US011017608B2

(12) United States Patent
Paul et al.

(10) Patent No.: US 11,017,608 B2
(45) Date of Patent: May 25, 2021

(54) DEVICES, METHODS, AND GRAPHICAL USER INTERFACES FOR DISPLAYING OBJECTS IN 3D CONTEXT

(71) Applicant: Apple Inc., Cupertino, CA (US)

(72) Inventors: Grant R. Paul, San Francisco, CA (US); Nicolas V. Scapel, Sunnyvale, CA (US); David Lui, San Jose, CA (US); Xiao Jin Yu, Sunnyvale, CA (US); Giancarlo Yerkes, Menlo Park, CA (US); Kyle E. Fisher, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/929,027

(22) Filed: Jul. 14, 2020

(65) Prior Publication Data

US 2020/0357184 A1 Nov. 12, 2020

Related U.S. Application Data

(63) Continuation of application No. 16/581,685, filed on Sep. 24, 2019, now Pat. No. 10,762,716.
(Continued)

(51) Int. Cl.
*G06T 19/00* (2011.01)
*G06F 3/0481* (2013.01)
(Continued)

(52) U.S. Cl.
CPC ............ *G06T 19/006* (2013.01); *G06F 3/013* (2013.01); *G06F 3/0488* (2013.01);
(Continued)

(58) Field of Classification Search
CPC ............... G06T 19/006; G06F 3/04815; G06F 3/04842
See application file for complete search history.

(56) References Cited

U.S. PATENT DOCUMENTS 8,825,187 B1 9/2014 Hamrick et al.
9,898,675 B2 2/2018 Yee et al.
(Continued)

FOREIGN PATENT DOCUMENTS

EP 2 741 175 A2 6/2014
WO WO 2018/222115 A1 12/2018

OTHER PUBLICATIONS

Atienza et al., "Interaction Techniques Using Head Gaze for Virtual Reality", 2016 IEEE Region 10 Symposium, May 9, 2016, 1 page.
(Continued)

*Primary Examiner* — Chong Wu
(74) *Attorney, Agent, or Firm* — Morgan, Lewis & Bockius LLP

(57) ABSTRACT

An electronic device, while displaying a first user interface region and a first media item, detects a first input corresponding to a sharing user interface. In response, the device displays the sharing user interface, which includes a second user interface object for initiating a process for displaying a second representation of a first media item in an augmented reality environment. In response to detecting a sequence of one or more inputs including selection of the second user interface object, the device displays the second representation of the first media item in a second user interface that includes content of at least a portion of a field of view of the device's one or more cameras.

36 Claims, 166 Drawing Sheets

Related U.S. Application Data

(60) Provisional application No. 62/855,973, filed on Jun. 1, 2019, provisional application No. 62/844,010, filed on May 6, 2019.

(51) Int. Cl.
*G06F 3/0484* (2013.01)
*G06F 3/01* (2006.01)
*G06F 3/0488* (2013.01)
*G06F 3/16* (2006.01)

(52) U.S. Cl.
CPC ...... *G06F 3/04815* (2013.01); *G06F 3/04842* (2013.01); *G06F 3/04845* (2013.01); *G06F 3/165* (2013.01)

(56) References Cited

U.S. PATENT DOCUMENTS

| | | | | |
|---|---|---|---|---|
| 2005/0232284 | A1 | 10/2005 | Karaoguz et al. | |
| 2008/0071559 | A1 | 3/2008 | Arrasvuori | |
| 2009/0083710 | A1 | 3/2009 | Best et al. | |
| 2013/0182012 | A1 | 7/2013 | Kim et al. | |
| 2013/0194259 | A1 | 8/2013 | Bennett et al. | |
| 2014/0002444 | A1 | 1/2014 | Bennett et al. | |
| 2014/0285522 | A1 | 9/2014 | Kim et al. | |
| 2016/0267720 | A1 | 9/2016 | Mandella et al. | |
| 2017/0053455 | A1 | 2/2017 | Chen et al. | |
| 2017/0199570 | A1* | 7/2017 | Kwon | H04M 1/72519 |
| 2018/0047213 | A1 | 2/2018 | Woo et al. | |
| 2018/0114372 | A1 | 4/2018 | Nagy et al. | |
| 2018/0150791 | A1 | 5/2018 | Stansell et al. | |
| 2018/0165888 | A1 | 6/2018 | Duan et al. | |
| 2018/0189354 | A1 | 7/2018 | Paine et al. | |
| 2018/0300185 | A1* | 10/2018 | Smet | G06F 3/04842 |
| 2018/0300952 | A1 | 10/2018 | Evans et al. | |
| 2019/0108686 | A1 | 4/2019 | Spivack et al. | |
| 2020/0356240 | A1 | 11/2020 | Paul et al. | |

OTHER PUBLICATIONS

Final Office Action, dated Jul. 9, 2020, in U.S. Appl. No. 16/581,679, 15 pages.
Art.com, "Gallery Wall Designer + ArtViewTM. Use Augmented Reality to See Art in Your Space", https://www.youtube.com/watch?v=YRCeS4QgQmo, Feb. 1, 2018, 2 pages.
Capstone International, "Virtual Fitting Room TryLive Eyewear by Total Immersion Augmented Reality", https://www.youtube.com/watch?v=k23mUSNfrX4, Mar. 13, 2014, 2 pages.
Ephere, "Playing Back and Retiming Simulation", https://ephere.com/plugins/autodesk/max/lucid/docs/1/Playing_Back_and_Retiming_Simulation, 2003, 4 pages.
Exhibitry, "Tactile AR—Hands-One Augmented Reality", https://exhibitgry.com/product-tactile, Aug. 23, 2018, 6 pages.
Ganti, "Design Lessons Learned From Mobile AR Experiments", https://medium.com/@vishnuganti/design-lessons-from-mobile-ar-experiments-b32ea3f42bb, Mar. 27, 2018, 9 pages.
Mattner, "Unity 3D VR Treasure Chest Animation", https://www.youtube.com/watch?v=KRP8XN7sQdk, Jan. 8, 2017, 2 pages.
Youtube, "Augmented Reality Tutorial #5: Scale and Drag Multiple Objects Individually", https://www.youtube.com/watch?v=KoP11-V07aw, Mar. 26, 2017, 4 pages.
Youtube, "RealSpace 3D Audio Demo—YouTube", https://www.youtube.com/watch?v=s3eOugAmLAA, Aug. 9, 2015, 2 pages.
Youtube, "What is 3D? Why is it Ignored?", https://wwwyoutube/Q5zB3HK_p5A, Apr. 1, 2016, 3 pages.
Office Action, dated Feb. 25, 2020, in U.S. Appl. No. 16/581,679, 13 pages.
Office Action, dated Jan. 23, 2020, in U.S. Appl. No. 16/581,685, 13 pages.
Notice of Allowance, dated Apr. 29, 2020, in U.S. Appl. No. 16/581,685, 8 pages.
Invitation to Pay Additiona Fees, dated Jun. 25, 2020, in International Patent Application No. PCT/US2020/026075, which corresponds with U.S. Appl. No. 16/581,679, 21 pages.
International Search Report and Written Opinion, dated Aug. 17, 2020, in International Patent Application No. PCT/US2020/026075, which corresponds with U.S. Appl. No. 16/581,679, 24 pages.
Office Action, dated Nov. 3, 2020, in U.S. Appl. No. 16/581,679, 15 pages.

* cited by examiner

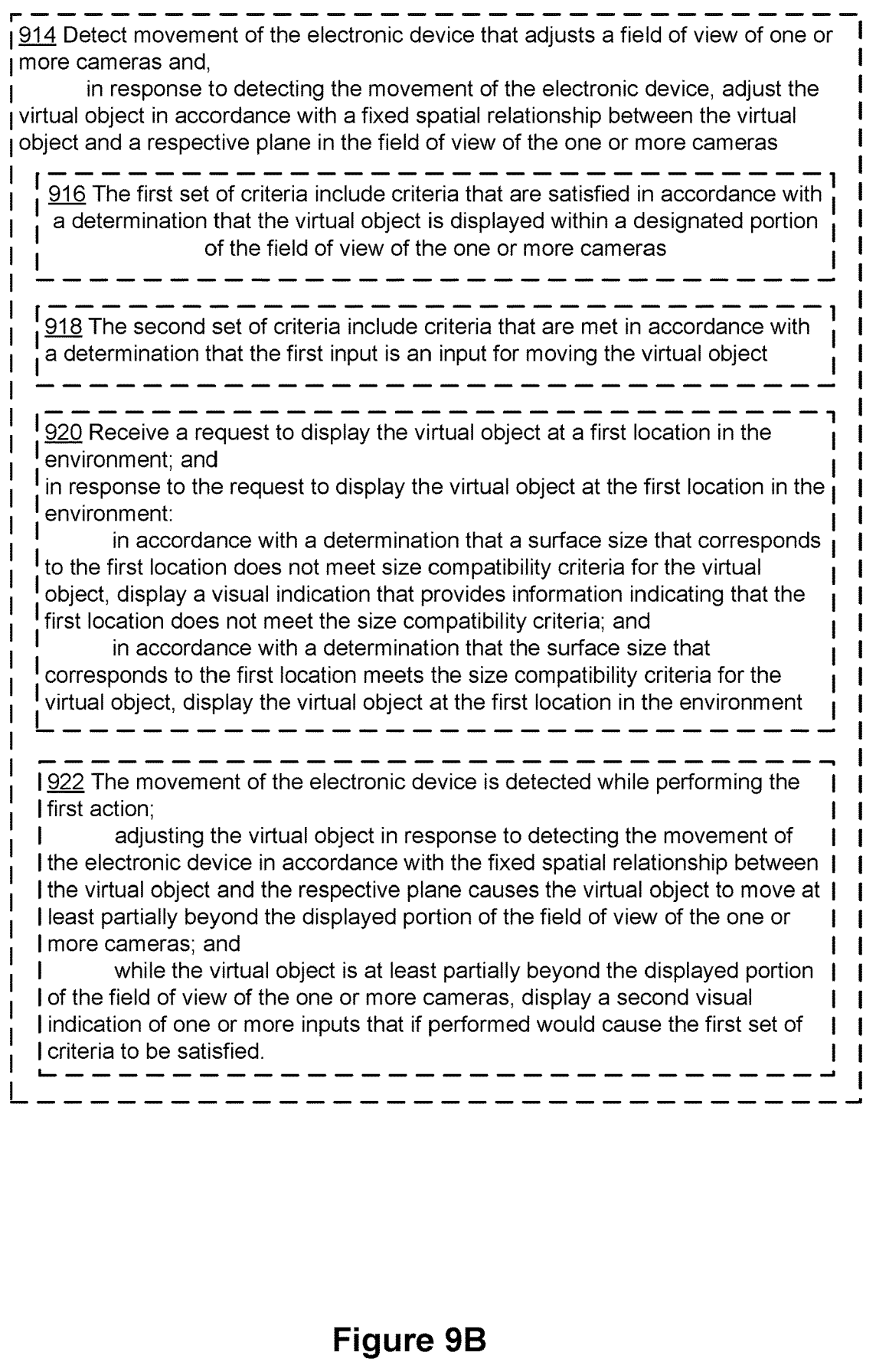

914 Detect movement of the electronic device that adjusts a field of view of one or more cameras and, in response to detecting the movement of the electronic device, adjust the virtual object in accordance with a fixed spatial relationship between the virtual object and a respective plane in the field of view of the one or more cameras 916 The first set of criteria include criteria that are satisfied in accordance with a determination that the virtual object is displayed within a designated portion of the field of view of the one or more cameras 918 The second set of criteria include criteria that are met in accordance with a determination that the first input is an input for moving the virtual object 920 Receive a request to display the virtual object at a first location in the environment; and in response to the request to display the virtual object at the first location in the environment:

in accordance with a determination that a surface size that corresponds to the first location does not meet size compatibility criteria for the virtual object, display a visual indication that provides information indicating that the first location does not meet the size compatibility criteria; and in accordance with a determination that the surface size that corresponds to the first location meets the size compatibility criteria for the virtual object, display the virtual object at the first location in the environment 922 The movement of the electronic device is detected while performing the first action;

adjusting the virtual object in response to detecting the movement of the electronic device in accordance with the fixed spatial relationship between the virtual object and the respective plane causes the virtual object to move at least partially beyond the displayed portion of the field of view of the one or more cameras; and while the virtual object is at least partially beyond the displayed portion of the field of view of the one or more cameras, display a second visual indication of one or more inputs that if performed would cause the first set of criteria to be satisfied.

Figure 9B

Figure 9C:
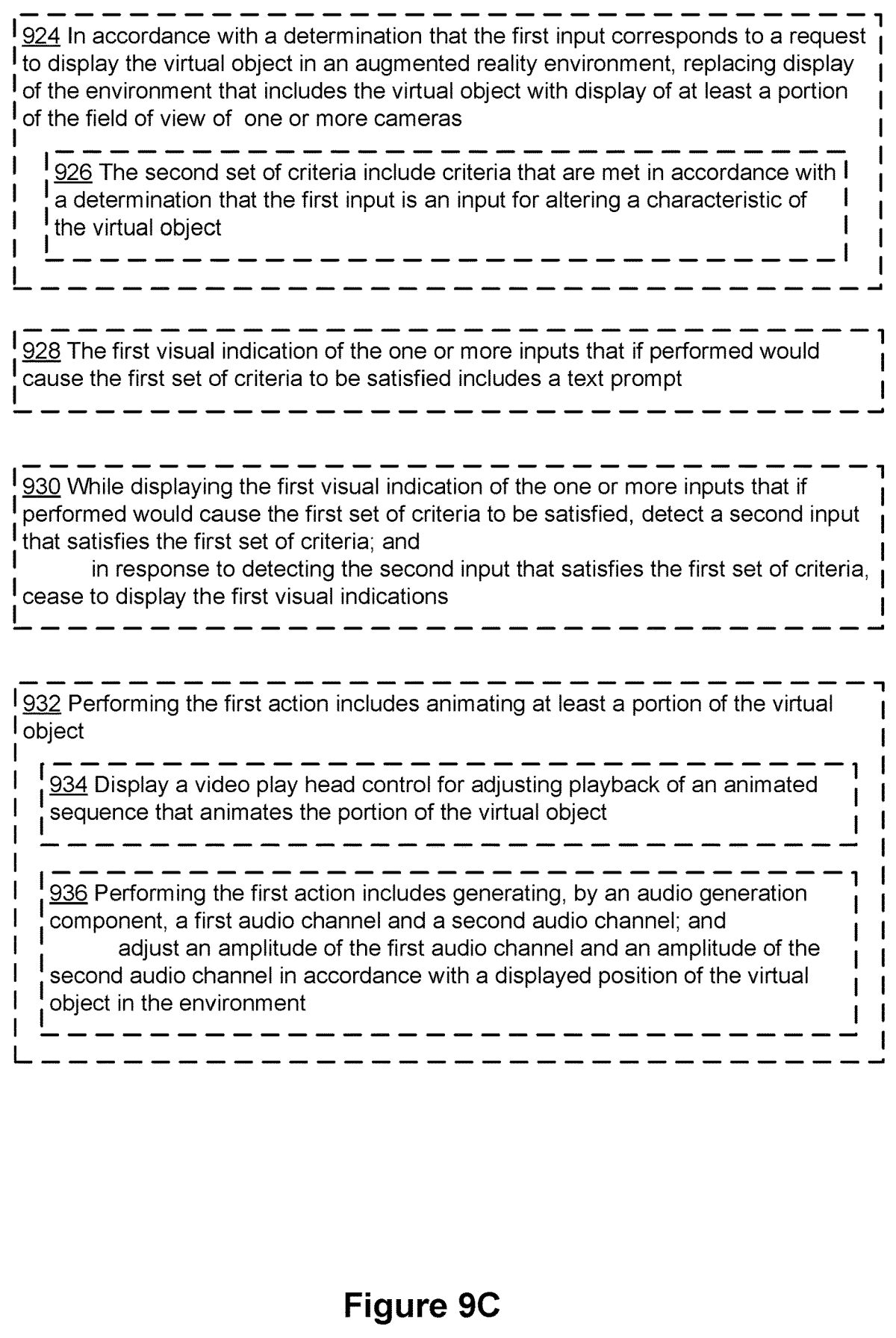

924 In accordance with a determination that the first input corresponds to a request to display the virtual object in an augmented reality environment, replacing display of the environment that includes the virtual object with display of at least a portion of the field of view of one or more cameras 926 The second set of criteria include criteria that are met in accordance with a determination that the first input is an input for altering a characteristic of the virtual object 928 The first visual indication of the one or more inputs that if performed would cause the first set of criteria to be satisfied includes a text prompt 930 While displaying the first visual indication of the one or more inputs that if performed would cause the first set of criteria to be satisfied, detect a second input that satisfies the first set of criteria; and in response to detecting the second input that satisfies the first set of criteria, cease to display the first visual indications 932 Performing the first action includes animating at least a portion of the virtual object 934 Display a video play head control for adjusting playback of an animated sequence that animates the portion of the virtual object 936 Performing the first action includes generating, by an audio generation component, a first audio channel and a second audio channel; and adjust an amplitude of the first audio channel and an amplitude of the second audio channel in accordance with a displayed position of the virtual object in the environment

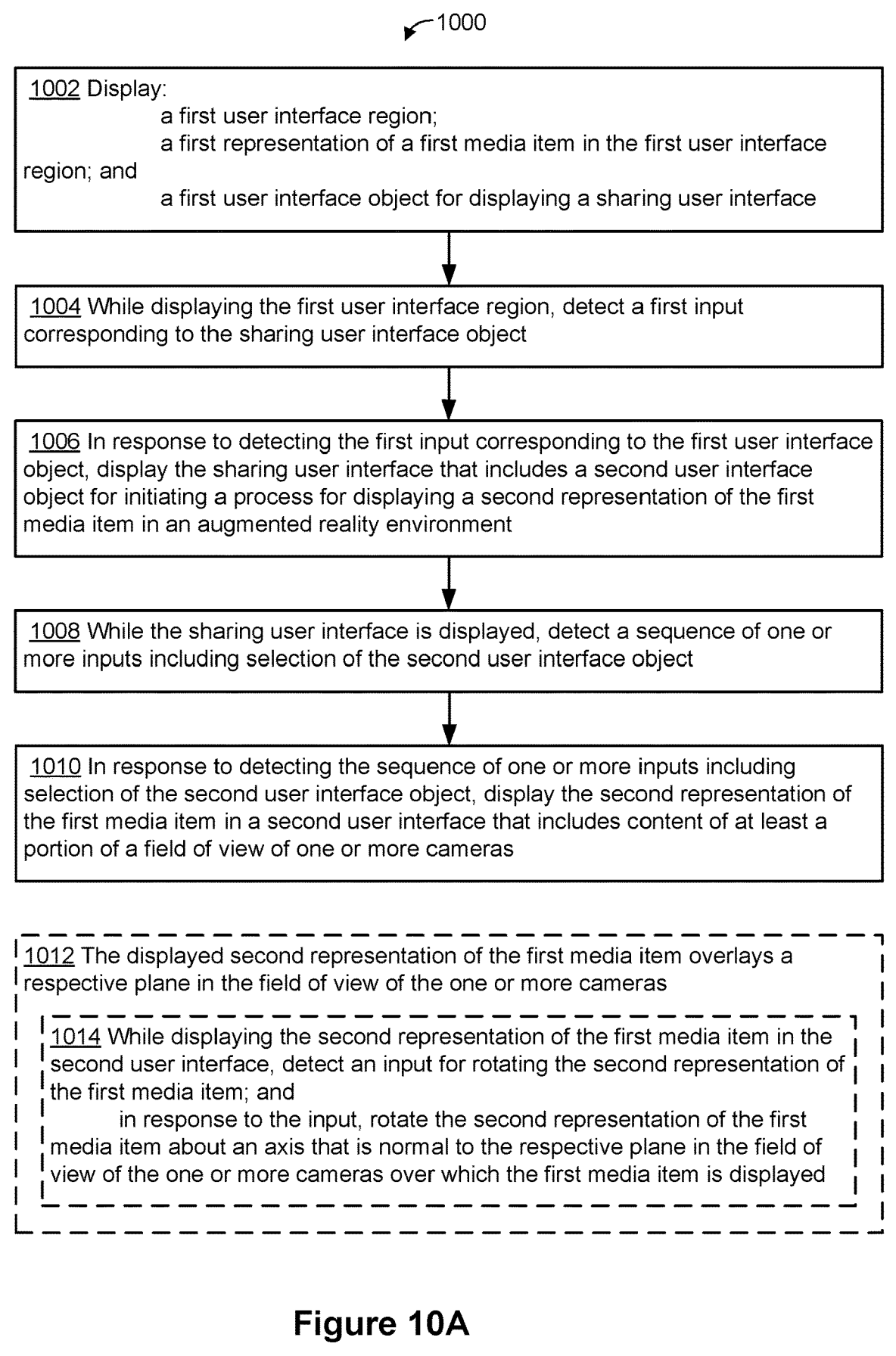

1002 Display:
a first user interface region;
a first representation of a first media item in the first user interface region; and
a first user interface object for displaying a sharing user interface 1004 While displaying the first user interface region, detect a first input corresponding to the sharing user interface object 1006 In response to detecting the first input corresponding to the first user interface object, display the sharing user interface that includes a second user interface object for initiating a process for displaying a second representation of the first media item in an augmented reality environment 1008 While the sharing user interface is displayed, detect a sequence of one or more inputs including selection of the second user interface object 1010 In response to detecting the sequence of one or more inputs including selection of the second user interface object, display the second representation of the first media item in a second user interface that includes content of at least a portion of a field of view of one or more cameras 1012 The displayed second representation of the first media item overlays a respective plane in the field of view of the one or more cameras 1014 While displaying the second representation of the first media item in the second user interface, detect an input for rotating the second representation of the first media item; and
in response to the input, rotate the second representation of the first media item about an axis that is normal to the respective plane in the field of view of the one or more cameras over which the first media item is displayed

Figure 10A

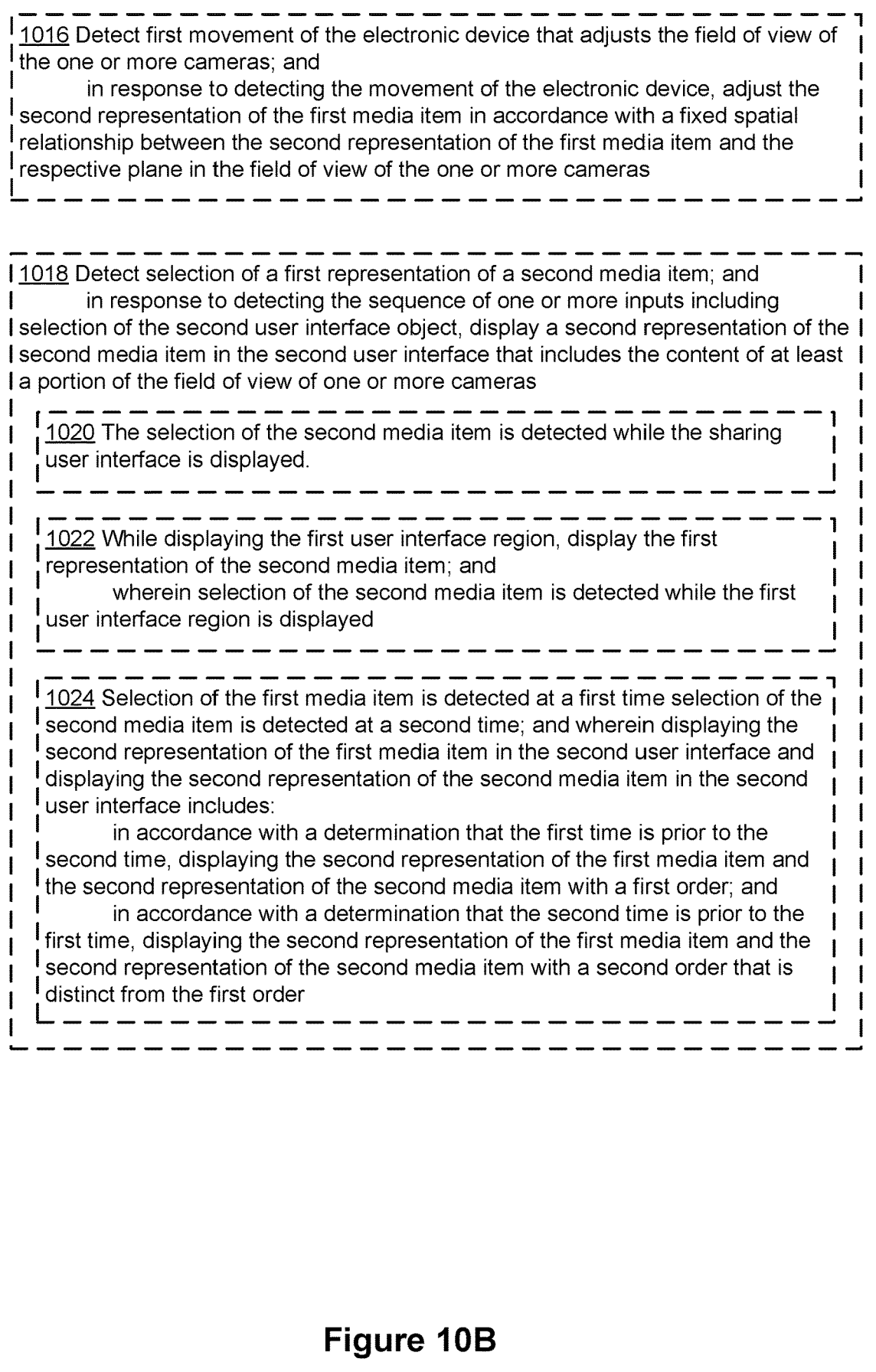

1016 Detect first movement of the electronic device that adjusts the field of view of the one or more cameras; and in response to detecting the movement of the electronic device, adjust the second representation of the first media item in accordance with a fixed spatial relationship between the second representation of the first media item and the respective plane in the field of view of the one or more cameras 1018 Detect selection of a first representation of a second media item; and in response to detecting the sequence of one or more inputs including selection of the second user interface object, display a second representation of the second media item in the second user interface that includes the content of at least a portion of the field of view of one or more cameras 1020 The selection of the second media item is detected while the sharing user interface is displayed.

1022 While displaying the first user interface region, display the first representation of the second media item; and wherein selection of the second media item is detected while the first user interface region is displayed 1024 Selection of the first media item is detected at a first time selection of the second media item is detected at a second time; and wherein displaying the second representation of the first media item in the second user interface and displaying the second representation of the second media item in the second user interface includes:

in accordance with a determination that the first time is prior to the second time, displaying the second representation of the first media item and the second representation of the second media item with a first order; and in accordance with a determination that the second time is prior to the first time, displaying the second representation of the first media item and the second representation of the second media item with a second order that is distinct from the first order

Figure 10B

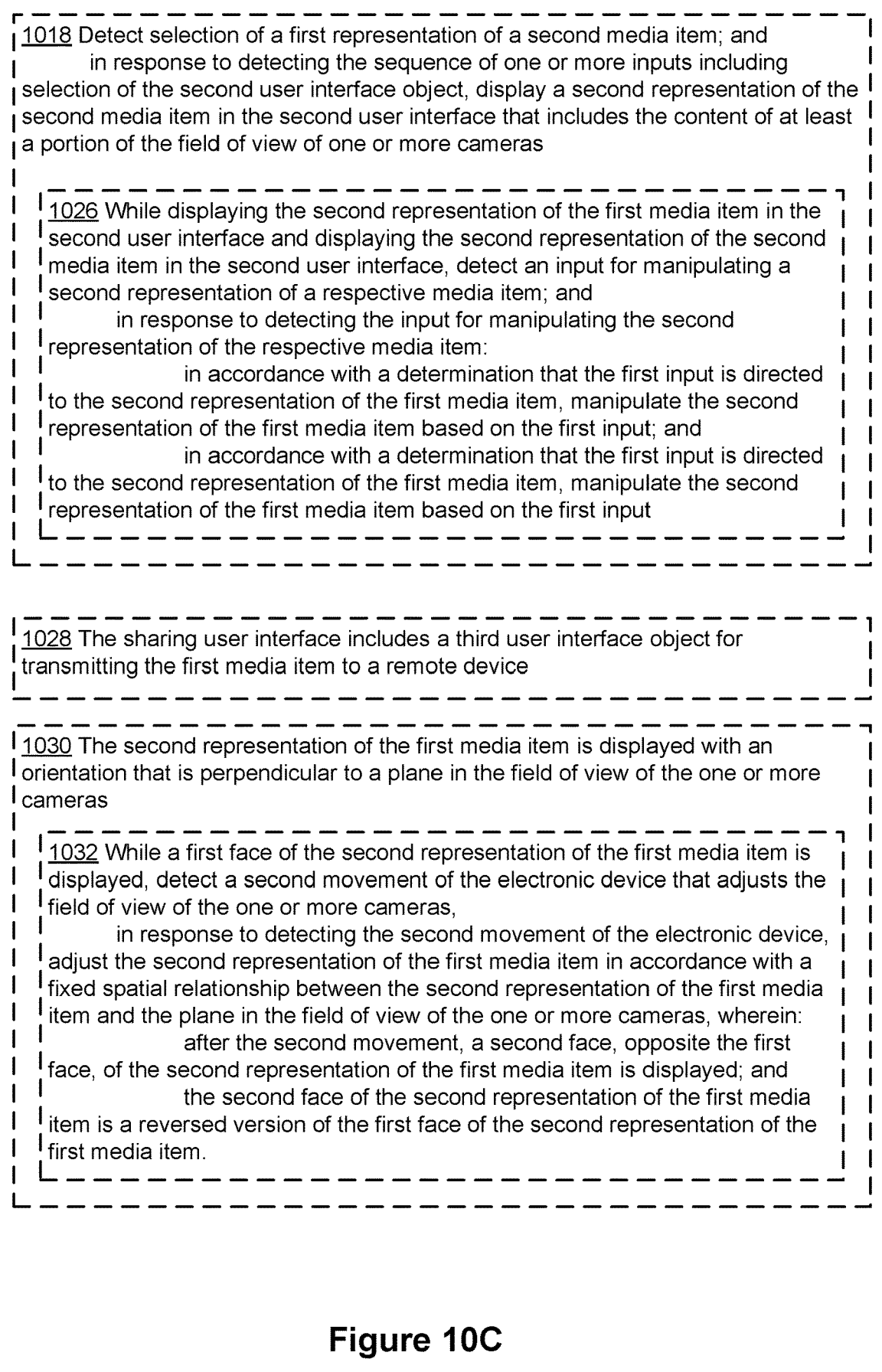

1018 Detect selection of a first representation of a second media item; and
in response to detecting the sequence of one or more inputs including selection of the second user interface object, display a second representation of the second media item in the second user interface that includes the content of at least a portion of the field of view of one or more cameras 1026 While displaying the second representation of the first media item in the second user interface and displaying the second representation of the second media item in the second user interface, detect an input for manipulating a second representation of a respective media item; and
in response to detecting the input for manipulating the second representation of the respective media item:
in accordance with a determination that the first input is directed to the second representation of the first media item, manipulate the second representation of the first media item based on the first input; and
in accordance with a determination that the first input is directed to the second representation of the first media item, manipulate the second representation of the first media item based on the first input 1028 The sharing user interface includes a third user interface object for transmitting the first media item to a remote device 1030 The second representation of the first media item is displayed with an orientation that is perpendicular to a plane in the field of view of the one or more cameras 1032 While a first face of the second representation of the first media item is displayed, detect a second movement of the electronic device that adjusts the field of view of the one or more cameras,
in response to detecting the second movement of the electronic device, adjust the second representation of the first media item in accordance with a fixed spatial relationship between the second representation of the first media item and the plane in the field of view of the one or more cameras, wherein:
after the second movement, a second face, opposite the first face, of the second representation of the first media item is displayed; and
the second face of the second representation of the first media item is a reversed version of the first face of the second representation of the first media item.

Figure 10C

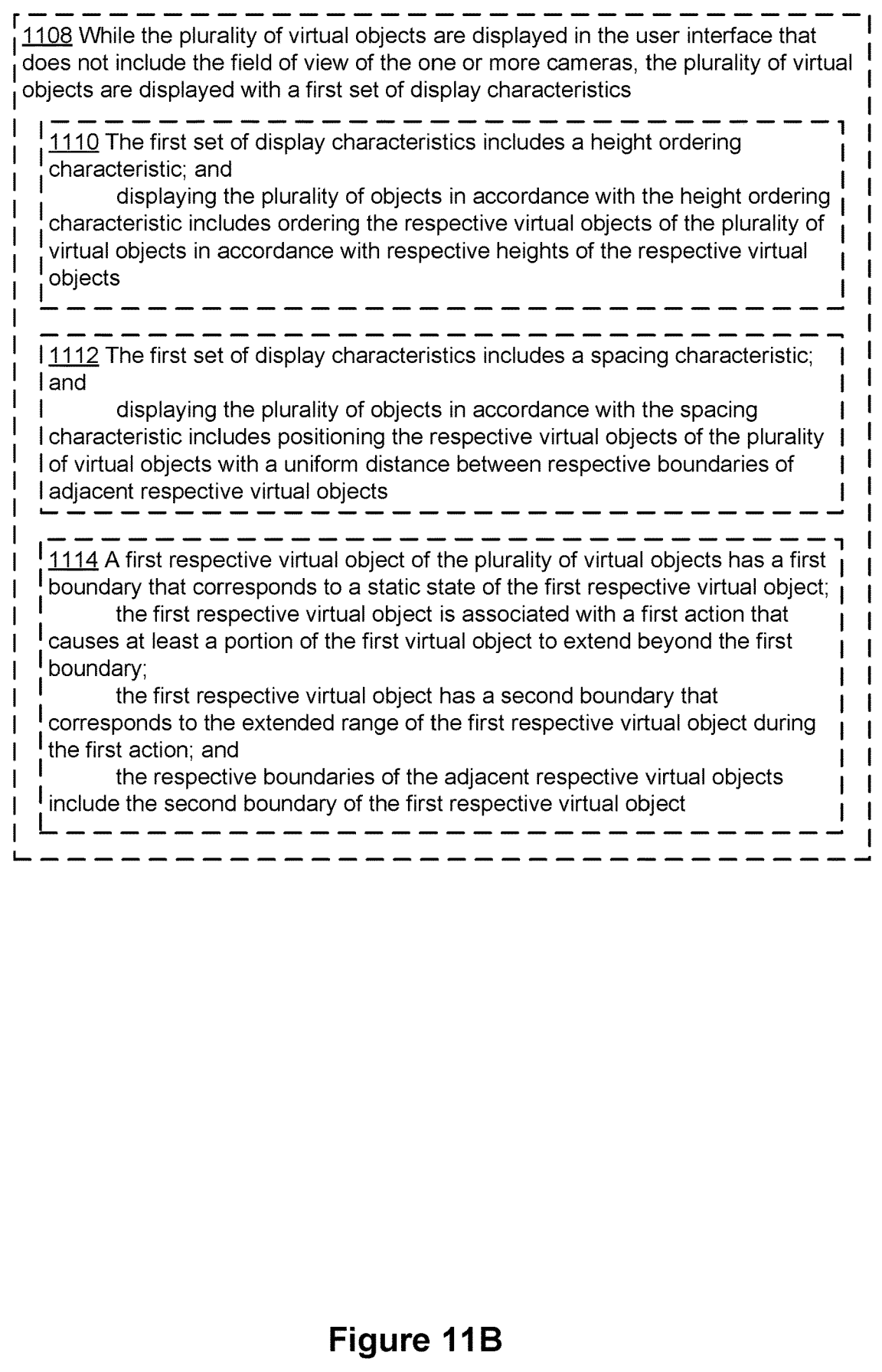

1108 While the plurality of virtual objects are displayed in the user interface that does not include the field of view of the one or more cameras, the plurality of virtual objects are displayed with a first set of display characteristics 1110 The first set of display characteristics includes a height ordering characteristic; and displaying the plurality of objects in accordance with the height ordering characteristic includes ordering the respective virtual objects of the plurality of virtual objects in accordance with respective heights of the respective virtual objects 1112 The first set of display characteristics includes a spacing characteristic; and displaying the plurality of objects in accordance with the spacing characteristic includes positioning the respective virtual objects of the plurality of virtual objects with a uniform distance between respective boundaries of adjacent respective virtual objects 1114 A first respective virtual object of the plurality of virtual objects has a first boundary that corresponds to a static state of the first respective virtual object;

the first respective virtual object is associated with a first action that causes at least a portion of the first virtual object to extend beyond the first boundary;

the first respective virtual object has a second boundary that corresponds to the extended range of the first respective virtual object during the first action; and the respective boundaries of the adjacent respective virtual objects include the second boundary of the first respective virtual object

Figure 11B

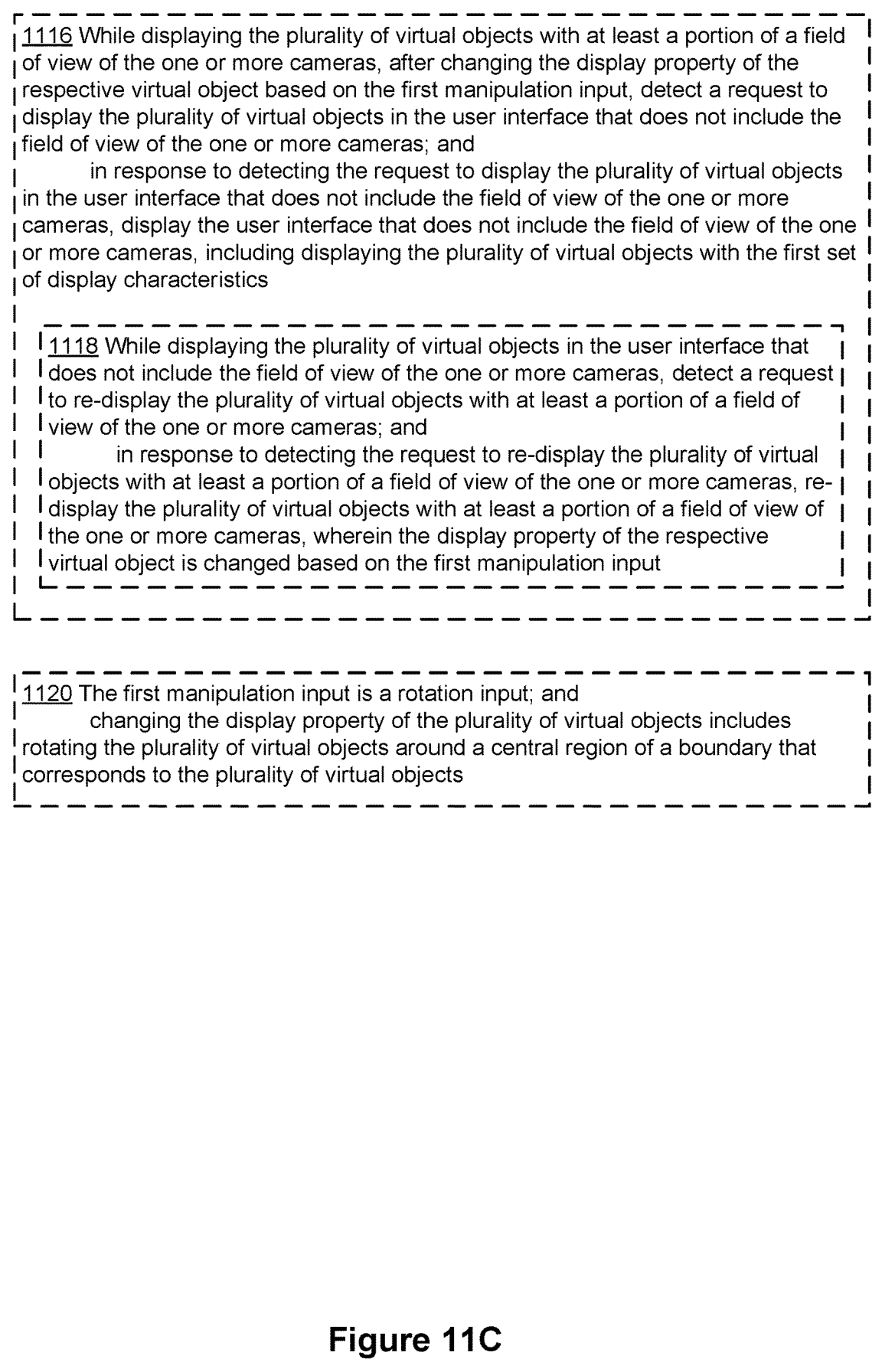

1116 While displaying the plurality of virtual objects with at least a portion of a field of view of the one or more cameras, after changing the display property of the respective virtual object based on the first manipulation input, detect a request to display the plurality of virtual objects in the user interface that does not include the field of view of the one or more cameras; and in response to detecting the request to display the plurality of virtual objects in the user interface that does not include the field of view of the one or more cameras, display the user interface that does not include the field of view of the one or more cameras, including displaying the plurality of virtual objects with the first set of display characteristics 1118 While displaying the plurality of virtual objects in the user interface that does not include the field of view of the one or more cameras, detect a request to re-display the plurality of virtual objects with at least a portion of a field of view of the one or more cameras; and in response to detecting the request to re-display the plurality of virtual objects with at least a portion of a field of view of the one or more cameras, re-display the plurality of virtual objects with at least a portion of a field of view of the one or more cameras, wherein the display property of the respective virtual object is changed based on the first manipulation input 1120 The first manipulation input is a rotation input; and changing the display property of the plurality of virtual objects includes rotating the plurality of virtual objects around a central region of a boundary that corresponds to the plurality of virtual objects

Figure 11C

Figure 11D:
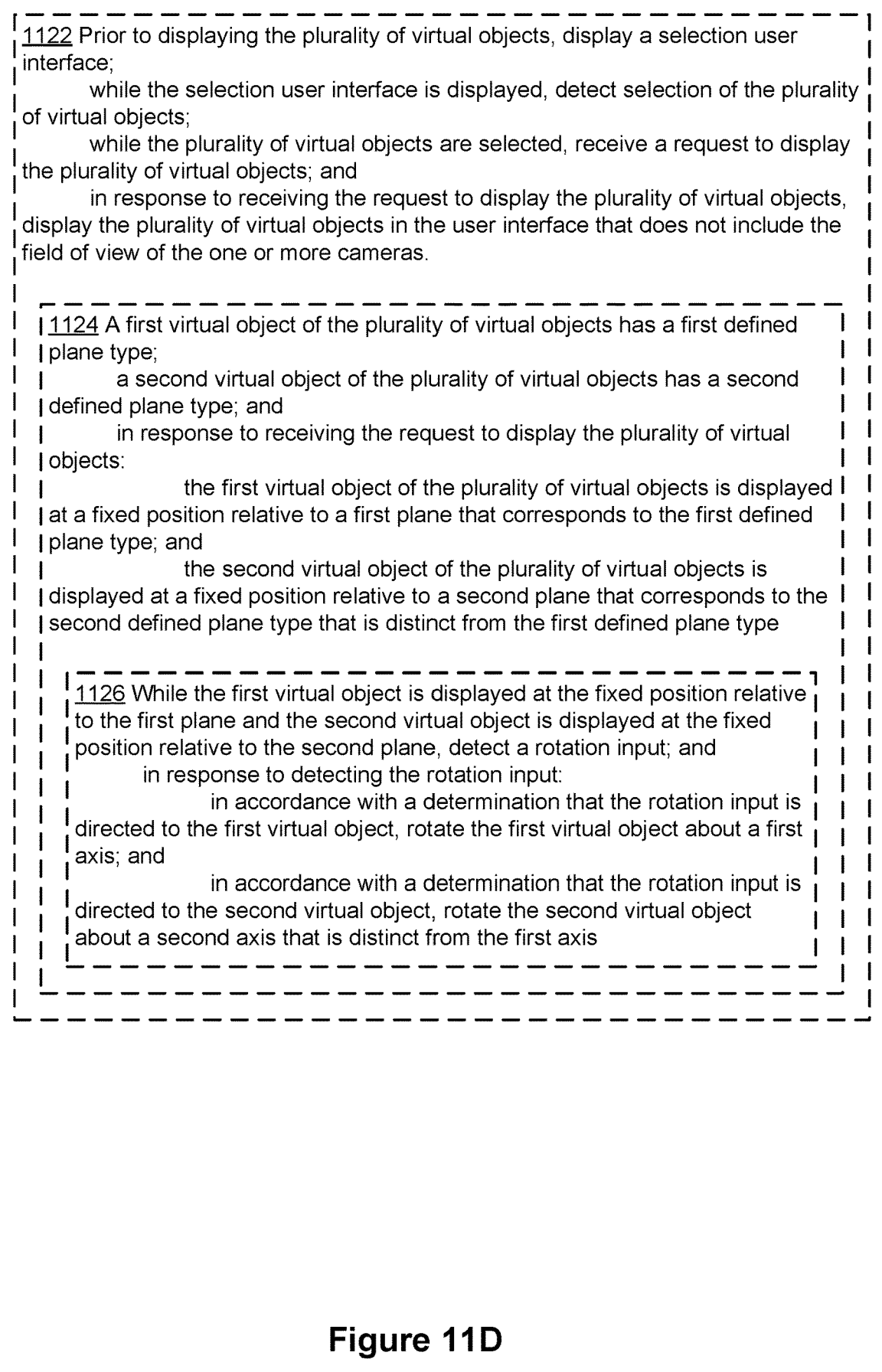

1122 Prior to displaying the plurality of virtual objects, display a selection user interface;

while the selection user interface is displayed, detect selection of the plurality of virtual objects;

while the plurality of virtual objects are selected, receive a request to display the plurality of virtual objects; and in response to receiving the request to display the plurality of virtual objects, display the plurality of virtual objects in the user interface that does not include the field of view of the one or more cameras.

1124 A first virtual object of the plurality of virtual objects has a first defined plane type;

a second virtual object of the plurality of virtual objects has a second defined plane type; and in response to receiving the request to display the plurality of virtual objects:

the first virtual object of the plurality of virtual objects is displayed at a fixed position relative to a first plane that corresponds to the first defined plane type; and the second virtual object of the plurality of virtual objects is displayed at a fixed position relative to a second plane that corresponds to the second defined plane type that is distinct from the first defined plane type 1126 While the first virtual object is displayed at the fixed position relative to the first plane and the second virtual object is displayed at the fixed position relative to the second plane, detect a rotation input; and in response to detecting the rotation input:

in accordance with a determination that the rotation input is directed to the first virtual object, rotate the first virtual object about a first axis; and in accordance with a determination that the rotation input is directed to the second virtual object, rotate the second virtual object about a second axis that is distinct from the first axis

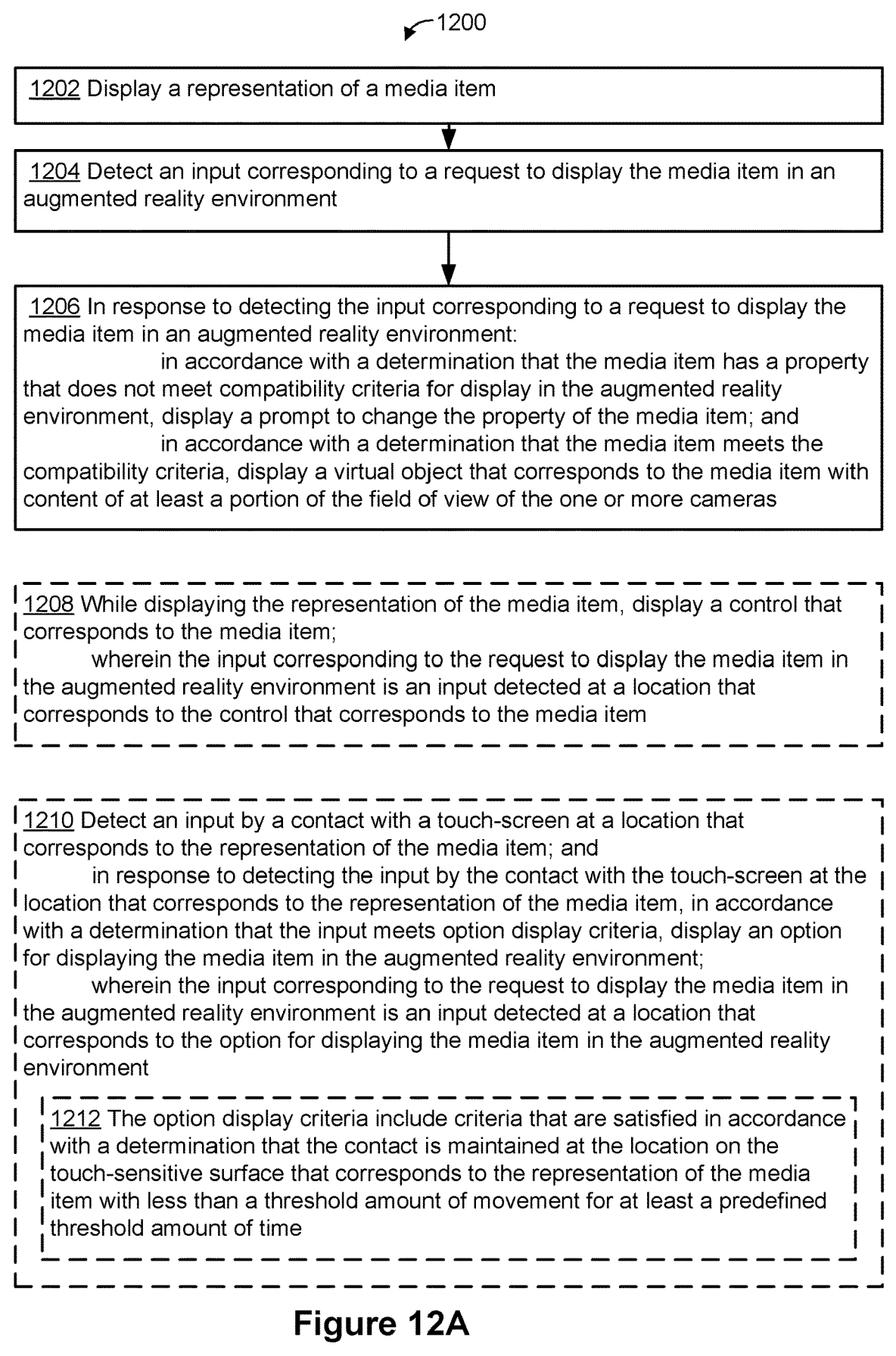

1202 Display a representation of a media item

1204 Detect an input corresponding to a request to display the media item in an augmented reality environment 1206 In response to detecting the input corresponding to a request to display the media item in an augmented reality environment:

in accordance with a determination that the media item has a property that does not meet compatibility criteria for display in the augmented reality environment, display a prompt to change the property of the media item; and in accordance with a determination that the media item meets the compatibility criteria, display a virtual object that corresponds to the media item with content of at least a portion of the field of view of the one or more cameras 1208 While displaying the representation of the media item, display a control that corresponds to the media item;

wherein the input corresponding to the request to display the media item in the augmented reality environment is an input detected at a location that corresponds to the control that corresponds to the media item 1210 Detect an input by a contact with a touch-screen at a location that corresponds to the representation of the media item; and in response to detecting the input by the contact with the touch-screen at the location that corresponds to the representation of the media item, in accordance with a determination that the input meets option display criteria, display an option for displaying the media item in the augmented reality environment;

wherein the input corresponding to the request to display the media item in the augmented reality environment is an input detected at a location that corresponds to the option for displaying the media item in the augmented reality environment 1212 The option display criteria include criteria that are satisfied in accordance with a determination that the contact is maintained at the location on the touch-sensitive surface that corresponds to the representation of the media item with less than a threshold amount of movement for at least a predefined threshold amount of time

Figure 12A

Figure 12B:
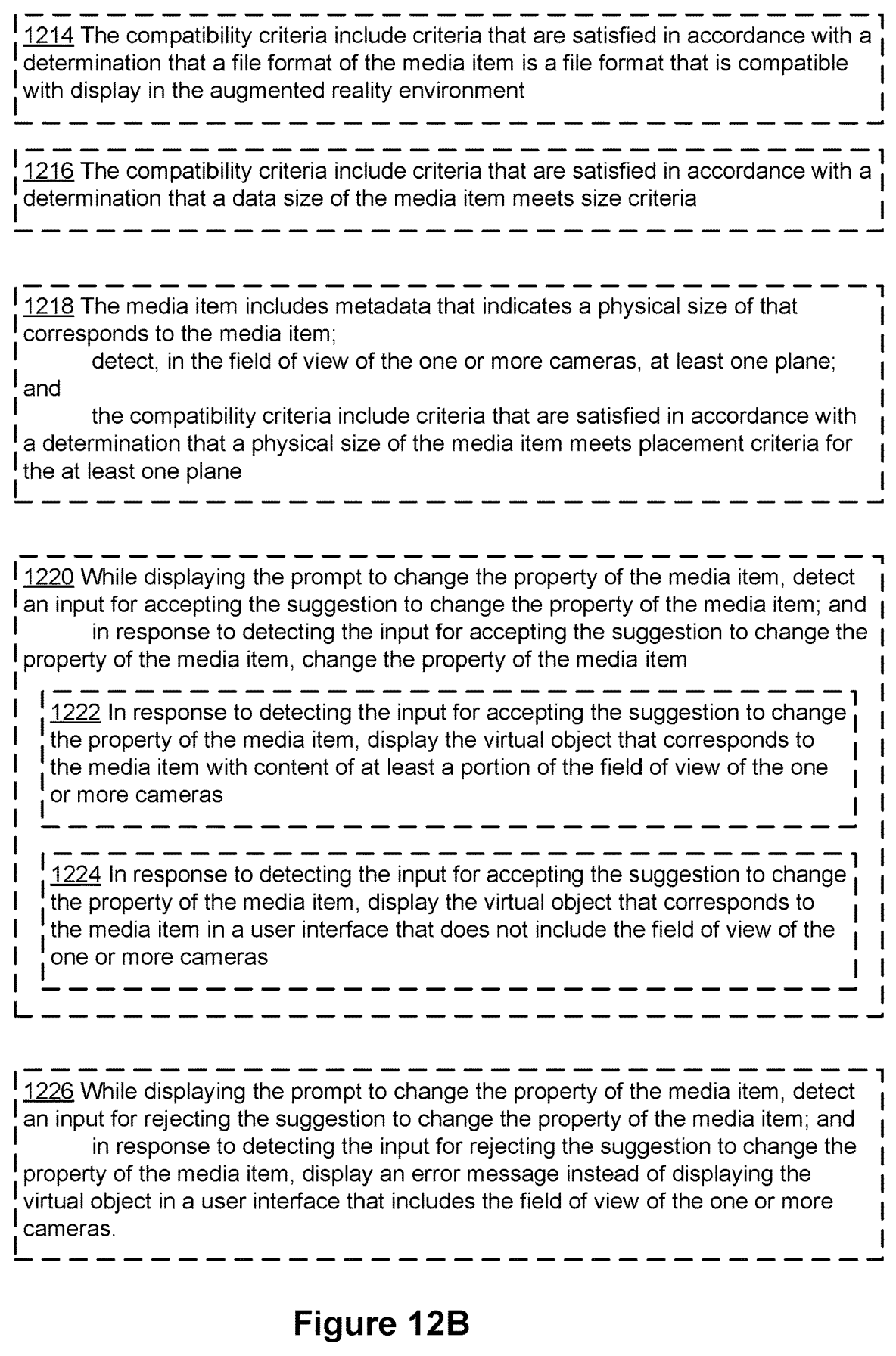

1214 The compatibility criteria include criteria that are satisfied in accordance with a determination that a file format of the media item is a file format that is compatible with display in the augmented reality environment 1216 The compatibility criteria include criteria that are satisfied in accordance with a determination that a data size of the media item meets size criteria 1218 The media item includes metadata that indicates a physical size of that corresponds to the media item;

detect, in the field of view of the one or more cameras, at least one plane; and the compatibility criteria include criteria that are satisfied in accordance with a determination that a physical size of the media item meets placement criteria for the at least one plane 1220 While displaying the prompt to change the property of the media item, detect an input for accepting the suggestion to change the property of the media item; and in response to detecting the input for accepting the suggestion to change the property of the media item, change the property of the media item 1222 In response to detecting the input for accepting the suggestion to change the property of the media item, display the virtual object that corresponds to the media item with content of at least a portion of the field of view of the one or more cameras 1224 In response to detecting the input for accepting the suggestion to change the property of the media item, display the virtual object that corresponds to the media item in a user interface that does not include the field of view of the one or more cameras 1226 While displaying the prompt to change the property of the media item, detect an input for rejecting the suggestion to change the property of the media item; and in response to detecting the input for rejecting the suggestion to change the property of the media item, display an error message instead of displaying the virtual object in a user interface that includes the field of view of the one or more cameras.

Figure 13E
Portable Multifunction Device 100
11:48
164
111
1342
CHECKOUT
SHIPPING ADDRESS
Joe Doe
1234 The Home Way
Palo Alto CA 95051
United States
PAYMENT METHOD
Credit Card (.... 1234)
1234 The Home Way, Palo Alto, CA
ORDER SUMMARY
Product
Price
QTY
Subtotal
LEATHER COUCH
$599
$599
Grand Total
$646.92
1344
Place Order
Touch Screen 112

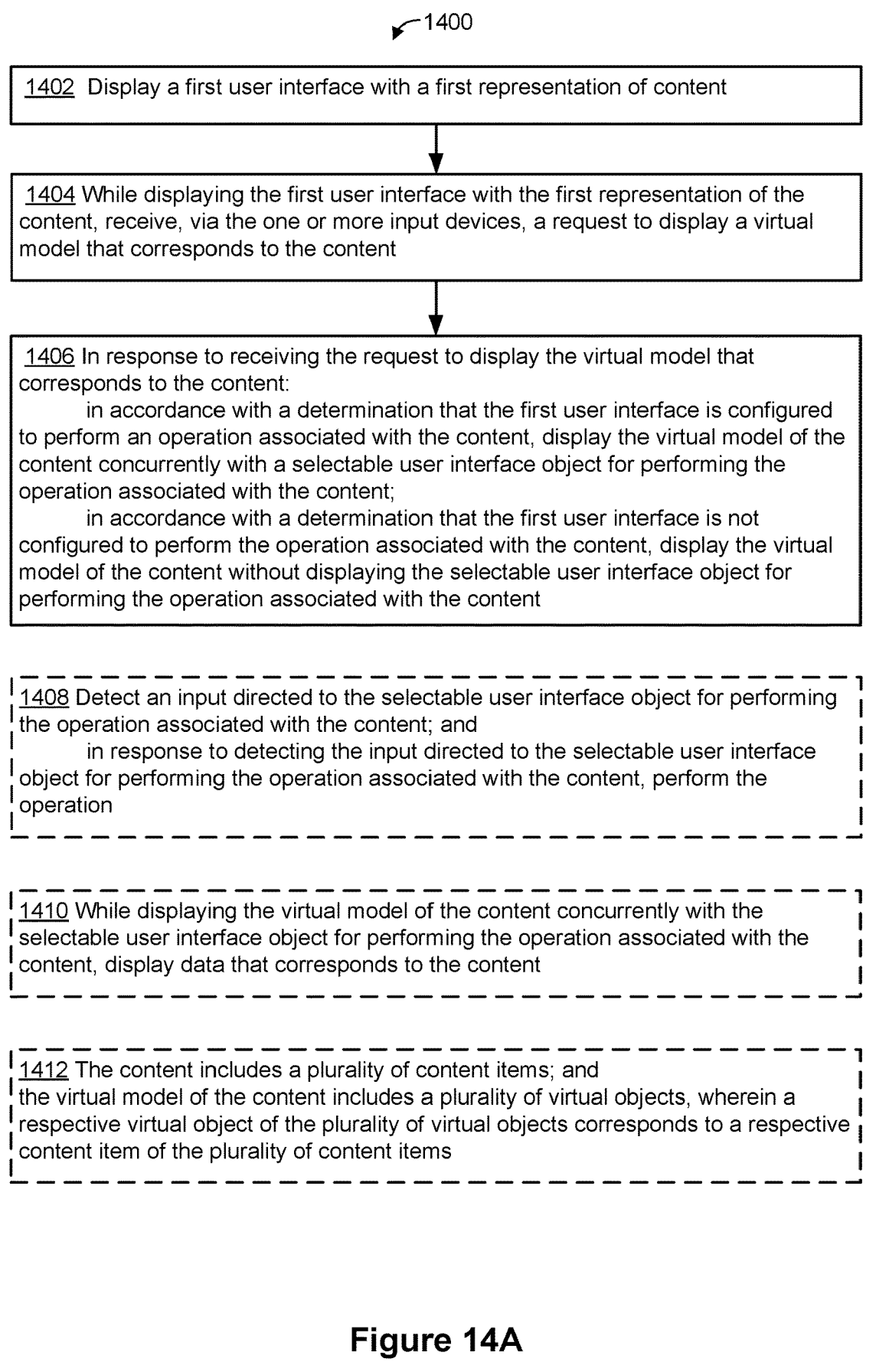

1402 Display a first user interface with a first representation of content

1404 While displaying the first user interface with the first representation of the content, receive, via the one or more input devices, a request to display a virtual model that corresponds to the content 1406 In response to receiving the request to display the virtual model that corresponds to the content:

in accordance with a determination that the first user interface is configured to perform an operation associated with the content, display the virtual model of the content concurrently with a selectable user interface object for performing the operation associated with the content;

in accordance with a determination that the first user interface is not configured to perform the operation associated with the content, display the virtual model of the content without displaying the selectable user interface object for performing the operation associated with the content 1408 Detect an input directed to the selectable user interface object for performing the operation associated with the content; and in response to detecting the input directed to the selectable user interface object for performing the operation associated with the content, perform the operation 1410 While displaying the virtual model of the content concurrently with the selectable user interface object for performing the operation associated with the content, display data that corresponds to the content 1412 The content includes a plurality of content items; and
the virtual model of the content includes a plurality of virtual objects, wherein a respective virtual object of the plurality of virtual objects corresponds to a respective content item of the plurality of content items

Figure 14A

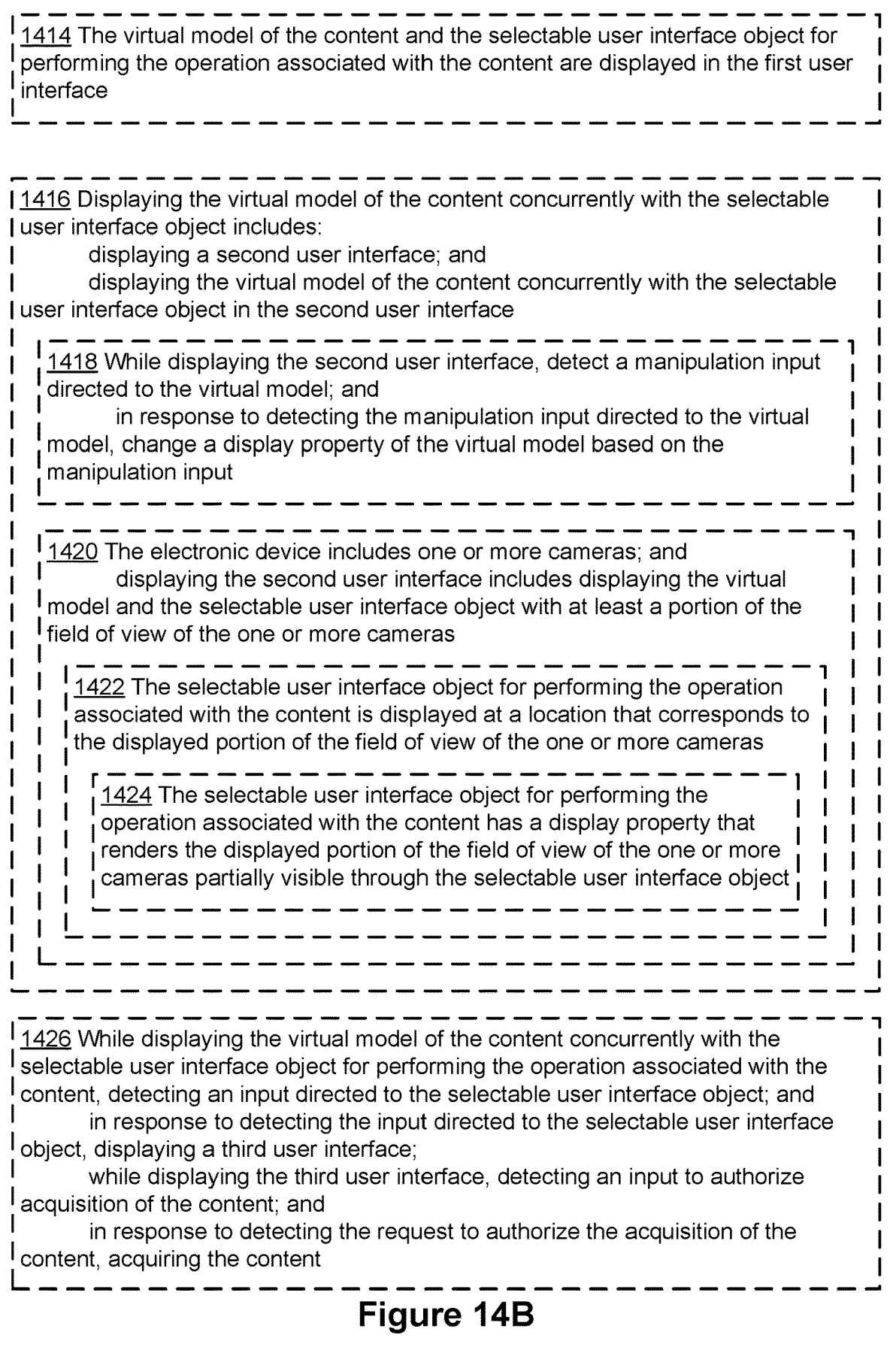

1414 The virtual model of the content and the selectable user interface object for performing the operation associated with the content are displayed in the first user interface 1416 Displaying the virtual model of the content concurrently with the selectable user interface object includes:
displaying a second user interface; and
displaying the virtual model of the content concurrently with the selectable user interface object in the second user interface 1418 While displaying the second user interface, detect a manipulation input directed to the virtual model; and
in response to detecting the manipulation input directed to the virtual model, change a display property of the virtual model based on the manipulation input 1420 The electronic device includes one or more cameras; and
displaying the second user interface includes displaying the virtual model and the selectable user interface object with at least a portion of the field of view of the one or more cameras 1422 The selectable user interface object for performing the operation associated with the content is displayed at a location that corresponds to the displayed portion of the field of view of the one or more cameras 1424 The selectable user interface object for performing the operation associated with the content has a display property that renders the displayed portion of the field of view of the one or more cameras partially visible through the selectable user interface object 1426 While displaying the virtual model of the content concurrently with the selectable user interface object for performing the operation associated with the content, detecting an input directed to the selectable user interface object; and
in response to detecting the input directed to the selectable user interface object, displaying a third user interface;
while displaying the third user interface, detecting an input to authorize acquisition of the content; and
in response to detecting the request to authorize the acquisition of the content, acquiring the content

Figure 14B

DEVICES, METHODS, AND GRAPHICAL USER INTERFACES FOR DISPLAYING OBJECTS IN 3D CONTEXT

RELATED APPLICATIONS

This application is a continuation of U.S. patent application Ser. No. 16/581,685, filed Sep. 24, 2019, which claims priority to U.S. Provisional Application Ser. No. 62/855,973, filed Jun. 1, 2019 and U.S. Provisional Application Ser. No. 62/844,010, filed May 6, 2019, all of which are incorporated by reference herein in their entireties.

This application is related to U.S. Provisional Application Ser. No. 62/679,951, filed Jun. 3, 2018 and U.S. Provisional Application Ser. No. 62/621,529, filed Jan. 24, 2018, which are incorporated by reference herein in their entireties.

TECHNICAL FIELD

This relates generally to electronic devices that display virtual objects, including but not limited to electronic devices that display virtual objects in a variety of contexts.

BACKGROUND

The development of computer systems for augmented reality has increased significantly in recent years. Example augmented reality environments include at least some virtual elements that replace or augment the physical world. Input devices, such as touch-sensitive surfaces, for computer systems and other electronic computing devices are used to interact with virtual/augmented reality environments. Example touch-sensitive surfaces include touchpads, touch-sensitive remote controls, and touch-screen displays. Such surfaces are used to manipulate user interfaces and objects therein on a display. Example user interface objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to generate virtual objects suitable for display in an augmented reality environment, and systems that require lack handling for manipulating sets of virtual objects are tedious, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for interacting with virtual objects. Such methods and interfaces optionally complement or replace conventional methods for interacting with virtual objects. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with interfaces for interacting with virtual objects (e.g., user interfaces for augmented reality (AR) and related non-AR interfaces) are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a touchpad. In some embodiments, the computer system has (and/or is in communication with) a touch-sensitive display (also known as a "touch screen" or "touch-screen display"). In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device including a display generation component and one or more input devices. The method includes displaying, via the display generation component, at least a portion of an environment that includes a virtual object that is associated with a first action that is triggered based on satisfaction of a first set of criteria. The method further includes, while displaying, by the display generation component, the portion of the environment, detecting a first input. The method further includes, in response to detecting the first input: in accordance with a determination that the first input satisfies the first set of criteria, performing the first action; and in accordance with a determination that the first input does not satisfy the first set of criteria but instead satisfies a second set of criteria, forgoing performing the first action and instead displaying a first visual indication of one or more inputs that if performed would cause the first set of criteria to be satisfied.

In accordance with some embodiments, a method is performed at an electronic device including a display generation component, one or more input devices, and one or more cameras. The method includes displaying, by the display generation component: a first user interface region, a first representation of a first media item in the first user interface region, and a first user interface object for displaying a sharing user interface. The method further includes, while displaying the first user interface region, detecting a first input corresponding to the sharing user interface object. The method further includes, in response to detecting the first input corresponding to the first user interface object, displaying the sharing user interface that includes a second user interface object for initiating a process for displaying a second representation of the first media item in an augmented reality environment. The method further includes, while the sharing user interface is displayed, detecting a sequence of one or more inputs including selection of the second user interface object. The method further includes, in response to detecting the sequence of one or more inputs including selection of the second user interface object, displaying the second representation of the first media item in a second user interface that includes content of at least a portion of the field of view of the one or more cameras.

In accordance with some embodiments, a method is performed at an electronic device including a display generation component, one or more input devices, and one or more cameras. The method includes displaying, by the display generation component, a plurality of virtual objects. The method further includes, while displaying the plurality of virtual objects, detecting a first manipulation input directed to a respective virtual object of the plurality of virtual objects. The method further includes, in response to detecting the first manipulation input directed to the respective virtual object of the plurality of virtual objects: in accordance with a determination that the plurality of virtual objects are displayed with at least a portion of a field of view of the one or more cameras, changing a display property of the respective virtual object based on the first manipulation input; and, in accordance with a determination that the plurality of virtual objects are displayed in a user interface that does not include the field of view of the one or more cameras, changing a display property of the plurality of virtual objects based on the first manipulation input.

In accordance with some embodiments, a method is performed at an electronic device including a display generation component, one or more input devices, and one or more cameras. The method includes displaying, by the display generation component, a representation of a media item. The method further includes detecting an input corresponding to a request to display the media item in an augmented reality environment. The method further includes, in response to detecting the input corresponding to a request to display the media item in an augmented reality environment: in accordance with a determination that the media item has a property that does not meet compatibility criteria for display in the augmented reality environment, displaying a prompt to change the property of the media item; and in accordance with a determination that the media item meets the compatibility criteria, displaying a virtual object that corresponds to the media item with content of at least a portion of the field of view of the one or more cameras.

In accordance with some embodiments, a method is performed at an electronic device including a display generation component and one or more input devices. The method includes displaying, via the display generation component, a first user interface with a first representation of content. The method further includes, while displaying the first user interface with the first representation of the content, receiving, via the one or more input devices, a request to display a virtual model that corresponds to the content. The method further includes, in response to receiving the request to display the virtual model that corresponds to the content: in accordance with a determination that the first user interface is configured to perform an operation associated with the content, displaying the virtual model of the content concurrently with a selectable user interface object for performing the operation associated with the content; and, in accordance with a determination that the first user interface is not configured to perform the operation associated with the content, displaying the virtual model of the content without displaying the selectable user interface object for performing the operation associated with the content.

In accordance with some embodiments, an electronic device includes a display generation component, one or more input devices, optionally one or more cameras, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display generation component, one or more input devices, and optionally one or more cameras cause the device to perform or cause performance of the operations of any of the methods described herein. In accordance with some embodiments, a graphical user interface on an electronic device with a display generation component, one or more input devices, optionally one or more cameras, a memory, and one or more processors to execute one or more programs stored in the memory includes one or more of the elements displayed in any of the methods described herein, which are updated in response to inputs, as described in any of the methods described herein. In accordance with some embodiments, an electronic device includes: display generation component, one or more input devices, and optionally one or more cameras; and means for performing or causing performance of the operations of any of the methods described herein. In accordance with some embodiments, an information processing apparatus, for use in an electronic device with a display generation component, one or more input devices, and optionally one or more cameras includes means for performing or causing performance of the operations of any of the methods described herein.

Thus, electronic devices with display generation component, one or more input devices, and optionally one or more cameras, are provided with improved methods and interfaces for displaying virtual objects in a variety of contexts, thereby increasing the effectiveness, efficiency, and user satisfaction with such devices. Such methods and interfaces may complement or replace conventional methods for displaying virtual objects in a variety of contexts.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A-5K, 5L-1, 5L-2, 5M-1, 5M-2, 5N-1, 5N-2, 5O-1, 5O-2, and 5P-5AK illustrate example user interfaces for displaying a visual indication of one or more inputs that if performed would cause criteria to be satisfied for performing an action, in accordance with some embodiments.

FIGS. 9A-9C are flow diagrams of a process for displaying a visual indication of one or more inputs that if performed would cause criteria to be satisfied for performing an action.

FIGS. 10A-10C are flow diagrams of a process for displaying a media item in a user interface that includes content of at least a portion of a field of view of one or more cameras, in accordance with some embodiments.

FIGS. 11A-11D are flow diagrams of a process for responding to an input directed to a respective virtual object of a plurality of displayed virtual objects, in accordance with some embodiments.

FIGS. 12A-12B are flow diagrams of a process for displaying a prompt to change a property of a media item that does not meet compatibility criteria for display in an augmented reality environment, in accordance with some embodiments.

FIGS. 14A-14B are flow diagrams of a process for displaying a virtual model of content concurrently with a selectable user interface object for performing an operation associated with the content, in accordance with some embodiments.

DESCRIPTION OF EMBODIMENTS

A virtual object is a graphical representation of a three-dimensional object in a virtual environment. Conventional methods of interacting with virtual objects often lack sufficient feedback to indicate to a user the needed input to achieve an intended outcome (e.g., performing an action associated with a virtual object). Further, conventional methods of require a cumbersome series of inputs (input for opening a conversion application, importing a converted item into an application for viewing the converted item in an augmented reality environment, etc.) for adapting media items for viewing in an augmented reality environment (e.g., an environment in which a view of the physical world is augmented with supplemental information that provides additional information to a user that is not available in the physical world). The embodiments herein provide an intuitive way for a user to display virtual objects in various contexts.

The systems, methods, and GUIs described herein improve user interface interactions with virtual/augmented reality environments in multiple ways. For example, they make it easier to: display a virtual object in an augmented reality environment and, in response to different inputs, adjust the appearance of the virtual object for display in the augmented reality environment.

Figure 2:
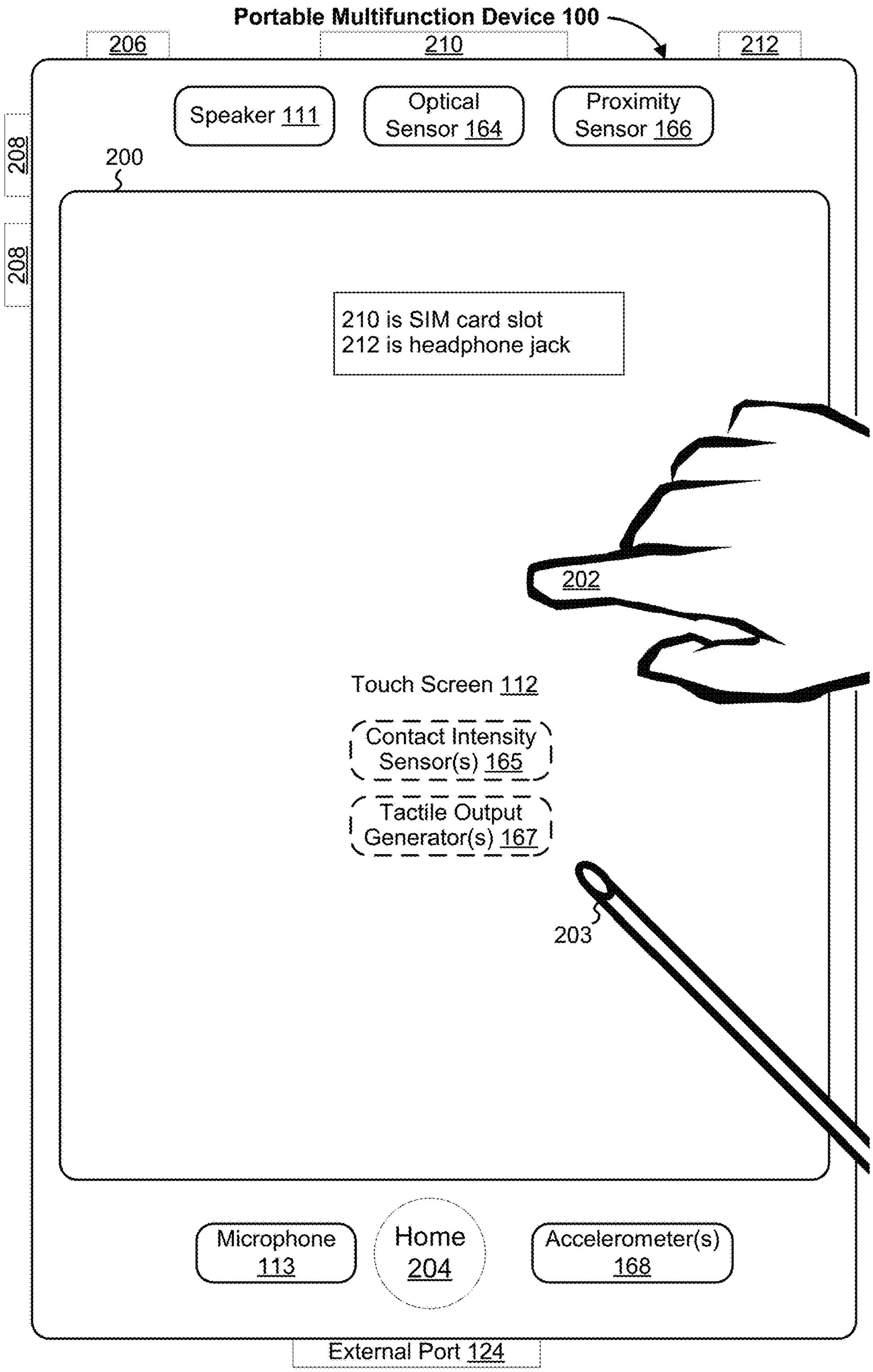
FIG. 2 illustrates a portable multifunction device having a touch screen in accordance with some embodiments.
Figure 3:
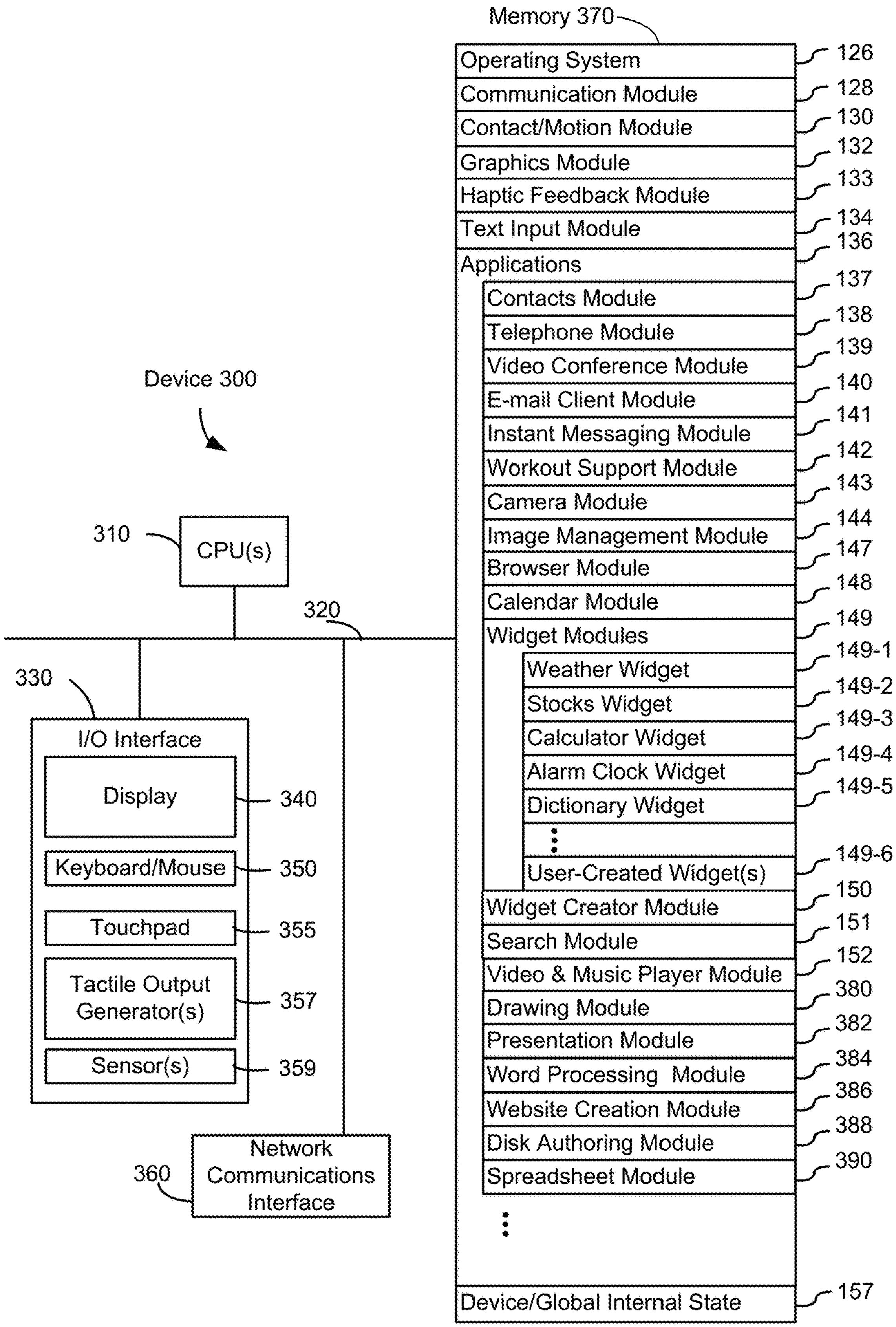
FIG. 3 is a block diagram of an example multifunction device with a display and a touch-sensitive surface in accordance with some embodiments.
Figure 4A:
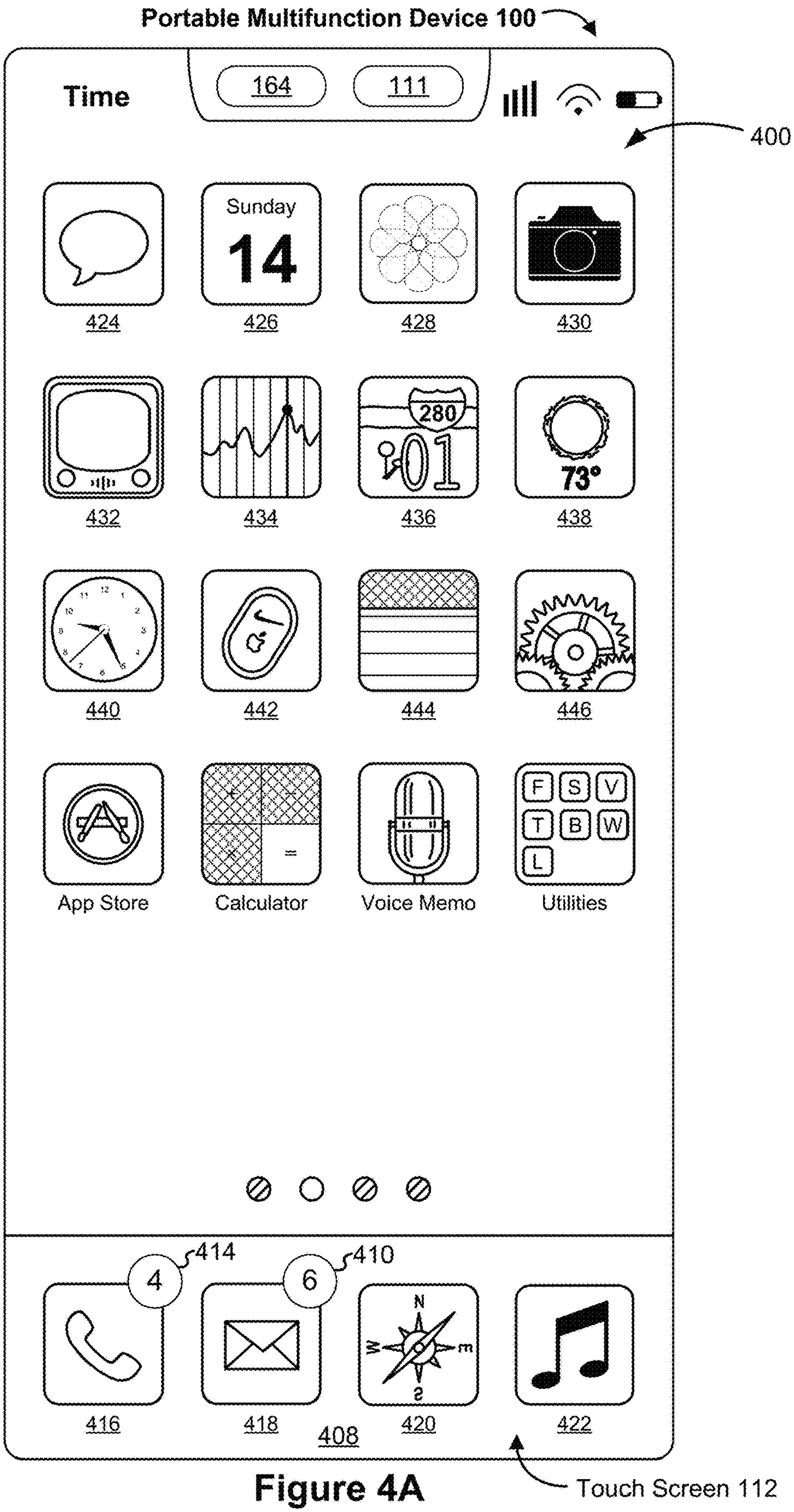
FIG. 4A illustrates an example user interface for a menu of applications on a portable multifunction device in accordance with some embodiments.
Figure 4B:
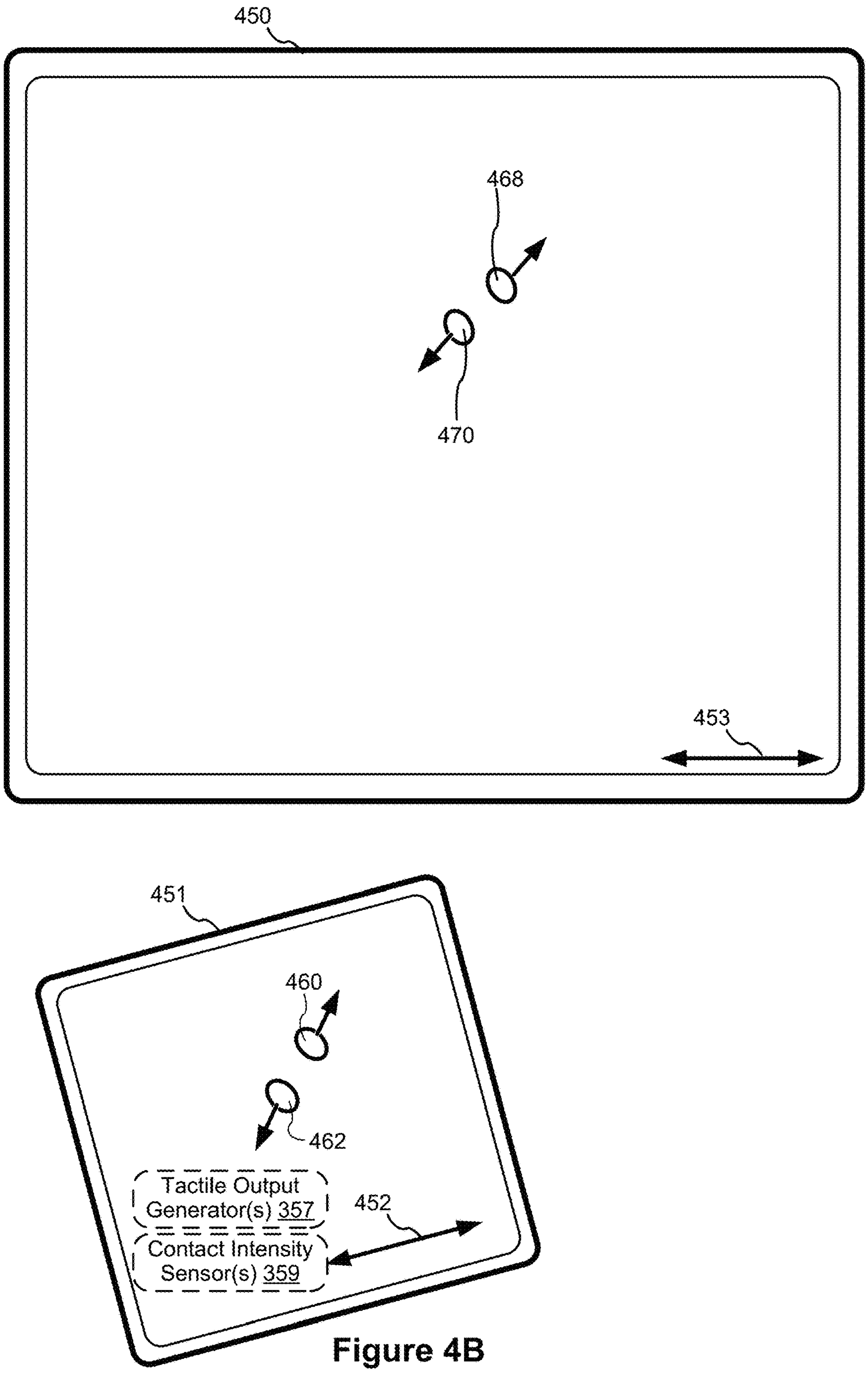
FIG. 4B illustrates an example user interface for a multifunction device with a touch-sensitive surface that is separate from the display in accordance with some embodiments.
Figure 5A:
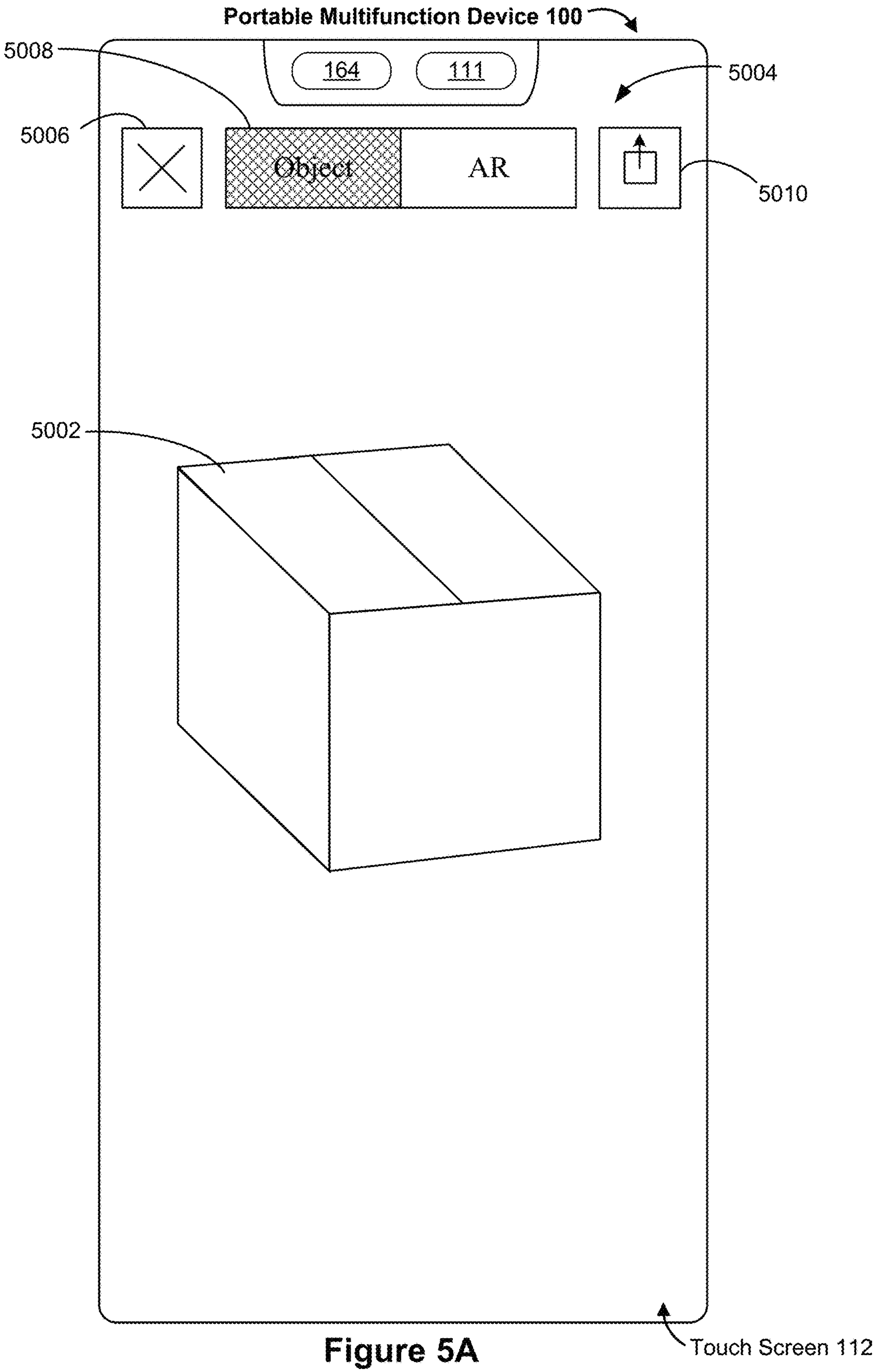
Figure 9A:
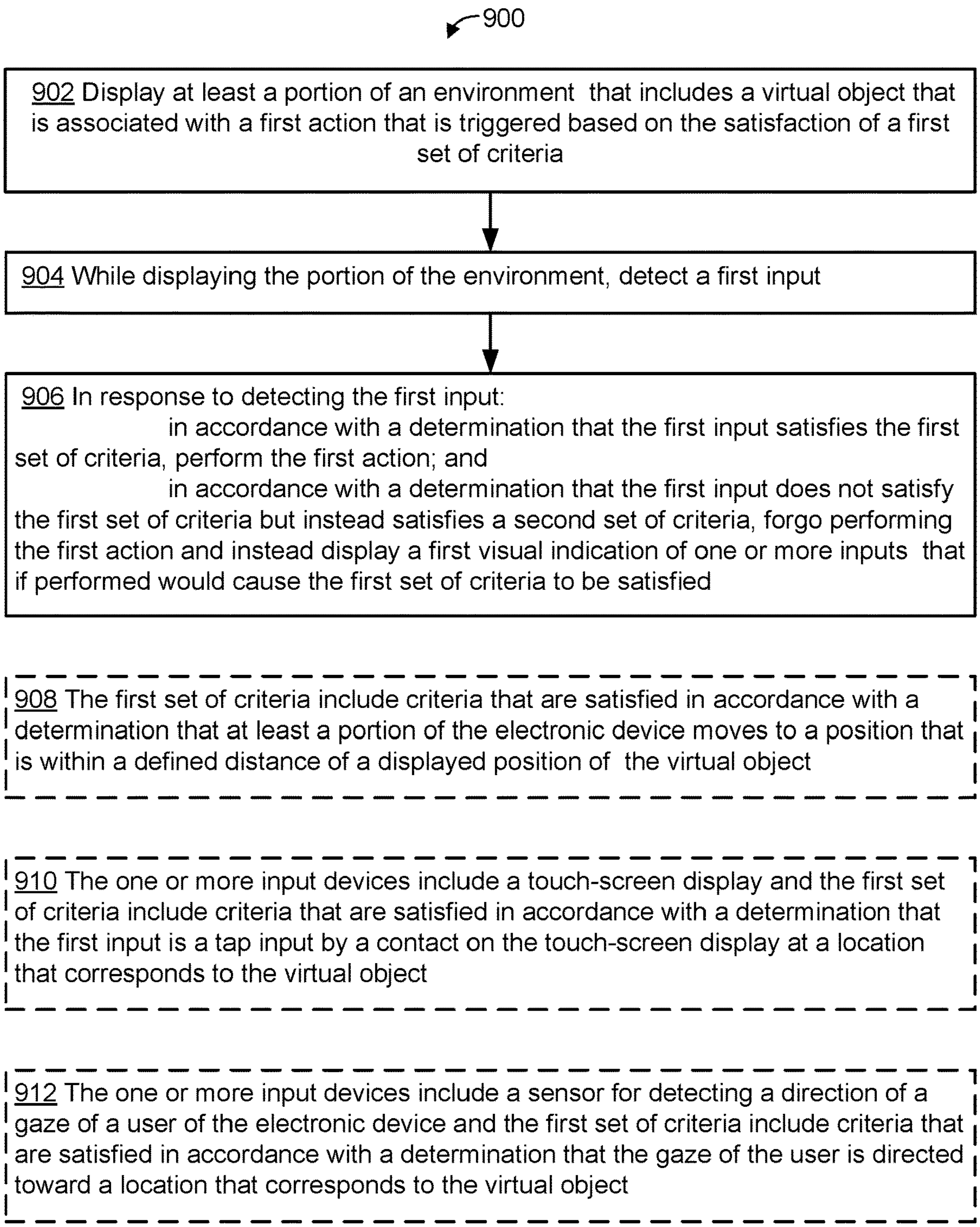
Figure 11A:
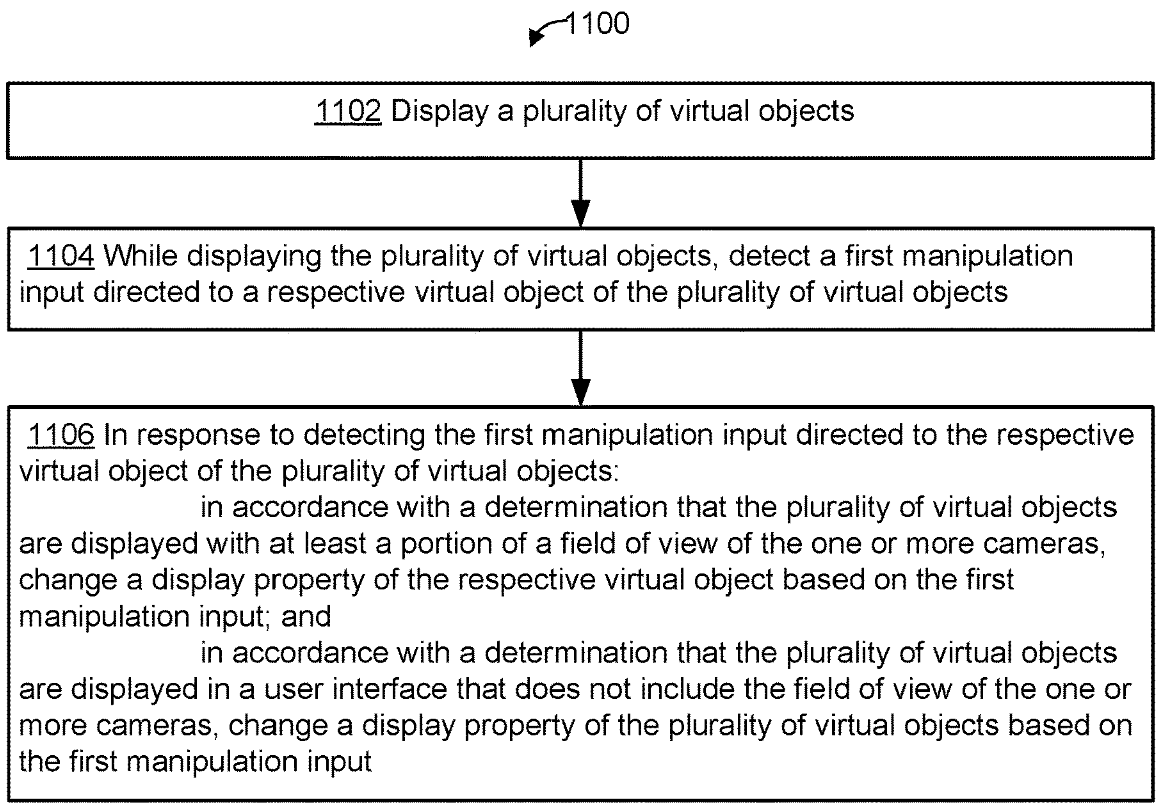

Below, FIGS. 1A-1C, 2, and 3 provide a description of example devices. FIGS. 4A-4B, 5A-5AK, 6A-6AI, 7A-7AQ, 8A-8K, and 13A-13J illustrate example user interfaces for displaying virtual objects in a variety of contexts. FIGS. 9A-9C illustrate flow diagrams of a method of displaying a visual indication of one or more inputs that if performed would cause criteria to be satisfied for performing an action. FIGS. 10A-10C illustrate flow diagrams of a method of displaying a media item in a user interface that includes content of at least a portion of a field of view of one or more cameras, in accordance with some embodiments. FIGS. 11A-11D illustrate flow diagrams of a method of responding to an input directed to a respective virtual object of a plurality of displayed virtual objects, in accordance with some embodiments. FIGS. 12A-12B illustrate flow diagrams of a method of displaying a prompt to change a property of a media item that does not meet compatibility criteria for display in an augmented reality environment, in accordance with some embodiments. The user interfaces in FIGS. 5A-5AK, 6A-6AI, 7A-7AQ, 8A-8K, and 13A-13J are used to illustrate the processes in FIGS. 9A-9C, 10A-10C, 11A-11D, 12A-12D and 14A-14B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
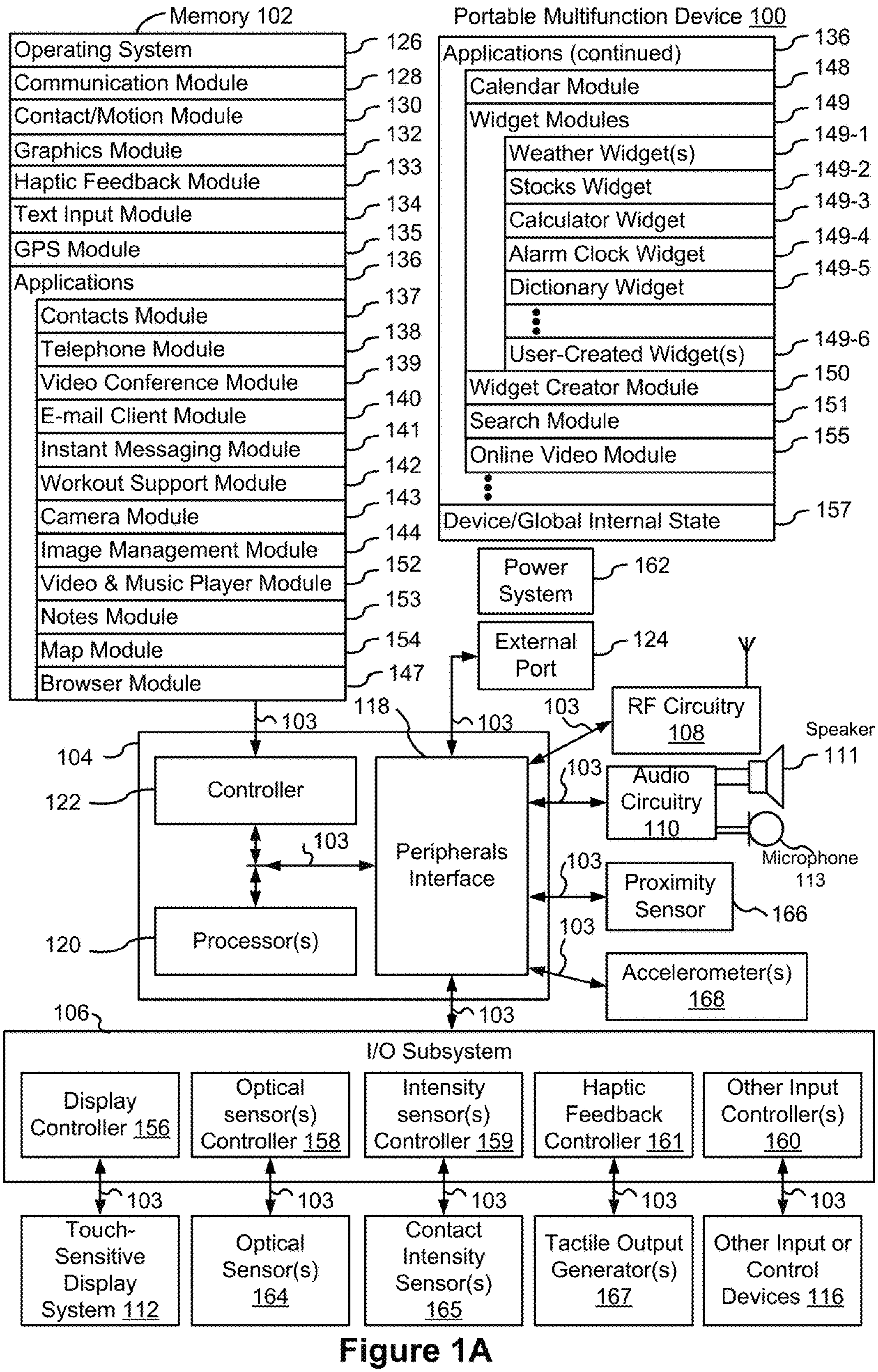
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., “multitouch”/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch-sensitive display system 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
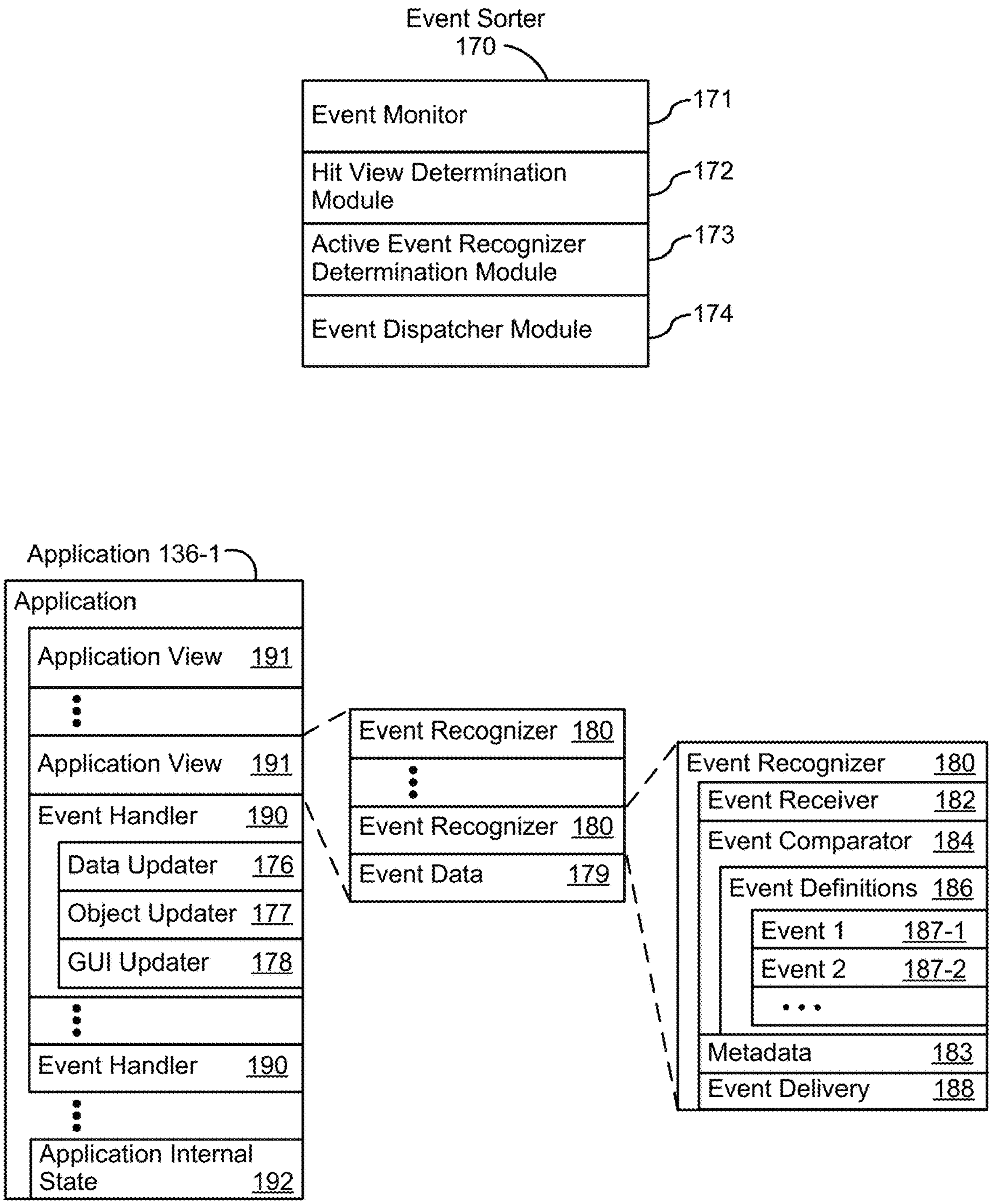
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
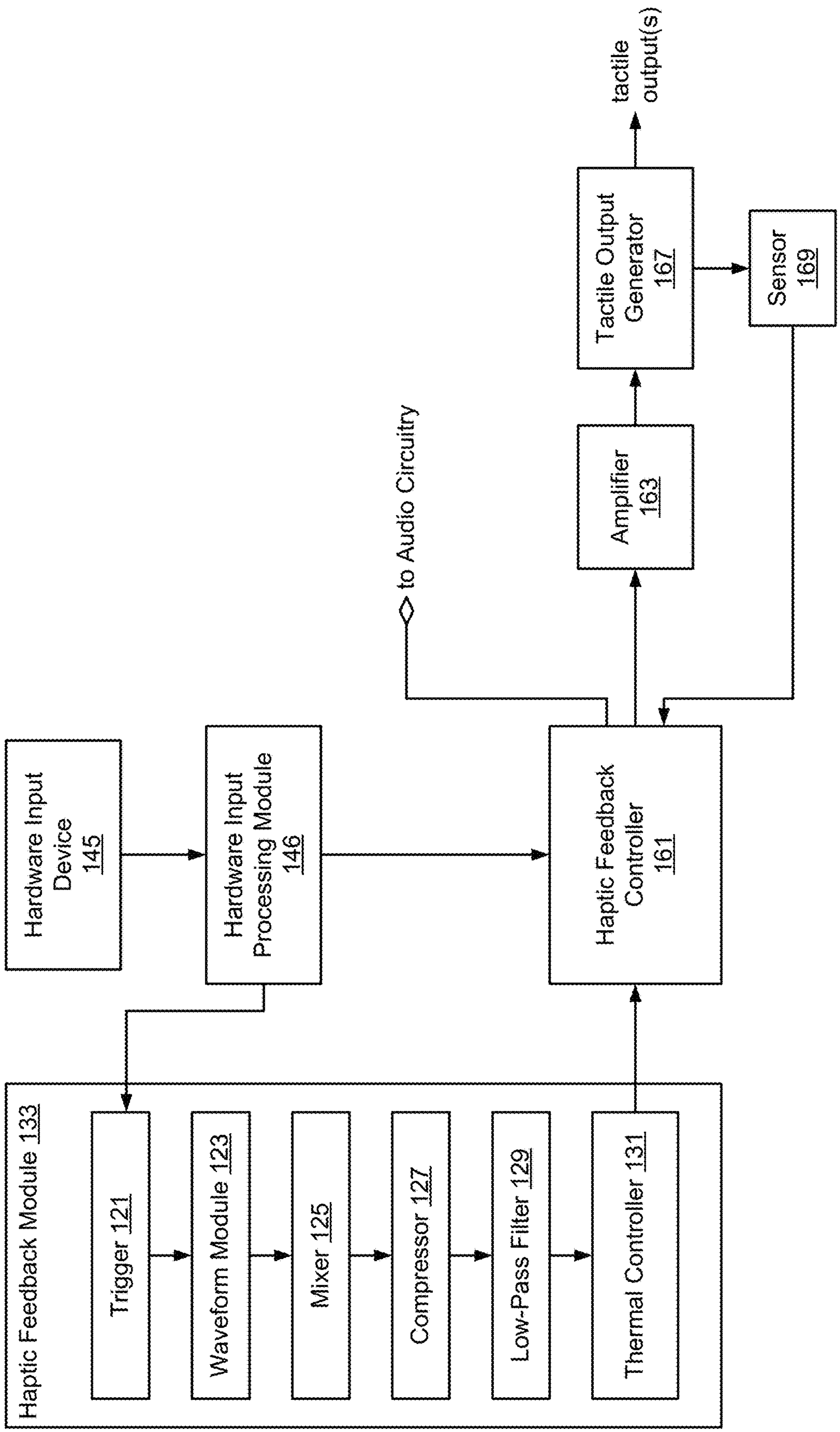
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F-4G).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button or an intensity-sensitive input surface, such as an intensity-sensitive touch screen). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button. In some embodiments, hardware input device 145 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 145 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface 400 for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator;
- Tray 408 with icons for frequently used applications, such as:
  - Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;
Icon 420 for browser module 147, labeled "Browser;" and
Icon 422 for video and music player module 152, labeled "Music;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen touch-sensitive display system 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
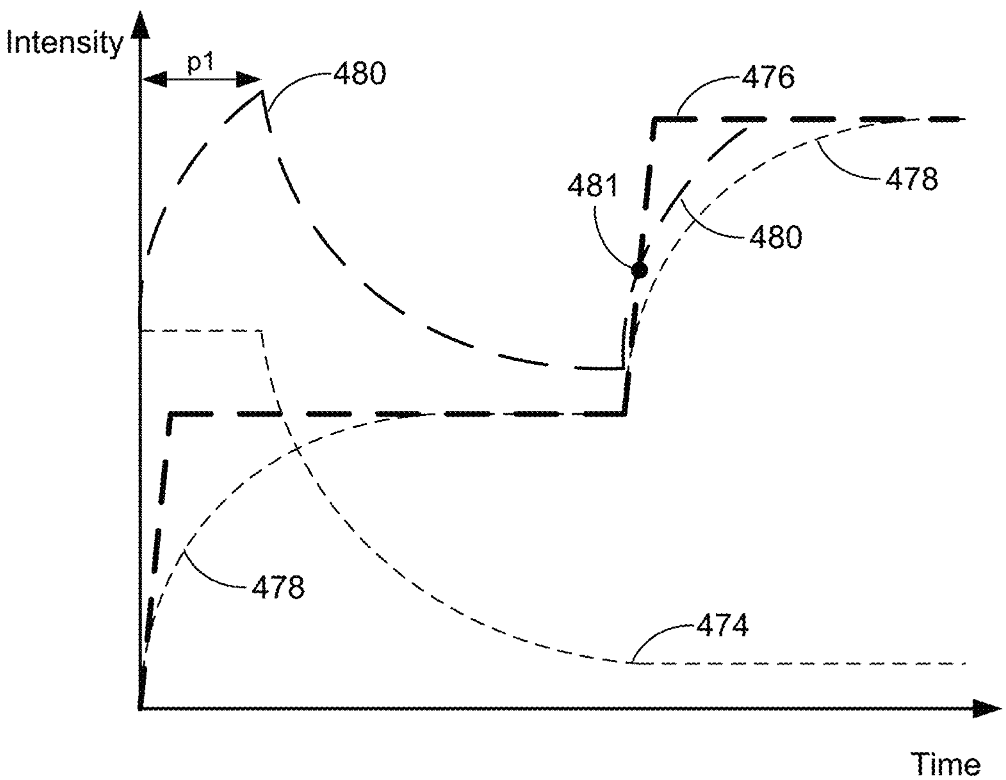
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
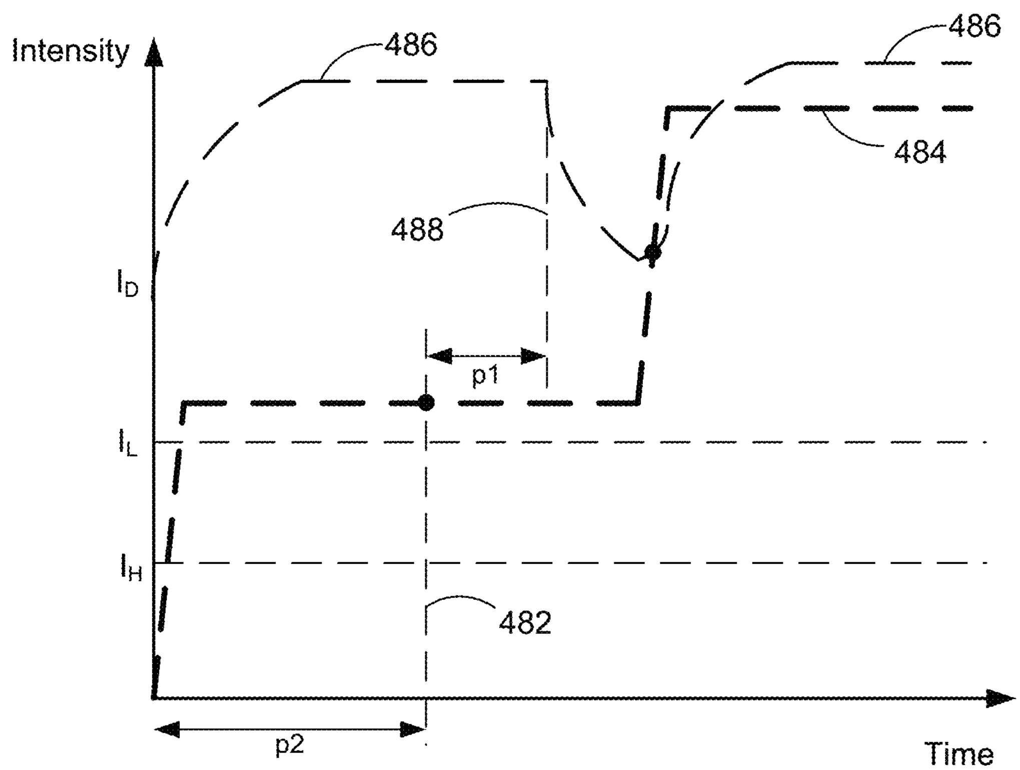

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
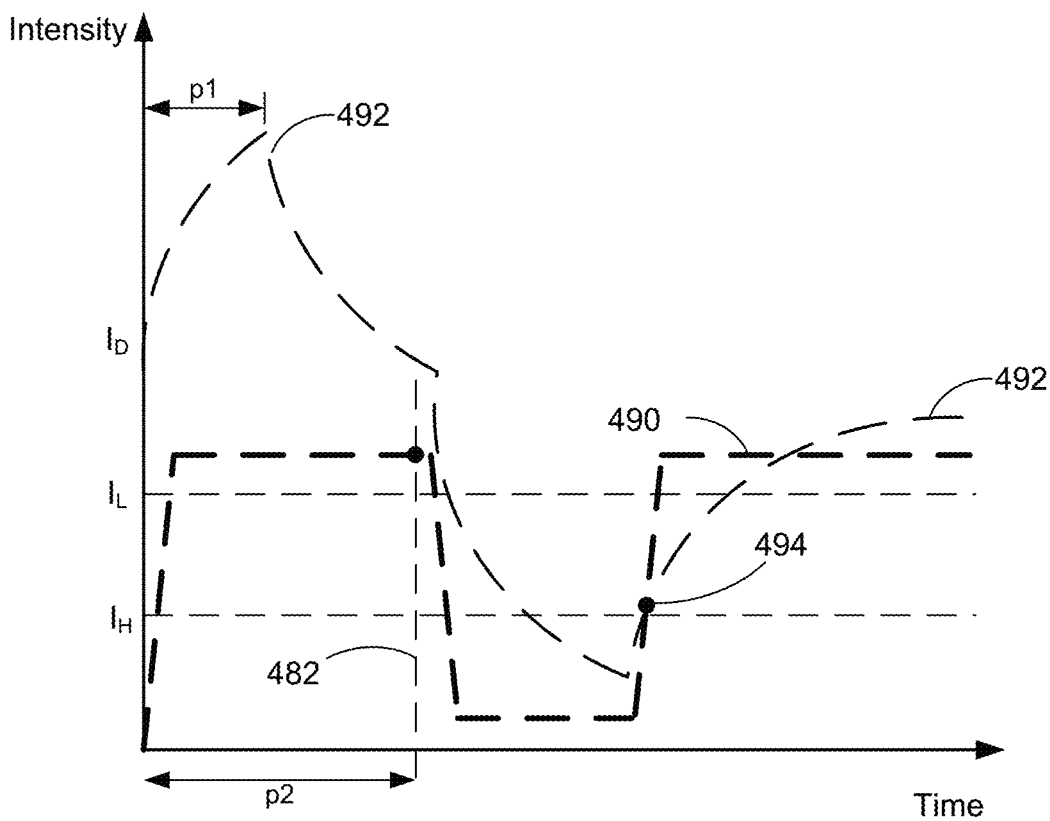

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4F:
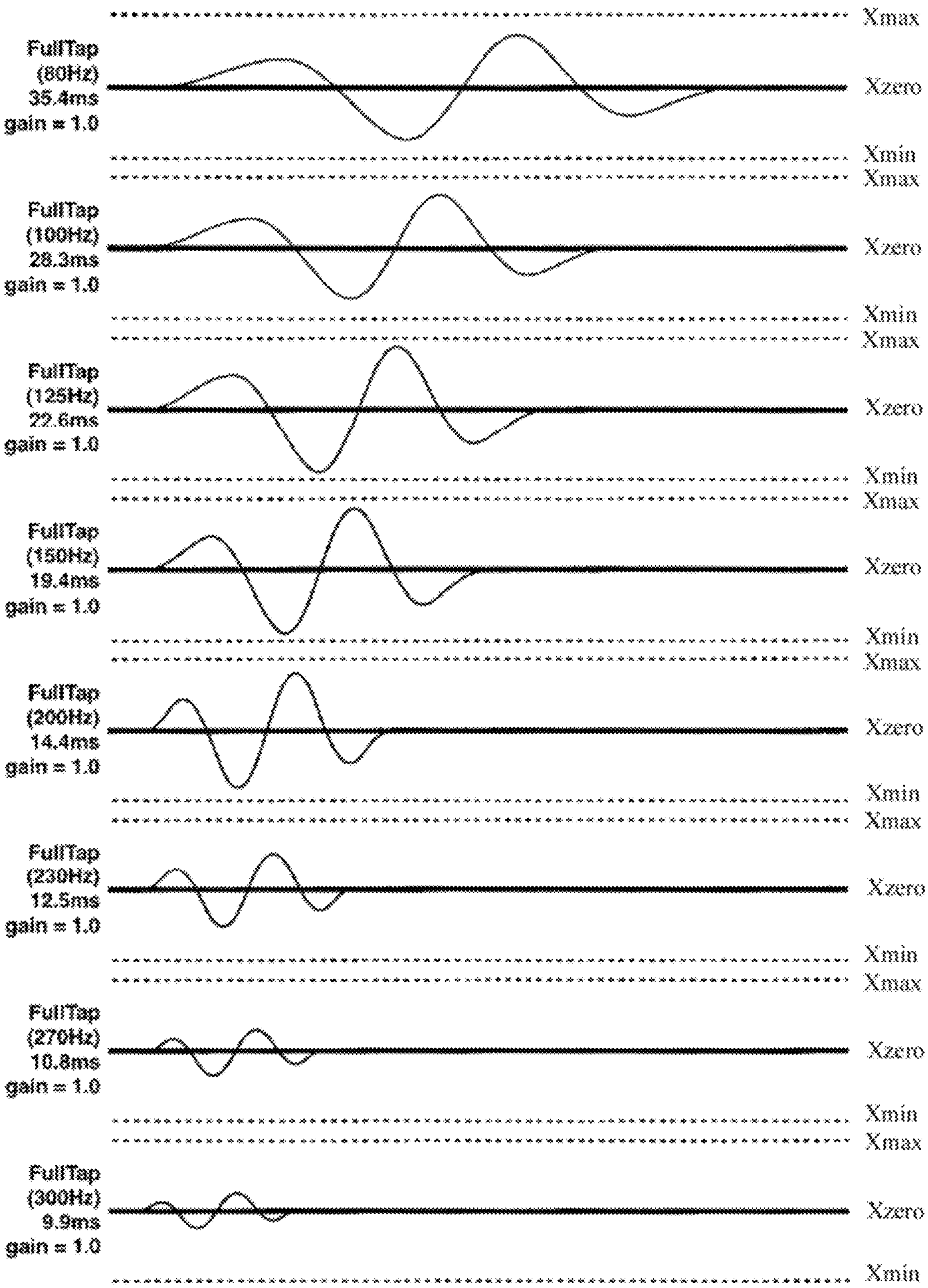
FIGS. 4F-4K illustrate a set of sample tactile output patterns in accordance with some embodiments.
Figure 4G:
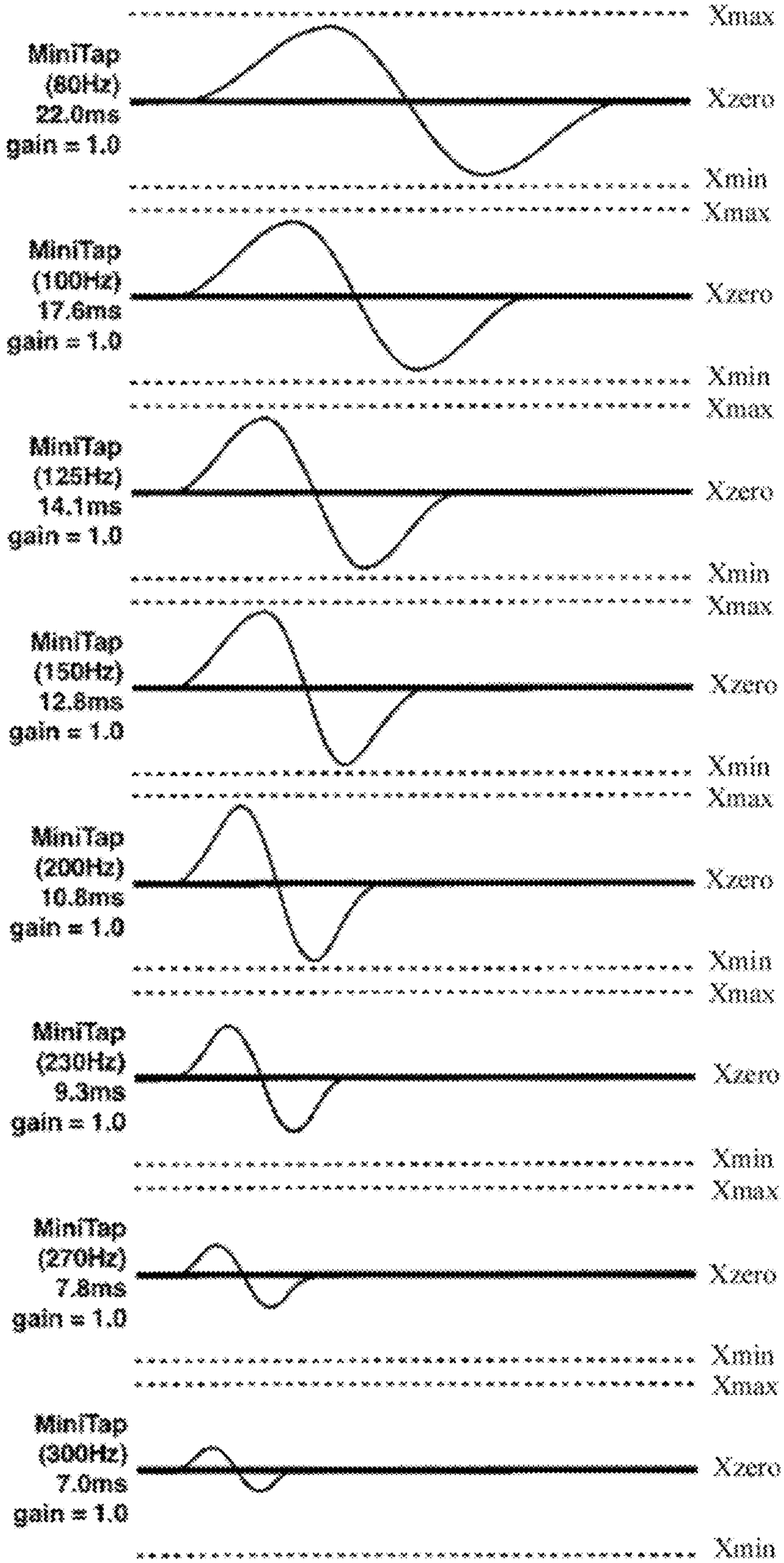
Figure 4H:
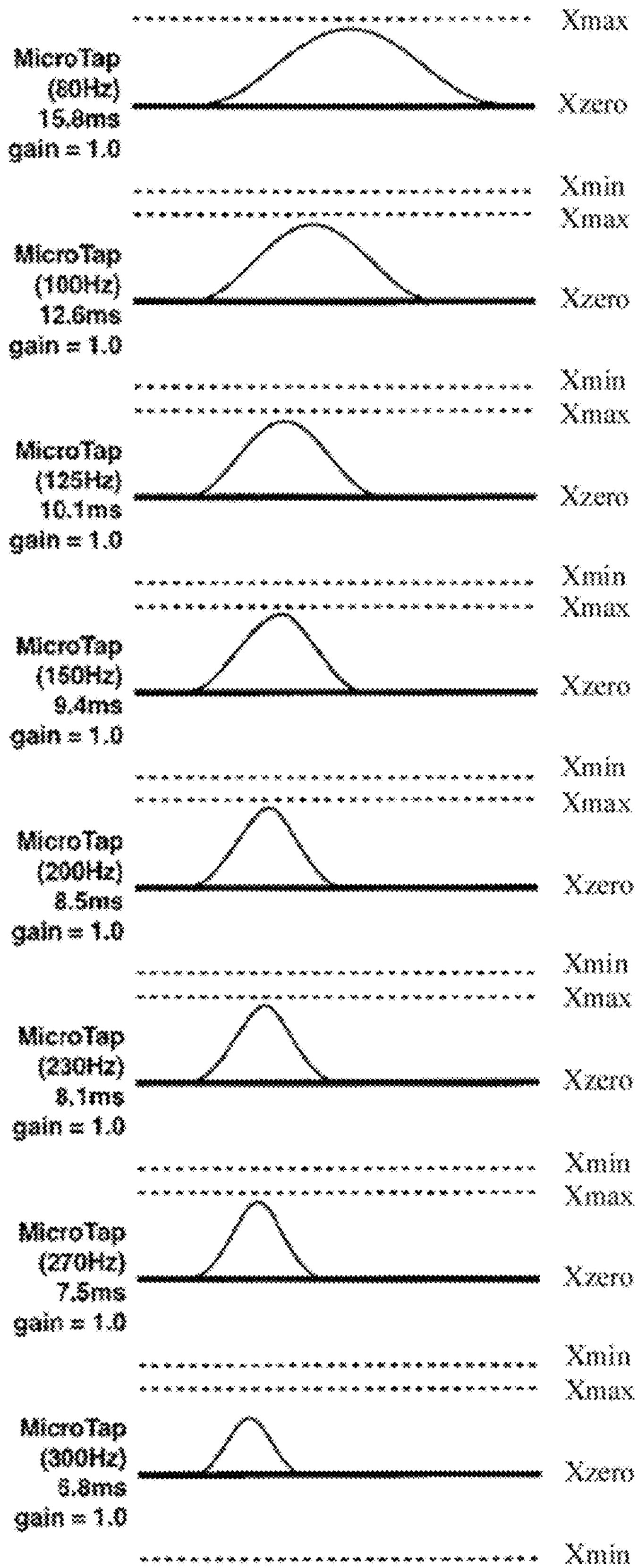
Figure 4I:
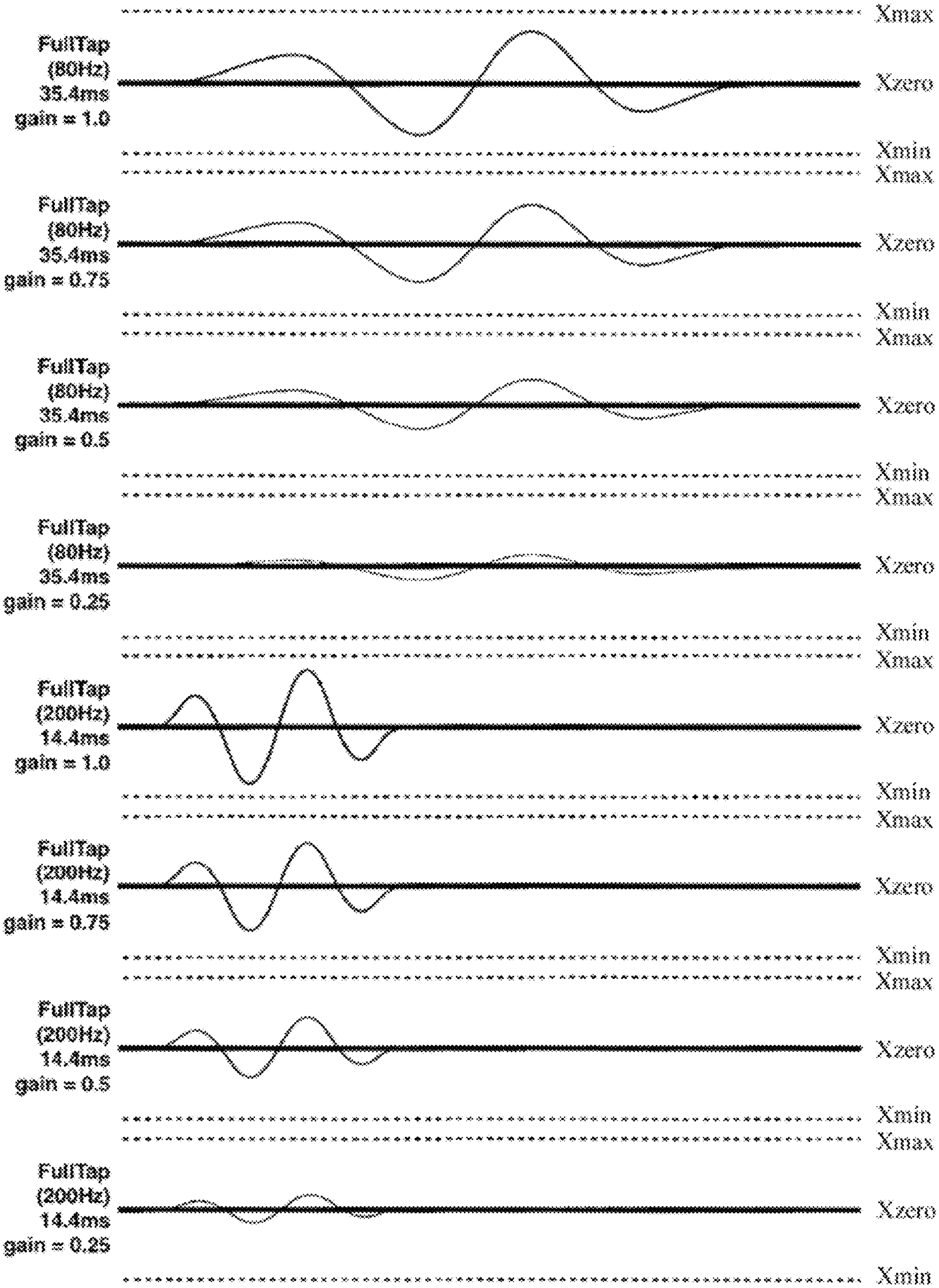
Figure 4J:
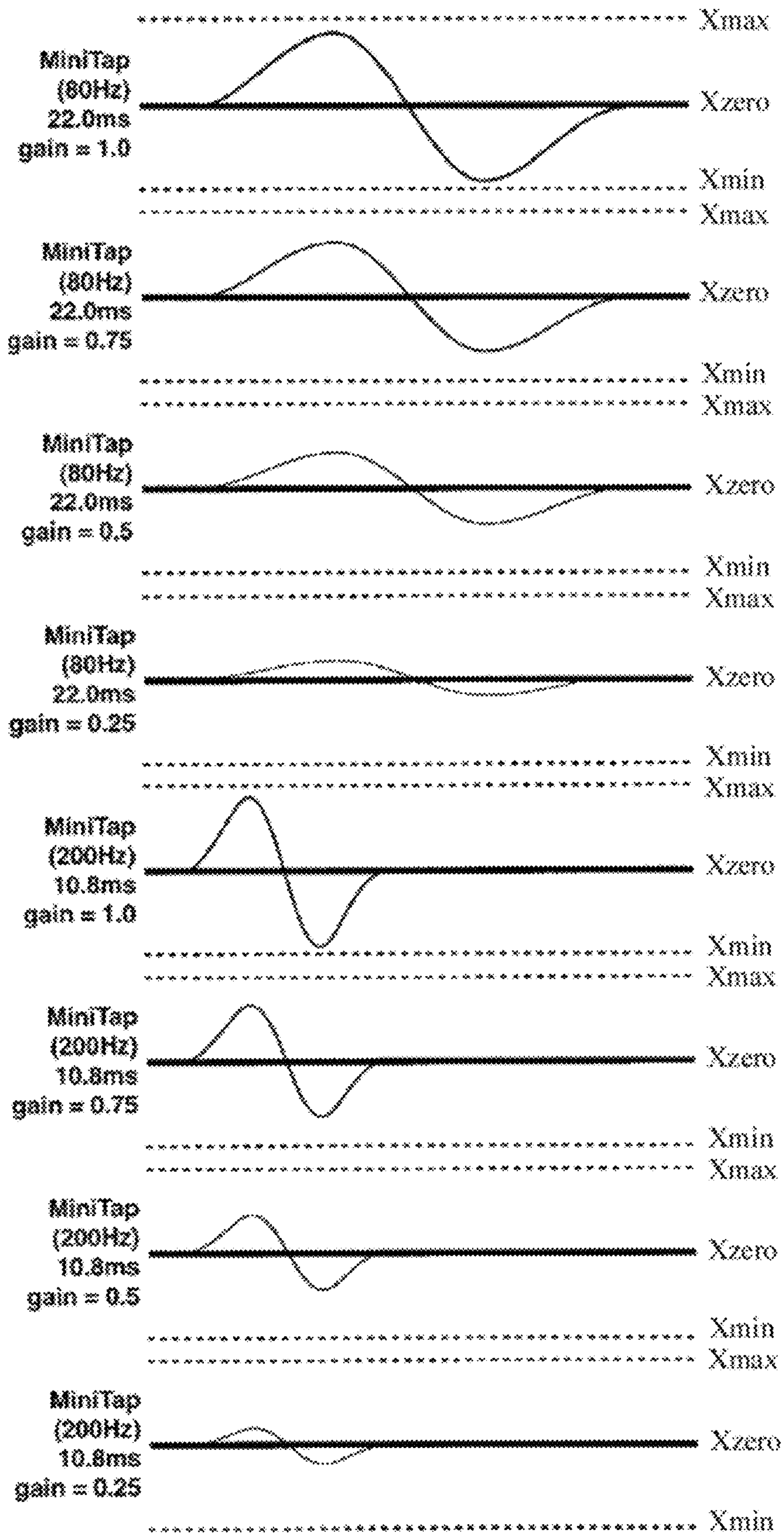
Figure 4K:
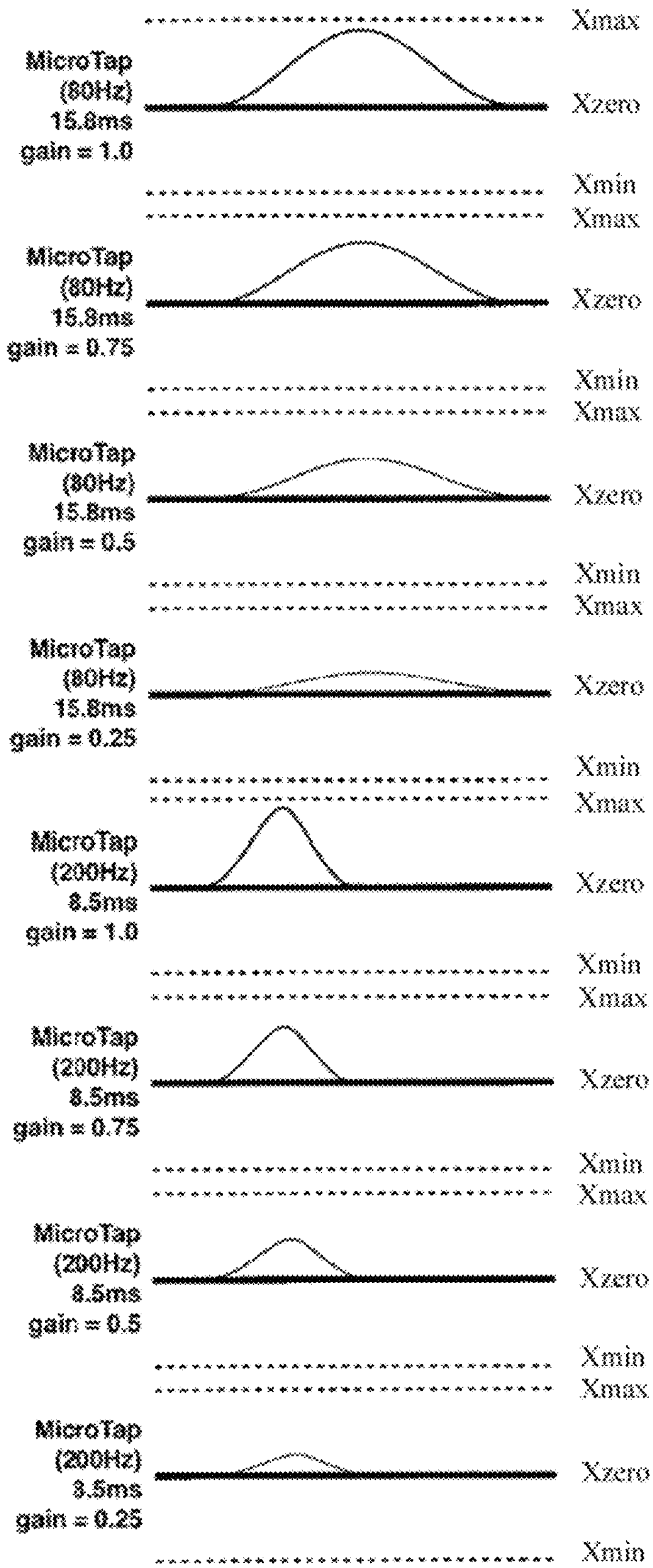

FIGS. 4F-4H provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 4I-4K, which are each shown with variants having a gain of 1.0, 0.75, 0.5, and 0.25. As shown in FIGS. 4I-4K, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

FIGS. 4F-4K show tactile output patterns that have a particular waveform. The waveform of a tactile output pattern represents the pattern of physical displacements relative to a neutral position (e.g., xzero) versus time that a moveable mass goes through to generate a tactile output with that tactile output pattern. For example, a first set of tactile output patterns shown in FIG. 4F (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 4G (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 4H (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 4F-4K include xmin and xmax values which represent the maximum and minimum extent of movement of the moveable mass. For larger electronic devices with larger moveable masses, there may be larger or smaller minimum and maximum extents of movement of the mass. The examples shown in FIGS. 4F-4K describe movement of a mass in I dimension, however similar principles would also apply to movement of a moveable mass in two or three dimensions.

As shown in FIGS. 4F-4K, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 4F-4H, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4F). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 4F-4K, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although only specific frequencies, amplitudes, and waveforms are represented in the sample tactile output patterns in FIGS. 4F-4K for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

User Interfaces and Associated Processes

Attention is now directed towards embodiments of user interfaces ("UI") and associated processes that may be implemented on an electronic device, such as portable multifunction device 100 or device 300, with a display generation component, one or more input devices, and (optionally) one or cameras.

FIGS. 5A-5AK illustrate example user interfaces for displaying a visual indication of one or more inputs that if performed would cause criteria to be satisfied for performing an action (e.g., displaying an animation sequence associated with a virtual object), in accordance with some embodiments. For example, in response to detecting an input that does not satisfy criteria for triggering an animation associated with a virtual object, a visual indication of input that would satisfy criteria for triggering the animation is displayed. The user interfaces in these figures are used to illustrate the processes described below, including the processes in FIGS. 9A-9C, 10A-10C, 11A-11D, 12A-12B, and 13A-13B. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

In FIG. 5A, a virtual object 5002 (a virtual box) is displayed in an object staging user interface 5004. In some embodiments, while object staging user interface 5004 is displayed, user input for manipulation of virtual object 5002 (e.g., an input by a contact at a location corresponding to virtual object 5002 displayed on touch-sensitive display system 112) causes a characteristic of virtual object 5002 to change (e.g. rotation of the virtual object about one or more axes). In this way, a user is enabled to view virtual object 5002 from various angles. In some embodiments, a change made to a characteristic of virtual object 5002 while the virtual object is displayed in object staging user interface 5004 (e.g., a rotation applied to the virtual object 5002 about a first axis) is applied to the virtual object 5002 when the virtual object 5002 is displayed in a user interface that includes at least a portion of a field of view of one or more cameras of device 100 (e.g., an augmented reality view). In this way, a user is enabled to set an orientation that the virtual object 5002 will have when displayed in an augmented reality view.

Object staging user interface 5004 includes toggle control 5008 that indicates a current display mode (e.g., the current display mode is an object staging user interface mode, as indicated by the highlighted "Object" indicator) and that, when activated, causes transition to a selected display mode. For example, while the object staging user interface 5004 is displayed, a tap input by a contact at a location that corresponds to toggle 5008 (e.g., a location that corresponds to a portion of toggle control 5008 that includes the text "AR") causes the object staging user interface 5008 to be replaced by at least a portion of a field of view of one or more cameras of device 100. Object staging user interface 5004 also includes cancel control 5006 (e.g., for replacing display of object staging user interface 5004 with a different user interface such as a previously displayed user interface) and share control 5010 (e.g., for displaying a sharing interface).

Figure 5B:
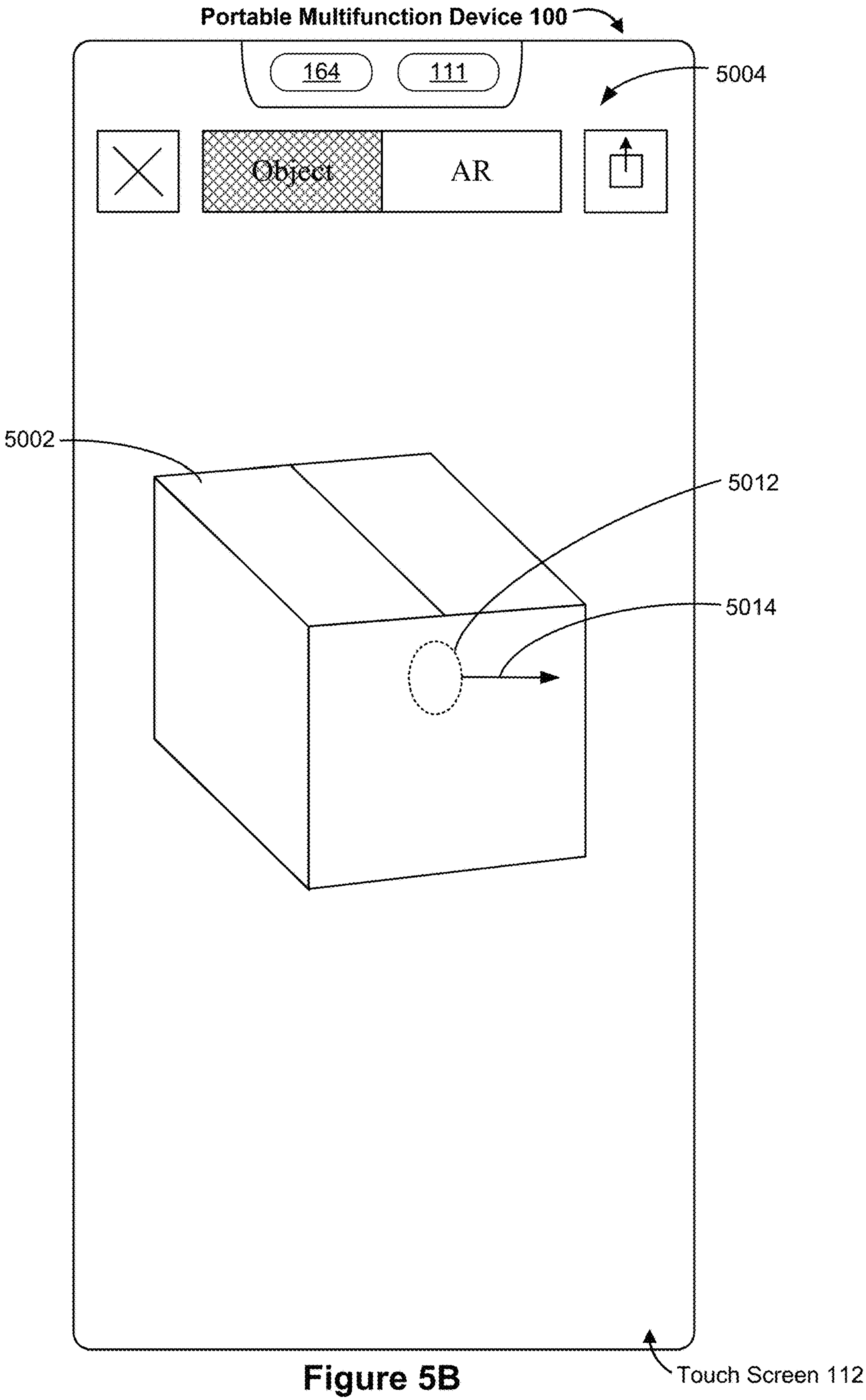
Figure 5C:
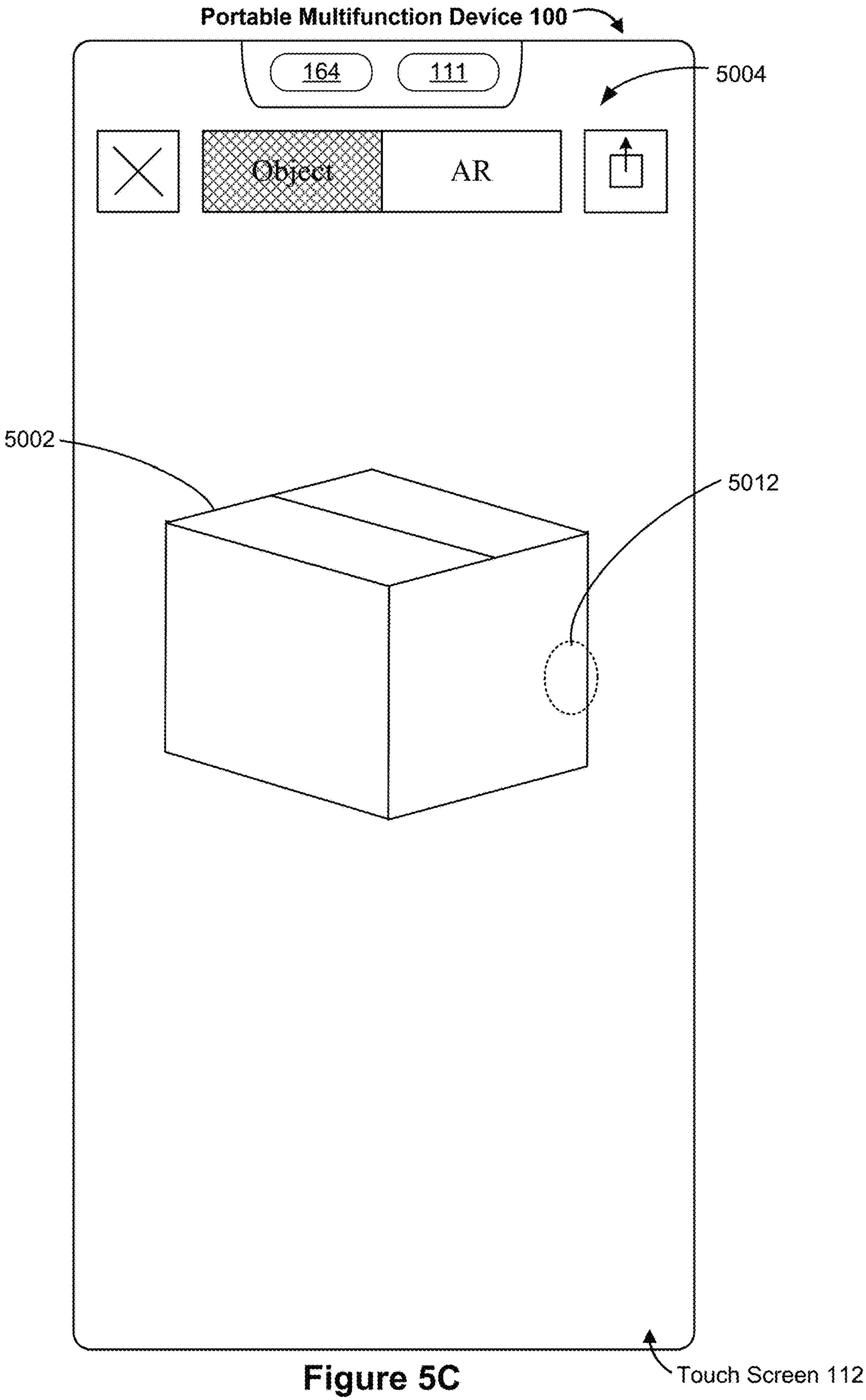

FIGS. 5B-5C illustrate an input that causes rotation of virtual object 5002 while object staging user interface 5004 is displayed. In FIG. 5B, an input by contact 5012 (e.g., a rightward swipe gesture) is detected at a location that corresponds to virtual object 5002. As the contact moves along a path indicated by arrow 5014, virtual object 5002 rotates about an axis that is perpendicular to the movement of the contact.

Figure 5D:
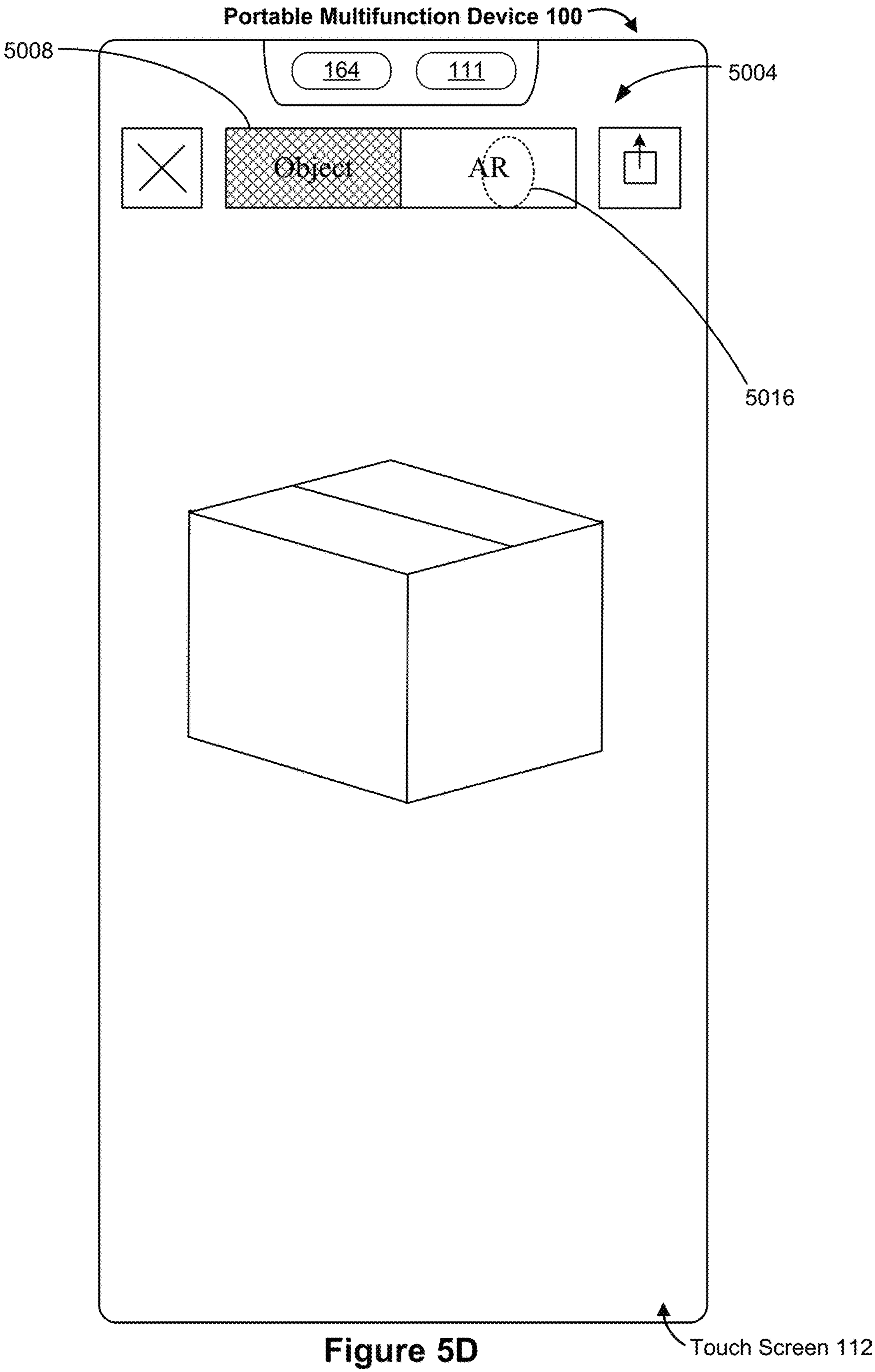
Figure 5E:
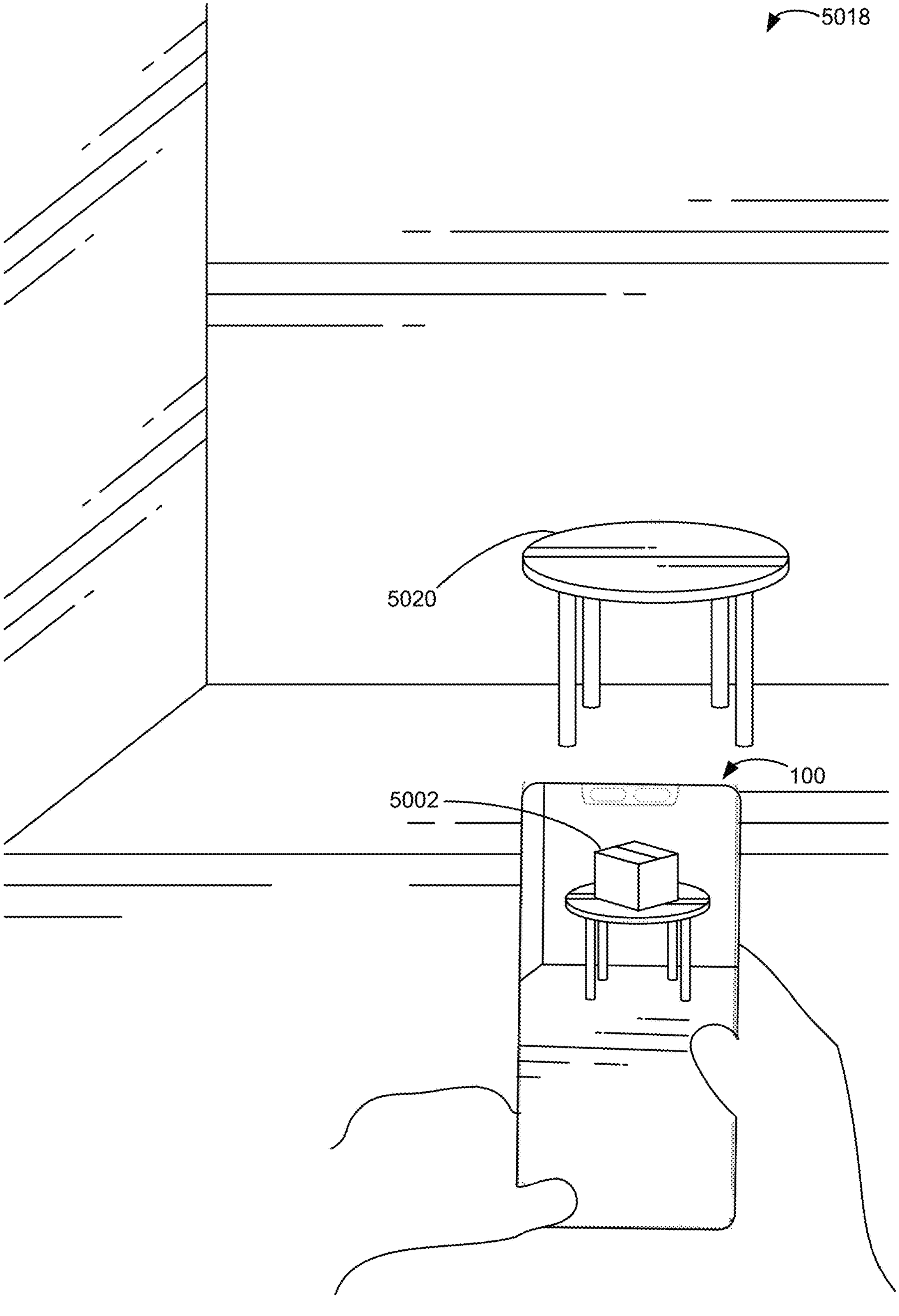
Figure 5F:
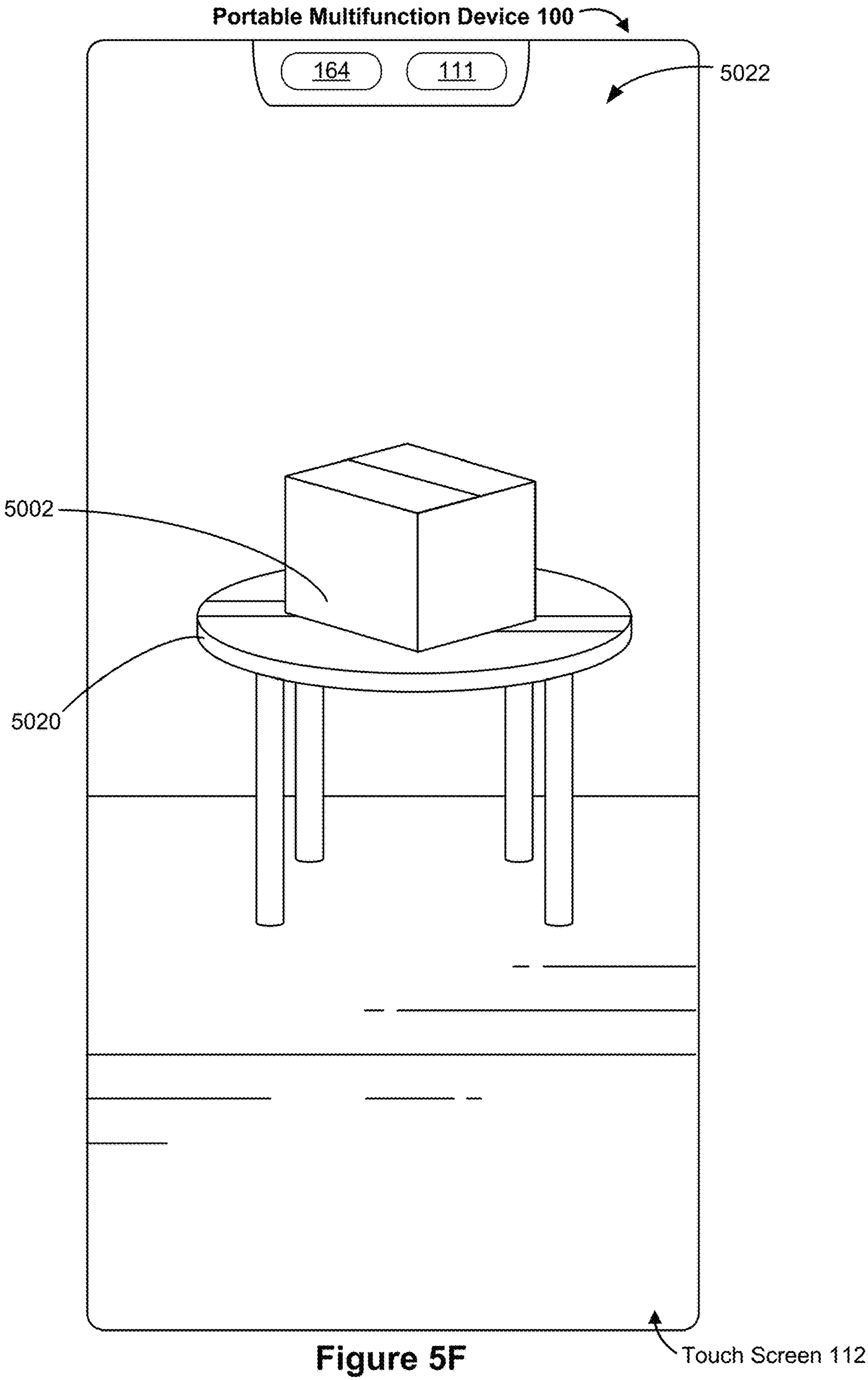

In FIG. 5D, an input (e.g., a tap input) by contact 5016 is detected on touch-sensitive display system 112 at a location that corresponds to the "AR" region of toggle control 5008. In response to the input, display of object staging user interface 5004 is replaced by display of virtual object 5002 in an augmented reality view (e.g., virtual object 5002 is displayed in a physical environment captured by one or more cameras of device 100), as illustrated in FIGS. 5E-5F. To indicate that the current display mode is an augmented reality user interface mode, the "AR" region of toggle control 5008 is highlighted in FIG. 5F.

FIG. 5E illustrates a physical environment 5018 in which device 100 is operated. Table 5020 is a physical object located in physical environment 5018. The display of device 100 shows virtual object 5002 placed on an upper surface of table 5020 in a view of physical environment 5018 as captured by one or more cameras of device 100.

Figure 5G:
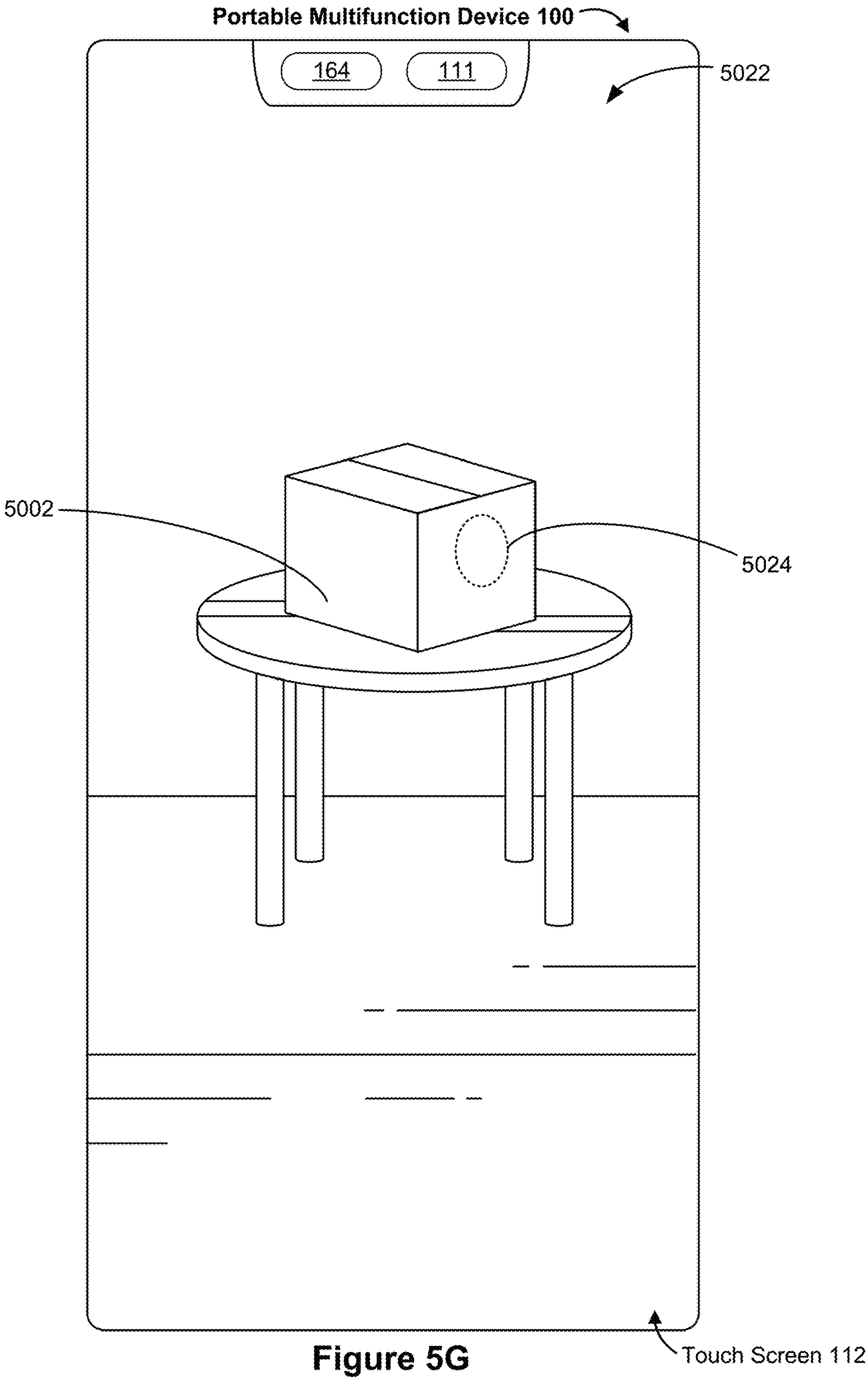
Figure 5H:
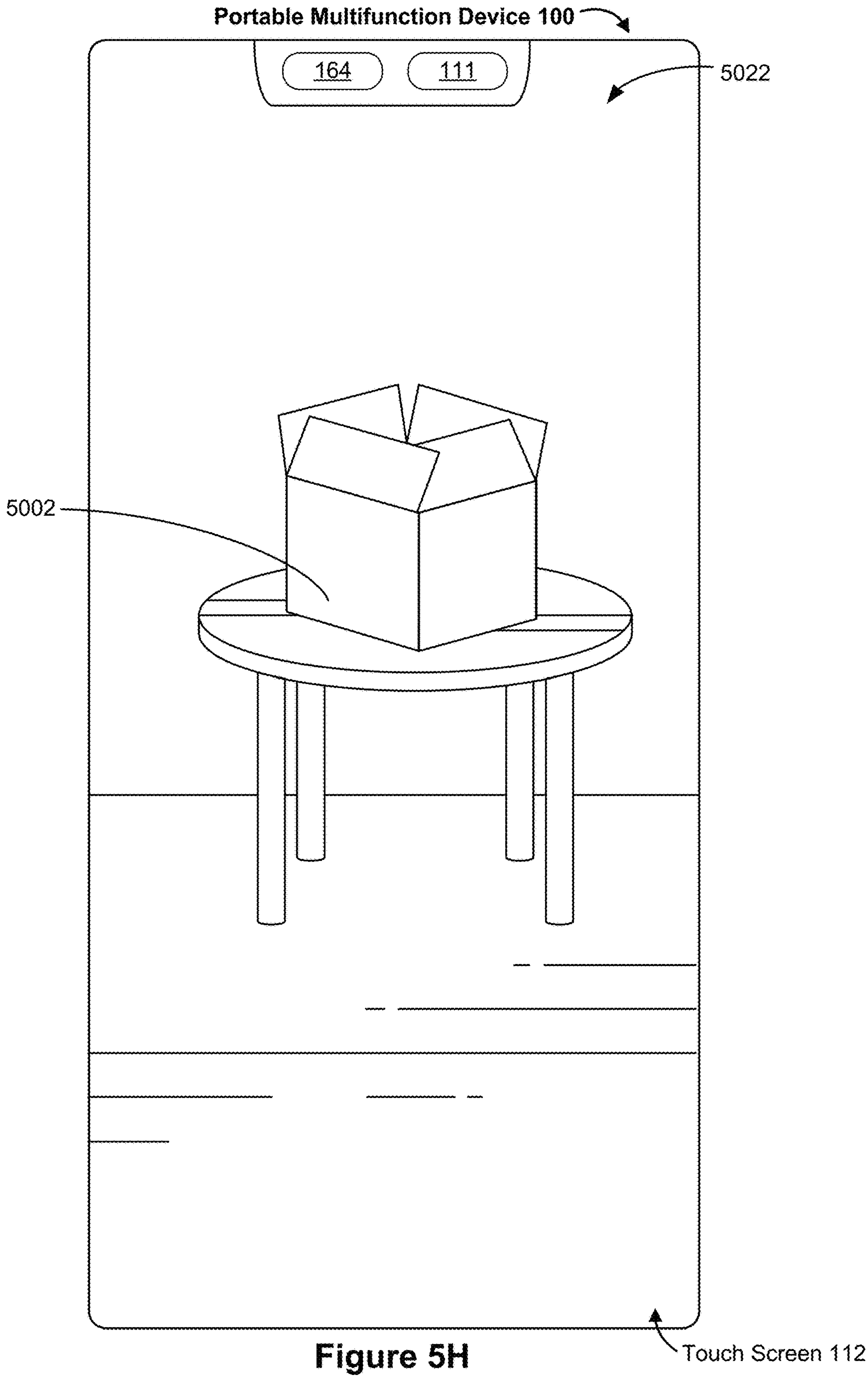
Figure 5I:
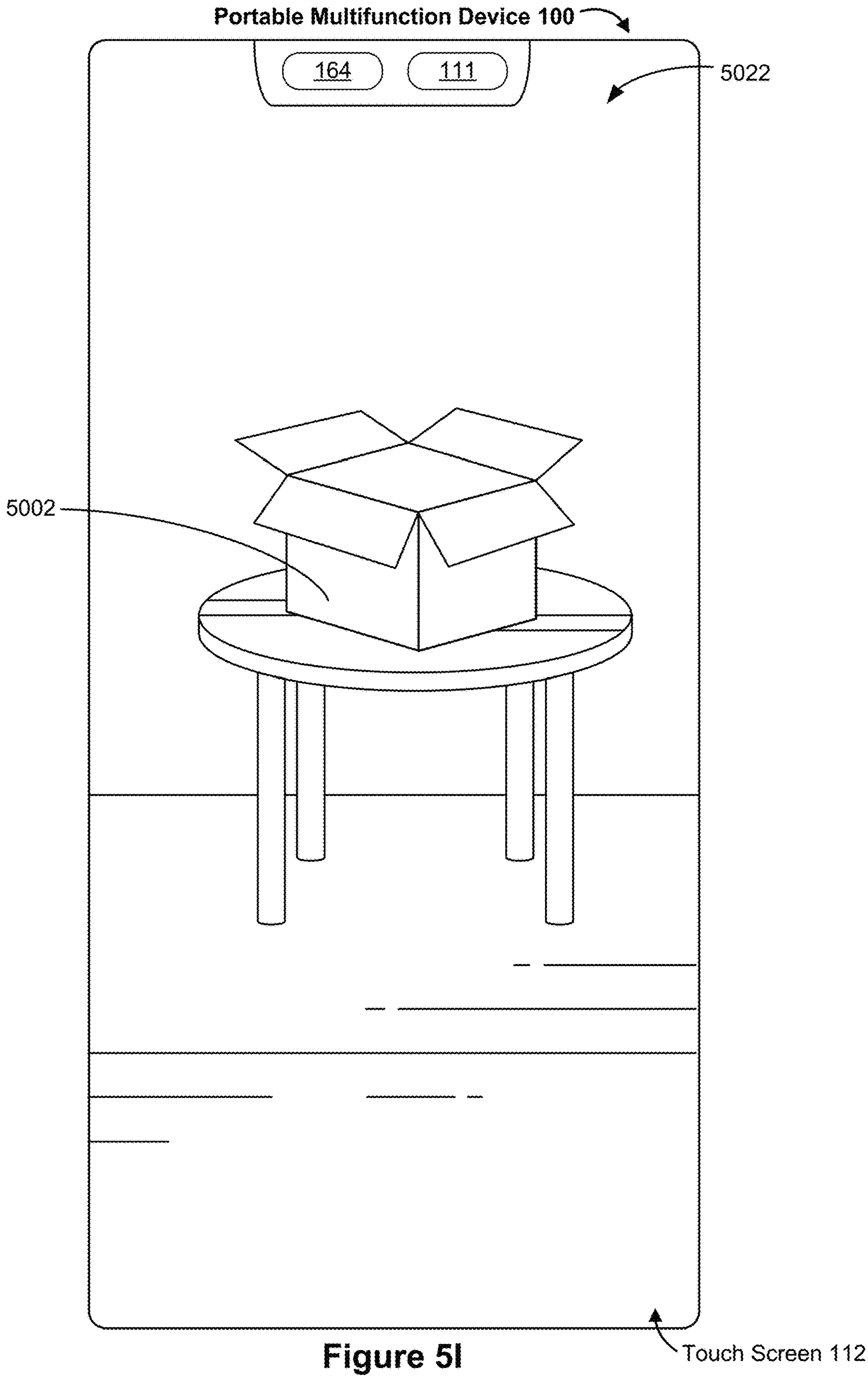

FIG. 5F-5I illustrate an input that causes animation of virtual object 5002 to occur. In FIG. 5F, virtual object 5002 is shown in augmented reality user interface 5022 that includes a view of physical environment 5018 as captured by one or more cameras of device 100. In FIG. 5G, an input (e.g., a tap input) by contact 5024 is detected on touch-sensitive display system 112 at a location that corresponds to virtual object 5002. In response to the input, virtual object 5002 is animated (e.g., an animation sequence shows the lid of the box gradually opening), as shown in FIGS. 5H-5I. In some embodiments, the animation of virtual object 5002 continues while contact 5024 is maintained at a location that corresponds to virtual object 5002. In some embodiments, when the animation of virtual object 5002 has been initiated, the animation continues (e.g., an animation sequence completes and/or an animation sequence continually loops) after contact 5024 lifts off of touch-sensitive display system 112.

Figure 5J:
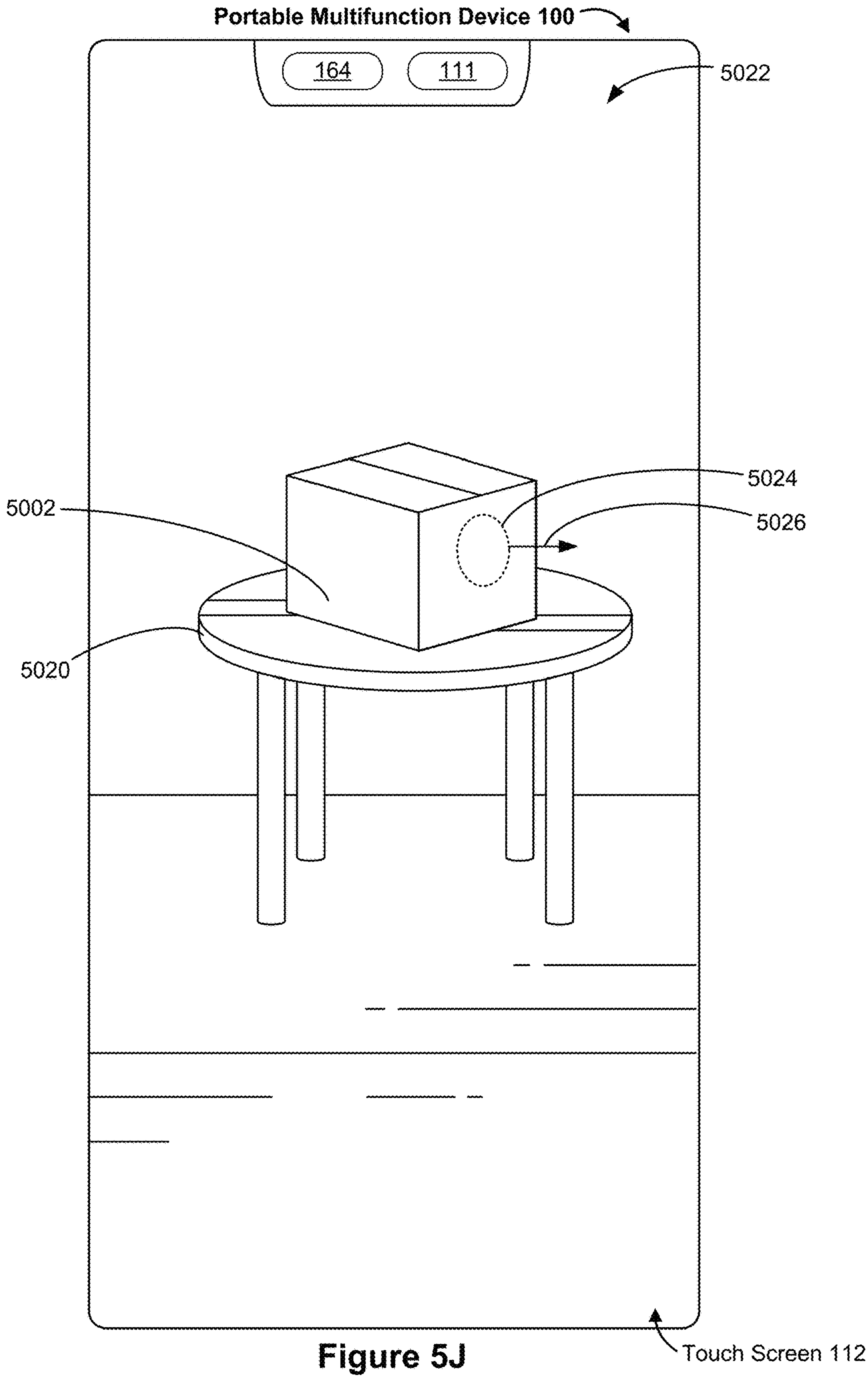
Figure 5K:
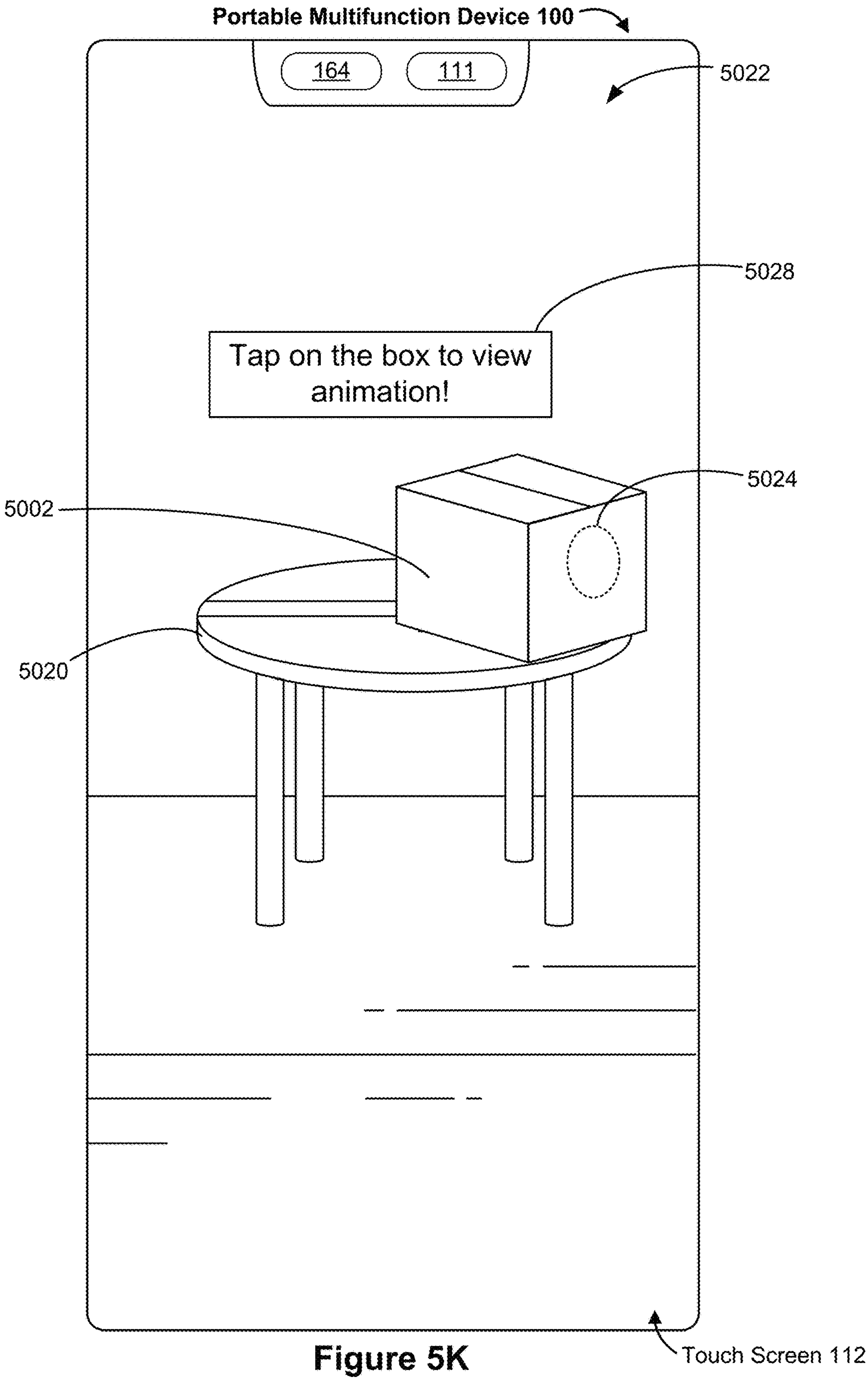

FIGS. 5J-5K illustrate an input that causes movement of virtual object 5002 while augmented reality user interface 5022 is displayed. In FIG. 5J, an input by contact 5024 (e.g., a rightward swipe gesture) is detected at a location that corresponds to virtual object 5002. As the contact moves along a path indicated by arrow 5026, virtual object 5002 moves along the surface of table 5020 in the direction of the movement of the contact, as shown in FIG. 5K.

In FIG. 5K, because the input that causes movement of virtual object 5002 does not satisfy criteria for causing animation of virtual object 5002 to occur, a visual indication 5028 of the input needed to cause animation to occur is displayed. Visual indication 5028 includes the text, "Tap on the box to view animation!" In this way, the user is provided with feedback that provides information about the input that will trigger playback of the animation sequence.

Figures 1, 5L:
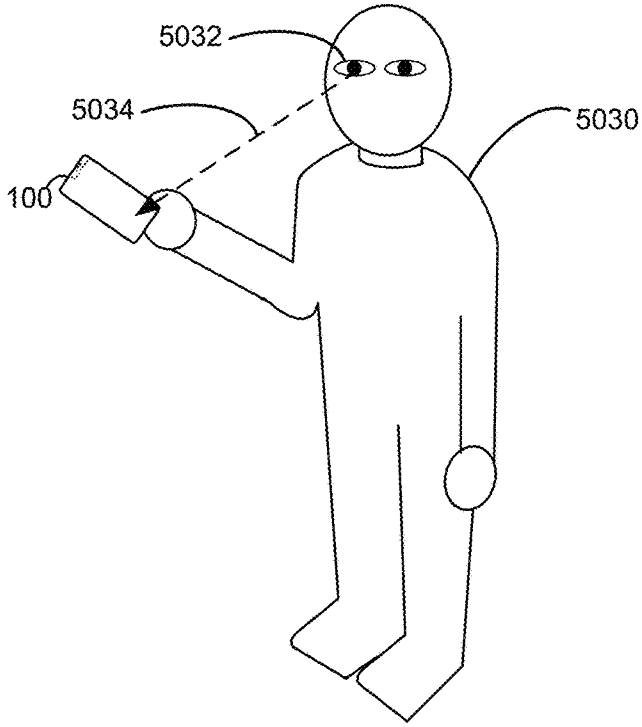
Figures 2, 5L:
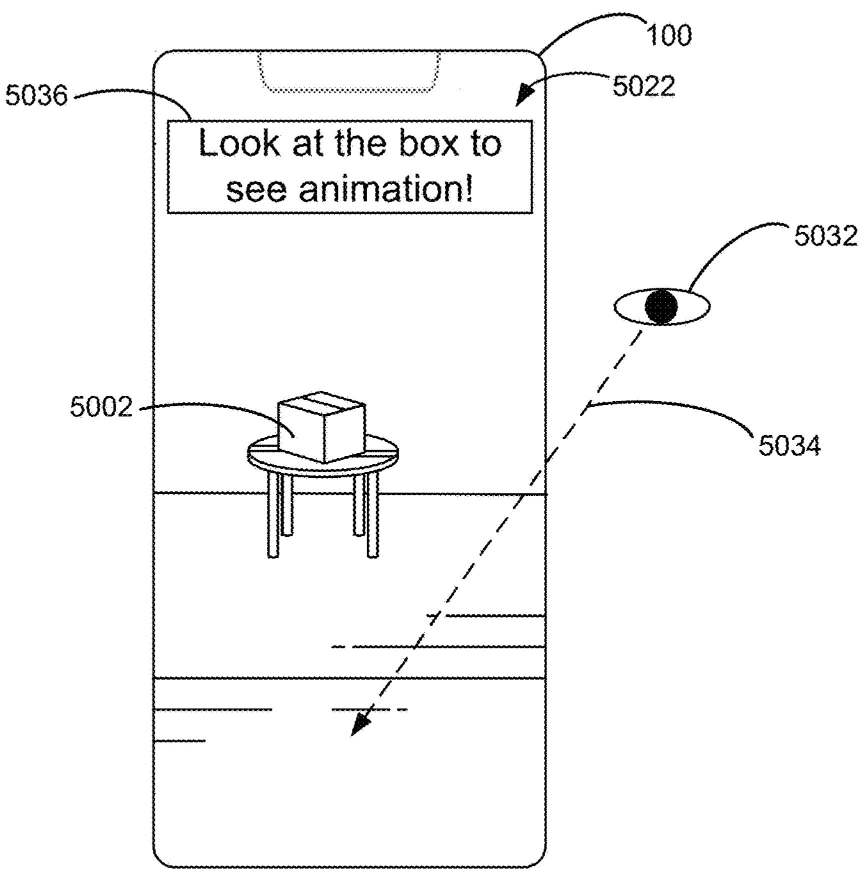

FIGS. 5L-5O illustrate a gaze input that causes animation of virtual object 5002 to occur. In FIG. 5L-1, a user 5030 is gazing at a lower portion of the display of device 100, as illustrated by gaze indicator 5034 that indicates the gaze target of eye 5032 of the user 5030. FIG. 5L-2 illustrates augmented reality user interface 5022 displayed by device 100. In FIG. 5L-2, gaze 5034 is targeted at a location in augmented reality user interface 5022 that does not correspond to virtual object 5002. A visual indication 5036 is displayed, indicating input that would cause animation of virtual object 5002 to occur (e.g., "Look at the box to see animation!").

Figures 1, 5M:
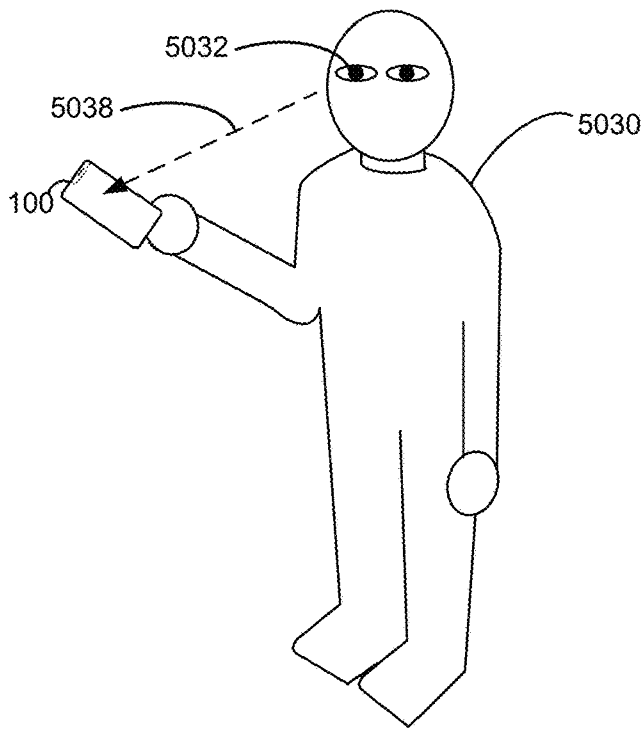
Figures 2, 5M:
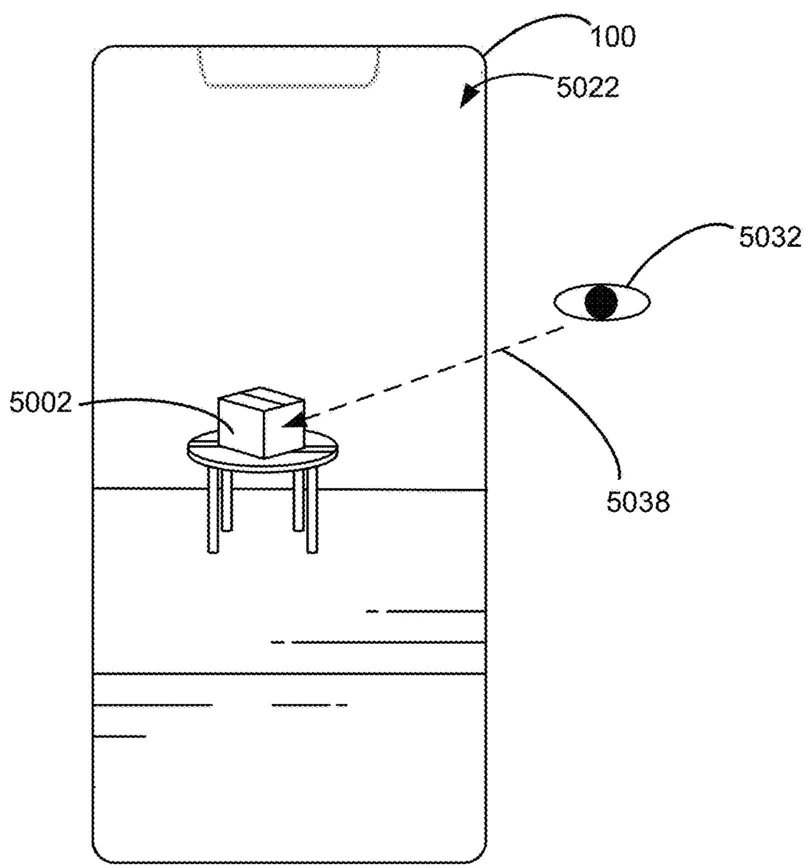
Figures 1, 5N:
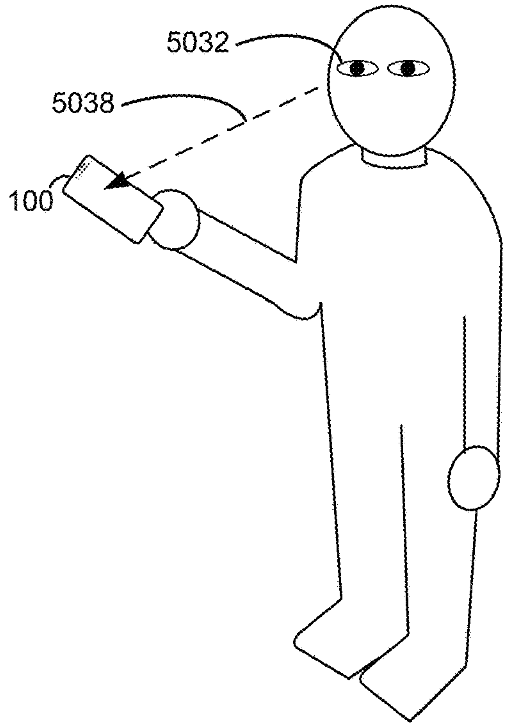
Figures 2, 5N:
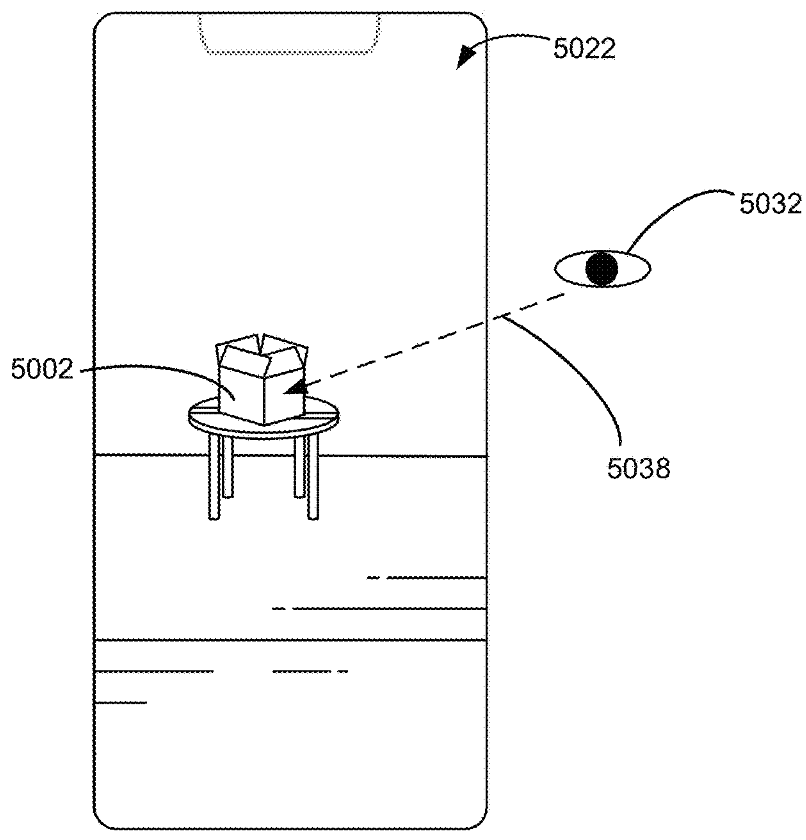
Figures 1, 5O:
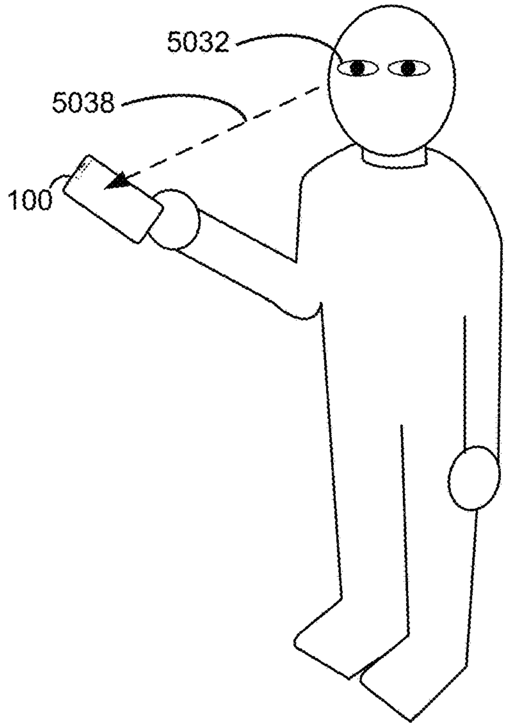
Figures 2, 5O:
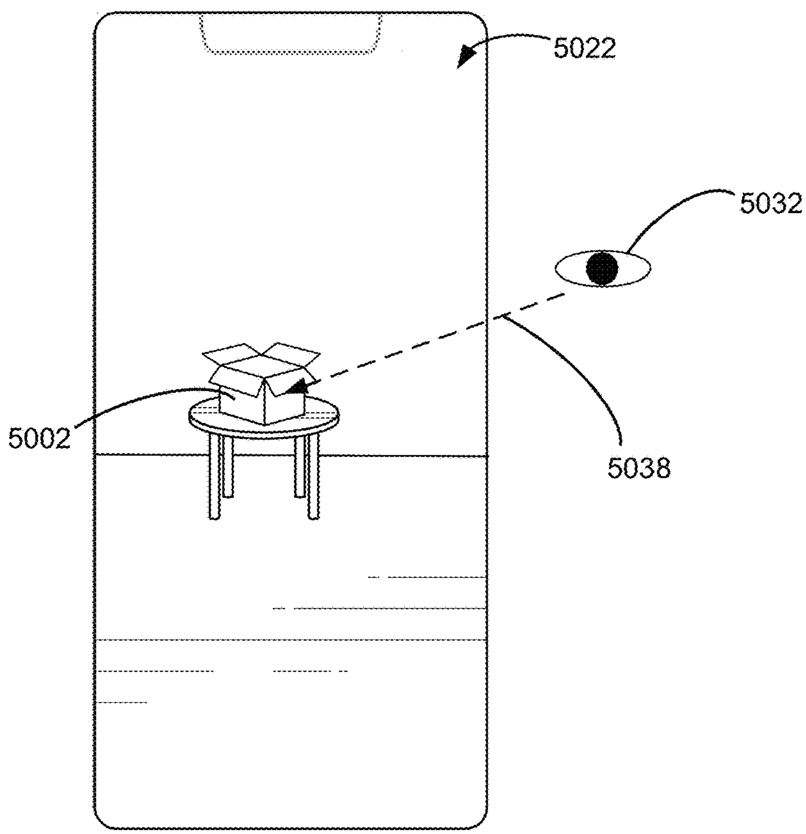

In FIG. 5M-1, user 5030 is gazing at an upper portion of the display of device 100, as illustrated by gaze indicator 5038. In FIG. 5M-2, gaze 5038 is targeted at a location in augmented reality user interface 5022 that corresponds to virtual object 5002. As shown in FIGS. 5N-2 and 5O-2, in accordance with a determination that gaze 5038 is targeted at virtual object 5002, the visual indication 5036 ceases to be displayed and animation of virtual object 5002 occurs. In some embodiments, the animation of virtual object 5002 continues while gaze 5038 continues to target virtual object 5002, as illustrated in FIGS. 5N-1 to 5N-2 and 5O-1 to 5O-2. In some embodiments, the animation of virtual object 5002 halts in accordance with a determination that the gaze is not targeted at virtual object 5002. In some embodiments, when the animation of virtual object 5002 has been initiated, the animation continues (e.g., an animation sequence completes and/or an animation sequence continually loops) after the gaze moves away from virtual object 5002.

Figure 5P:
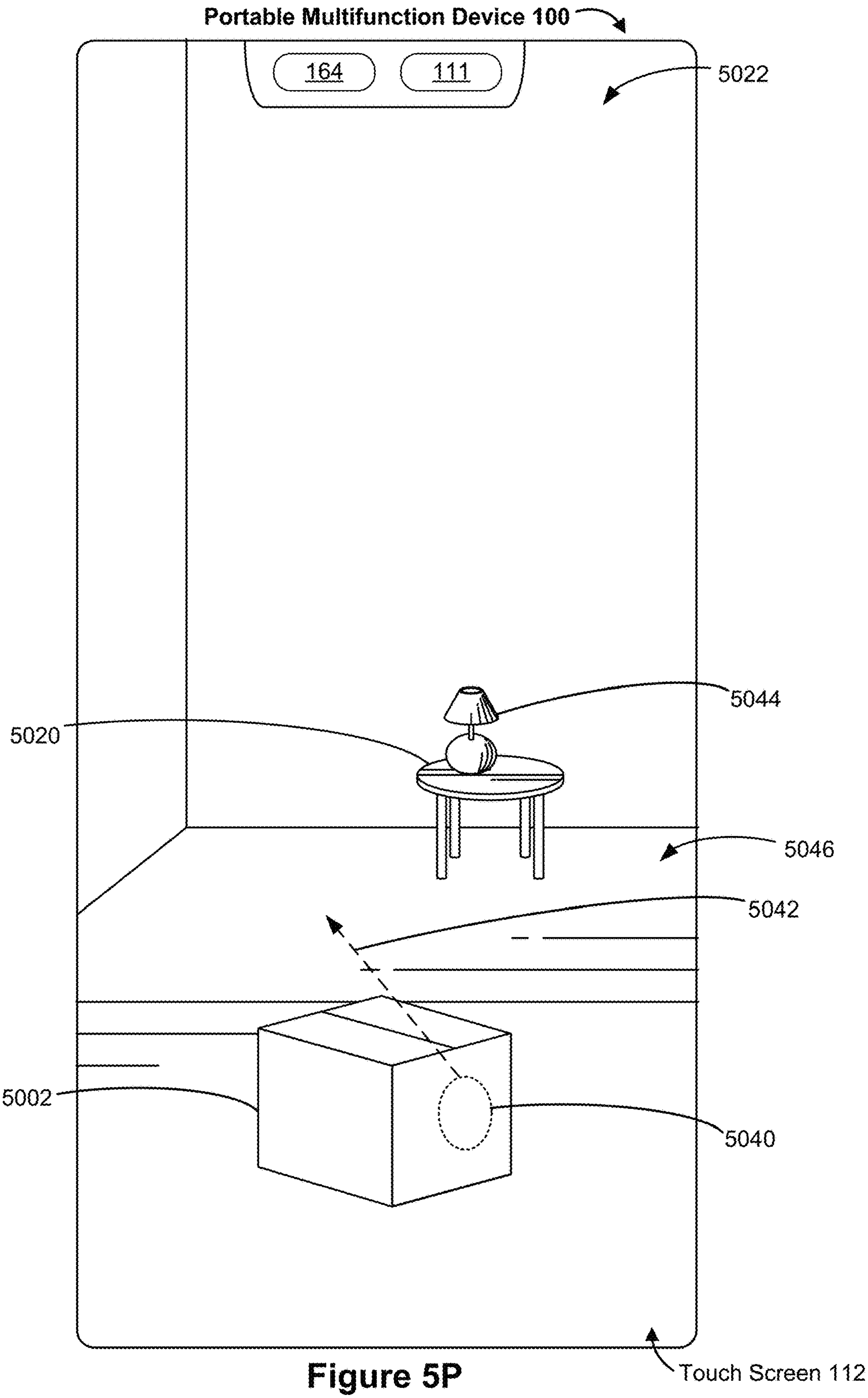
Figure 5Q:
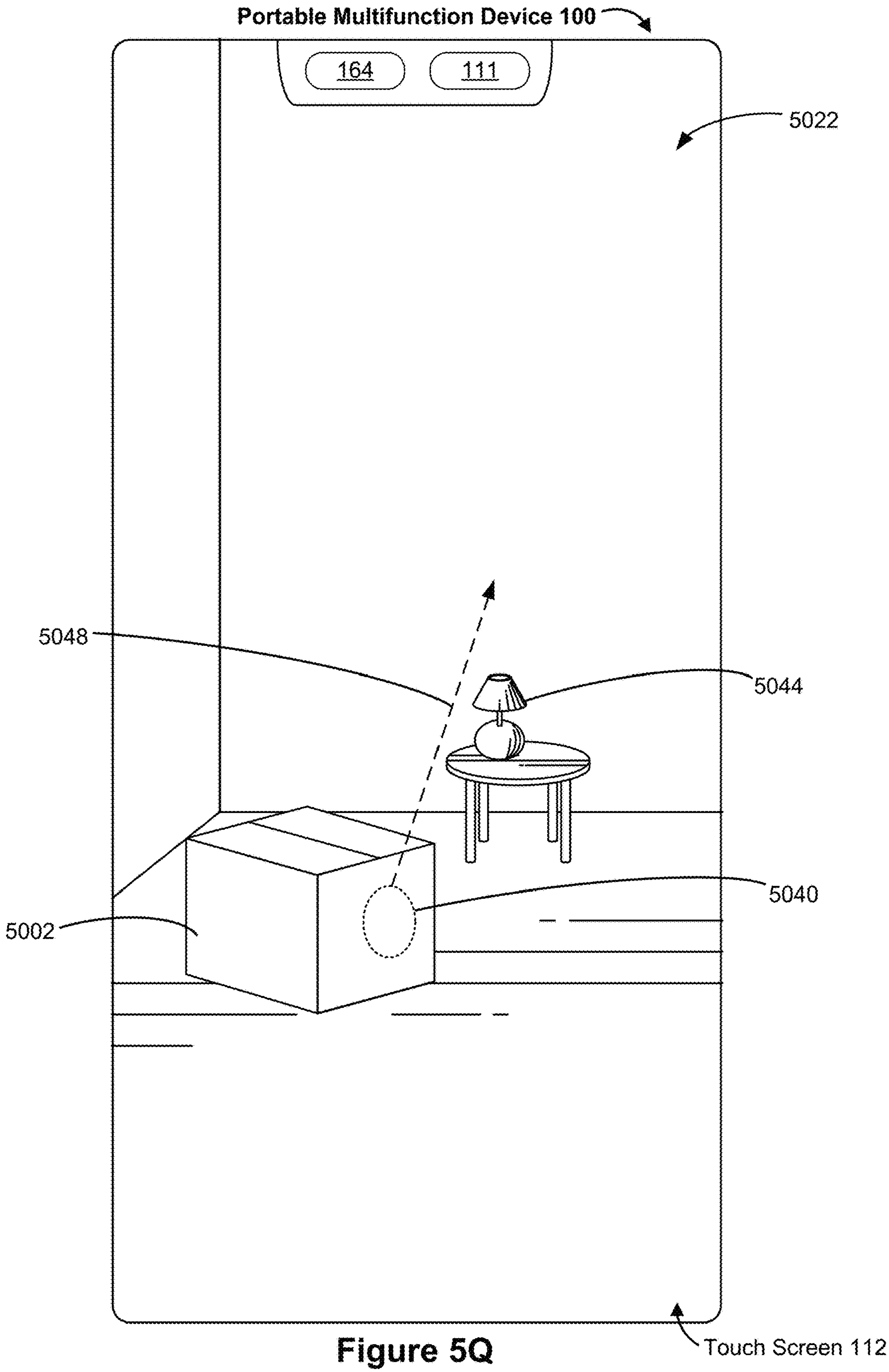
Figure 5R:
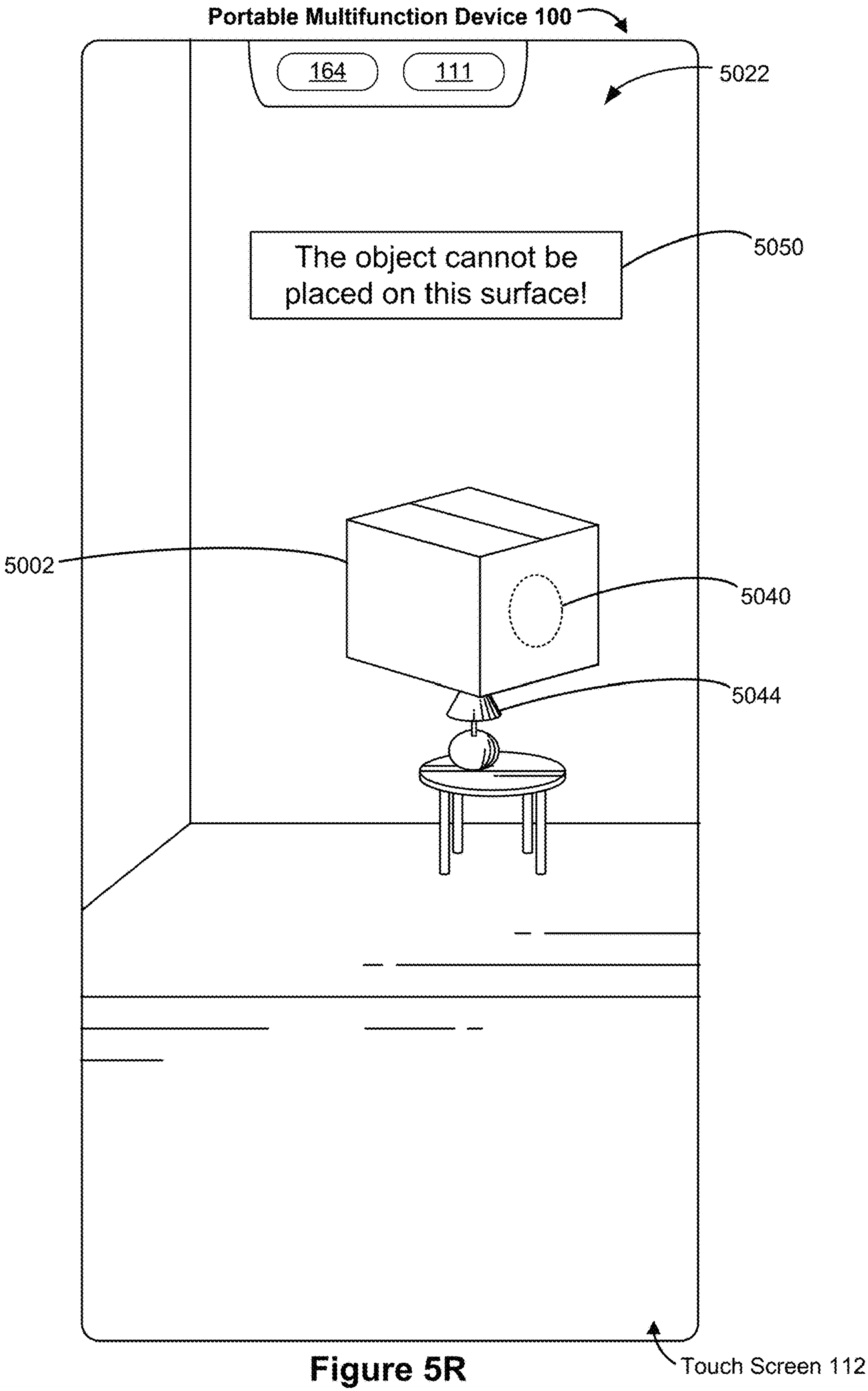

FIGS. 5P-5R illustrate an input that attempts to place virtual object 5002 on a surface with a size that is not compatible with the virtual object 5002. In FIG. 5P, an input by contact 5040 is detected at a location that corresponds to virtual object 5002. As contact 5040 moves along a path indicated by arrow 5042, virtual object 5002 moves along floor 5046 (the floor of physical environment 5018 as captured in the field of view of the one or more cameras of device 100) in the direction of the movement of the contact, as illustrated in FIGS. 5P-5Q. In FIGS. 5Q-5R, contact 5040 continues to move along a path indicated by arrow 5048 as the user attempts to place virtual object 5002 on the upper surface of lamp 5044. In FIG. 5R, because the size of the upper surface of lamp 5044 is not compatible with the size of virtual object 5002 (e.g., including a size corresponding to an animation sequence associated with virtual object 5002), a visual indication 5050 is displayed, indicating that the size of the upper surface of lamp 5044 is not compatible with virtual object 5002 (e.g., "The object cannot be placed on this surface!").

Figure 5S:
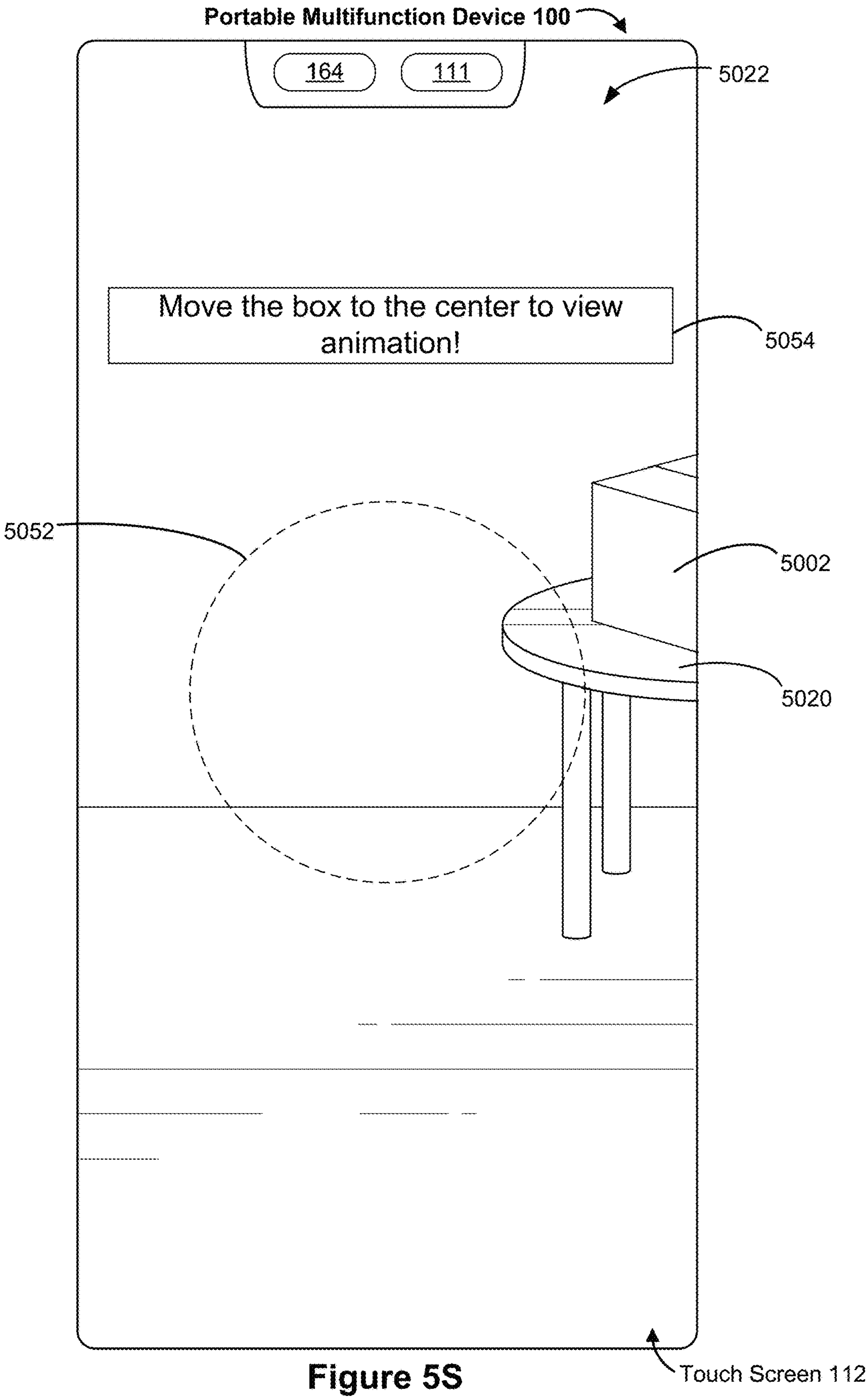

FIGS. 5S-5W illustrate positioning of virtual object 5002 in the displayed field of view of cameras of device 100 that causes animation of virtual object 5002 to occur. In FIG. 5S, virtual object 5002 has been placed on the upper surface of physical table 5020 (e.g., such that virtual object 5002 is displayed at a fixed position relative to physical table 5020 as the field of view of the cameras of device 100 changes). Virtual object 5002 and physical table 5020 are only partially in the displayed field of view of the cameras of device 100. Because the virtual object 5002 is not fully displayed in the field of view of the cameras of device 100, a visual indication 5054 is displayed, indicating input that would cause animation of virtual object 5002 to occur (e.g., "Move the box to the center to view animation!"). Circle 5052 indicates the location to which the virtual object is to be moved to cause animation of virtual object 5002 to occur. In some embodiments, circle 5052 is not displayed by device 100 (as indicated by the dotted lines). In some embodiments, circle 5052 is a prompt that is displayed by device 100. In some embodiments, animation of virtual object 5002 occurs when virtual object 5002 is fully displayed in the displayed portion of the field of view of the cameras of device 100.

Figure 5T:
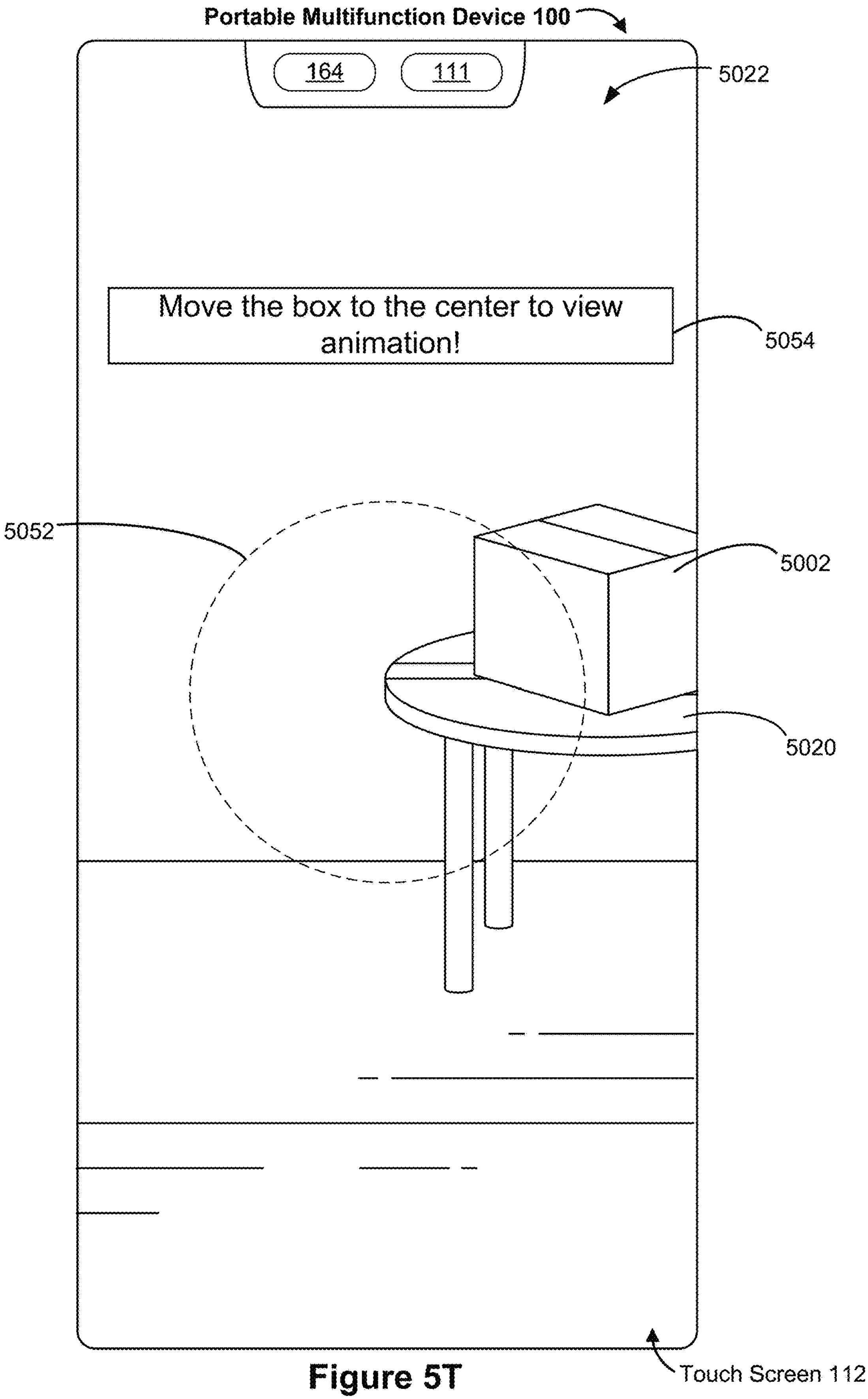
Figure 5U:
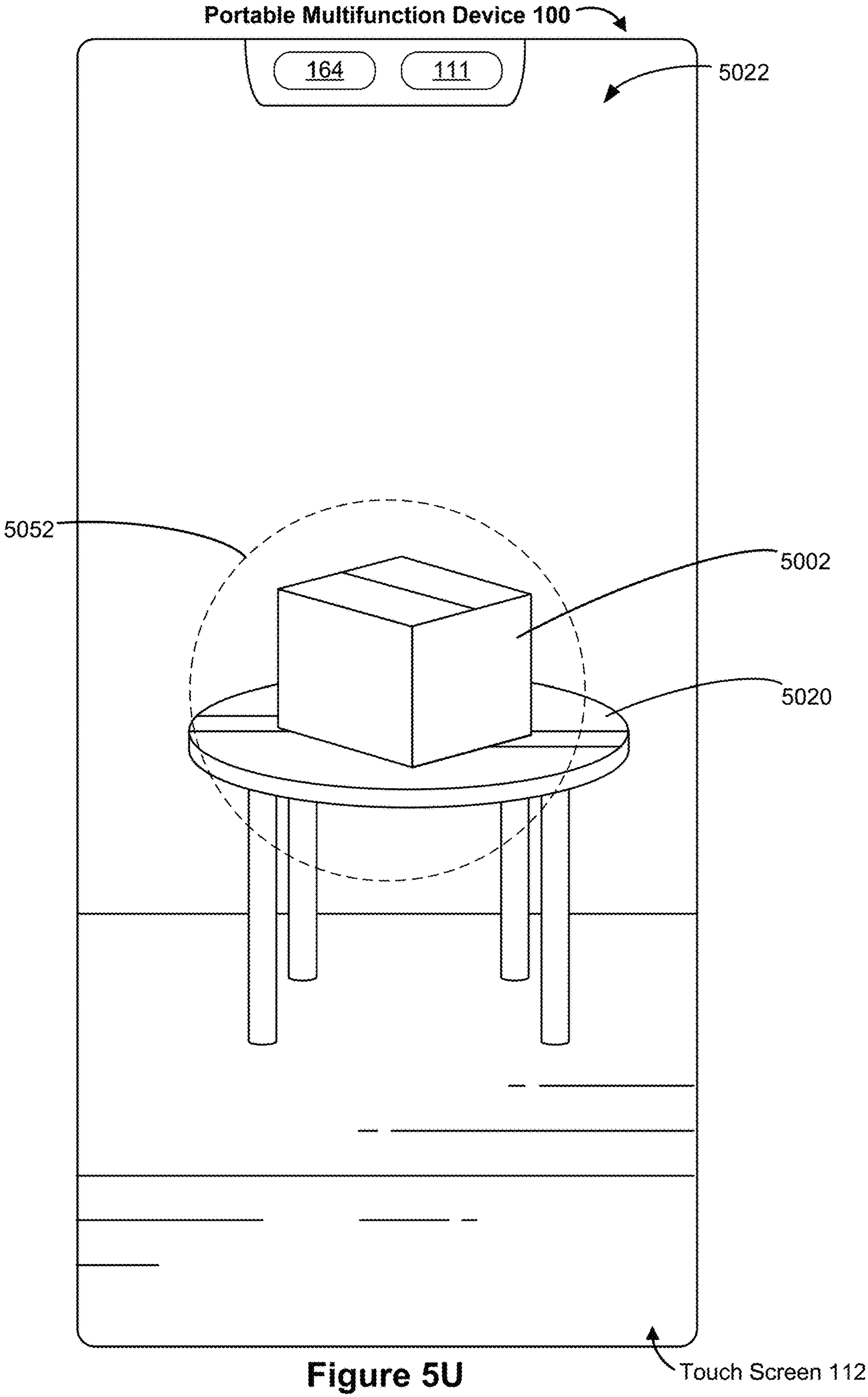
Figure 5V:
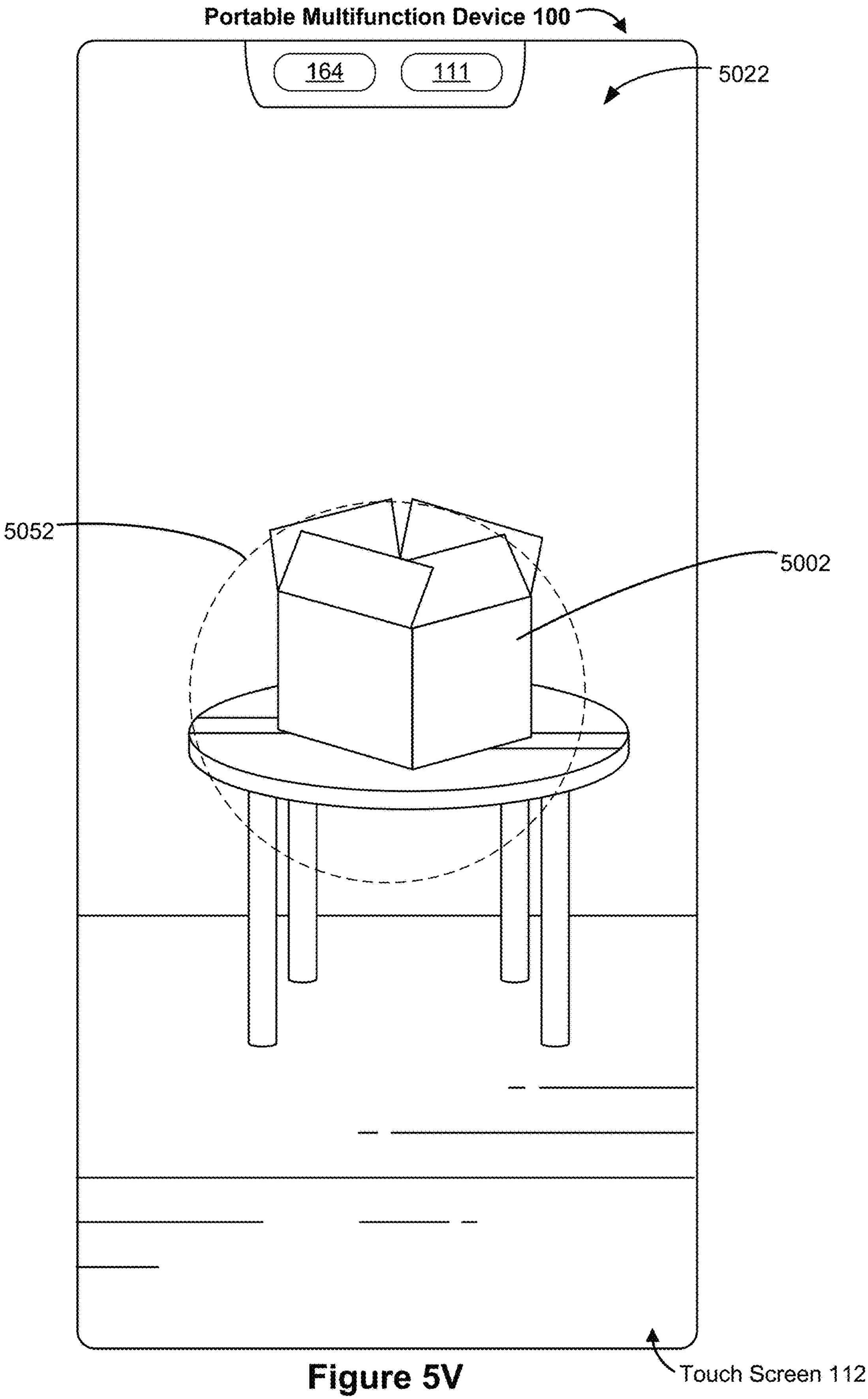
Figure 5W:
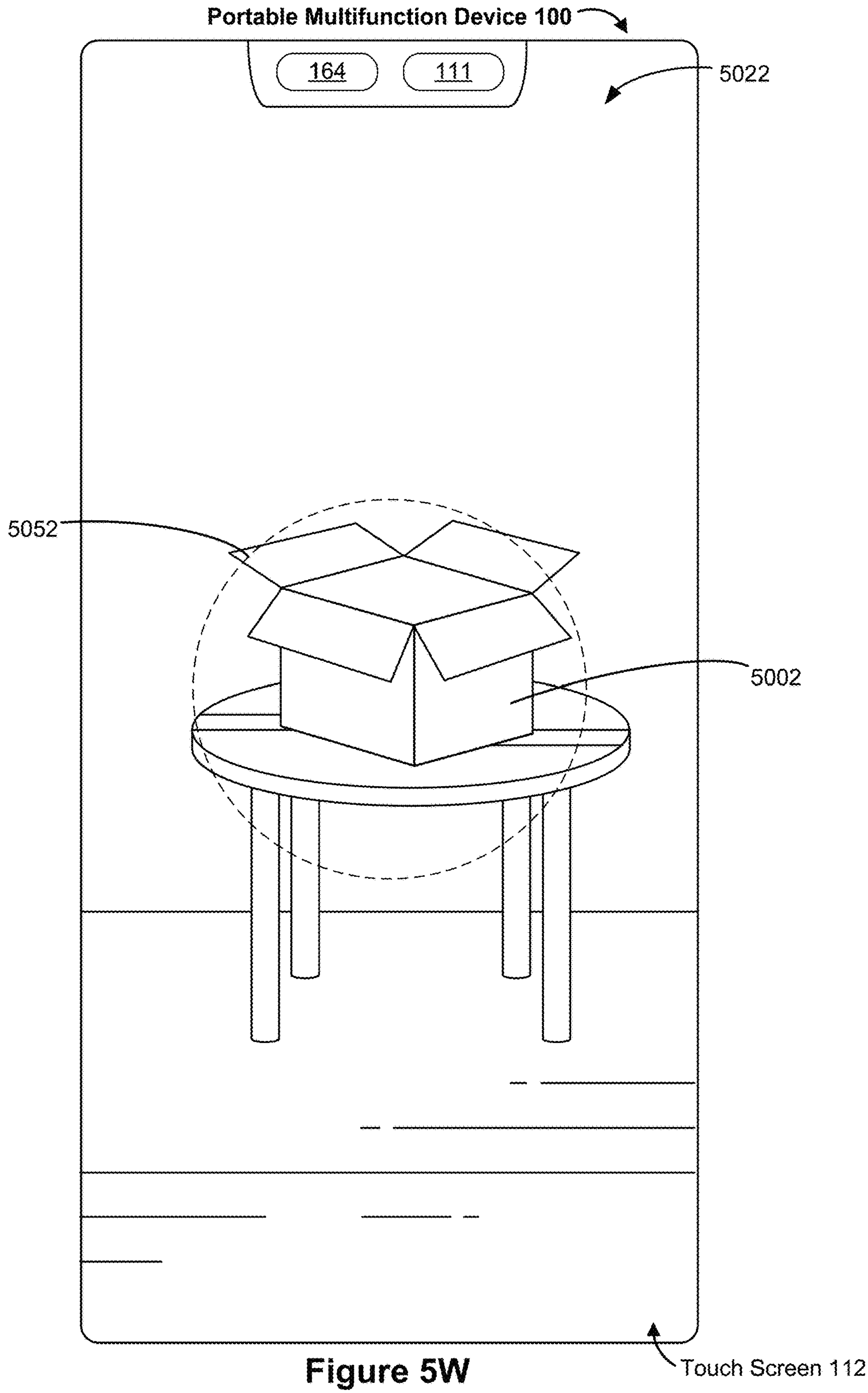

In FIG. 5T, device 100 has been moved relative to physical environment 5018 such that virtual object 5002 is partially displayed within circle 5052. Because virtual object 5002 is not fully displayed within circle 5052, animation of virtual object 5002 has not occurred and visual indication 5054 continues to be displayed. In FIG. 5U, device 100 has been moved relative to physical environment 5018 such that virtual object 5002 is fully displayed within circle 5052. Because virtual object 5002 is fully displayed within circle 5052, animation of virtual object 5002 occurs (as illustrated in FIGS. 5U, 5V, and 5W) and visual indication 5054 ceases to be displayed.

Figure 5X:
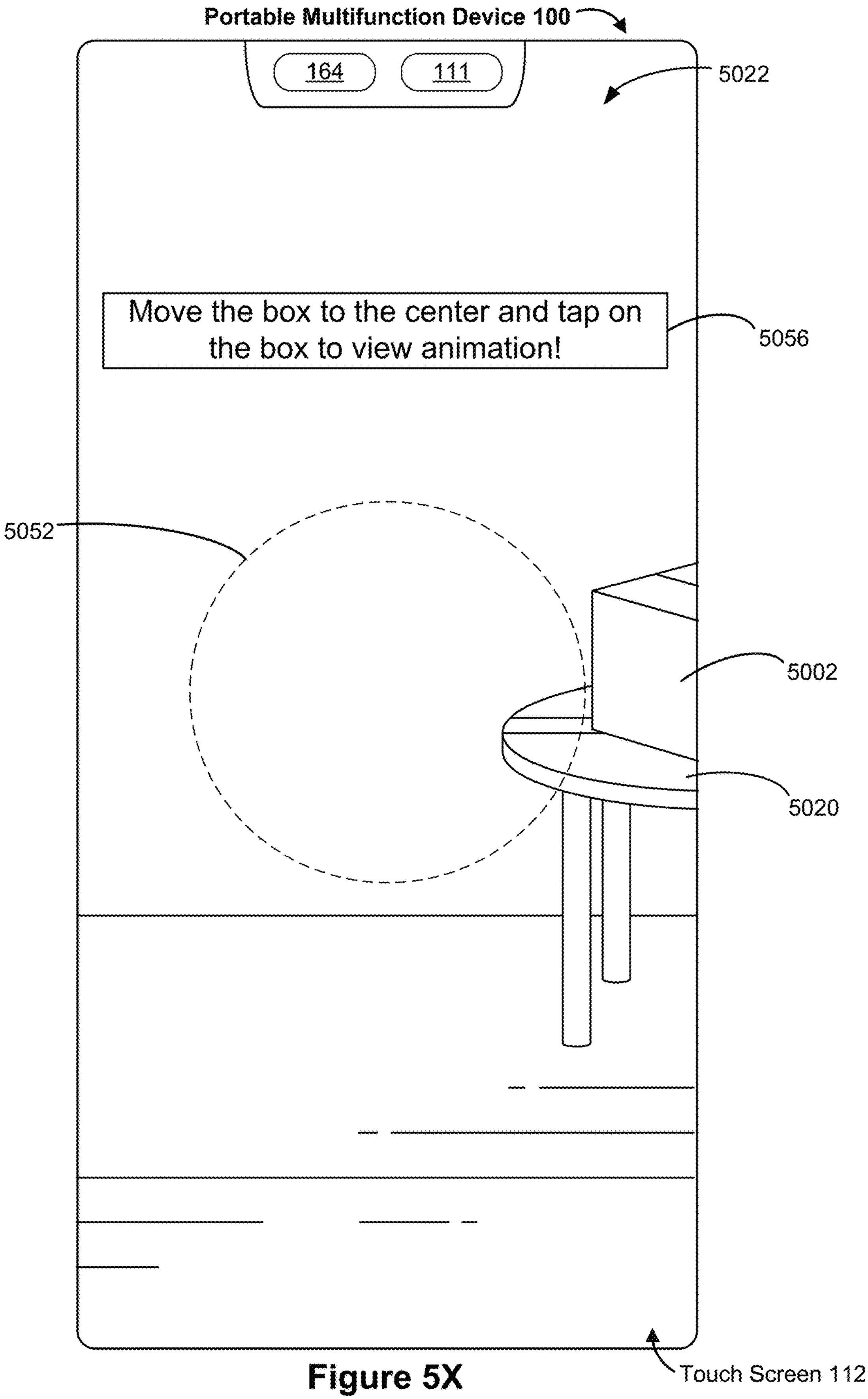

FIGS. 5X-5AC illustrate an embodiment in which multiple criteria must be satisfied to cause playback of an animation sequence of virtual object 5002. In FIG. 5X, virtual object 5002 and physical table 5020 are only partially in the displayed field of view of the cameras of device 100. Until both criteria are satisfied, a visual indication 5056 is displayed, indicating input that would cause animation of virtual object 5002 to occur (e.g., "Move the box to the center and tap on the box to view animation!"). Circle 5052 indicates the location to which the virtual object is to be moved to cause animation of virtual object 5002 to occur.

Figure 5Y:
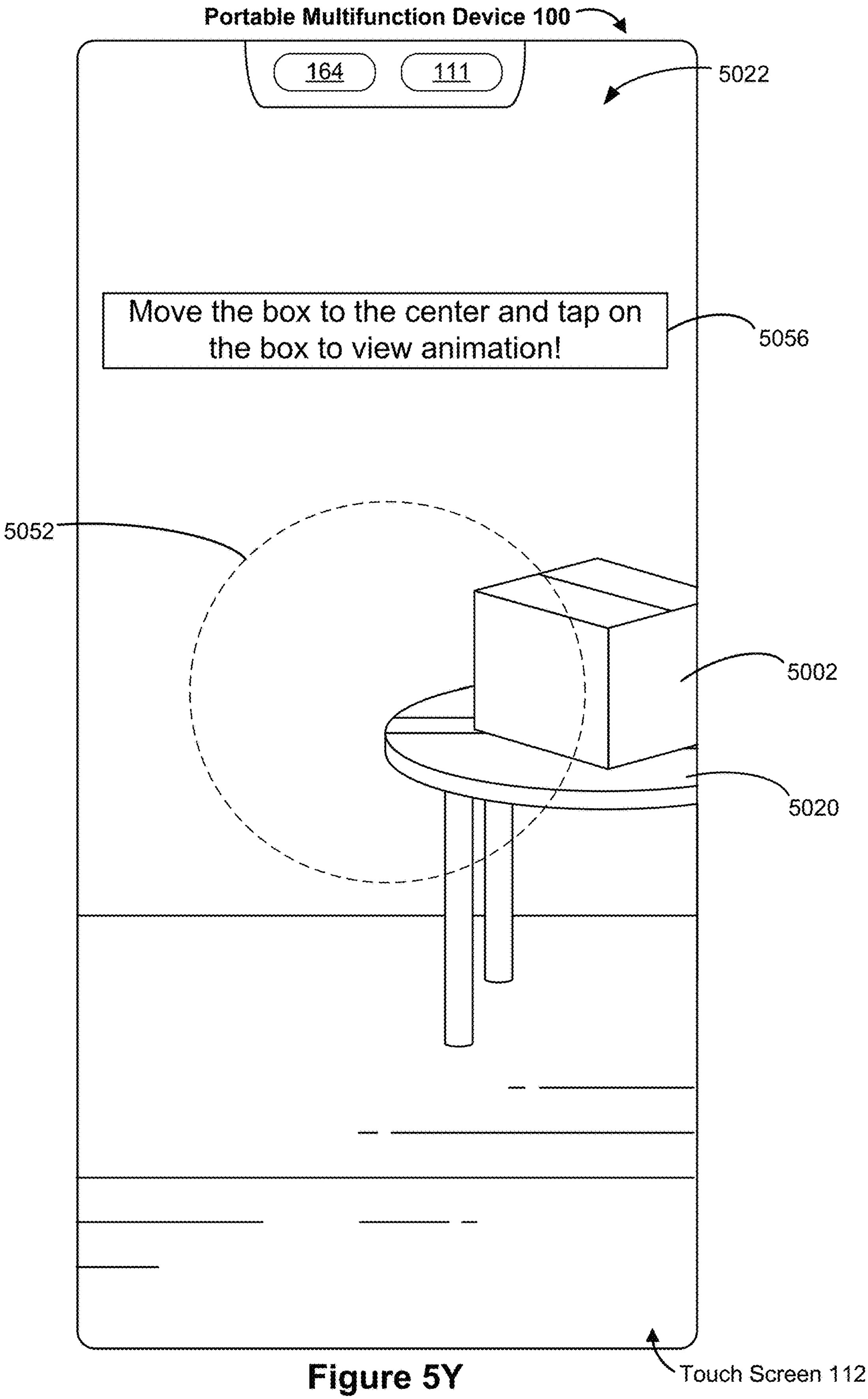
Figure 5Z:
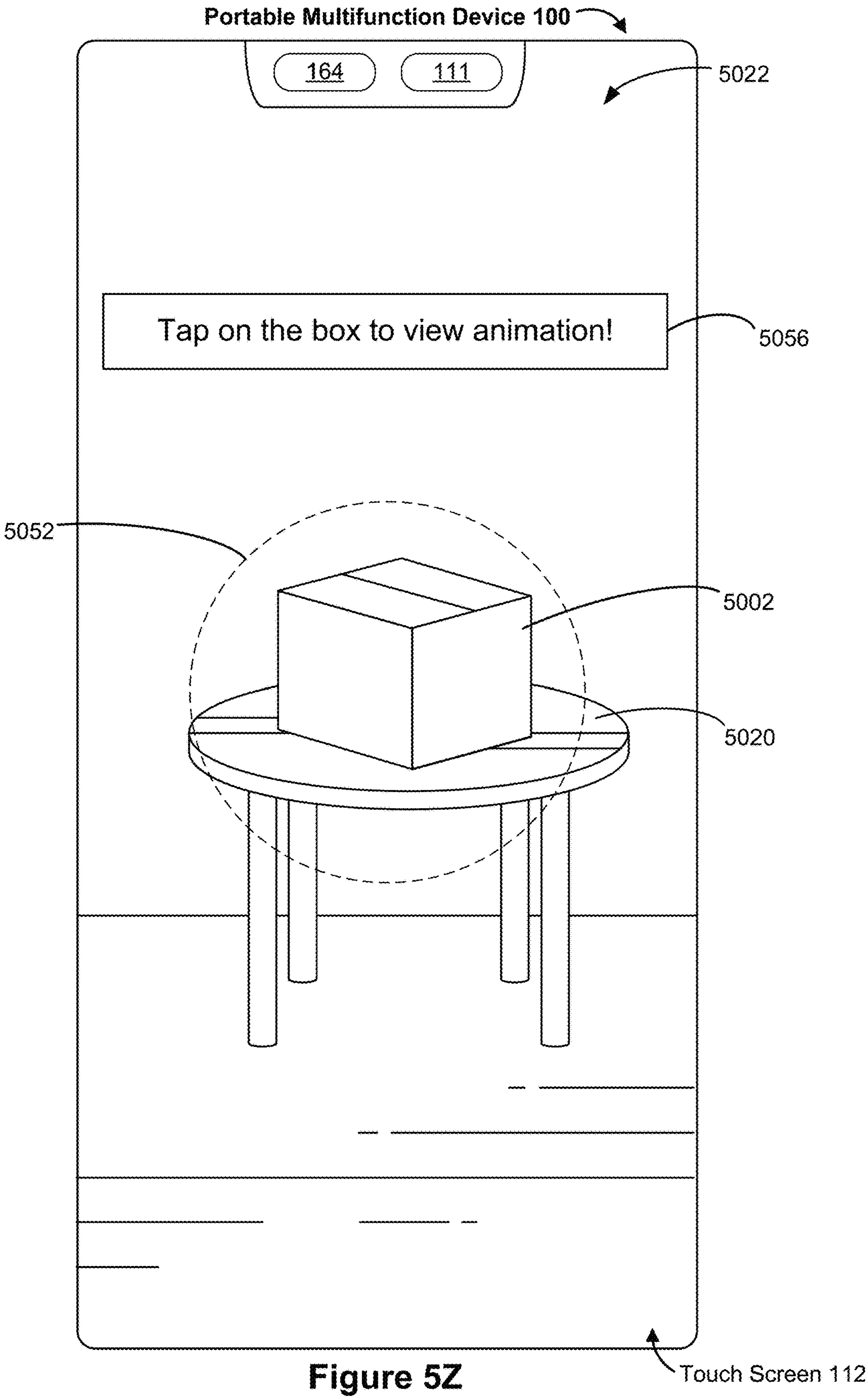
Figure 5A:
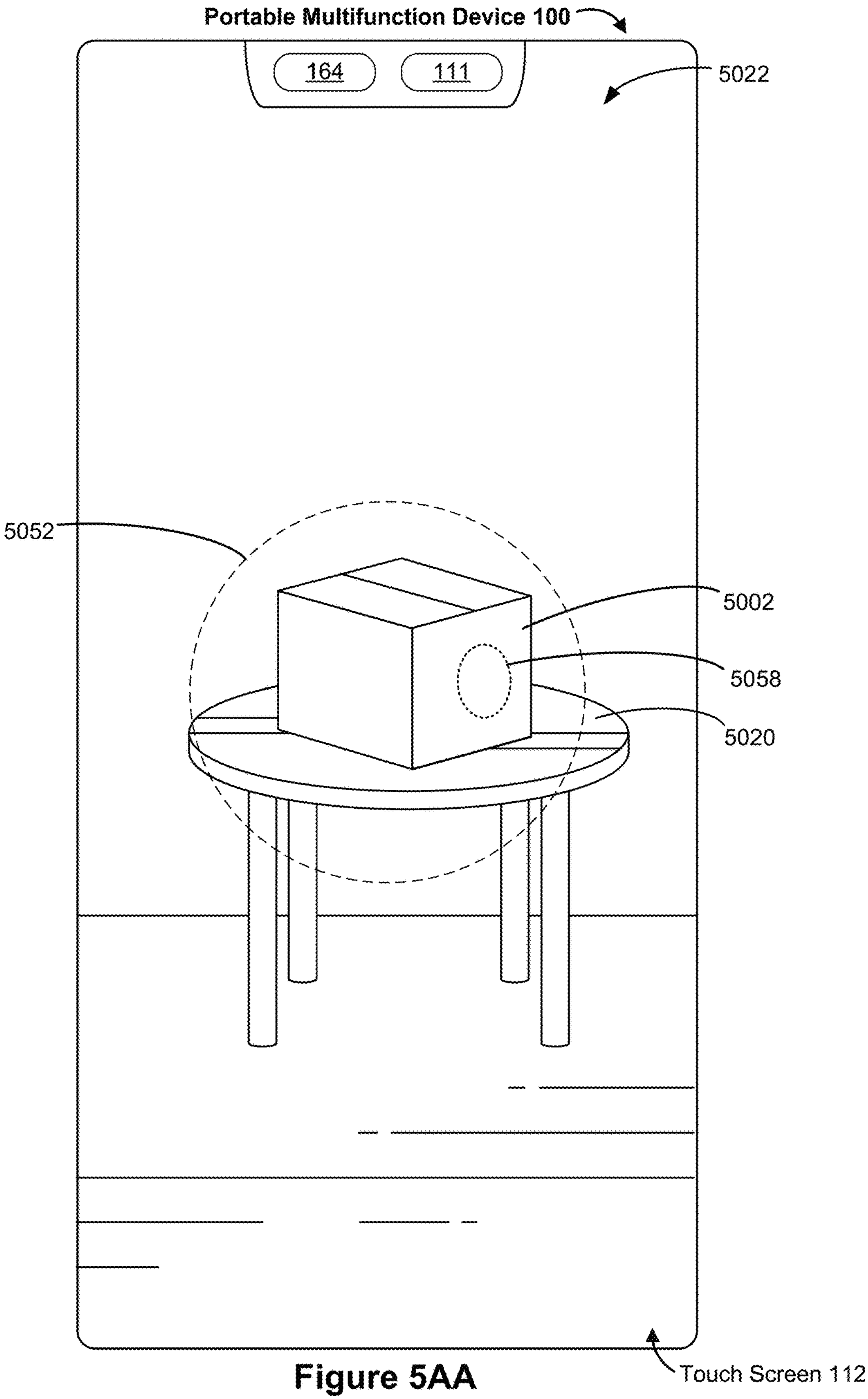
Figure 5A:
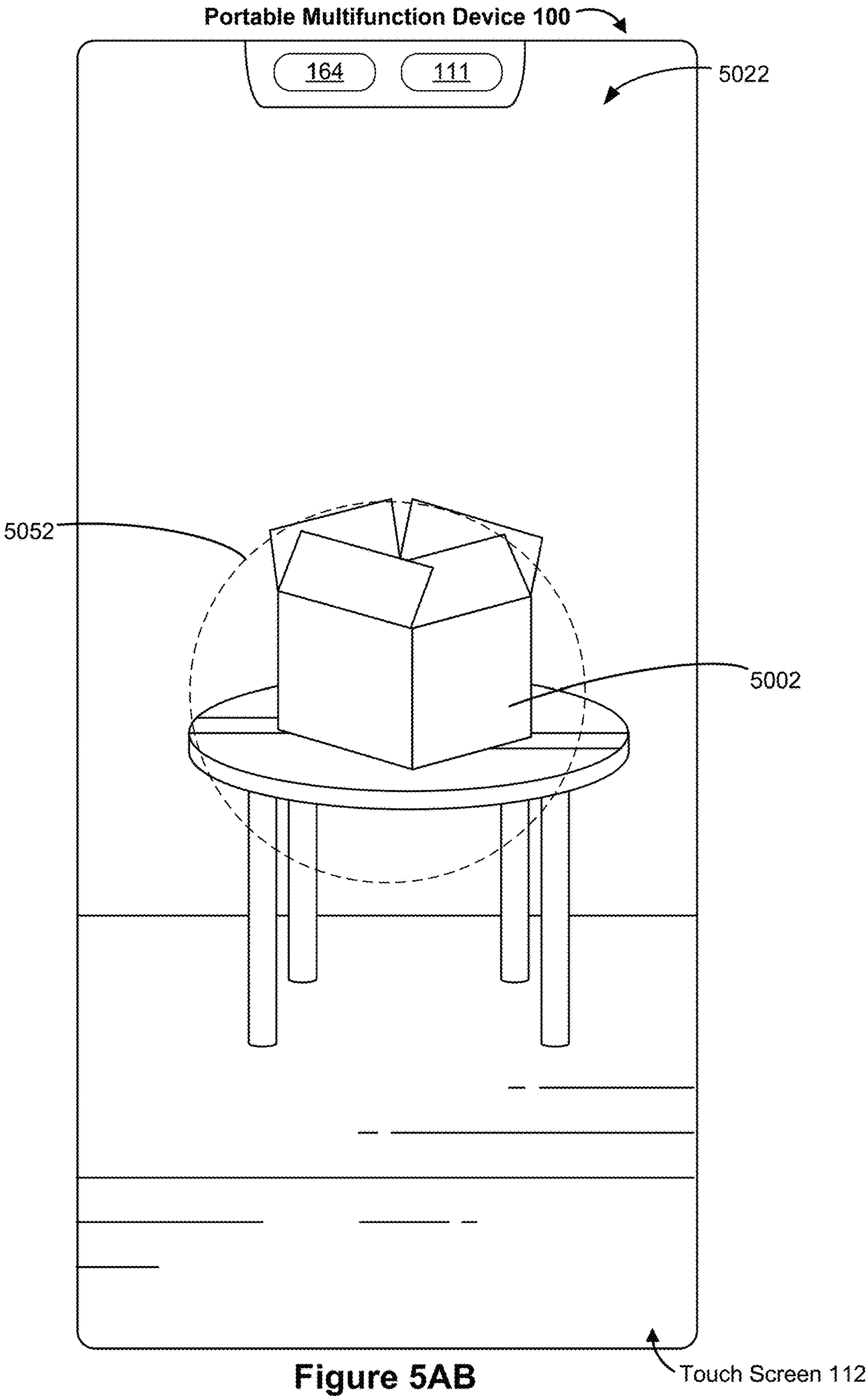
Figure 5A:
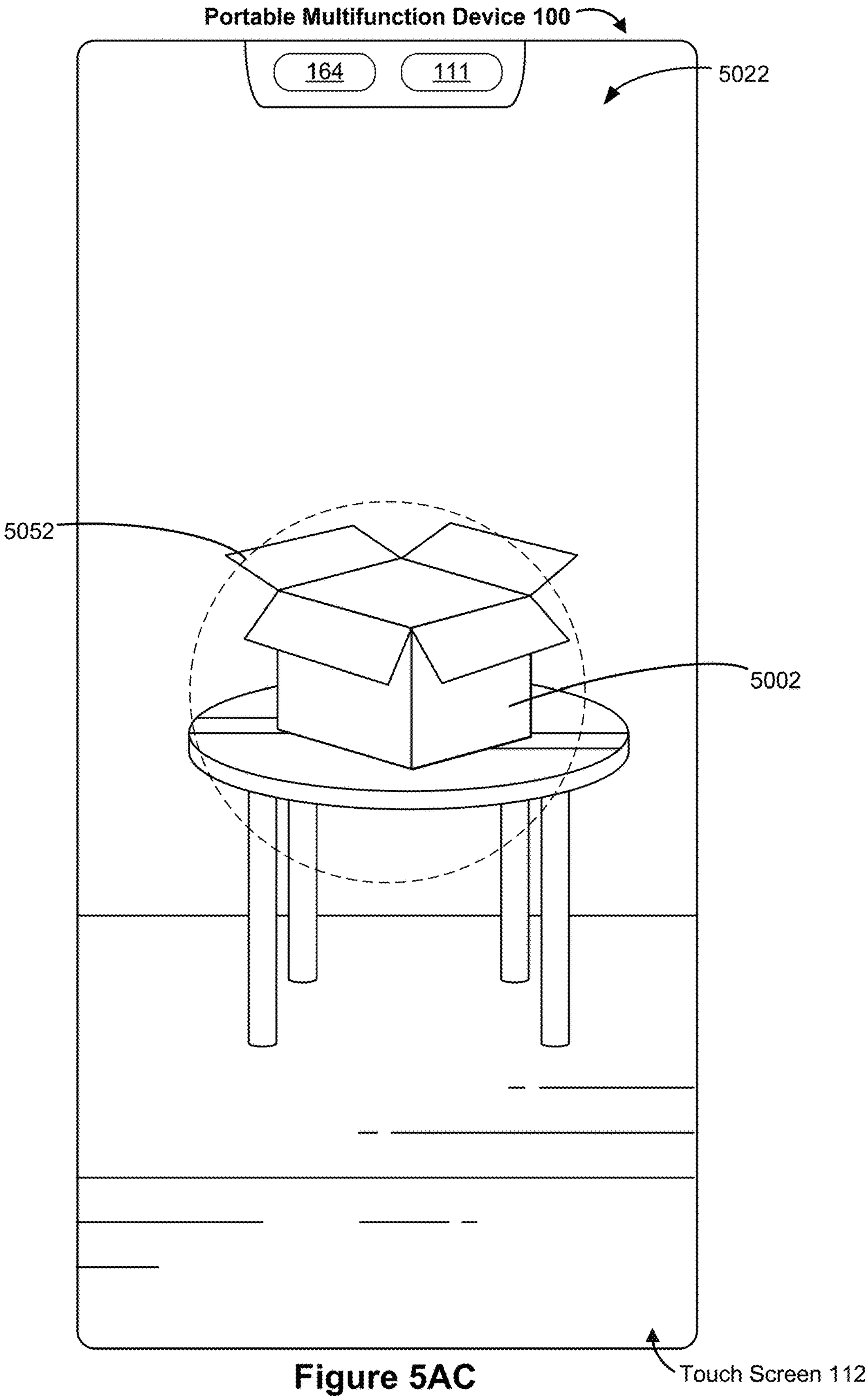
Figure 5A:
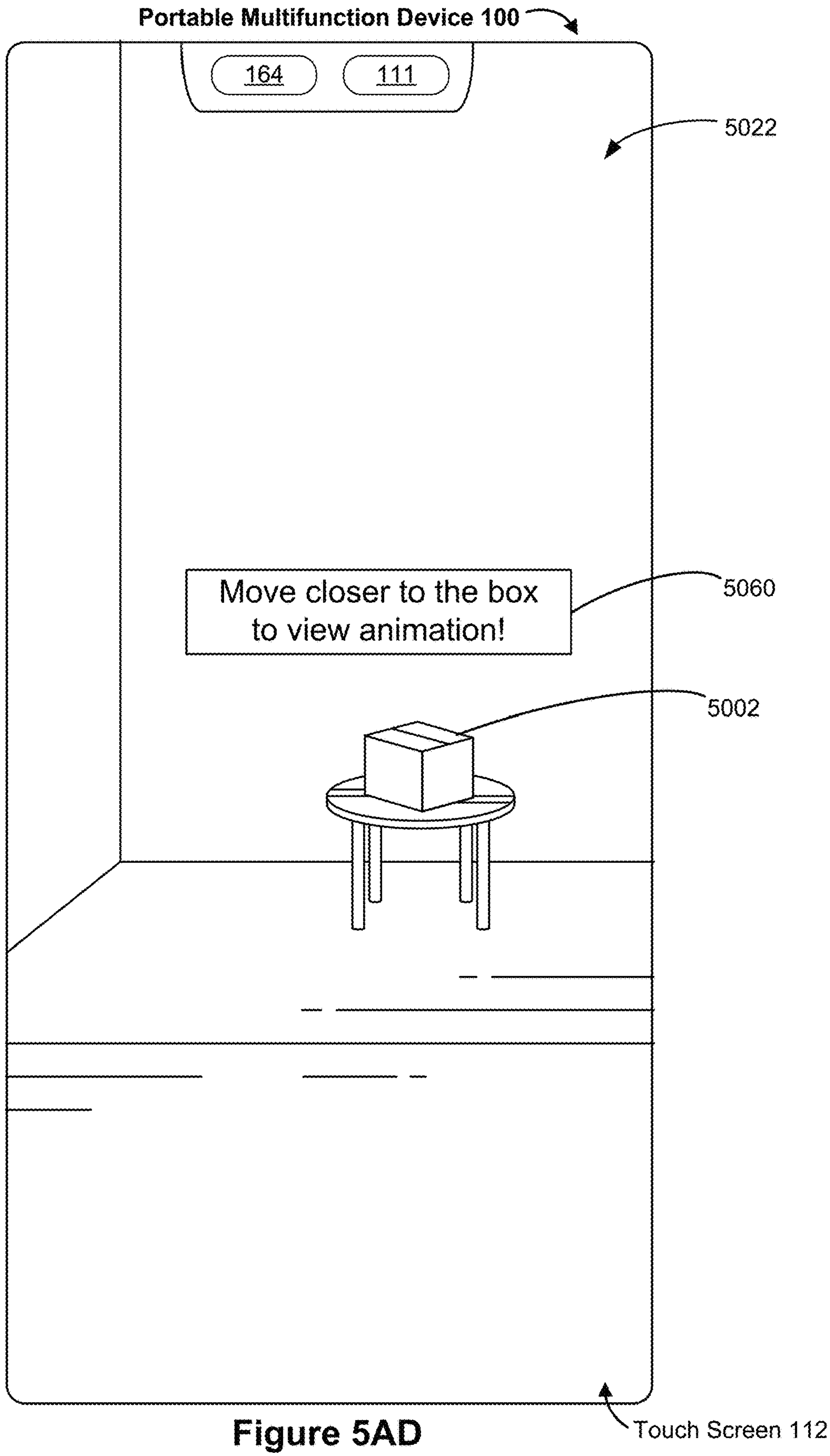
Figure 5A:
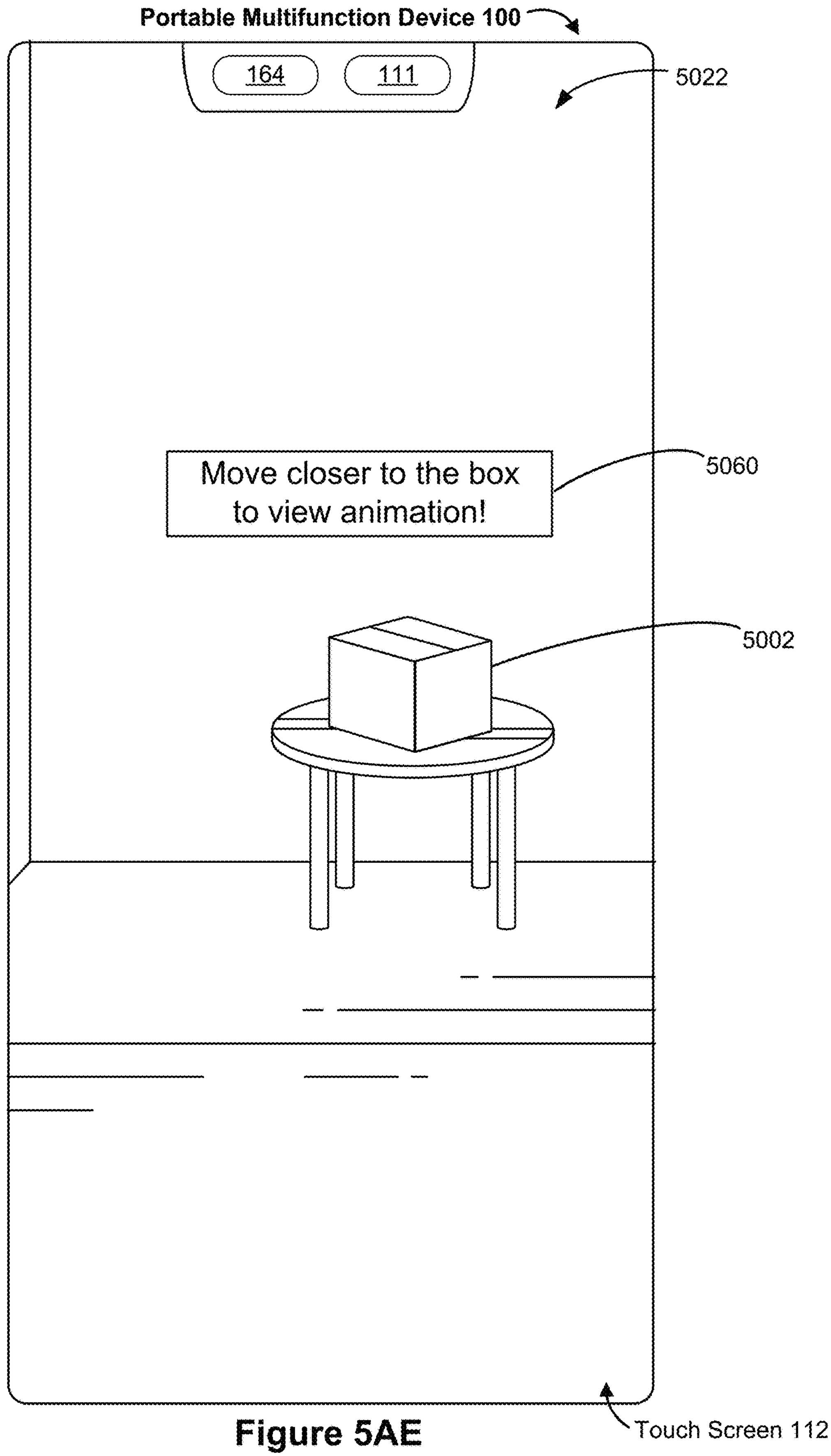
Figure 5A:
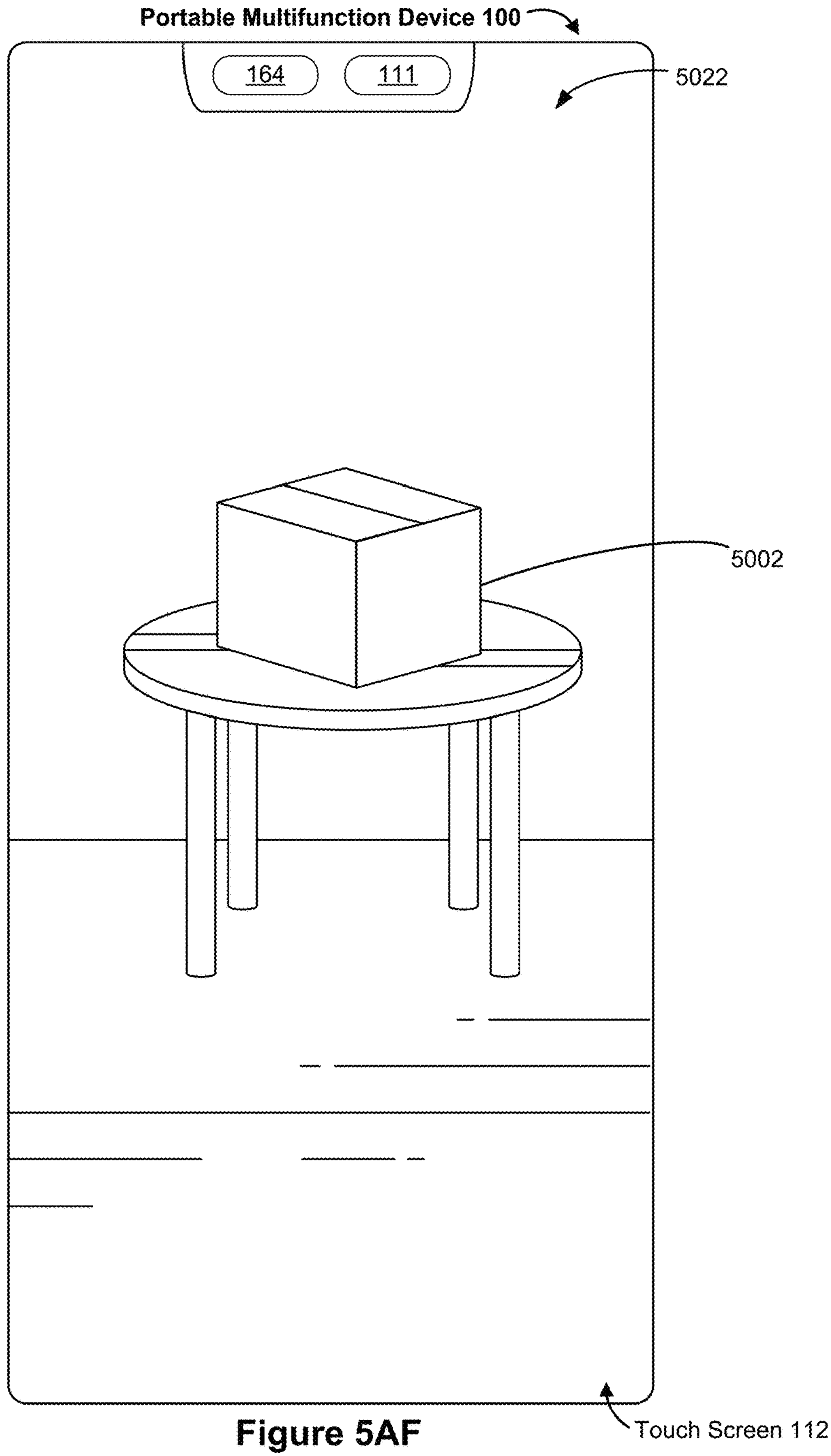
Figure 5A:
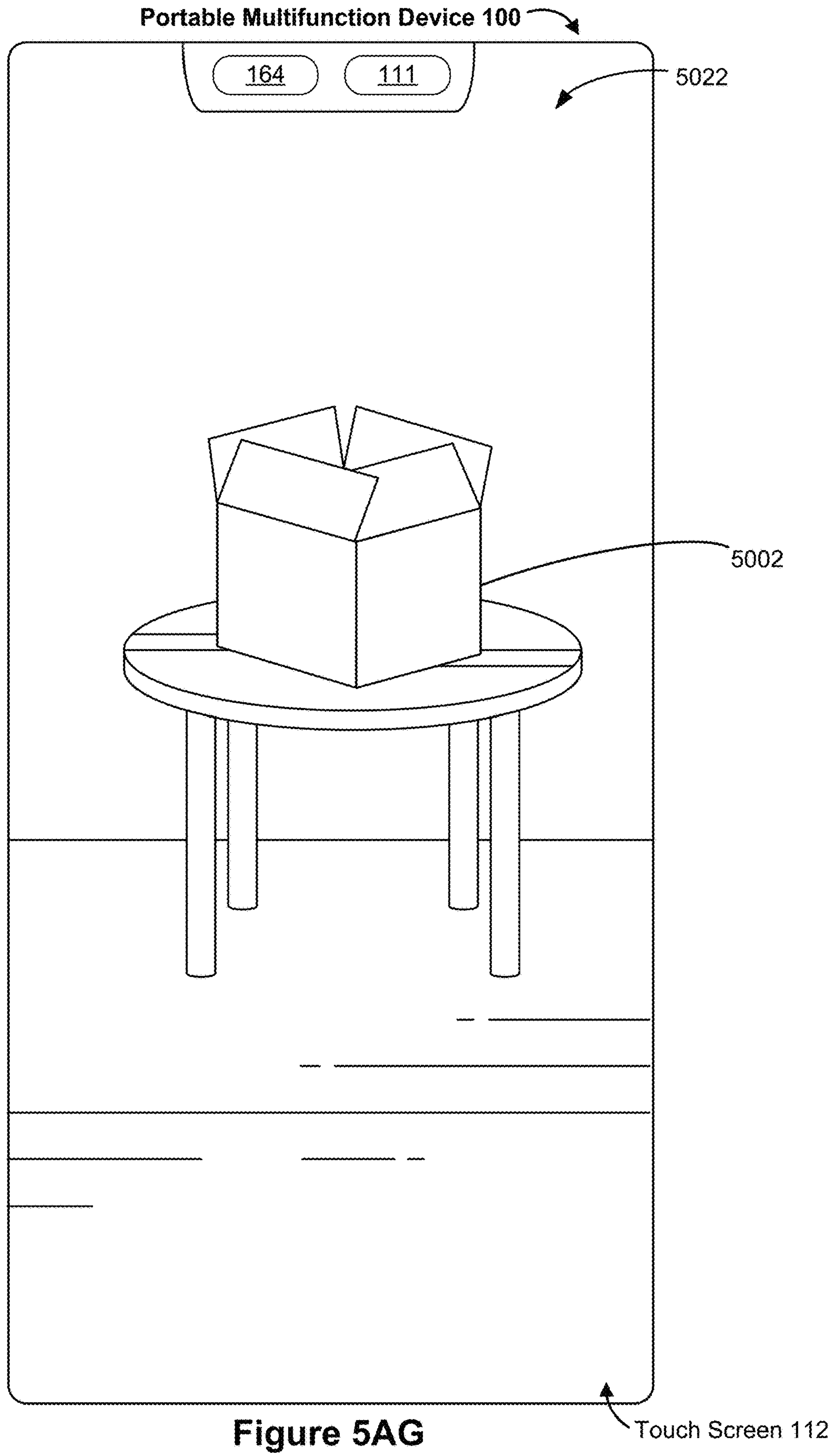
Figure 5A:
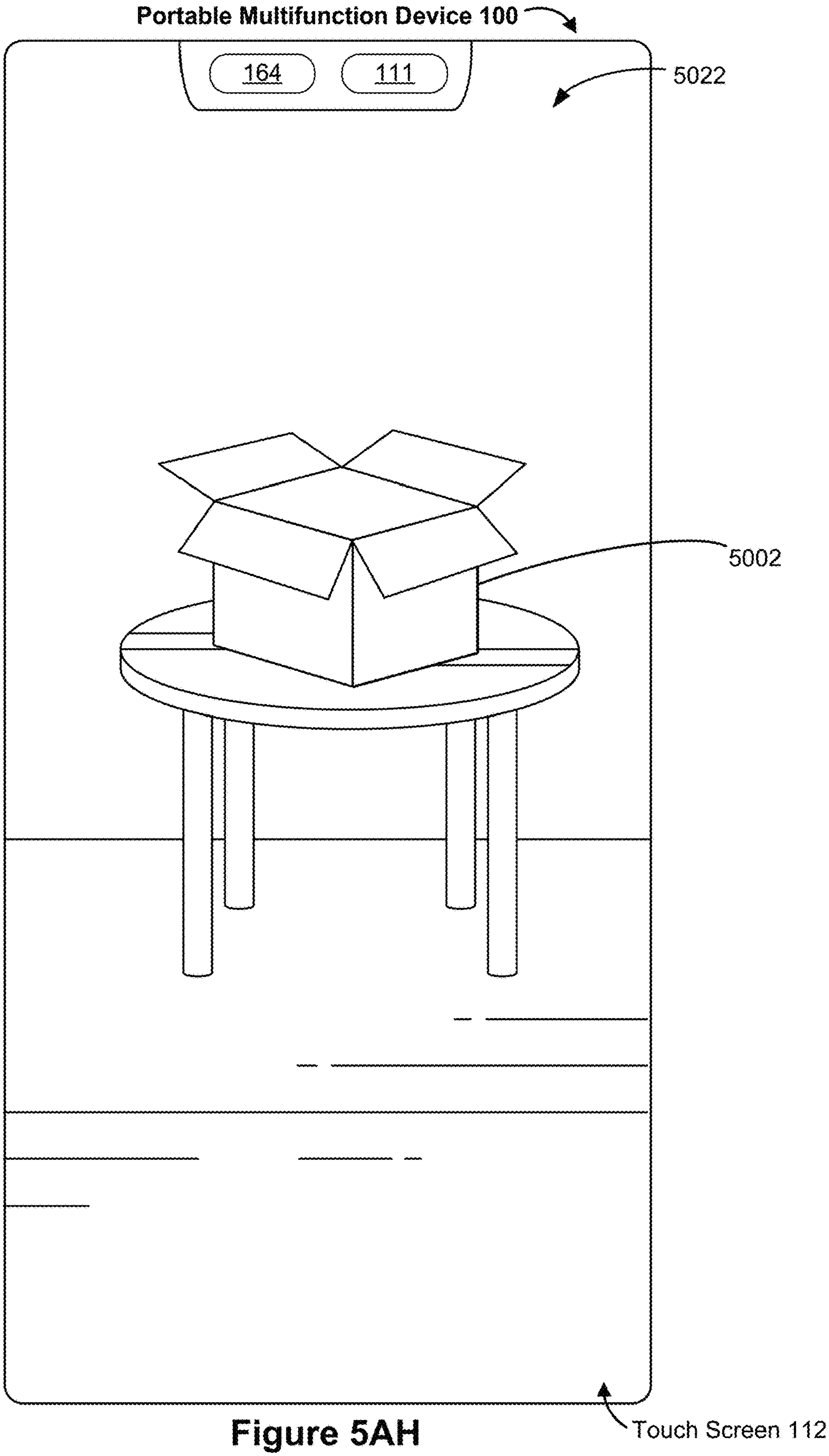
Figure 5A:
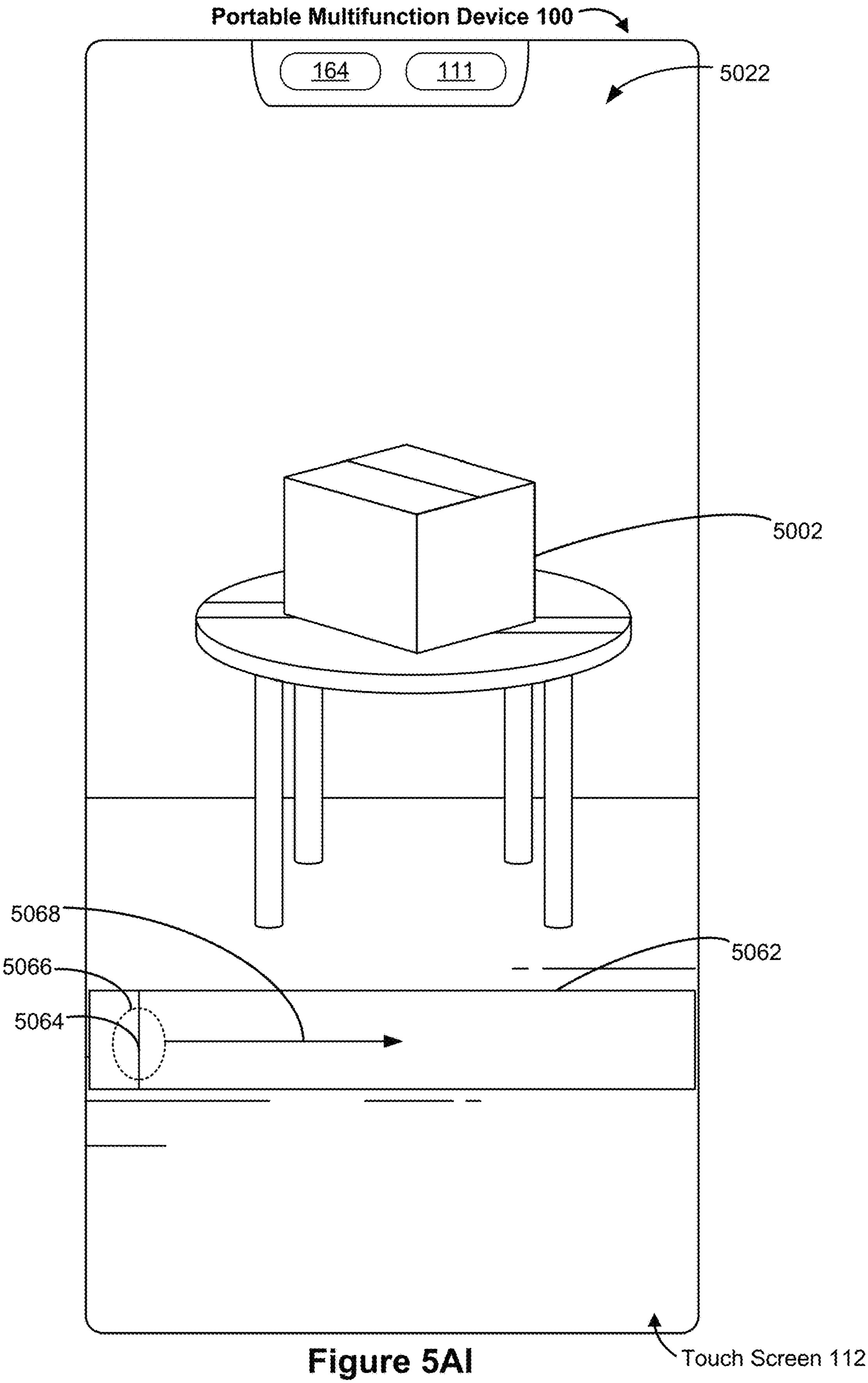
Figure 5A:
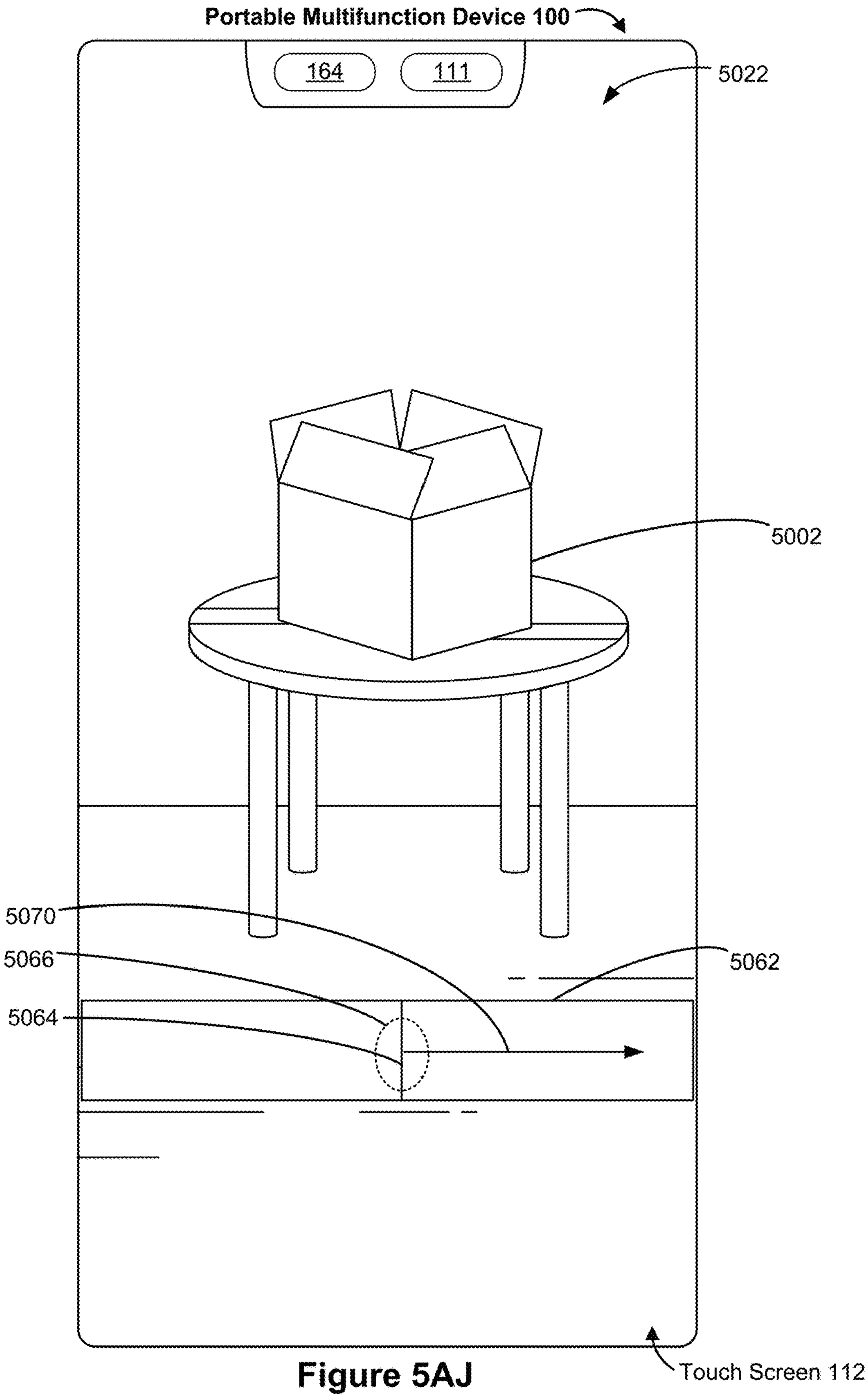
Figure 5A:
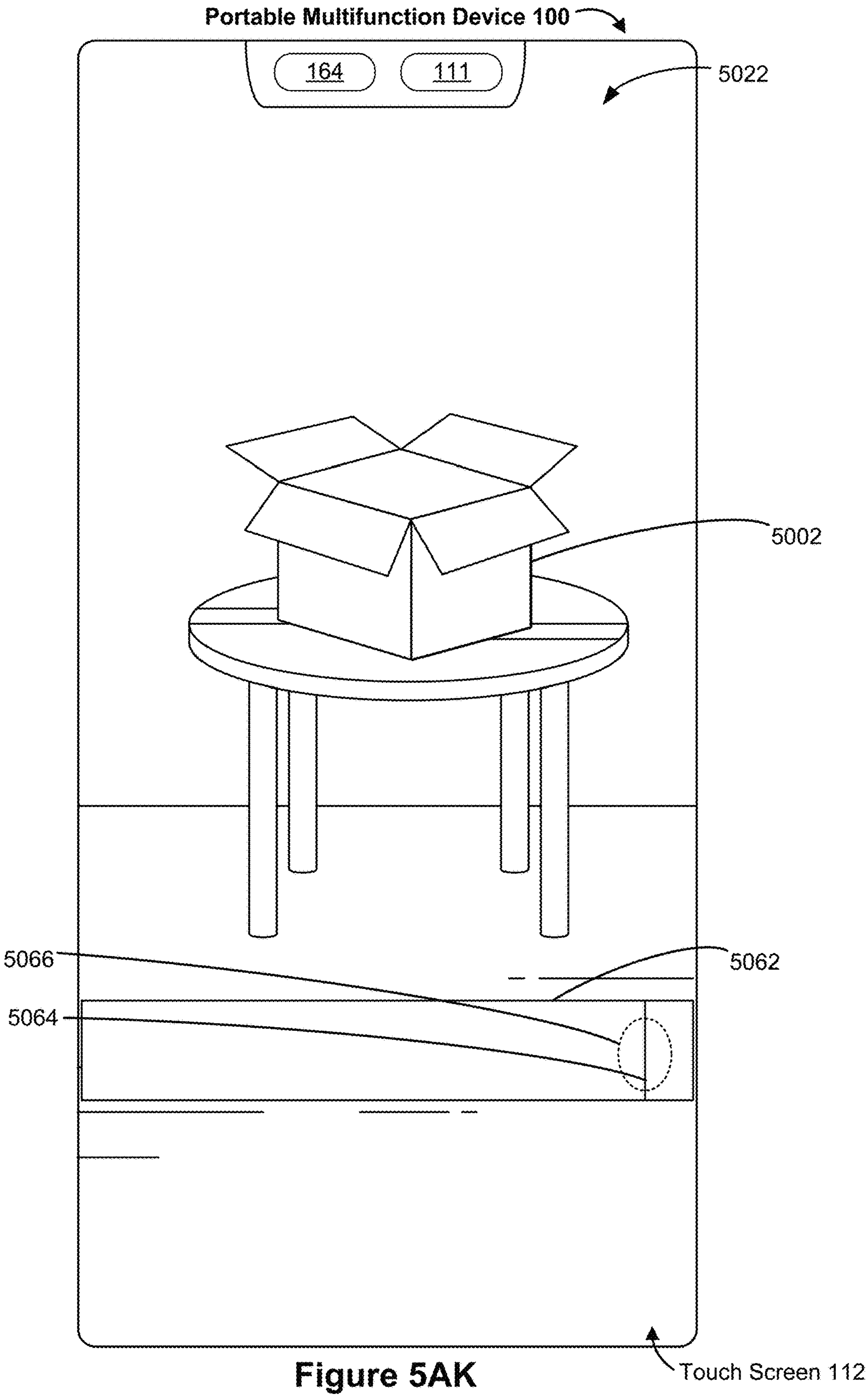

In FIG. 5Y, device 100 has been moved relative to physical environment 5018 such that virtual object 5002 is partially displayed within circle 5052. Because the multiple criteria have not been satisfied, animation of virtual object 5002 has not occurred and visual indication 5054 continues to be displayed. In FIG. 5Z, device 100 has been moved relative to physical environment 5018 such that virtual object 5002 is fully displayed within circle 5052, satisfying a first criterion of multiple criteria that must be satisfied to cause playback of the animation sequence of virtual object 5002. Because the first criterion has been satisfied but the second criterion has not been satisfied, visual indication 5056 is updated to indicate the input that must be provided to satisfy the second criterion (e.g., "Tap on the box to view animation!"). In FIG. 5AA, an input (e.g., a tap input) by a contact 5058 is detected at a location that corresponds to virtual object 5002. In response to the input, because the first criterion and the second criterion have been met, animation of virtual object 5002 occurs (as illustrated in FIGS. 5AA, 5AB, and 5AC) and visual indication 5054 ceases to be displayed.

FIGS. 5AD-5AH illustrate movement of device 100 that causes playback of an animation of virtual object 5002 to occur. In FIG. 5AD, a distance between a displayed position of virtual object 5002 and device 100 is greater than a threshold distance for an animation of virtual object 5002 to occur. A visual indication 5060 is displayed to indicate input that would cause animation of virtual object 5002 to occur (e.g., "Move closer to the box to view animation!"). In FIG. 5AE, device 100 has moved closer to the displayed position of virtual object 5002. Because the distance between the displayed position of virtual object 5002 and device 100 is still greater than the threshold distance for an animation of virtual object 5002 to occur, animation of virtual object 5002 has not occurred and visual indication 5060 continues to be displayed. In FIG. 5AF, device 100 has moved closer to the displayed position of virtual object 5002 such that the distance between the displayed position of virtual object 5002 and device 100 has decreased below the threshold distance for an animation of virtual object 5002 to occur. Because the distance between the displayed position of virtual object 5002 and device 100 has decreased below the threshold distance, animation of virtual object 5002 occurs (as illustrated in FIGS. 5AF, 5AG, and 5AH) and visual indication 5060 ceases to be displayed.

FIGS. 5AI-5AK illustrate a play head control for adjusting playback of an animated sequence that animates virtual object 5002. In FIG. 5AI, a timeline 5062 is displayed that corresponds to playback of the animation sequence for virtual object 5002. Play head 5064 indicates a position within timeline 5062 of a currently displayed frame of the animation sequence. An input by contact 5066 is detected at a location that corresponds to play head 5064. As contact 5066 moves along a path indicated by arrow 5068, play head 5064 moves along timeline 5062 in the direction of the movement of the contact (e.g., play head 5064 is "dragged" by the movement of contact 5066) and the animation sequence of virtual object 5002 progresses in accordance with the movement of play head 5064, as illustrated in FIGS. 5AI-5AJ. In FIGS. 5AJ-5AK, contact 5066 continues to move along a path indicated by arrow 5070, causing further movement of play head 5064 and further progression of the animation sequence of virtual object 5002.

Figure 6A:
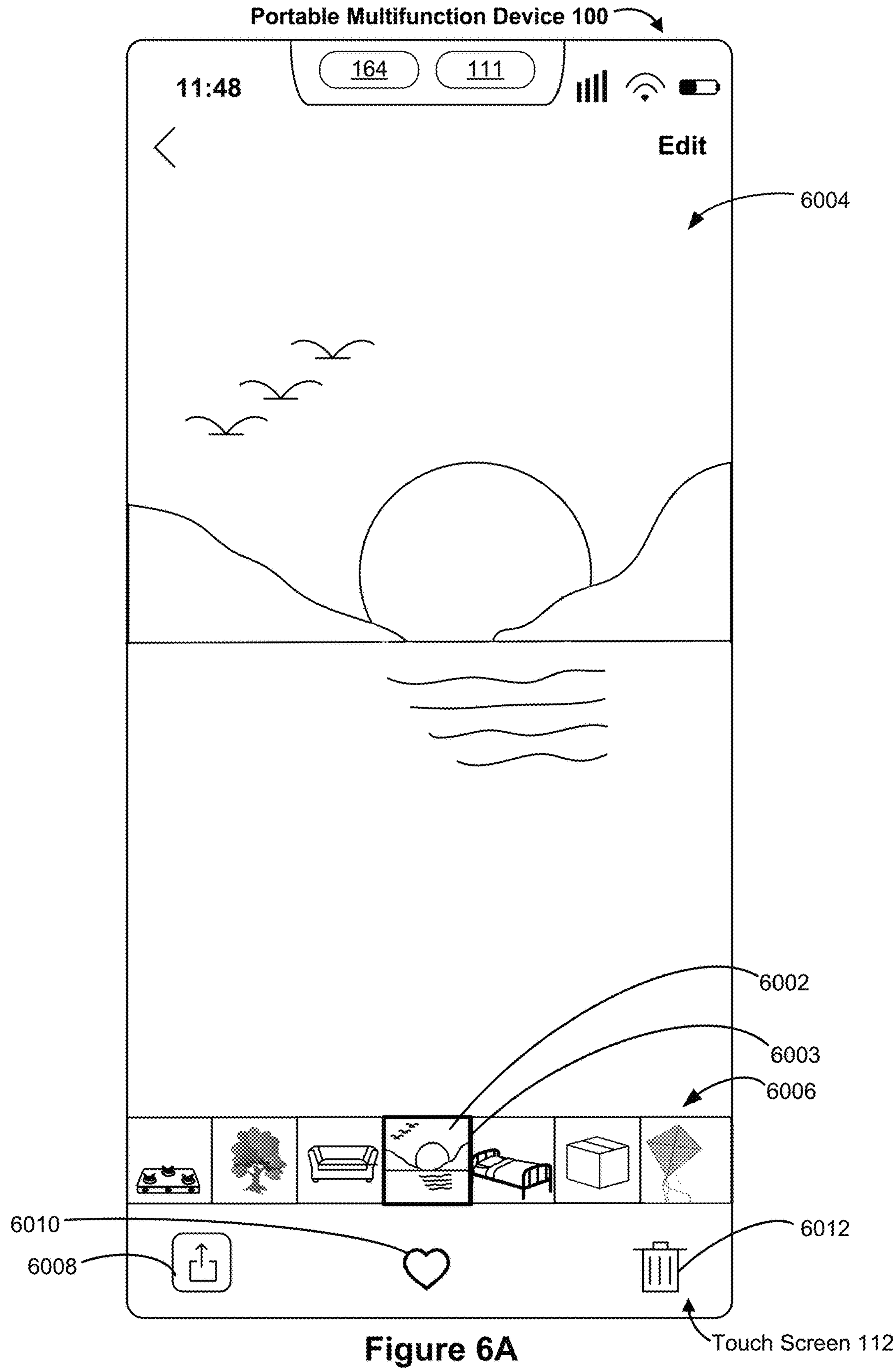
FIGS. 6A-6AI illustrate example user interfaces for displaying a media item in a user interface that includes content of at least a portion of a field of view of one or more cameras, in accordance with some embodiments.

FIGS. 6A-6AI illustrate example user interfaces for displaying a media item in a user interface that includes content of at least a portion of a field of view of one or more cameras (e.g., displaying a photograph in an augmented reality environment), in accordance with some embodiments. The user interfaces in these figures are used to illustrate the processes described below, including the processes in FIGS. 9A-9C, 10A-10C, 11A-11D, 12A-12B, and 13A-13B. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

In FIG. 6A, a currently selected photo 6002 is displayed in a photo viewing interface 6004 of a photo management application. Photo management application user interface includes a photo thumbnail navigation bar 6006 that displays thumbnails of photos (e.g., photos captured by device 100). In some embodiments, leftward or rightward swipe input on photo thumbnail navigation bar 6006 causes scrolling of the displayed set of photo thumbnails in the direction of the swipe input, such that additional photo thumbnails are revealed. In some embodiments, an input (e.g., a tap input) on a photo thumbnail displayed in photo thumbnail navigation bar 6006 causes an enlarged version of a photo to be selected for display in photo viewing interface 6004. For example, because photo 6002 is currently selected (e.g., as indicated by frame 6003 surrounding the photo thumbnail that corresponds to currently selected photo 6002) an enlarged version of photo 6002 is displayed in photo viewing interface 6004. Photo viewing interface 6004 includes control 6008 for displaying a sharing user interface, control 6010 for applying metadata to a selected photo (e.g., metadata indicating that the selected photo is a favorite photo), and control 6012 for deleting a selected photo.

Figure 6B:
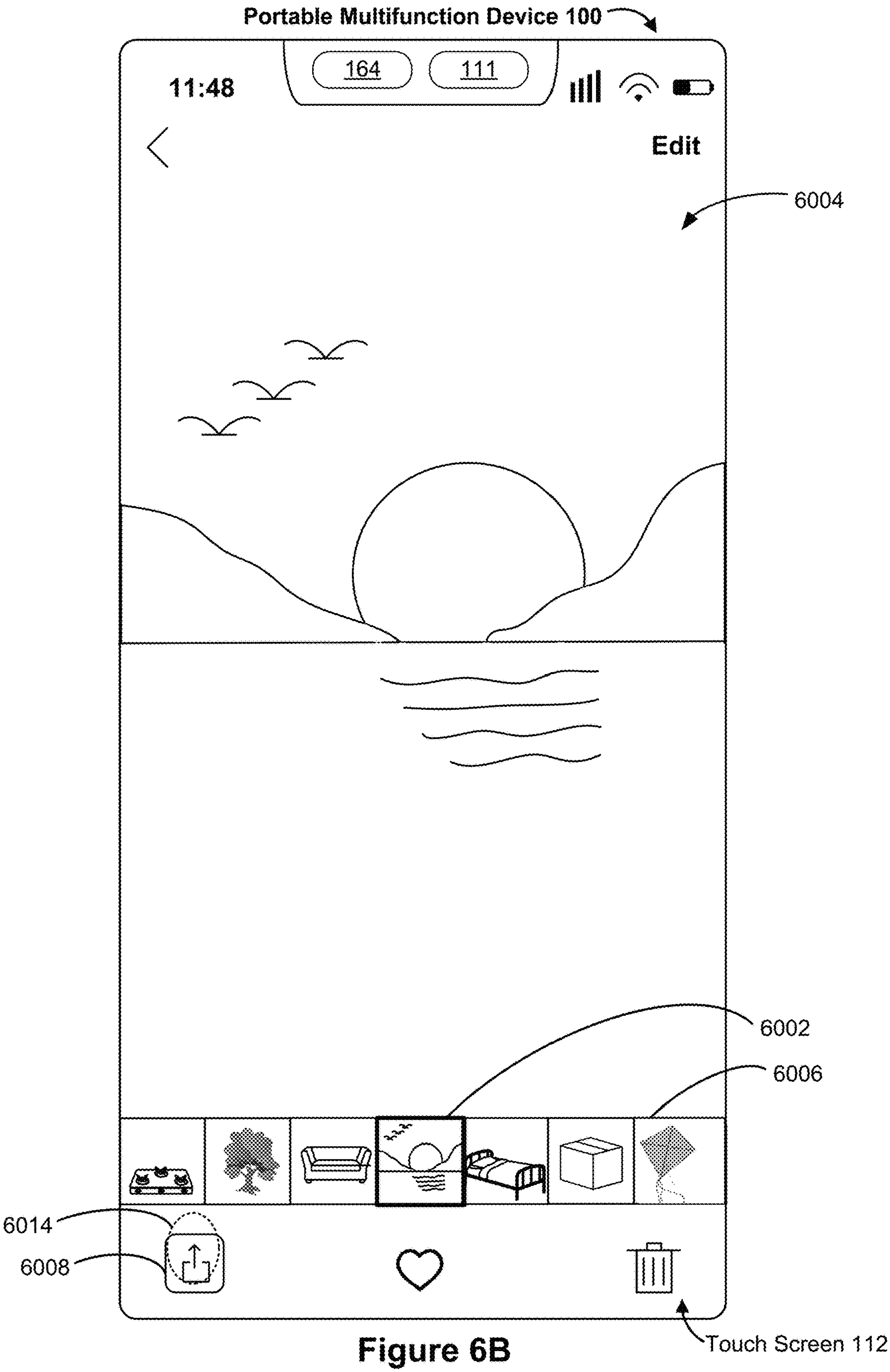
Figure 6C:
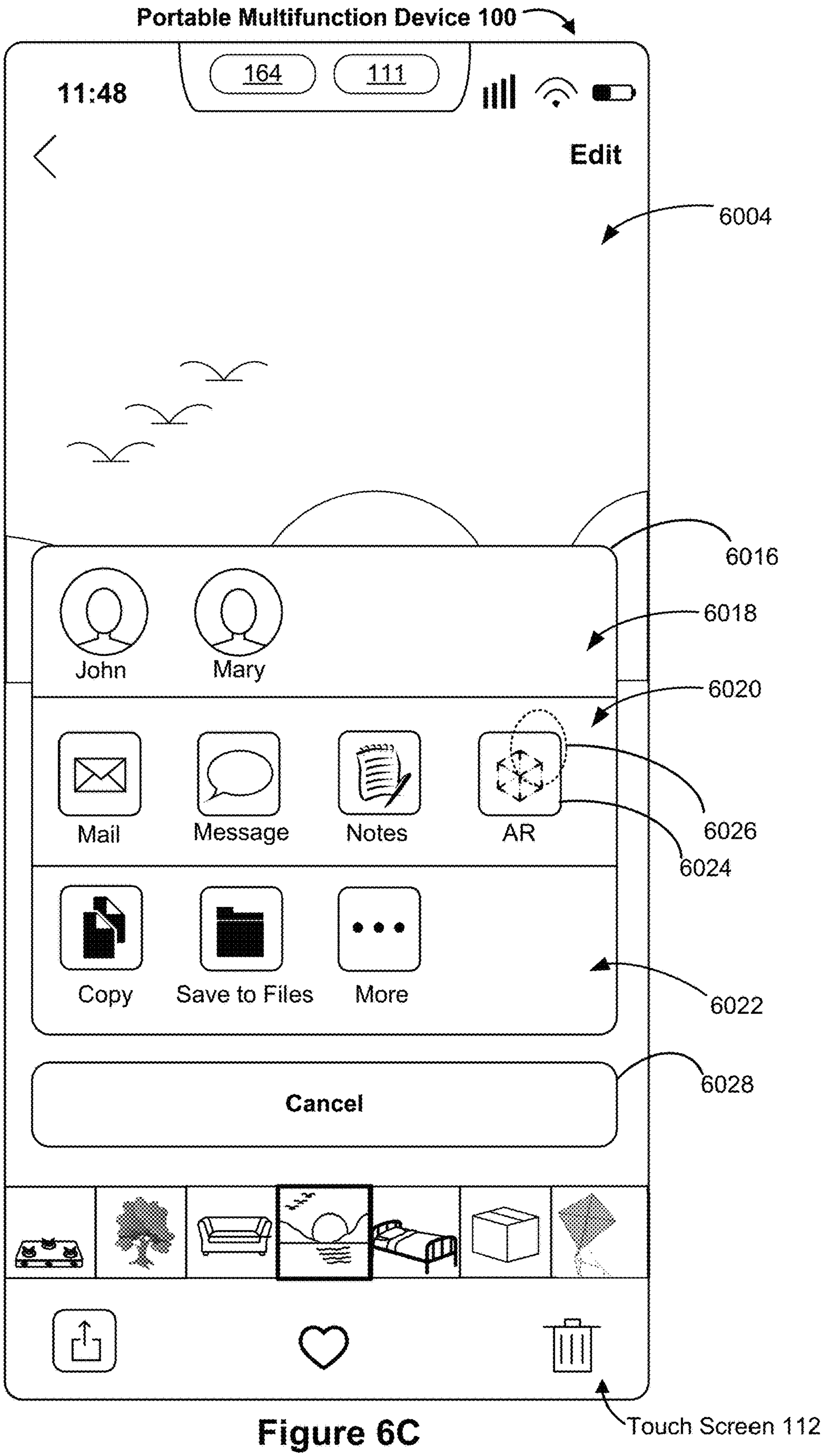

In FIG. 6B, an input (e.g., a tap input) by contact 6014 is detected at a location that corresponds to control 6008 for displaying a sharing user interface. In response to the input, sharing user interface 6016 is displayed overlaying photo viewing interface 6004, as illustrated in FIG. 6C. Sharing user interface 6016 includes an indication 6018 of contacts with whom currently selected photo 6002 may be shared, an indication 6020 of communication modes via which currently selected photo 6002 may be shared, and additional functions 6022 that may be applied to currently selected photo 6002. While sharing user interface 6016 is displayed, control 6028 for ceasing to display the sharing user interface 6016 is displayed.

In FIG. 6C, an input (e.g., a tap input) by contact 6026 is detected at a location that corresponds to control 6024 for displaying one or more selected objects in an object three-dimensional viewing mode (e.g., object management user interface 5004 or augmented reality user interface 5022). In response to the input, sharing user interface 6016 and photo viewing interface 6004 cease to be displayed and currently selected photo 6002 is displayed with a field of view of one or more cameras of device 100, as illustrated in FIGS. 6D-6E.

Figure 6D:
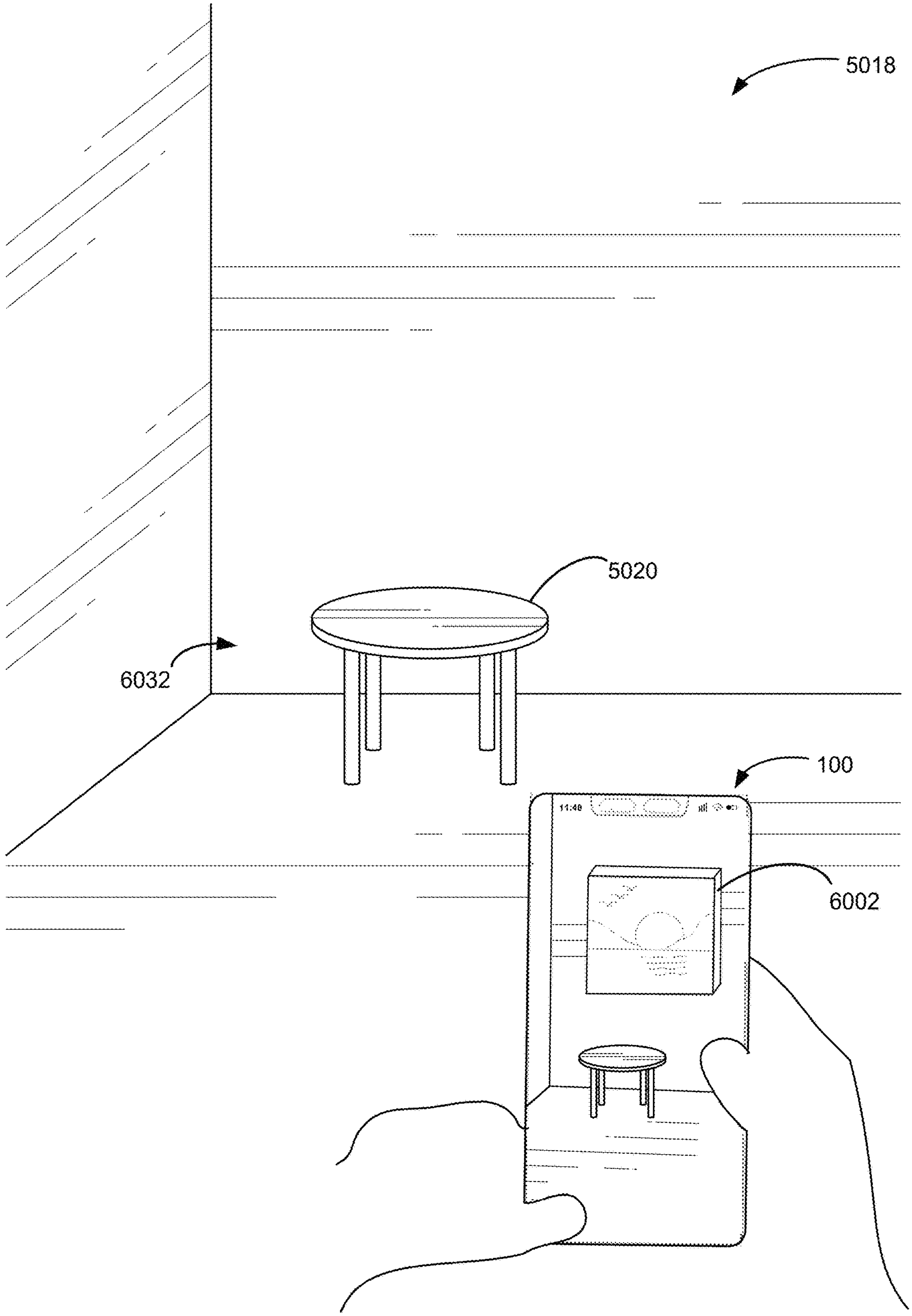

FIG. 6D illustrates a physical environment 5018 in which device 100 is operated. Physical table 5020 appears in the physical environment 5018 and in a view of physical environment 5018 captured by one or more cameras of device 100, as displayed by device 100. Photo 6002 as displayed by device 100 appears to be hanging on wall 6032 of the physical environment 5018.

Figure 6E:
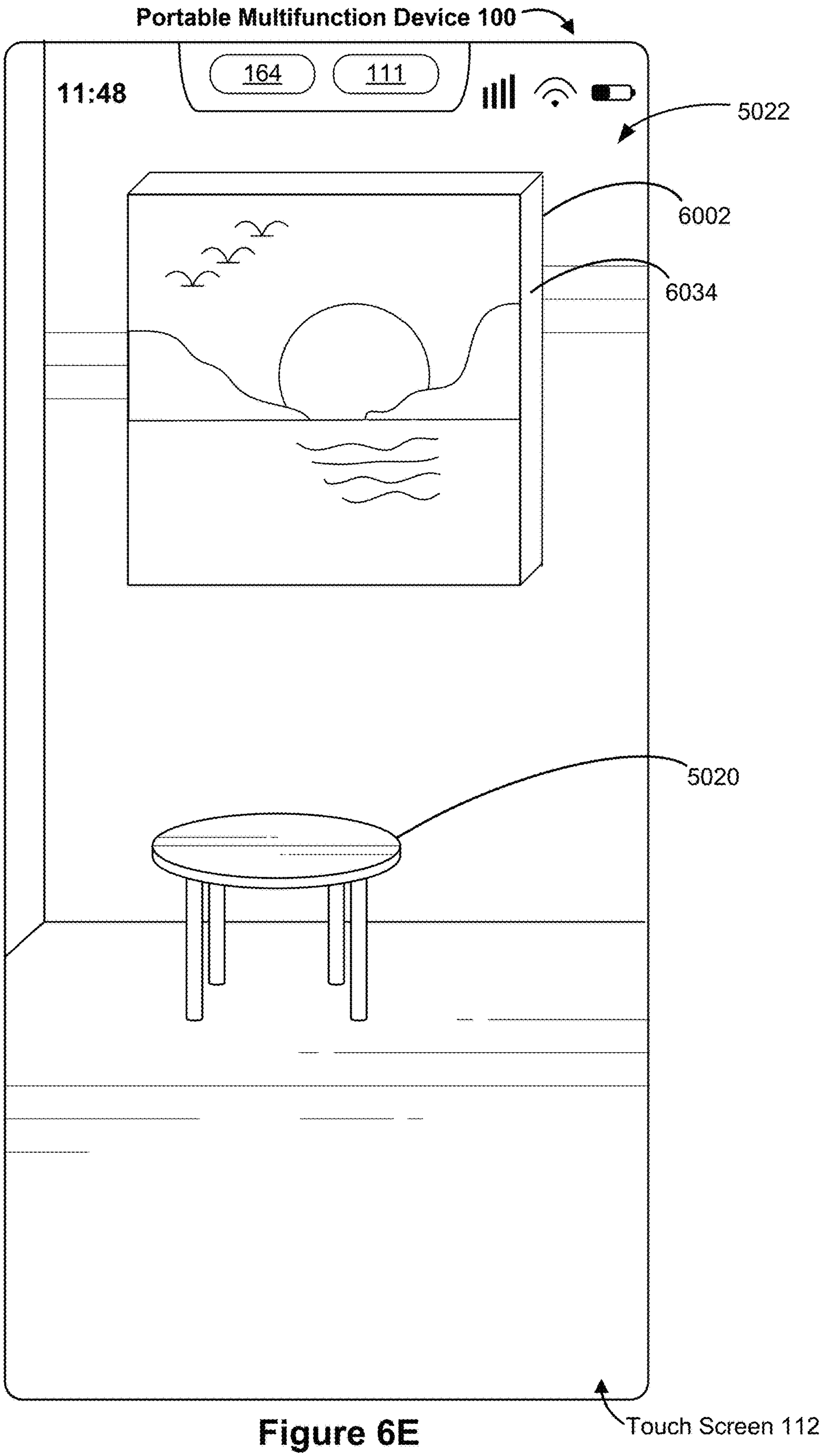
Figure 6F:
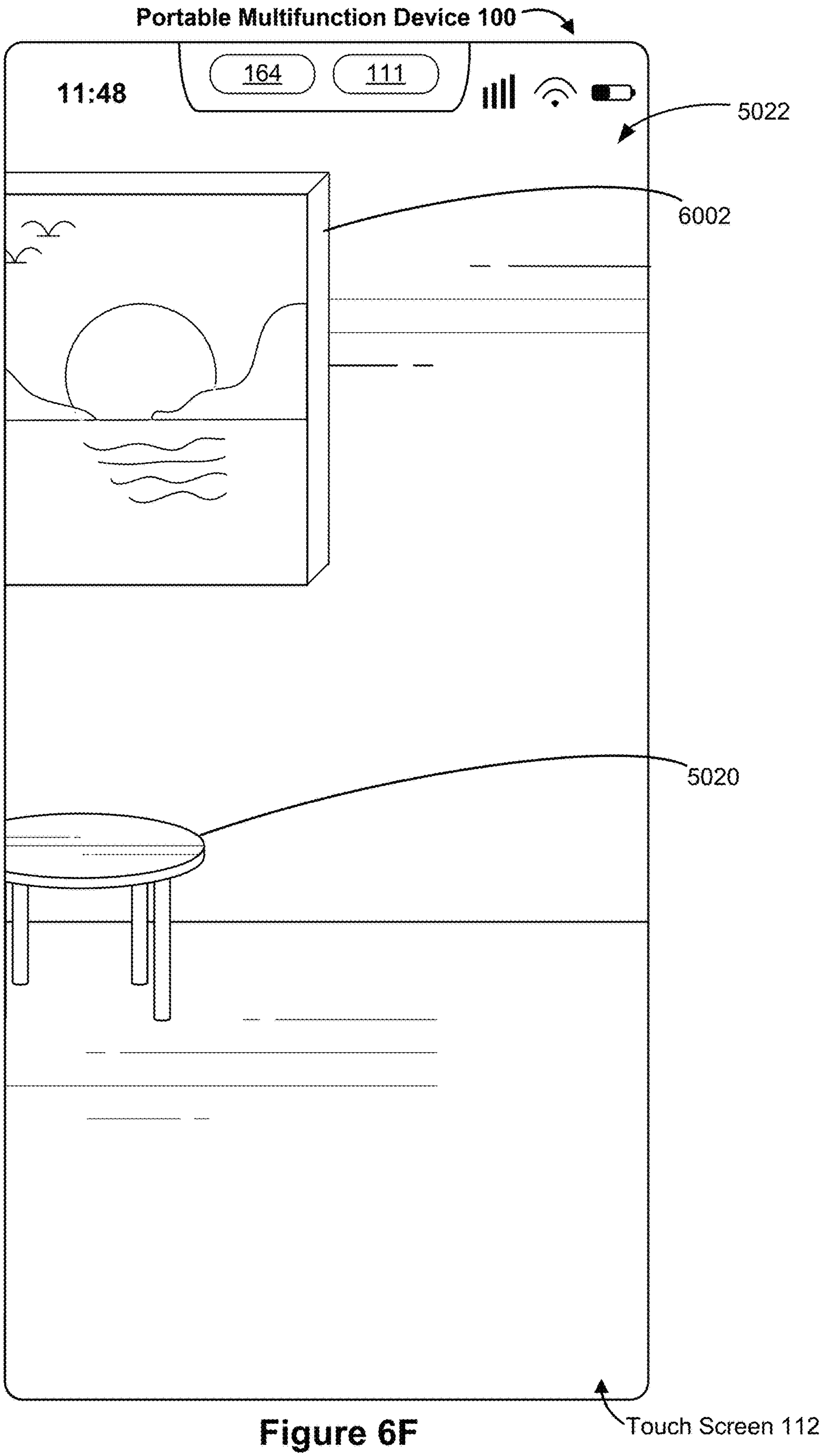
Figure 6G:
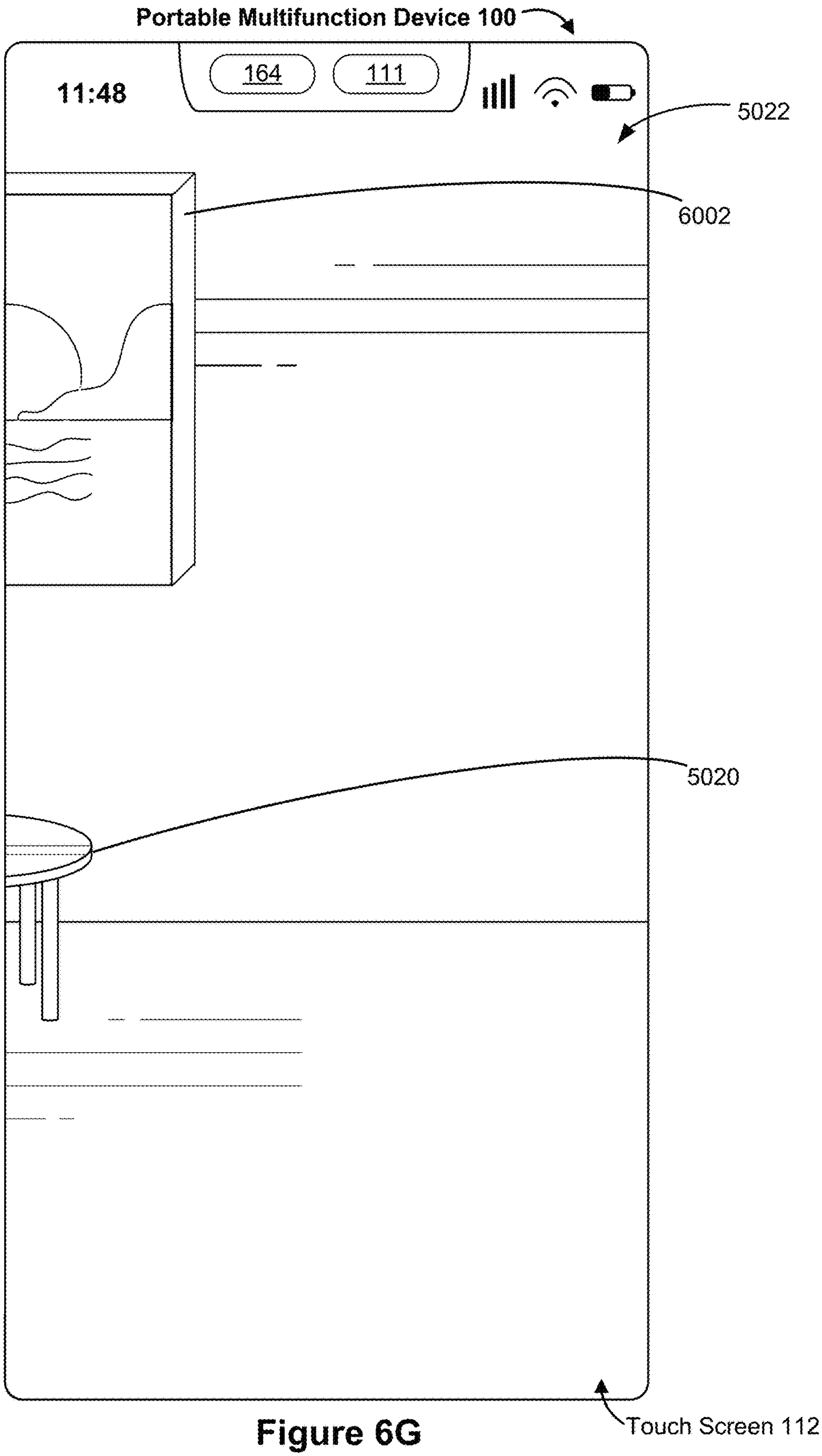

FIG. 6E-6G illustrate adjustment to the displayed portion of the field of view of cameras of the device 100 that occurs as device 100 moves in the physical environment. In FIG. 6E, photo 6002 is shown in augmented reality user interface 5022 that includes a view of the physical environment. In some embodiments, when displayed in augmented reality user interface 5022, photo 6002 appears to have a three-dimensional appearance (e.g., a simulated backing 6034 of photo 6002 creates a space between wall 6032 and a displayed position of photo 6002). From FIG. 6E to FIG. 6F, as device 100 moves from a first position in the physical environment to a second position in the physical environment, the displayed locations of photo 6002 and table 5020 change, indicating that photo 6002 is displayed at a fixed position relative to the physical environment. From FIG. 6F to FIG. 6G, device 100 continues to move from the second position in the physical environment to a third position in the physical environment, and the displayed locations of photo 6002 and table 5020 continue to change in accordance with the movement of device 100.

FIGS. 6H-6L illustrate successive selection of multiple photographs.

Figure 6H:
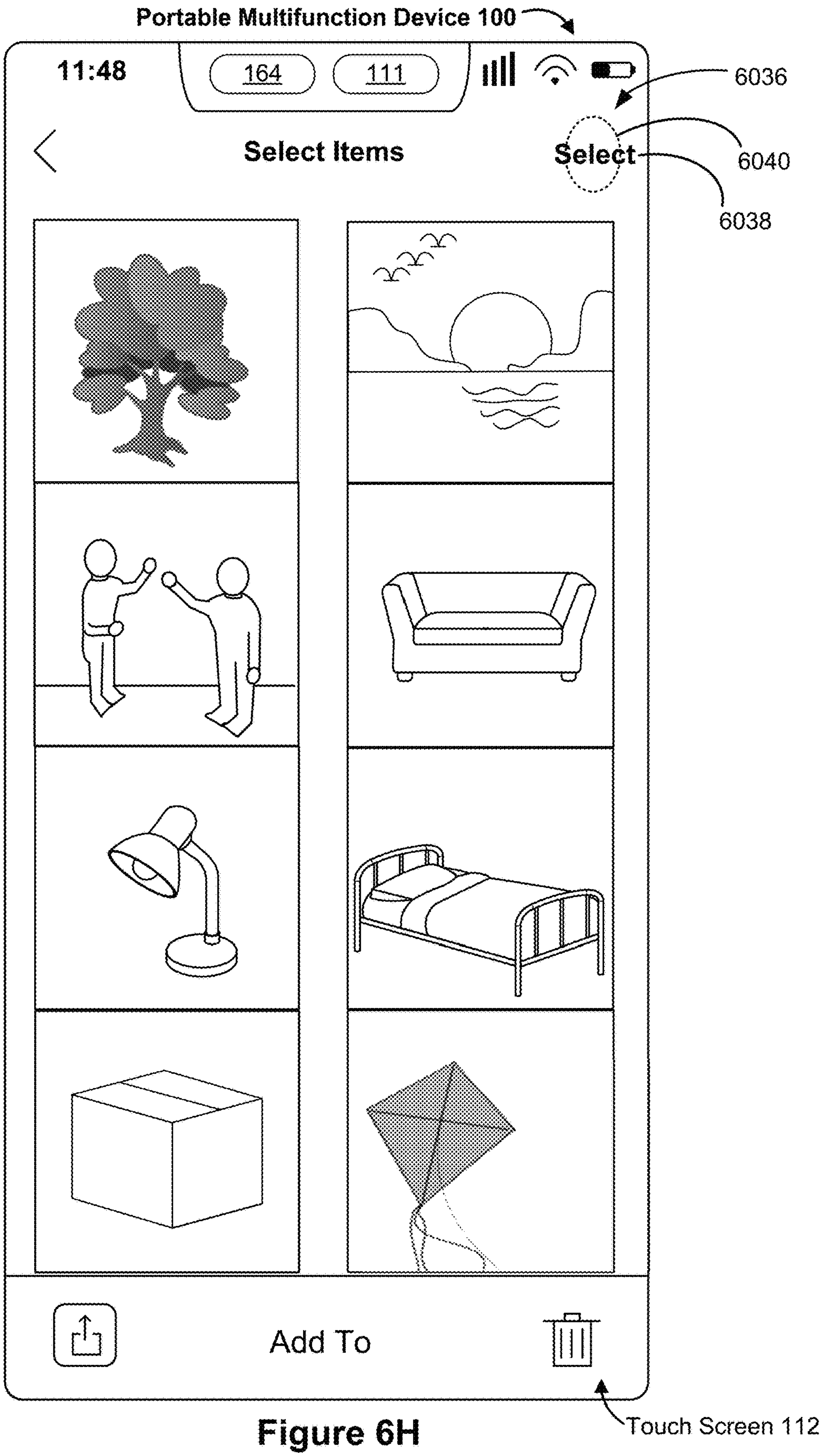

In FIG. 6H, multiple photos are displayed in a photo selection interface 6036 of photo management application. An input (e.g., a tap input) by contact 6040 is detected on touch-sensitive display system 112 at a location that corresponds to a "Select" control for enabling a selection mode in which input received at respective photos will cause selection of the respective photos. In response to the input, the selection mode is enabled.

Figure 6I:
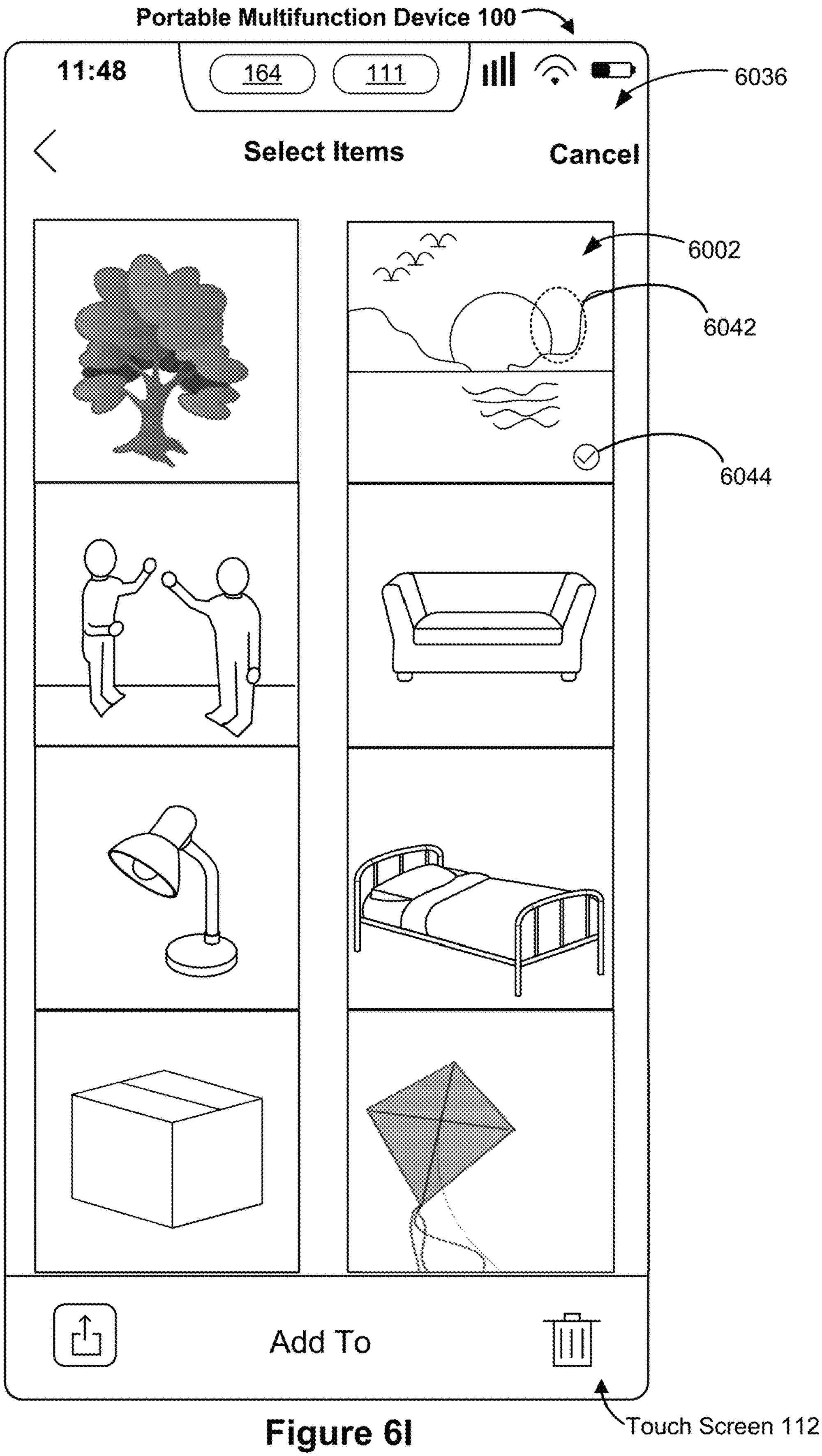

In FIG. 6I, an input (e.g., a tap input) by contact 6042 is detected at a location that corresponds to photo 6002. In response to the input, photo 6002 is selected (e.g., as marked by selection indicator 6044 displayed adjacent to photo 6002).

Figure 6J:
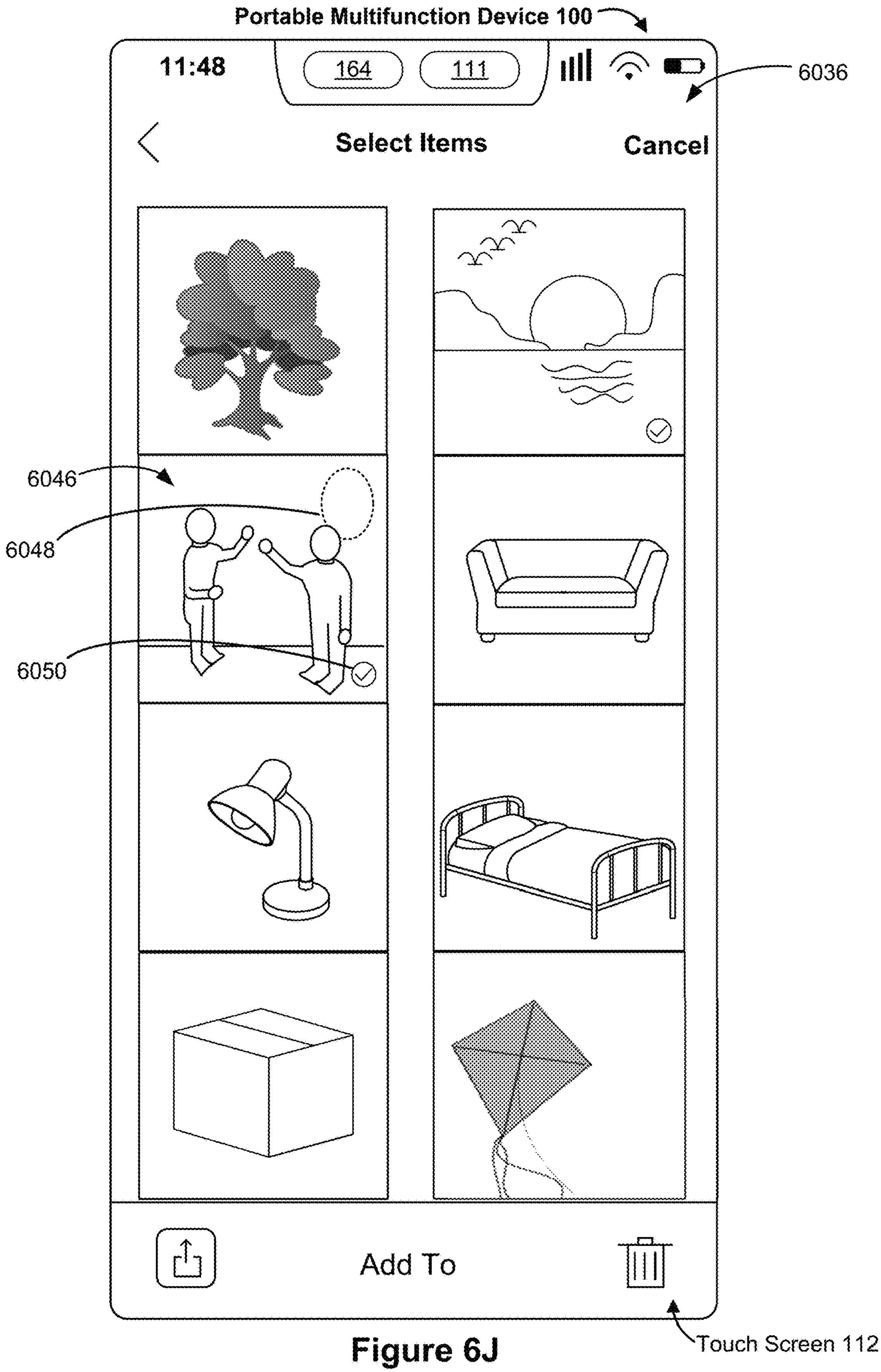

In FIG. 6J, an input (e.g., a tap input) by contact 6048 is detected at a location that corresponds to photo 6046. In response to the input, photo 6046 is selected (e.g., as marked by selection indicator 6050 displayed adjacent to photo 6046).

Figure 6K:
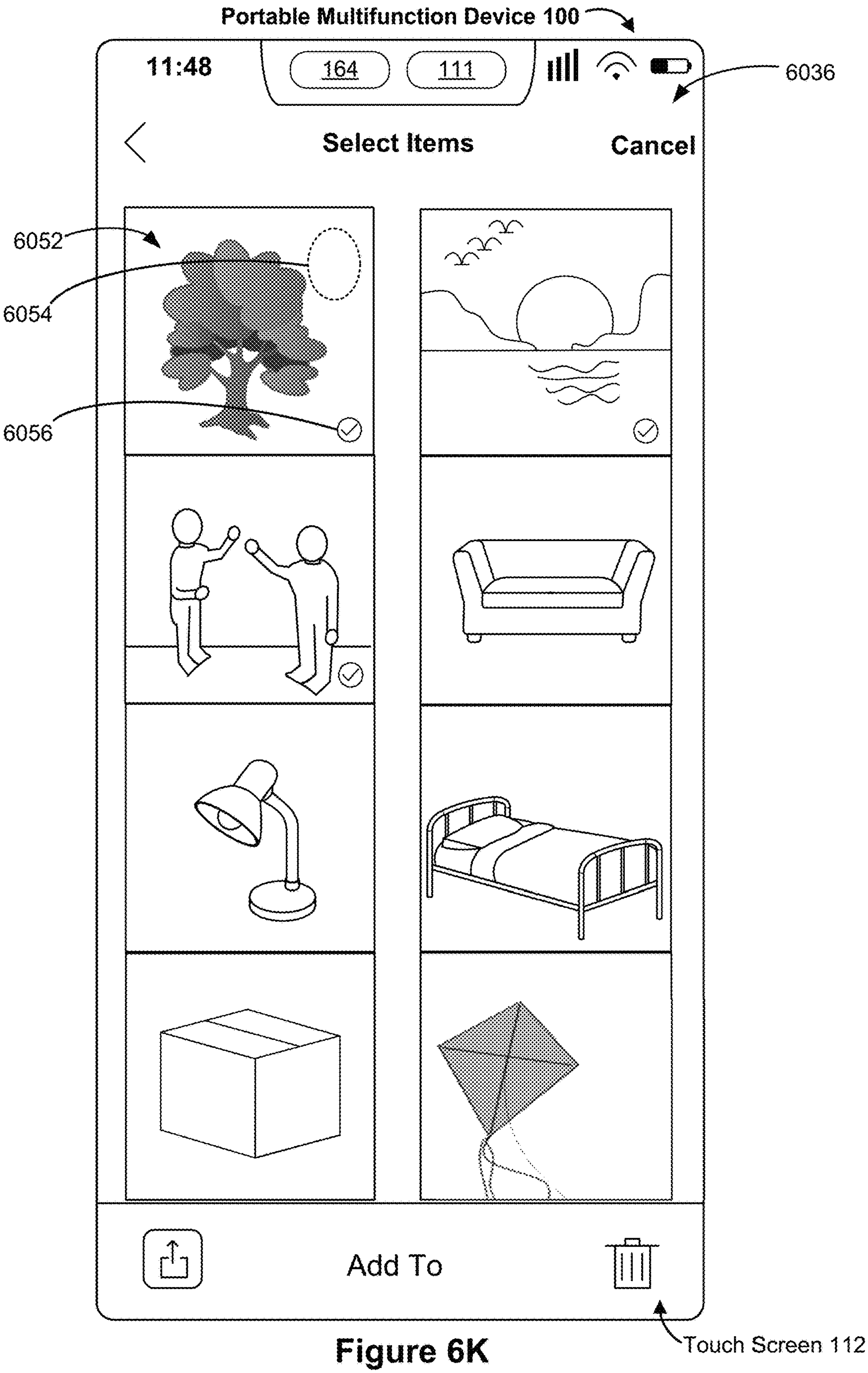

In FIG. 6K, an input (e.g., a tap input) by contact 6054 is detected at a location that corresponds to photo 6052. In response to the input, photo 6052 is selected (e.g., as marked by selection indicator 6056 displayed adjacent to photo 6052).

Figure 6L:
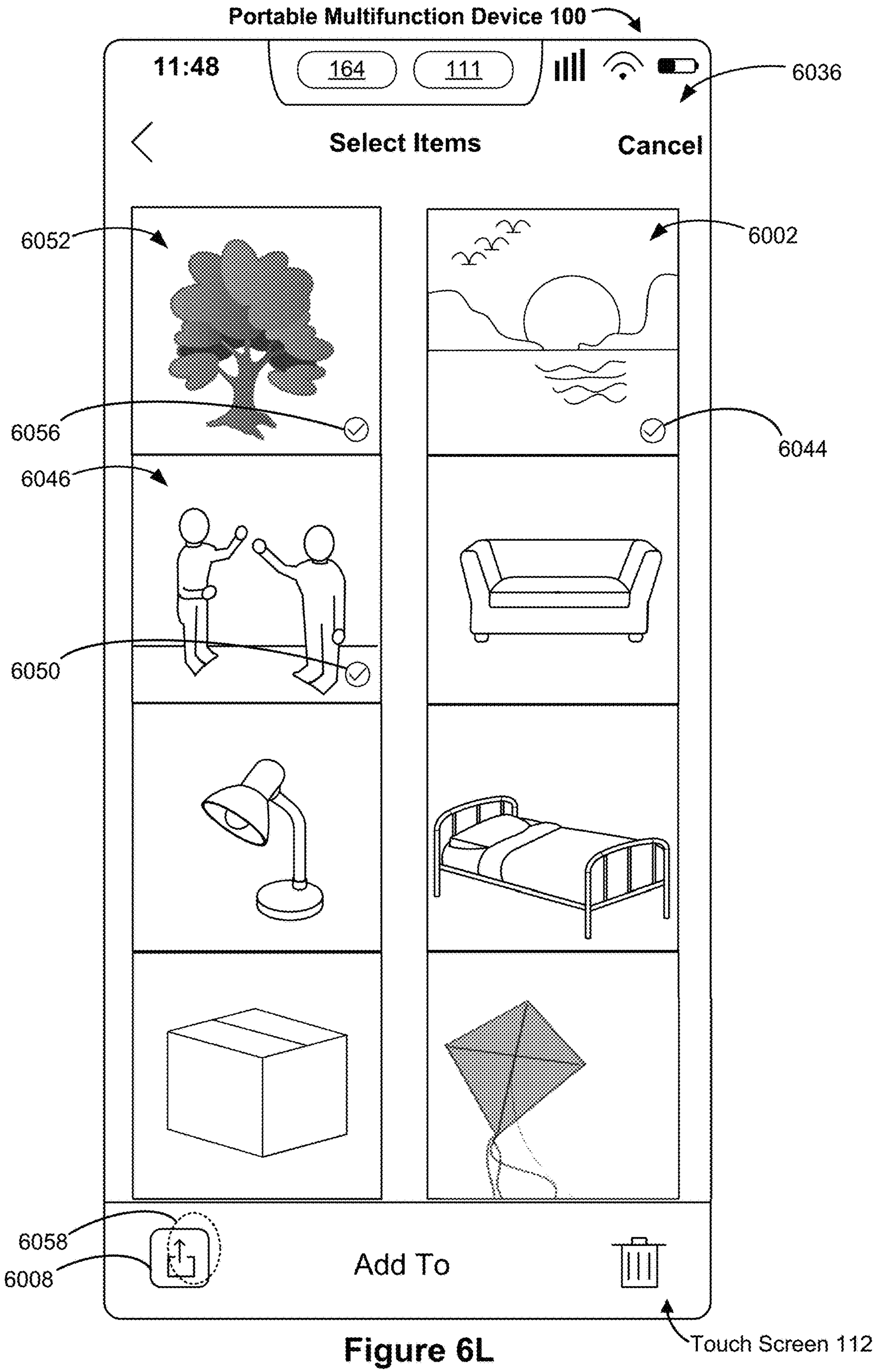
Figure 6M:
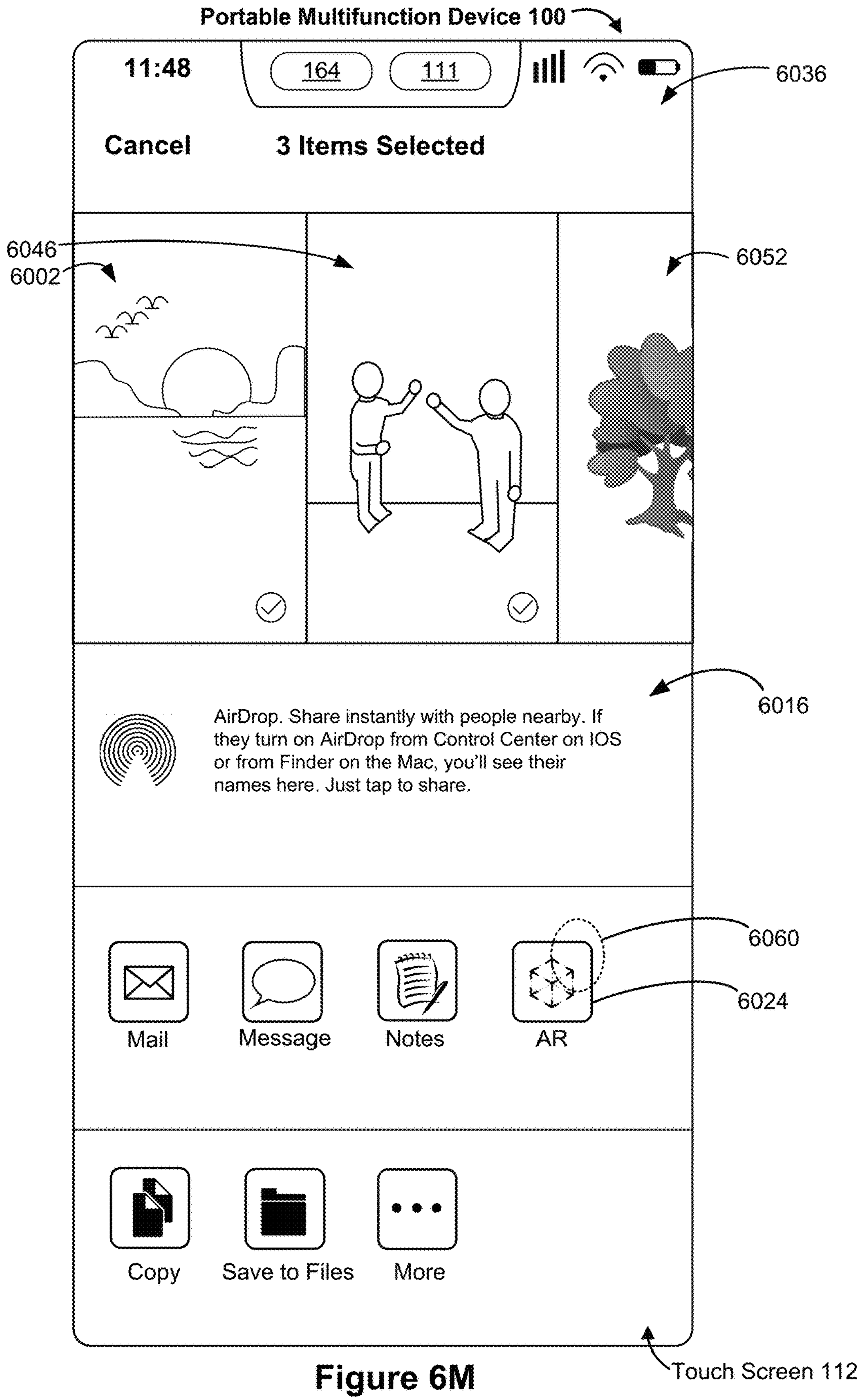

In FIG. 6L, while photos 6002, 6046, and 6052 are selected, an input (e.g., a tap input) by contact 6058 is detected at a location that corresponds to share control 6008. In response to the input, sharing user interface 6016 (described above with regard to FIG. 6C) is displayed, as illustrated in FIG. 6M. While sharing user interface 6016 is displayed, currently selected photos 6002, 6046, and 6052 are displayed (e.g., the set of multiple photos, including the photos displayed in photo selection interface 6036, is filtered such that only currently selected photos are displayed while sharing user interface 6016 is displayed).

Figure 6N:
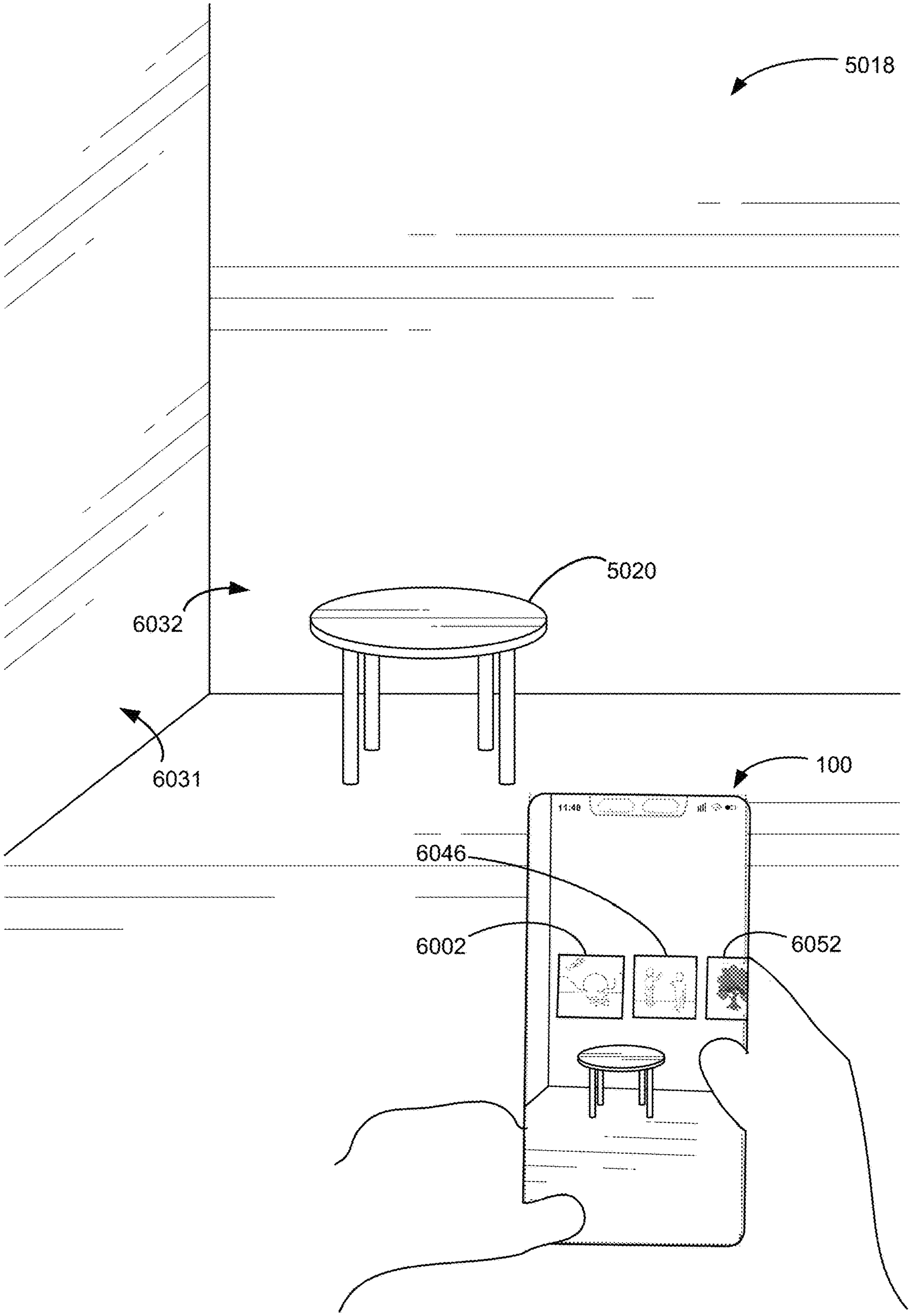
Figure 6O:
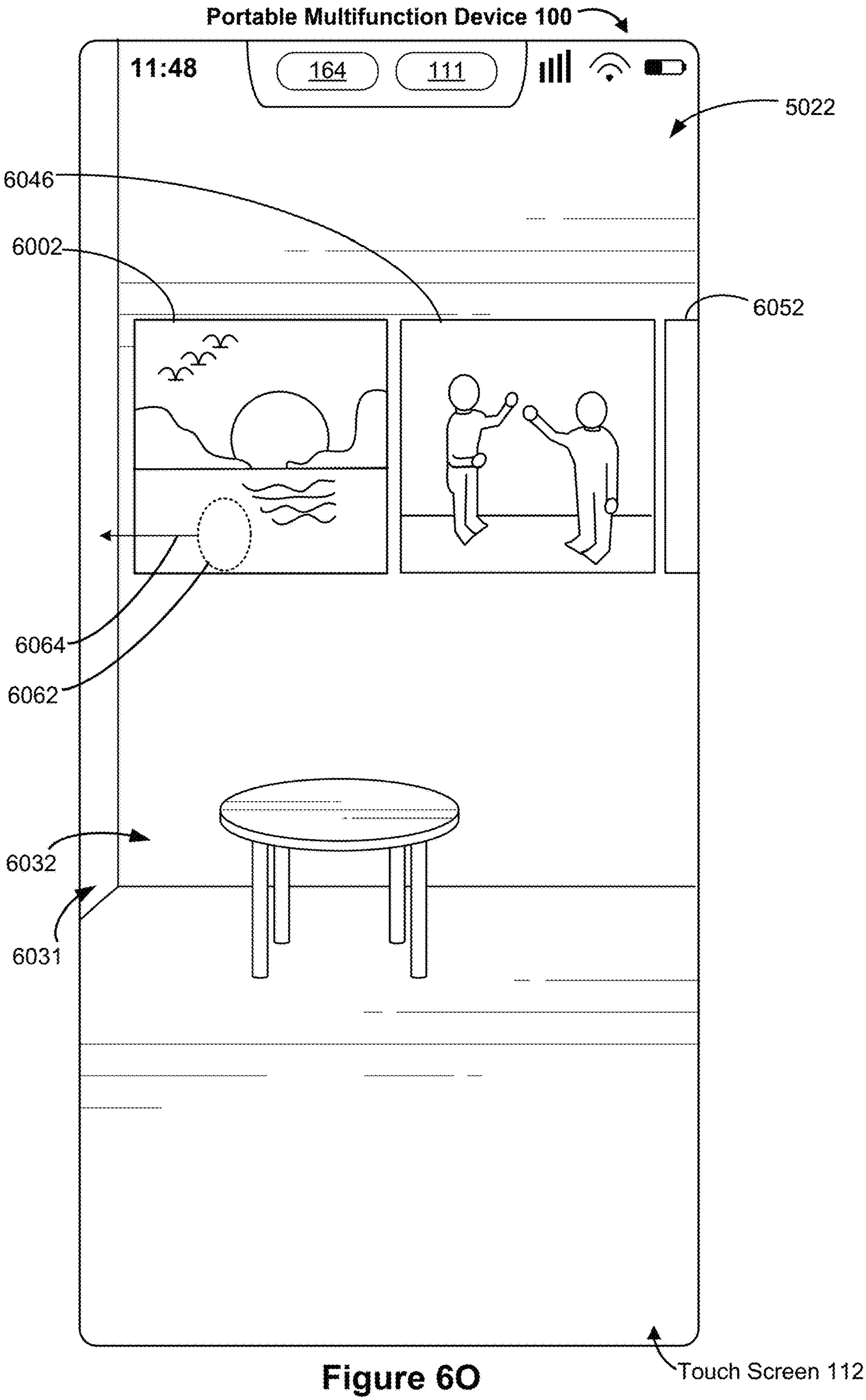
Figure 6P:
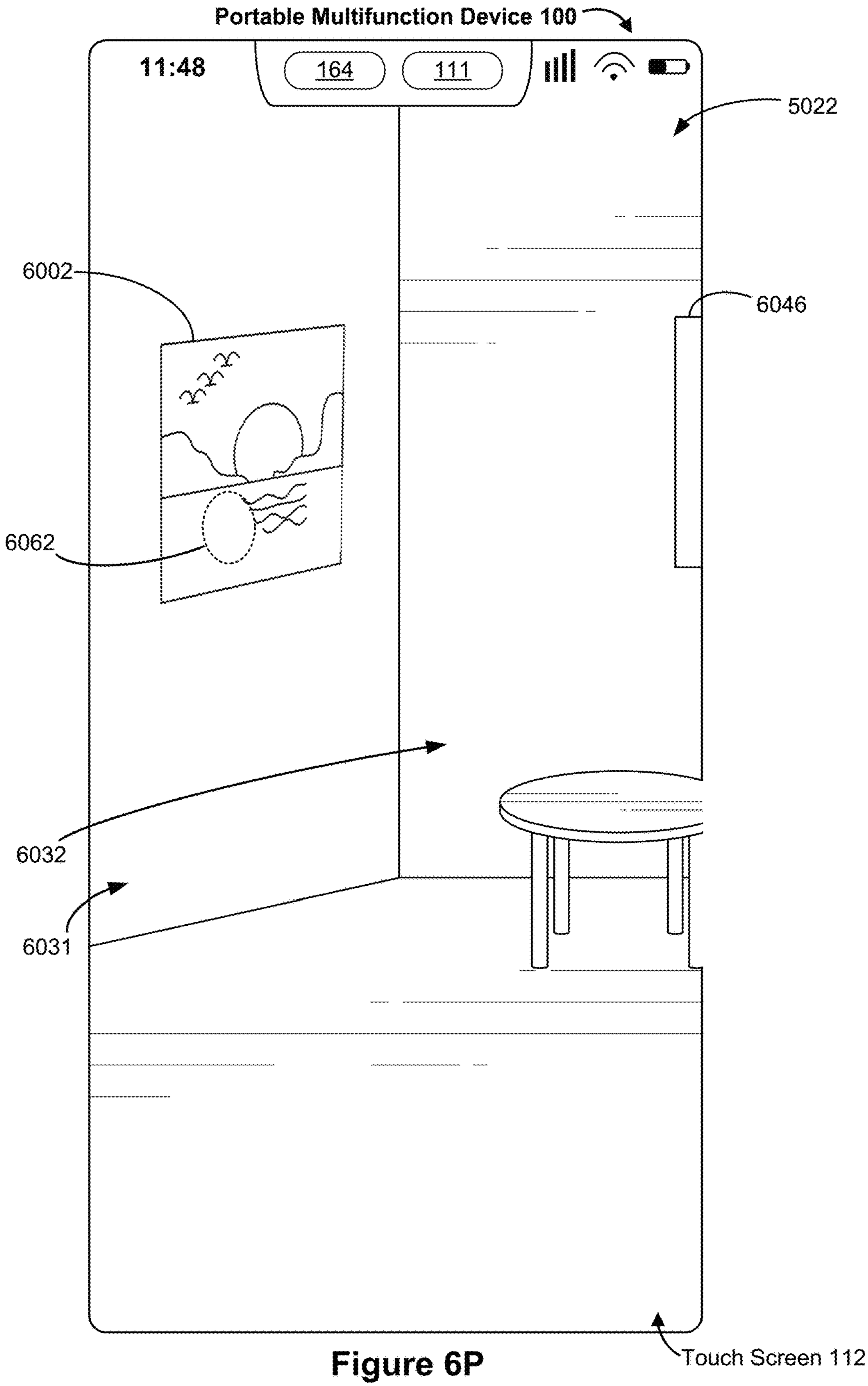
Figure 6Q:
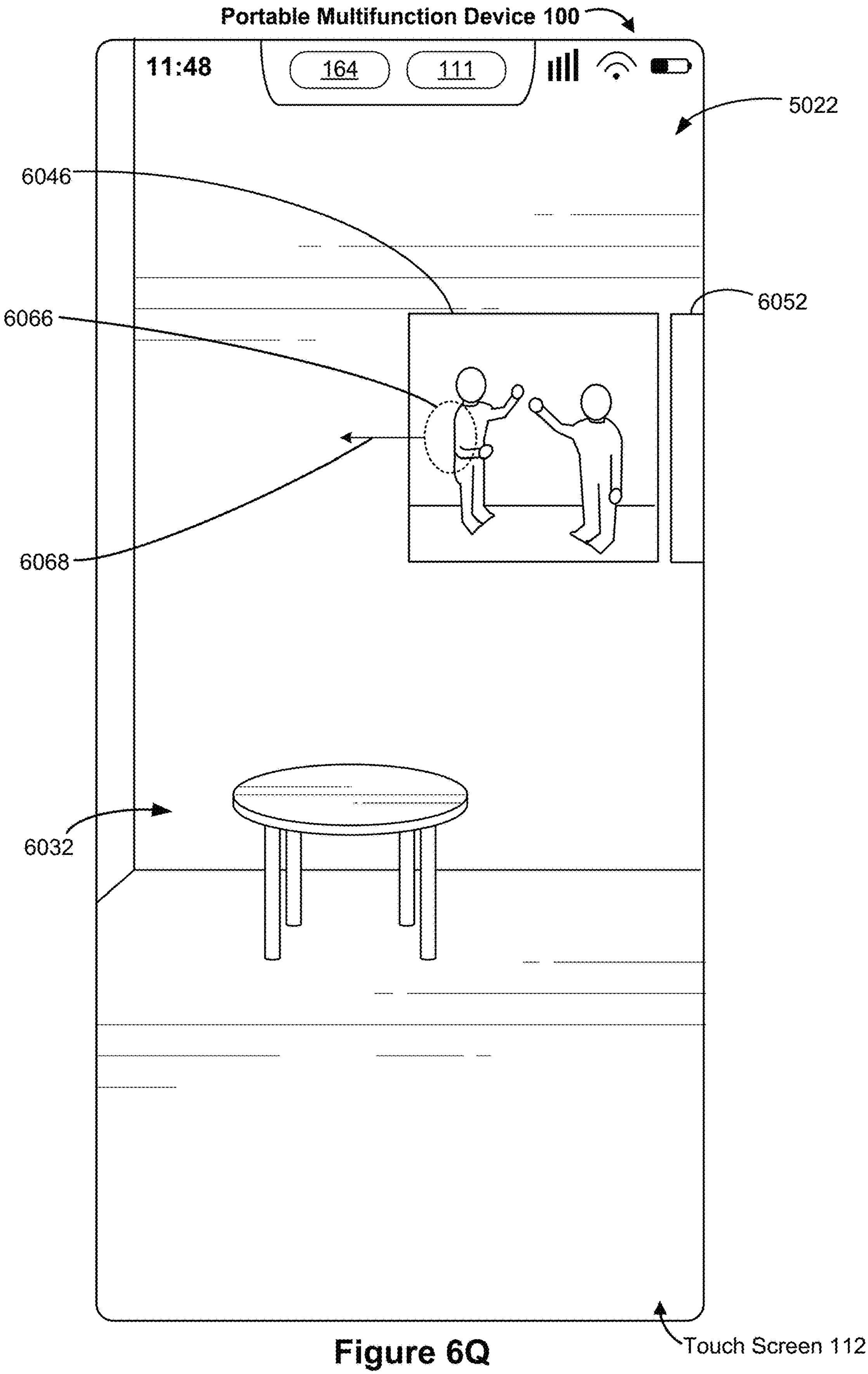
Figure 6R:
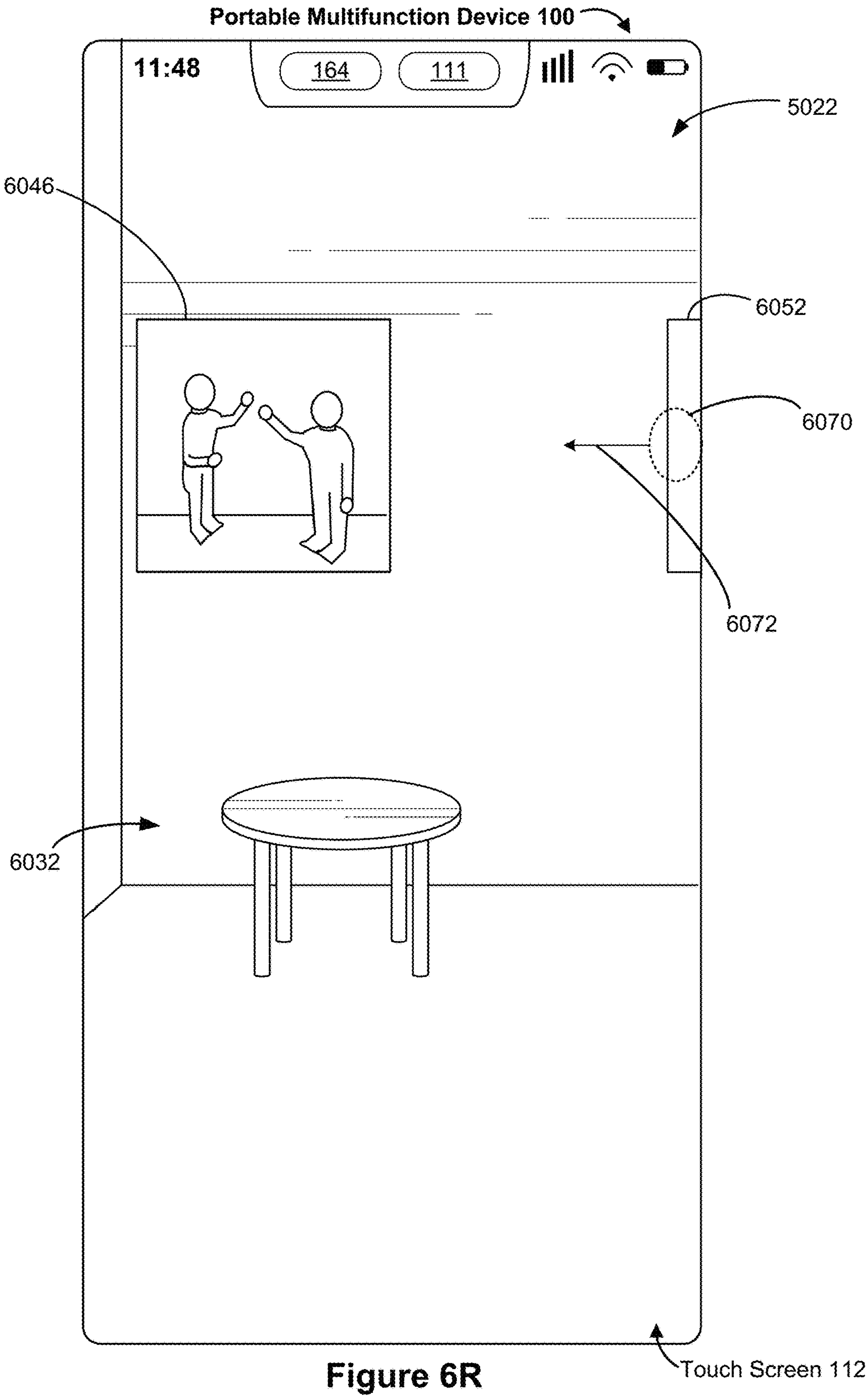
Figure 6S:
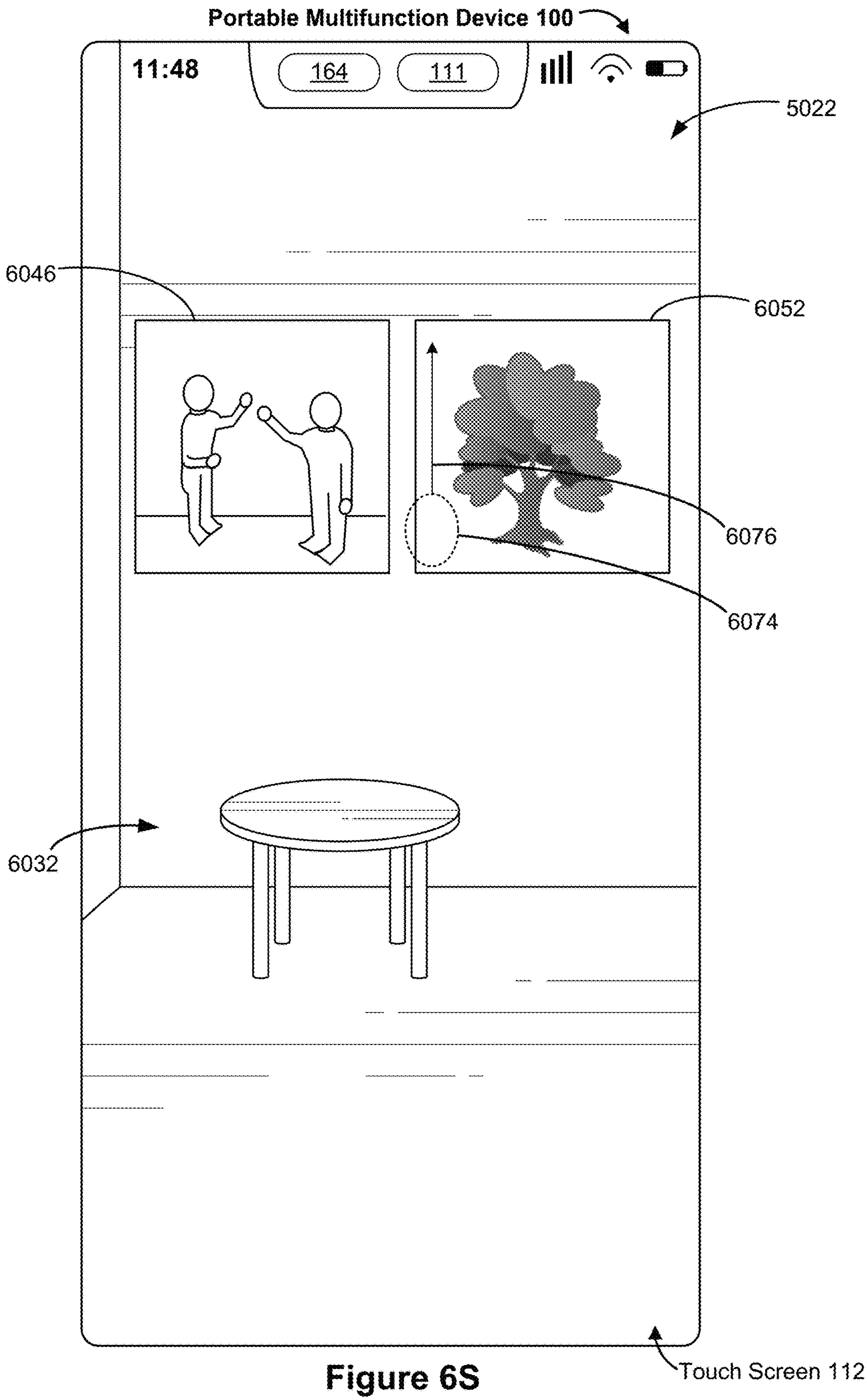
Figure 6T:
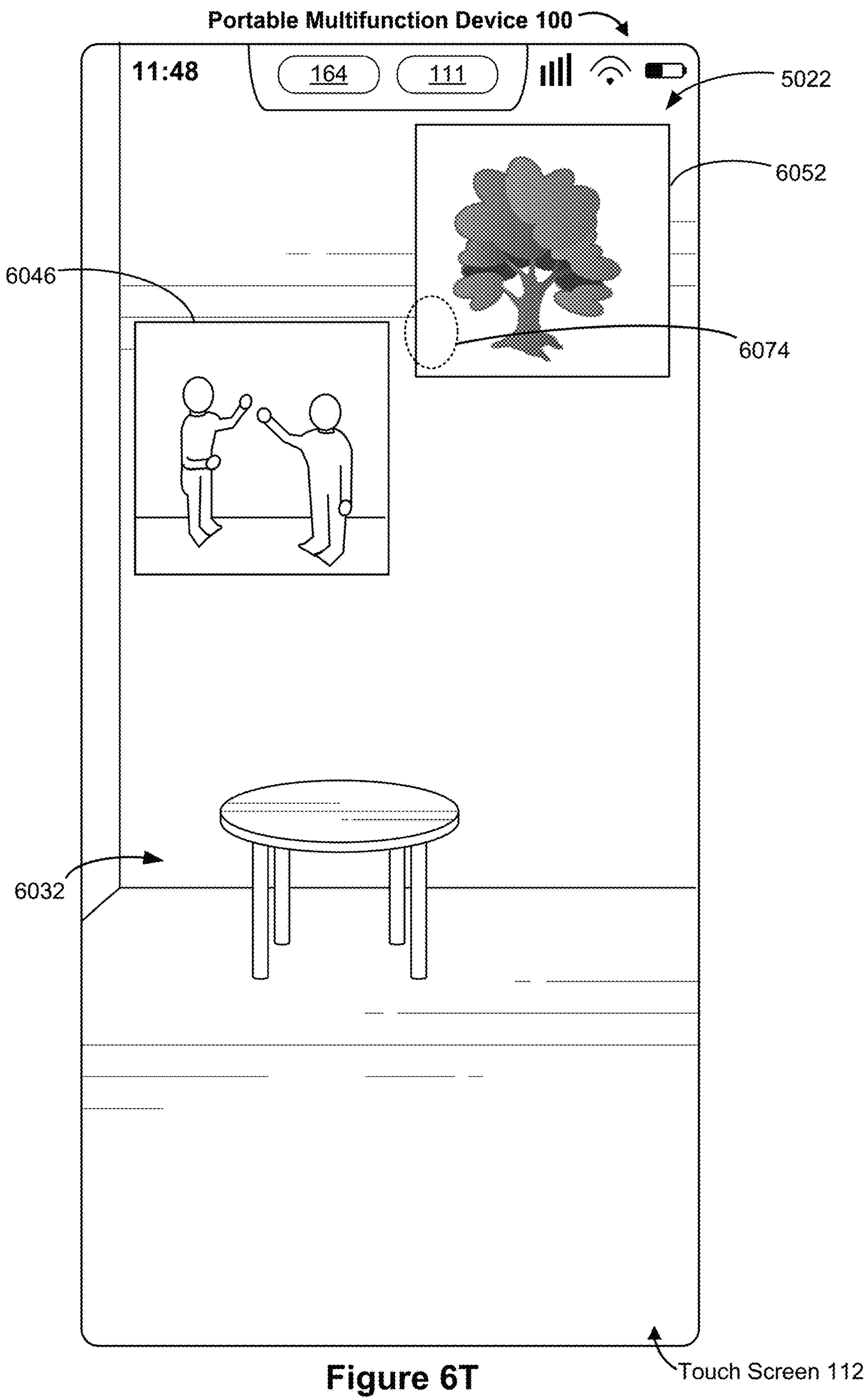
Figure 6U:
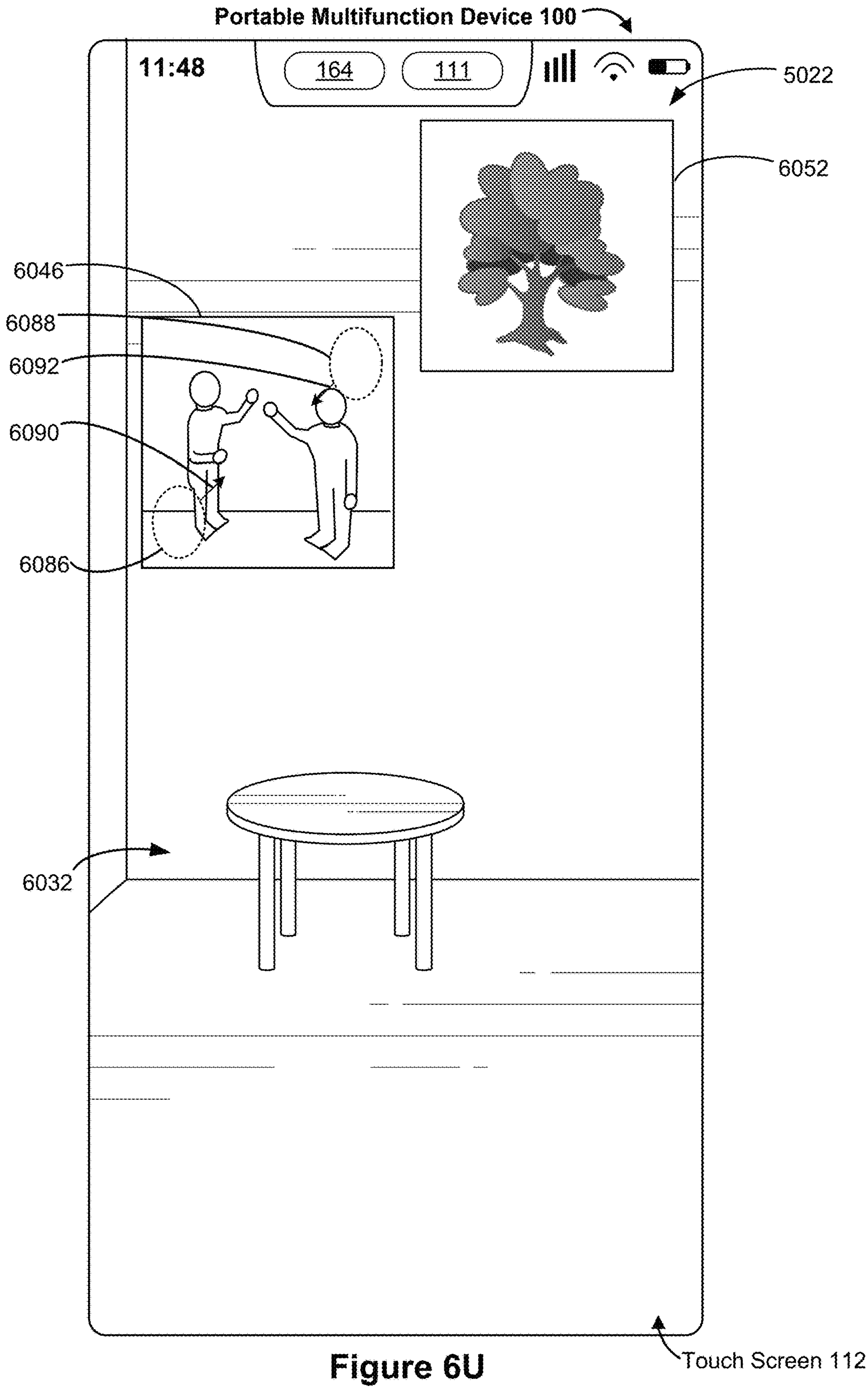
Figure 6V:
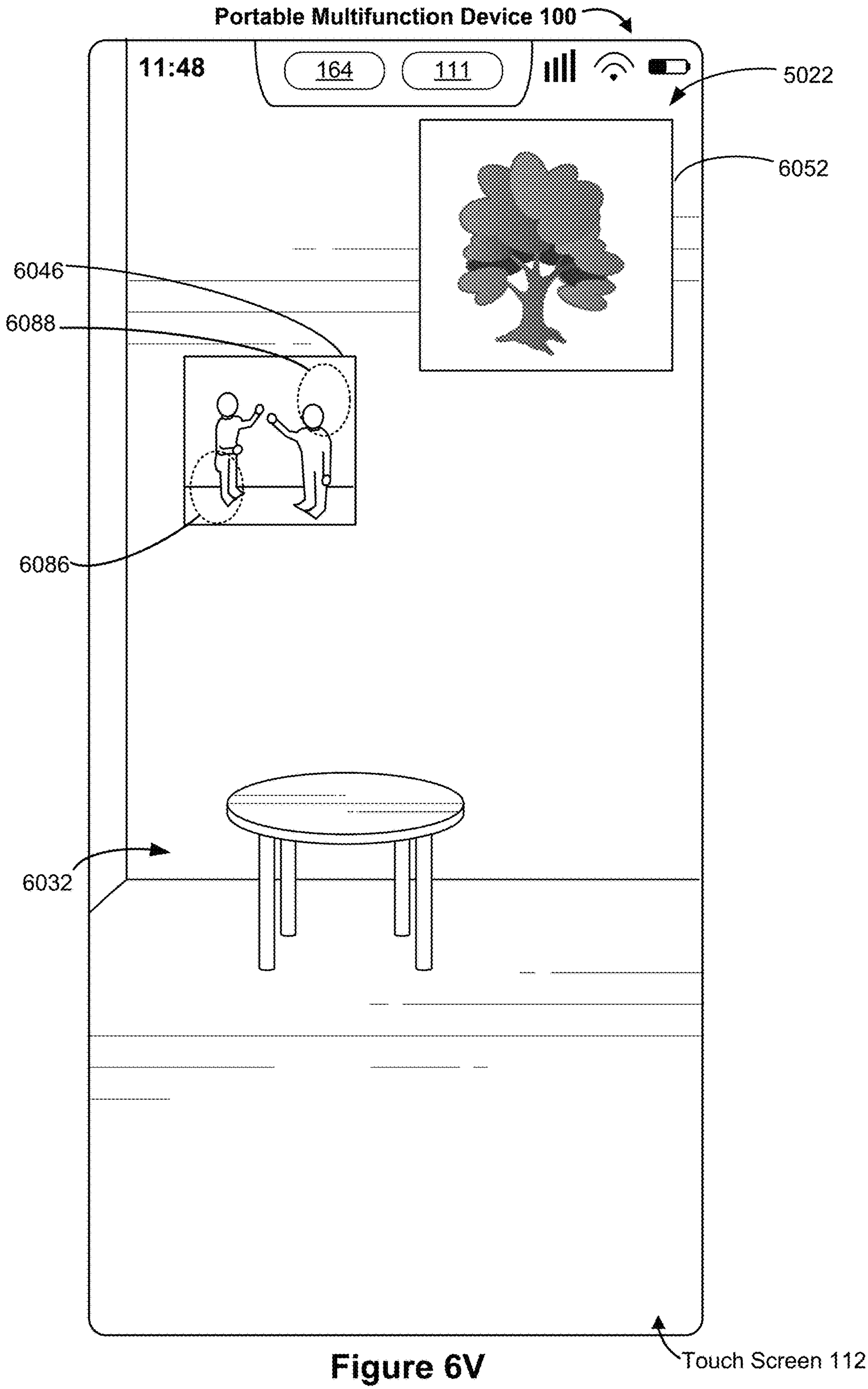
Figure 6W:
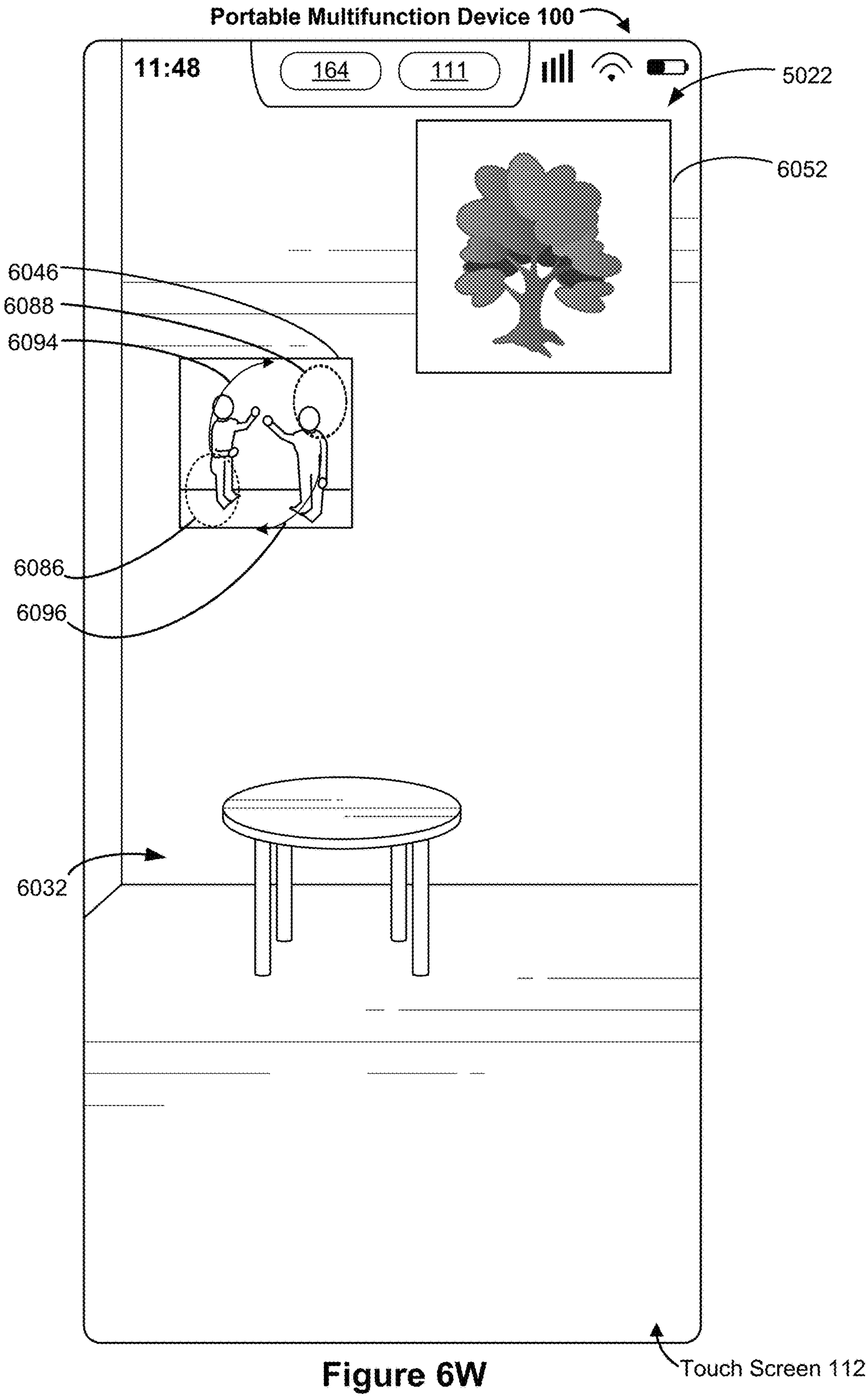
Figure 6X:
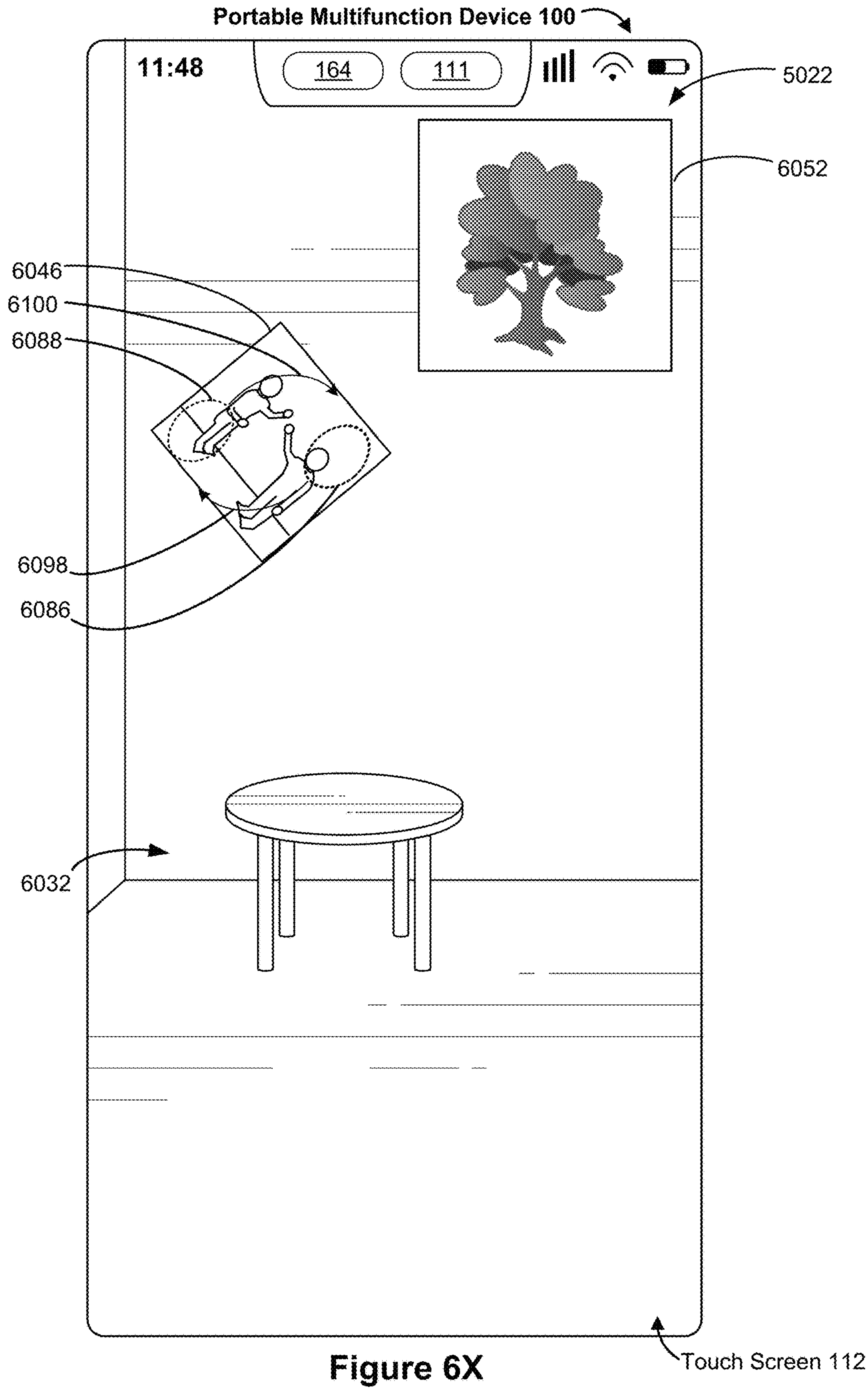
Figure 6Y:
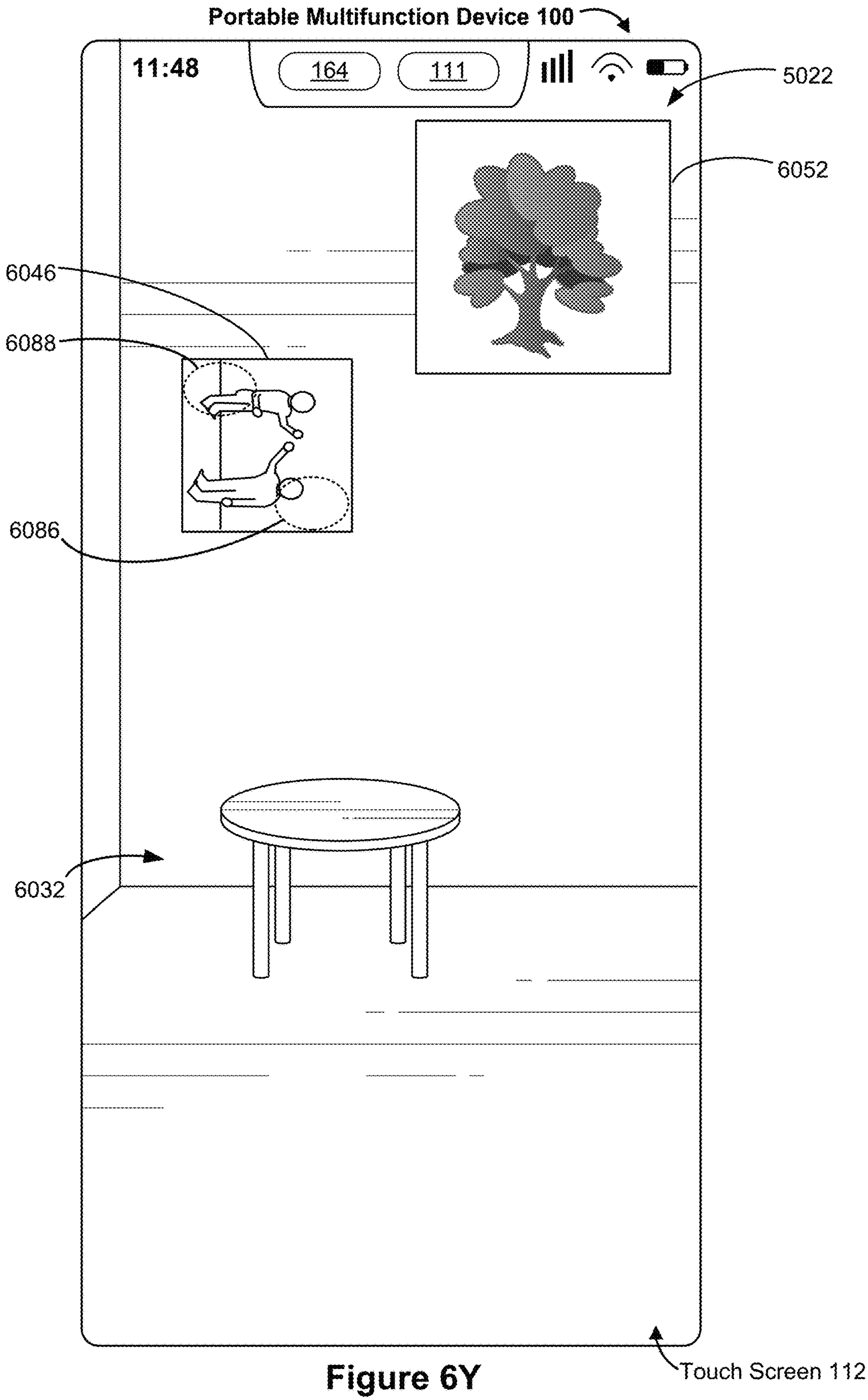
Figure 6Z:
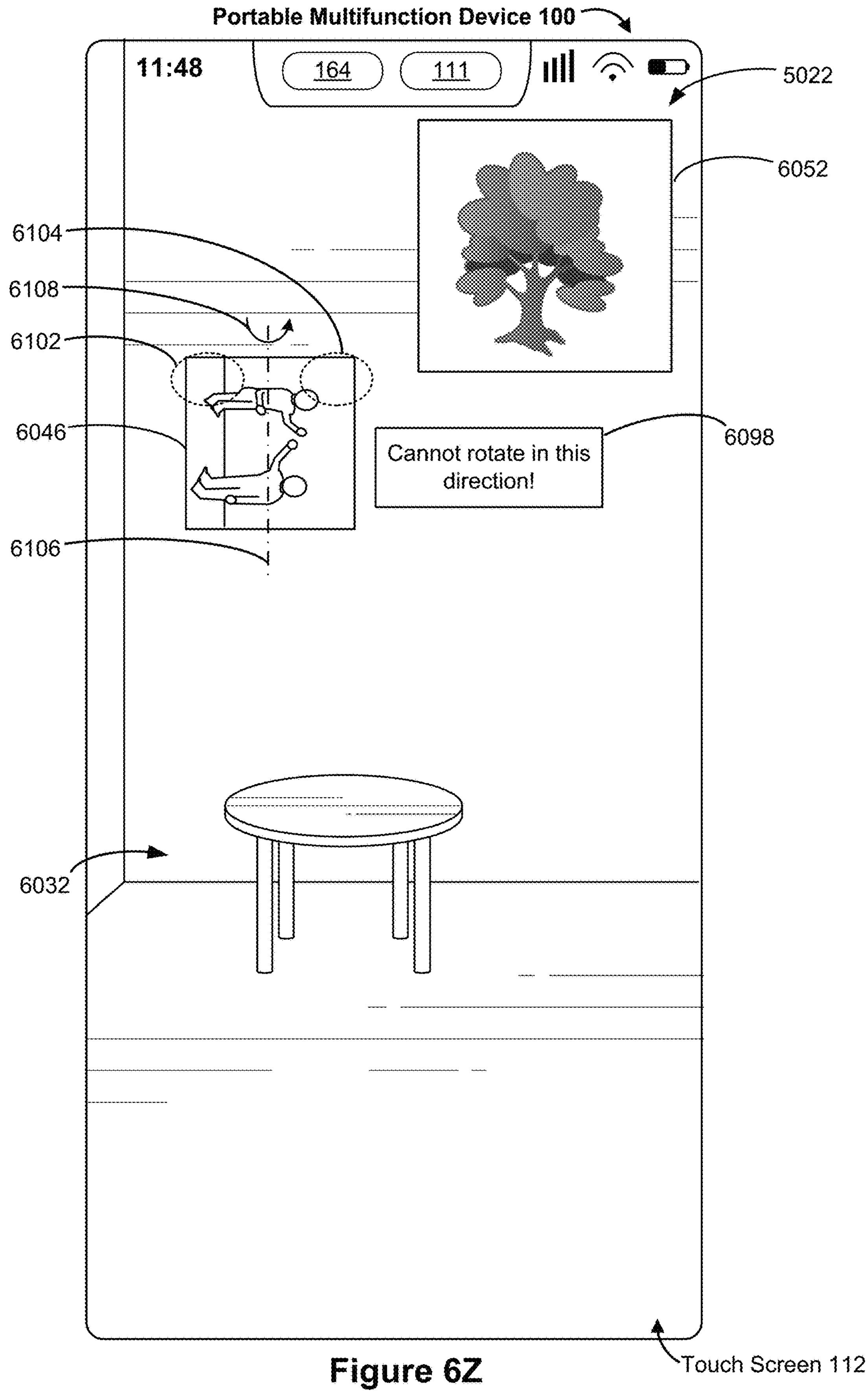
Figure 6A:
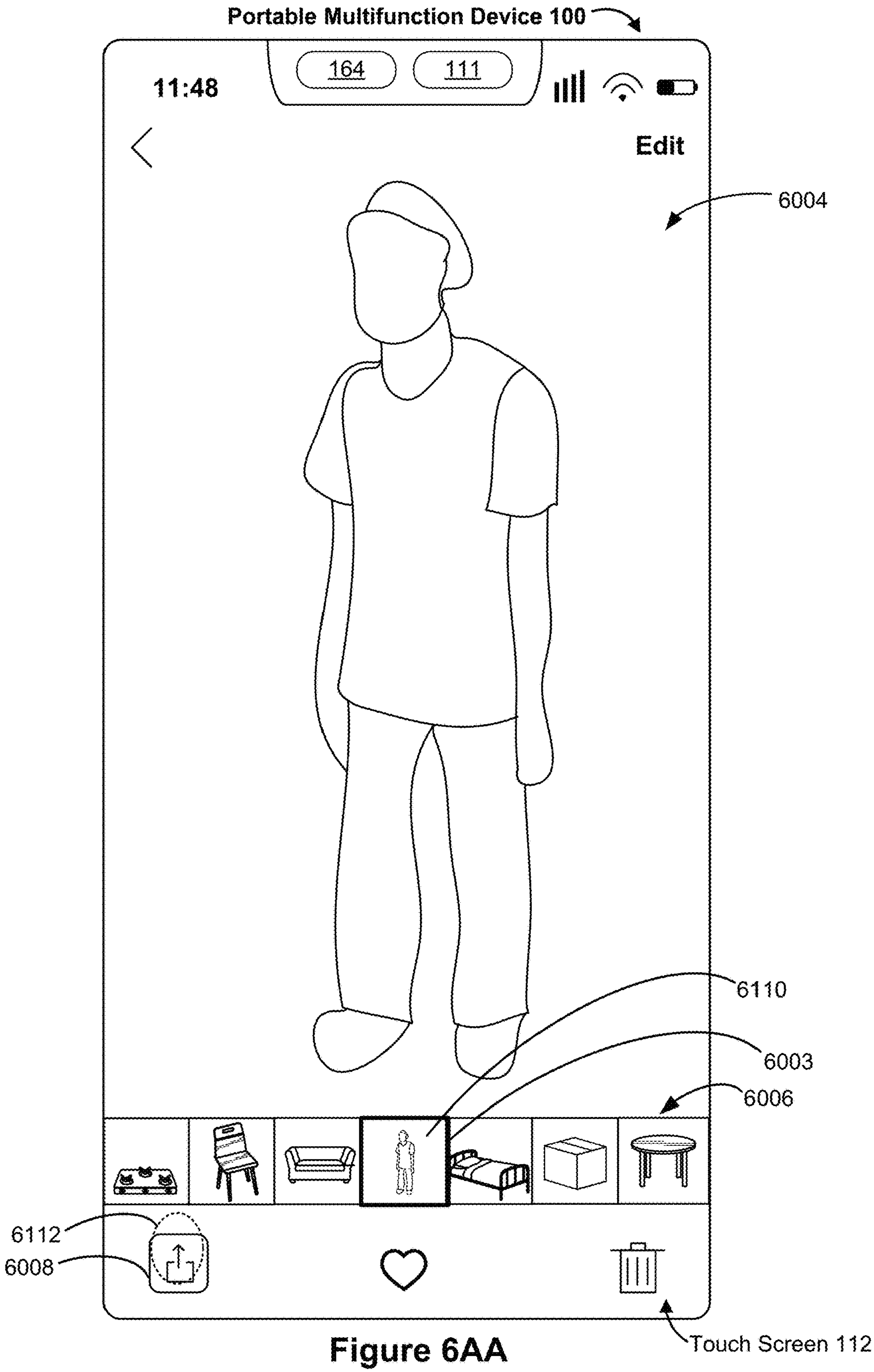
Figure 6A:
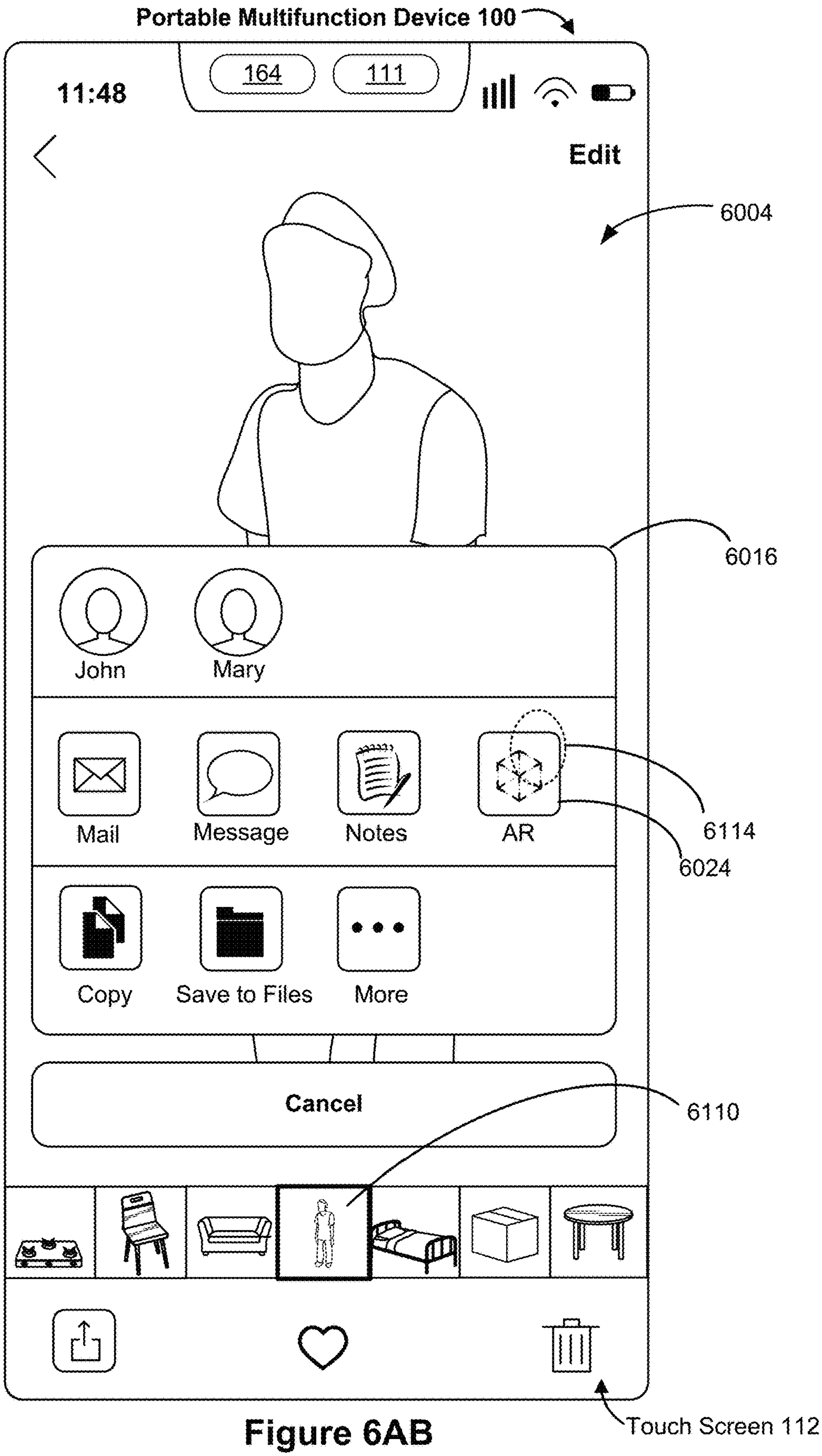
Figure 6A:
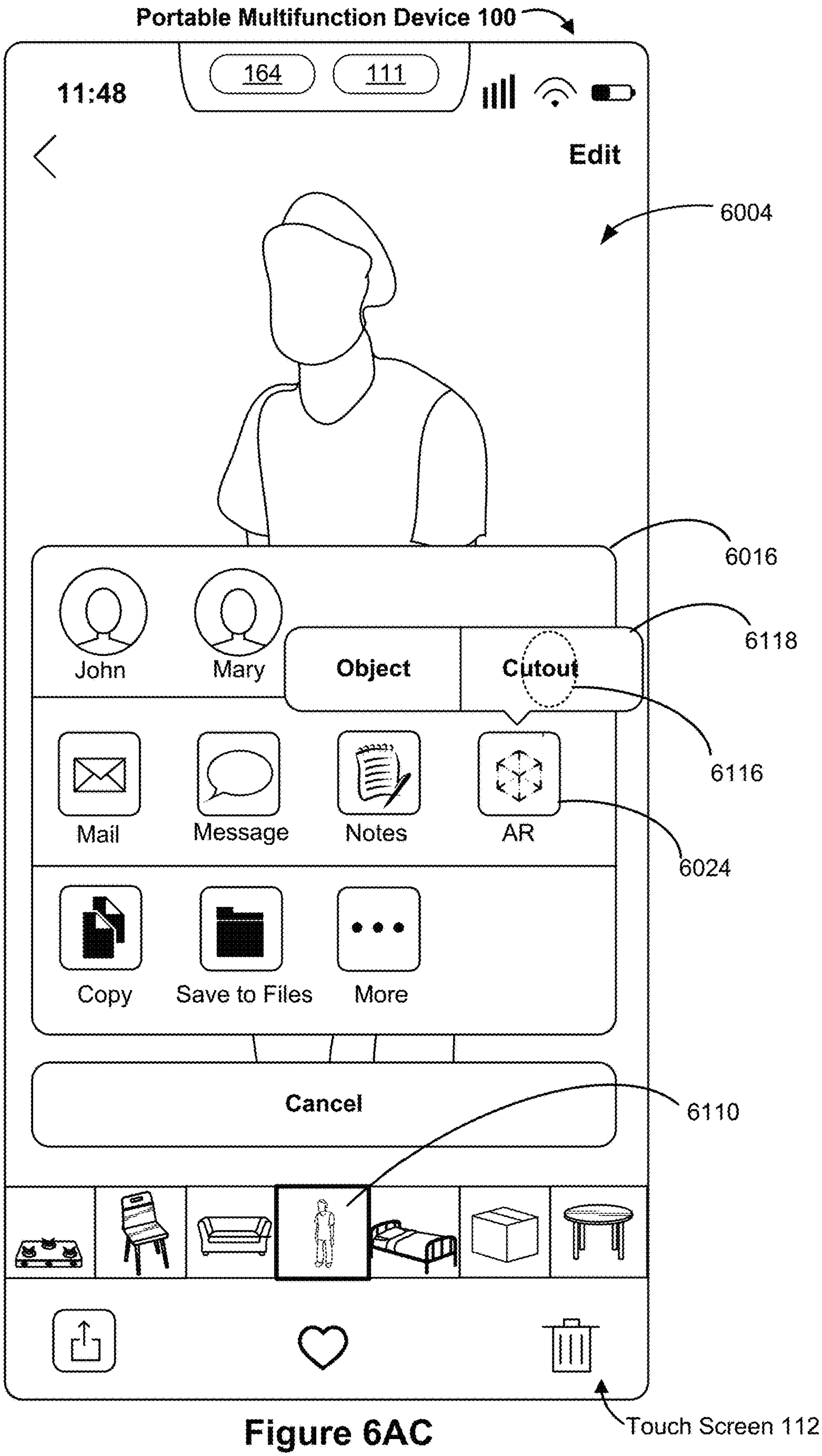
Figure 6A:
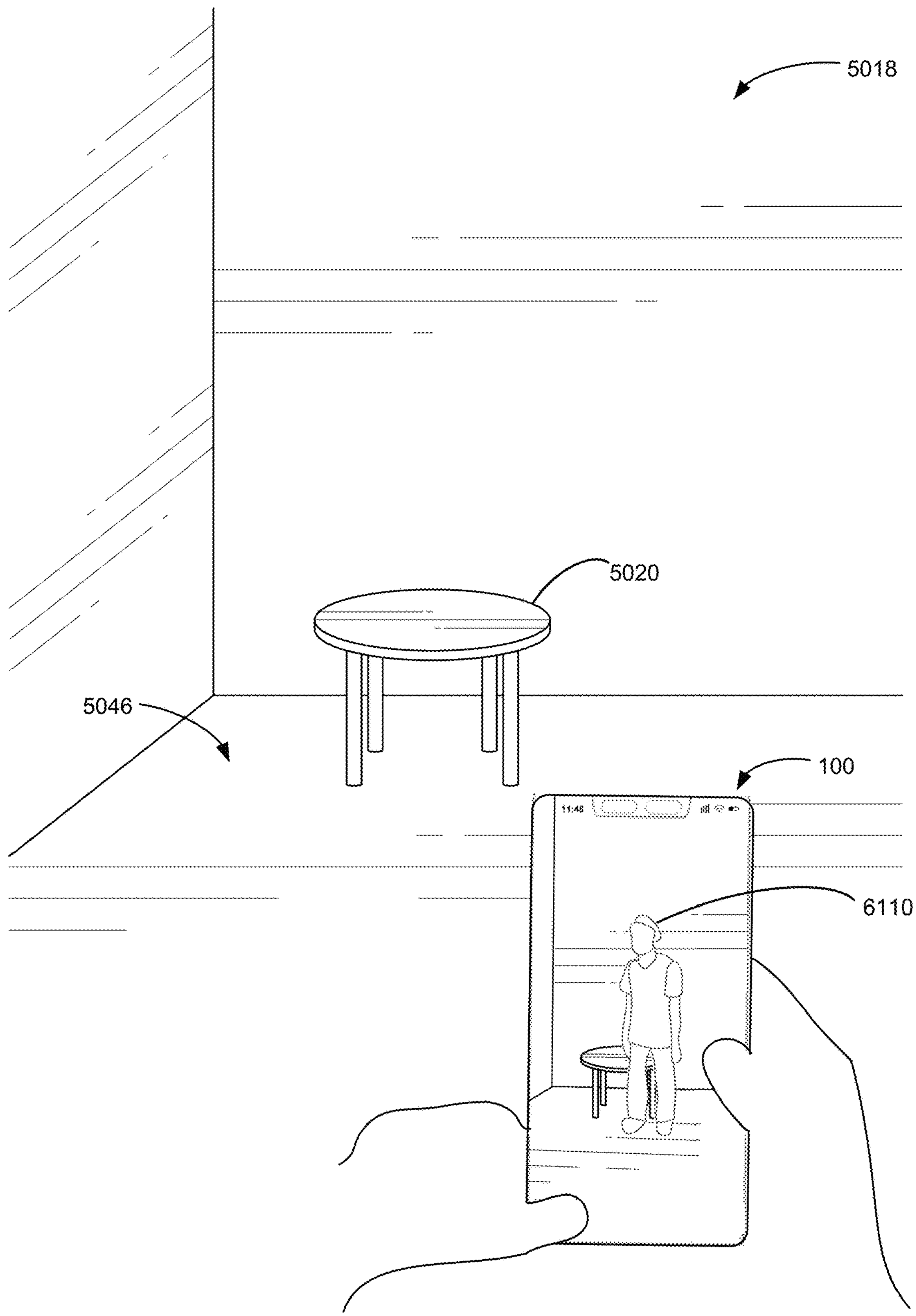
Figure 6A:
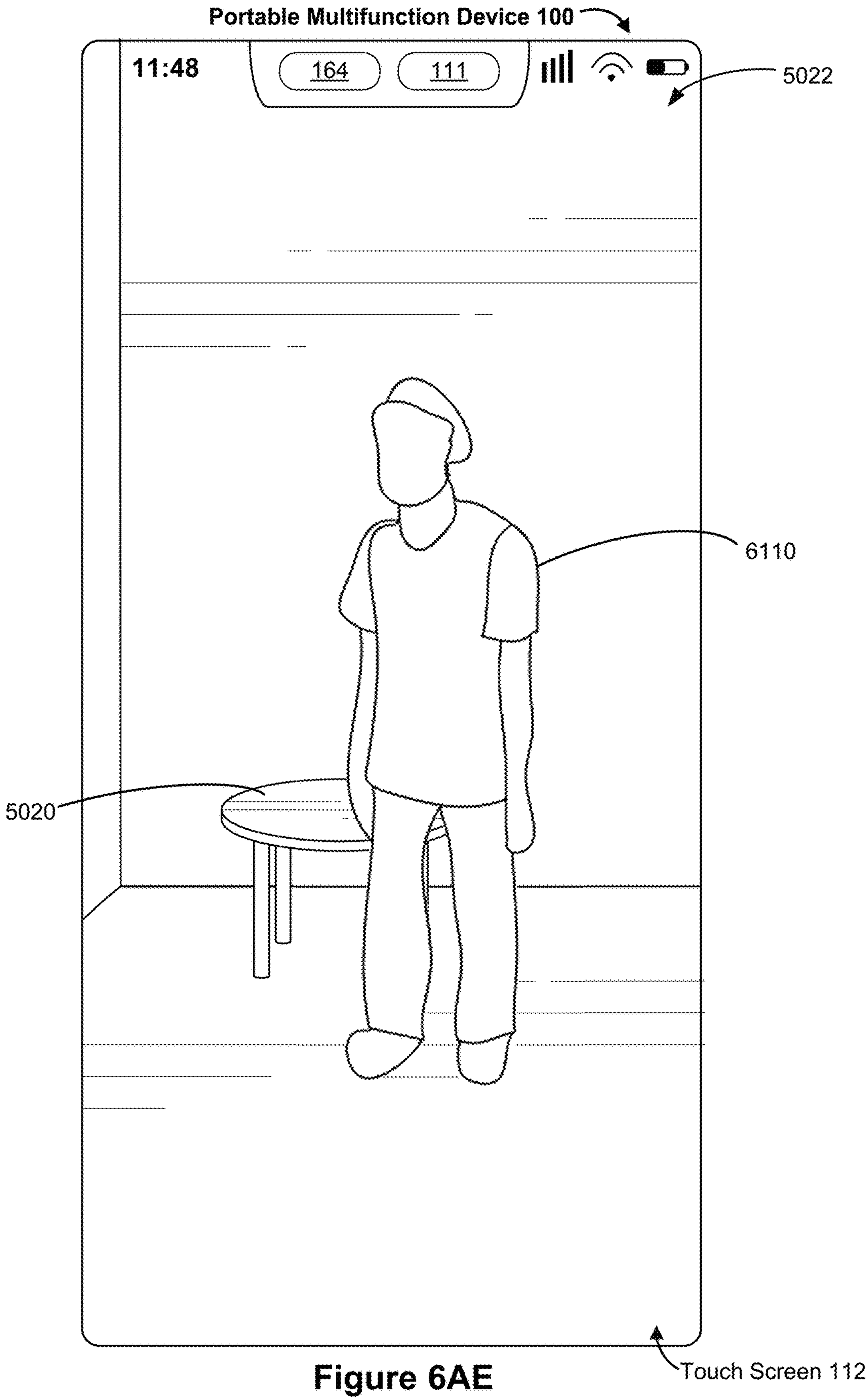
Figure 6A:
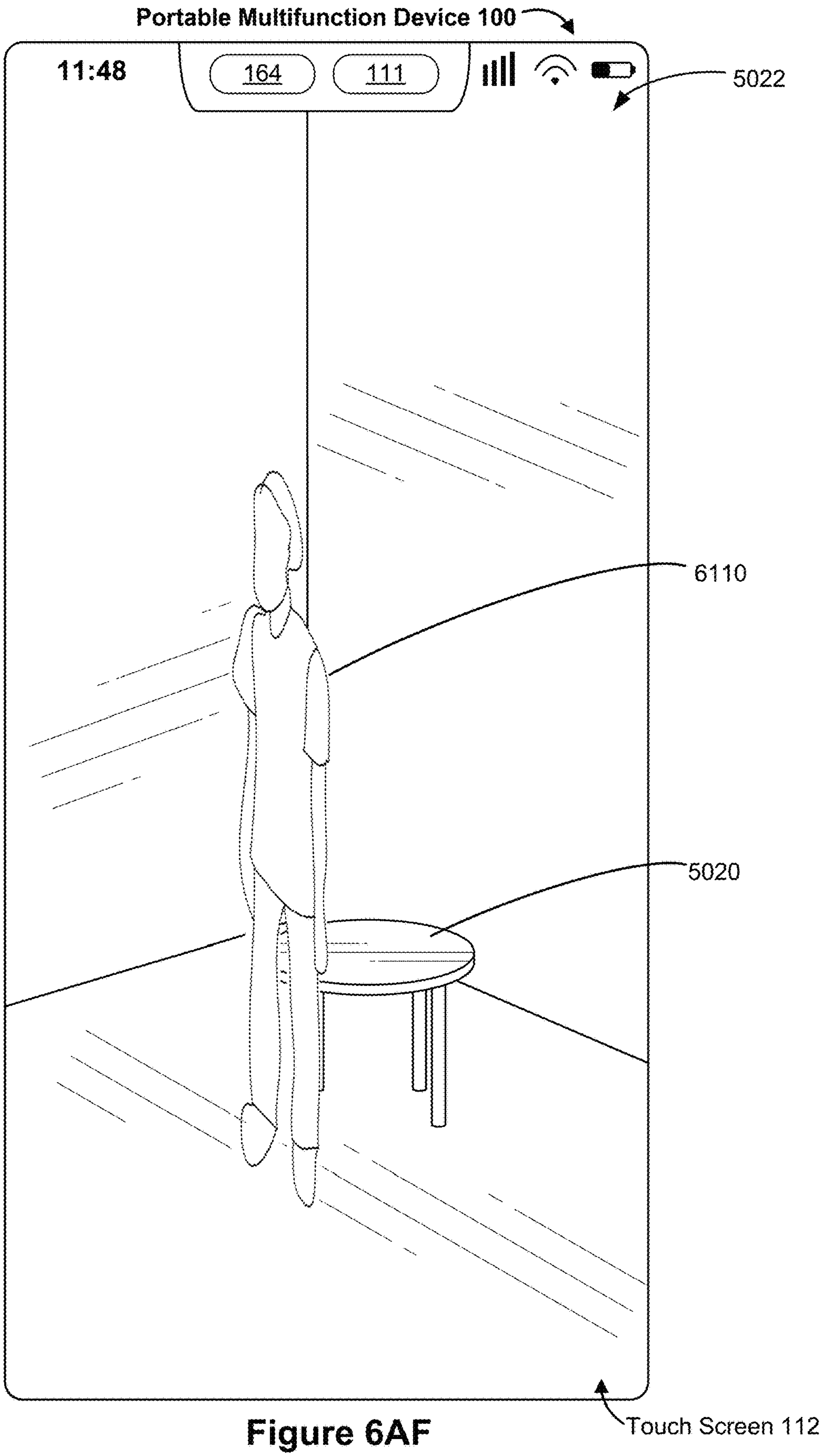
Figure 6A:
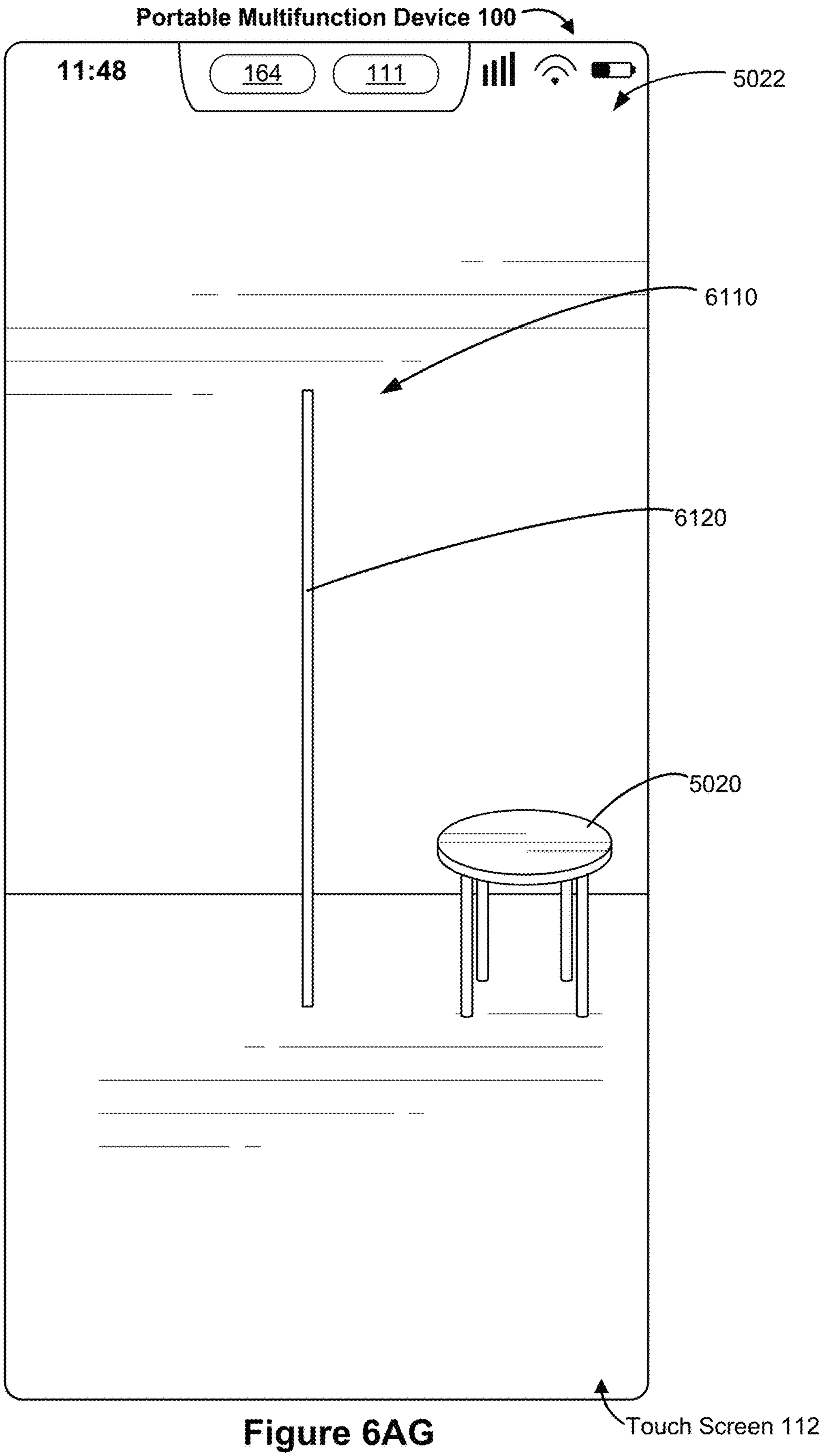
Figure 6A:
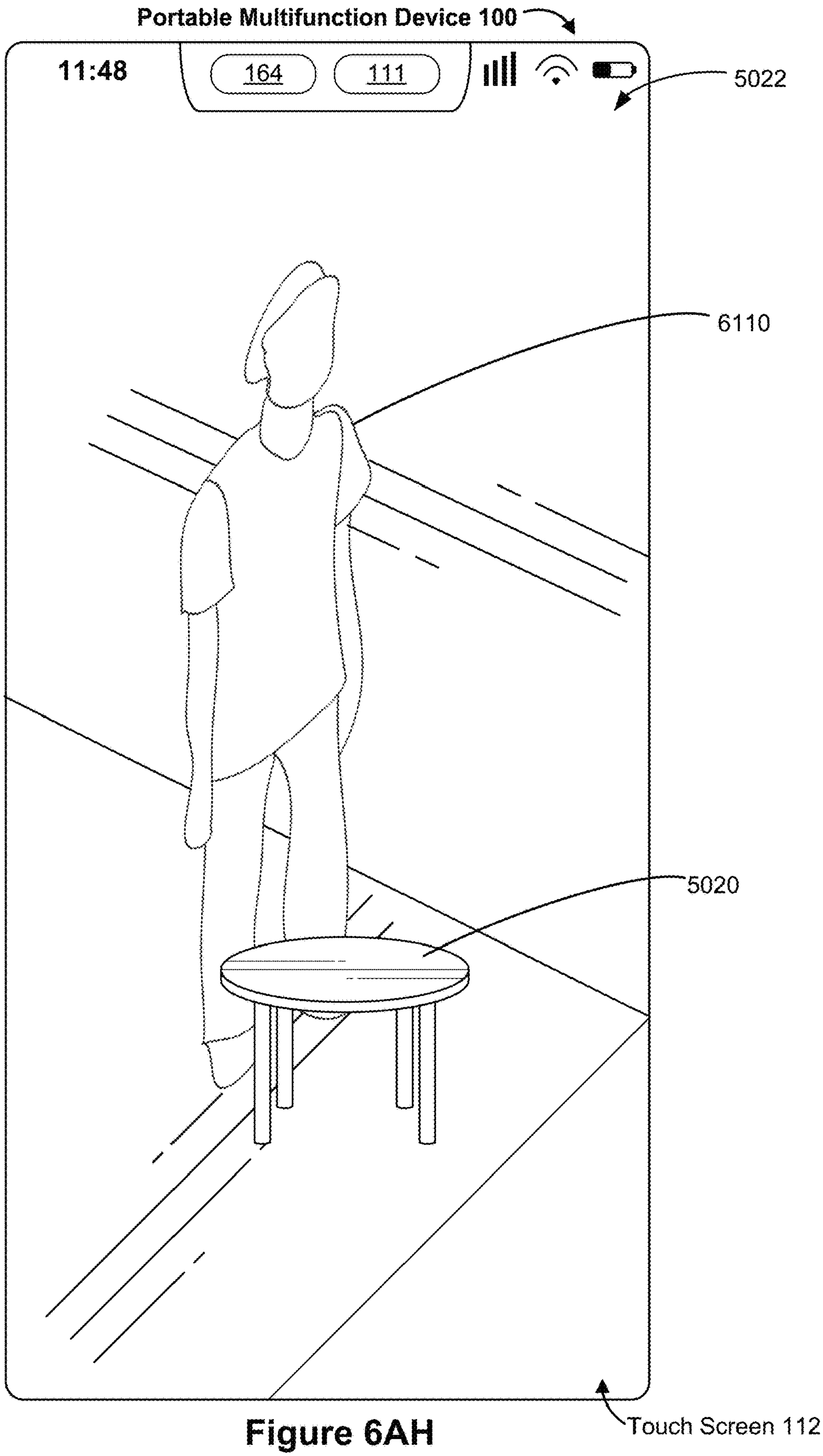
Figure 6A:
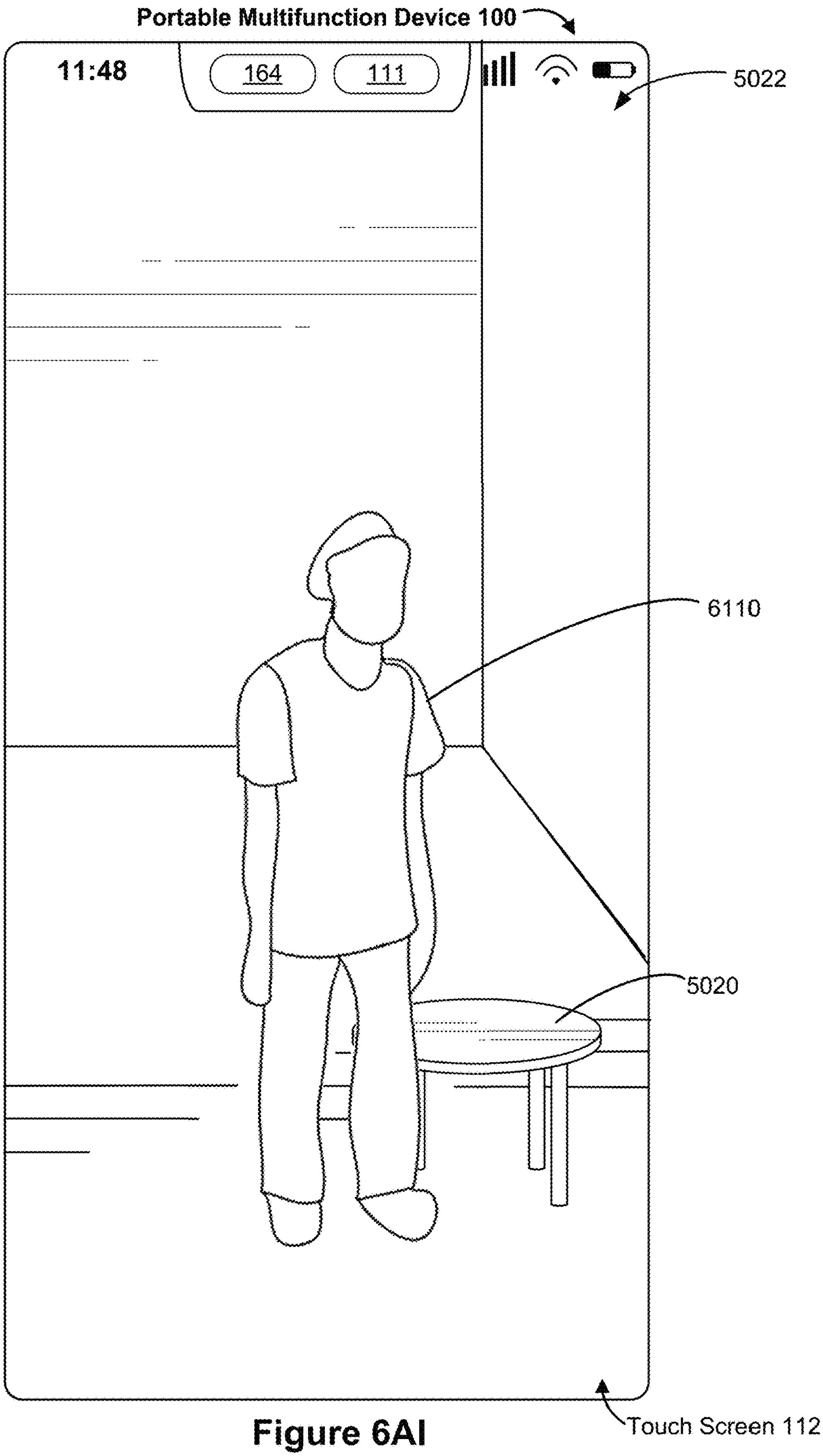

FIGS. 6M-6Z illustrate input for manipulating the multiple photographs.

In FIG. 6M, an input (e.g., a tap input) by contact 6060 is detected at a location that corresponds to control 6024 for displaying one or more selected photos in an object three-dimensional viewing mode. In response to the input, sharing user interface 6016 and photo selection interface 6036 cease to be displayed and currently selected photos 6002, 6046, and 6052 are displayed in augmented reality user interface 5022, as illustrated in FIGS. 6N-6O.

FIG. 6N illustrates a physical environment 5018 in which device 100 is operated. Photos 6002, 6046, and 6052 as displayed by device 100 appear to be hanging on rear wall 6032 of the physical environment 5018.

In FIG. 6O, an input (e.g., a leftward swipe input) by contact 6062 is detected at a location that corresponds to photo 6002. As contact 6062 moves along a path indicated by arrow 6064, photo 6002 moves along rear wall plane 6032 detected in the physical environment. In FIGS. 6O-6P, photo 6002 moves from rear wall plane 6032 onto side wall plane 6031.

In FIG. 6Q, an input (e.g., a leftward swipe input) by contact 6066 is detected at a location that corresponds to photo 6046. In FIGS. 6Q-6R, as contact 6066 moves along a path indicated by arrow 6068, photo 6046 moves leftward along rear wall plane 6032 in the direction indicated by arrow 6068 to a new position as illustrated in FIG. 6R.

In FIG. 6R, an input (e.g., a leftward swipe input) by contact 6070 is detected at a location that corresponds to photo 6052. In FIGS. 6R-6S, as contact 6070 moves along a path indicated by arrow 6072, photo 6052 moves leftward along rear wall plane 6032 in the direction indicated by arrow 6072 to a new position as illustrated in FIG. 6S.

In FIG. 6S, an input (e.g., a upward swipe input) by contact 6074 is detected at a location that corresponds to photo 6052. In FIGS. 6S-6T, as contact 6074 moves along a path indicated by arrow 6076, photo 6052 moves upward along rear wall plane 6032 in the direction indicated by arrow 6076 to a new position as illustrated in FIG. 6T.

In FIG. 6U, an input (e.g., a pinch gesture) by contacts 6086 and 6088 for changing the simulated physical size of photo 6046 is detected. As contact 6086 moves along a path indicated by arrow 6090 and contact 6088 moves along a path indicated by arrow 6092, the size of photo 6046 decreases, as illustrated in FIGS. 6U-6V.

In FIG. 6W, an input by contacts 6086 and 6088 is detected for rotating photo 6046. As contact 6086 moves along a path indicated by arrow 6094 and contact 6088 moves along a path indicated by arrow 6096, photo 6046 rotates about an axis that is perpendicular to rear wall plane 6032, as illustrated in FIGS. 6W-6X. From FIG. 6X-FIG. 6Y, photo 6046 continues to rotate as contact 6086 moves along a path indicated by arrow 6098 and contact 6088 moves along a path indicated by arrow 6100.

In FIG. 6Z, an input by contacts 6102 and 6104 is detected for rotating photo 6046 about an axis 6016 that is parallel to rear wall plane 6032, as illustrated by rotation arrow 6108. Because rotation about an axis that is parallel to rear wall plane 6032 is not permitted, a visual indication 6098 of the non-permitted activity is displayed (e.g., including text indicating, "Cannot rotate in this direction!").

In FIG. 6AA, a currently selected photo 6110 is displayed in photo viewing interface 6004 of the photo management application (e.g., as indicated by frame 6003 surrounding the photo thumbnail that corresponds to currently selected photo 6110). An input (e.g., a tap input) by contact 6112 is detected at a location that corresponds to control 6008 for displaying a sharing user interface 6016. In response to the input, sharing user interface 6016 is displayed overlaying photo viewing interface 6004, as illustrated in FIG. 6AB.

In FIG. 6AB, an input (e.g., a long press or deep press input) by contact 6114 is detected at a location that corresponds to control 6024 for displaying one or more selected objects in an object three-dimensional viewing mode (e.g., object management user interface 5004 or augmented reality user interface 5022). In response to the input, a menu 6118 is displayed for indicating a display mode for displaying one or more currently selected photos in the object three-dimensional viewing mode (e.g., an "Object" mode or a "Cutout" mode), as illustrated in FIG. 6AC.

In FIG. 6AC, an input (e.g., a tap input) by contact 6116 is detected at a location that corresponds to the "Cutout" region of menu 6118. In response to the input, sharing user interface 6016 and photo viewing interface 6004 cease to be displayed and a cutout version of image 6110 is displayed with a field of view of one or more cameras of device 100, as illustrated in FIGS. 6AD-6AE.

FIG. 6AD illustrates a physical environment 5018 in which device 100 is operated. Physical table 5020 appears in the physical environment 5018 and in a view of physical environment 5018 captured by one or more cameras of device 100, as displayed by device 100. The cutout version of photo 6110 as displayed by device 100 appears to be in front of table 5020 in the physical environment 5018.

FIG. 6AE-6AI illustrate adjustment to the displayed portion of the field of view of cameras of device 100 that occurs as the device moves in the physical environment. In FIG. 6AE, the cutout version of photo 6110 is shown in augmented reality user interface 5022 that includes a view of the physical environment. From FIG. 6AE to FIG. 6AF and from FIG. 6AF to FIG. 6AG, device 100 moves from a position in front of the cutout version of image 6110 to a position to the side of cutout version of image 6110, revealing that the cutout version of image 6110 has a simulated backing 6120 (e.g., with a simulated thickness that is small relative to the size of the cutout version of image 6110, such as a simulated thickness of 1 cm-10 cm). In some embodiments, the cutout version of image 6110 displayed in augmented reality user interface 5022 is a two-dimensional image that is displayed without a backing (and would thus not be visible from a side view as shown in FIG. 6AH). From FIG. 6AG to FIG. 6AH and from FIG. 6AH to FIG. 6AI, device 100 continues to move from the position to the side of the cutout version of image 6110 to a position behind the cutout version of image 6110, and the displayed locations of image 6110 and table 5020 continue to change in accordance with the movement of device 100. In FIG. 6AI, the cutout version of image 6110 appears as a reverse version of the cutout version of image 6110 as viewed from the position in front of the cutout version of image 6110 (as shown in FIG. 6AE).

Figure 7A:
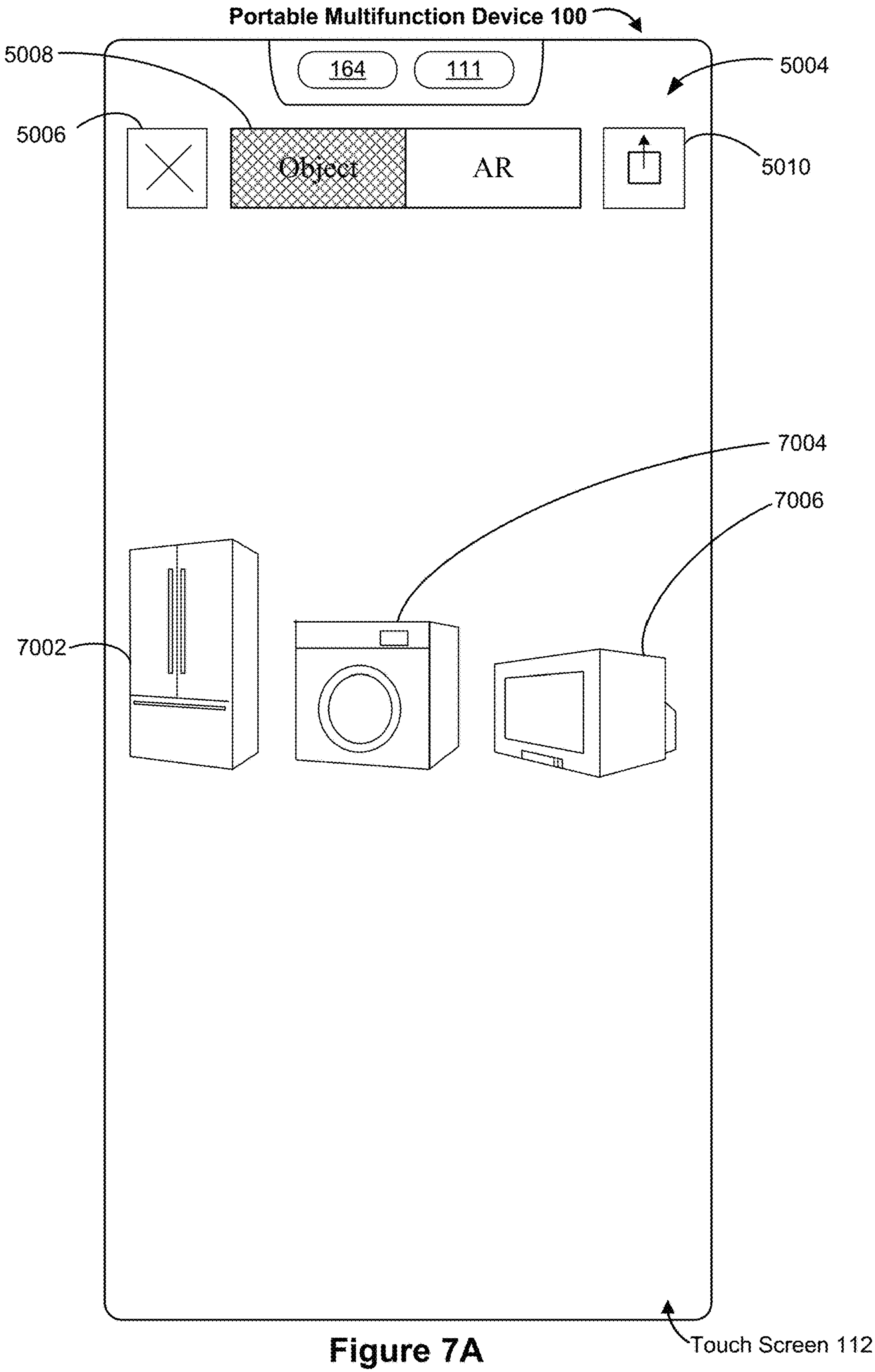
FIGS. 7A-7AQ illustrate example user interfaces for responding to an input directed to a respective virtual object of a plurality of displayed virtual objects, in accordance with some embodiments.

FIGS. 7A-7AQ illustrate example user interfaces for responding to an input directed to a respective virtual object of a plurality of displayed virtual objects, in accordance with some embodiments. The user interfaces in these figures are used to illustrate the processes described below, including the processes in FIGS. 9A-9C, 10A-10C, 11A-11D, 12A-12B, and 13A-13B. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

In FIG. 7A, virtual object 7002 (a virtual refrigerator), virtual object 7004 (a virtual washing machine), and virtual object 7006 (a virtual television) are displayed in object staging user interface 5004 (as described further with regard to FIG. 5A).

Figure 7B:
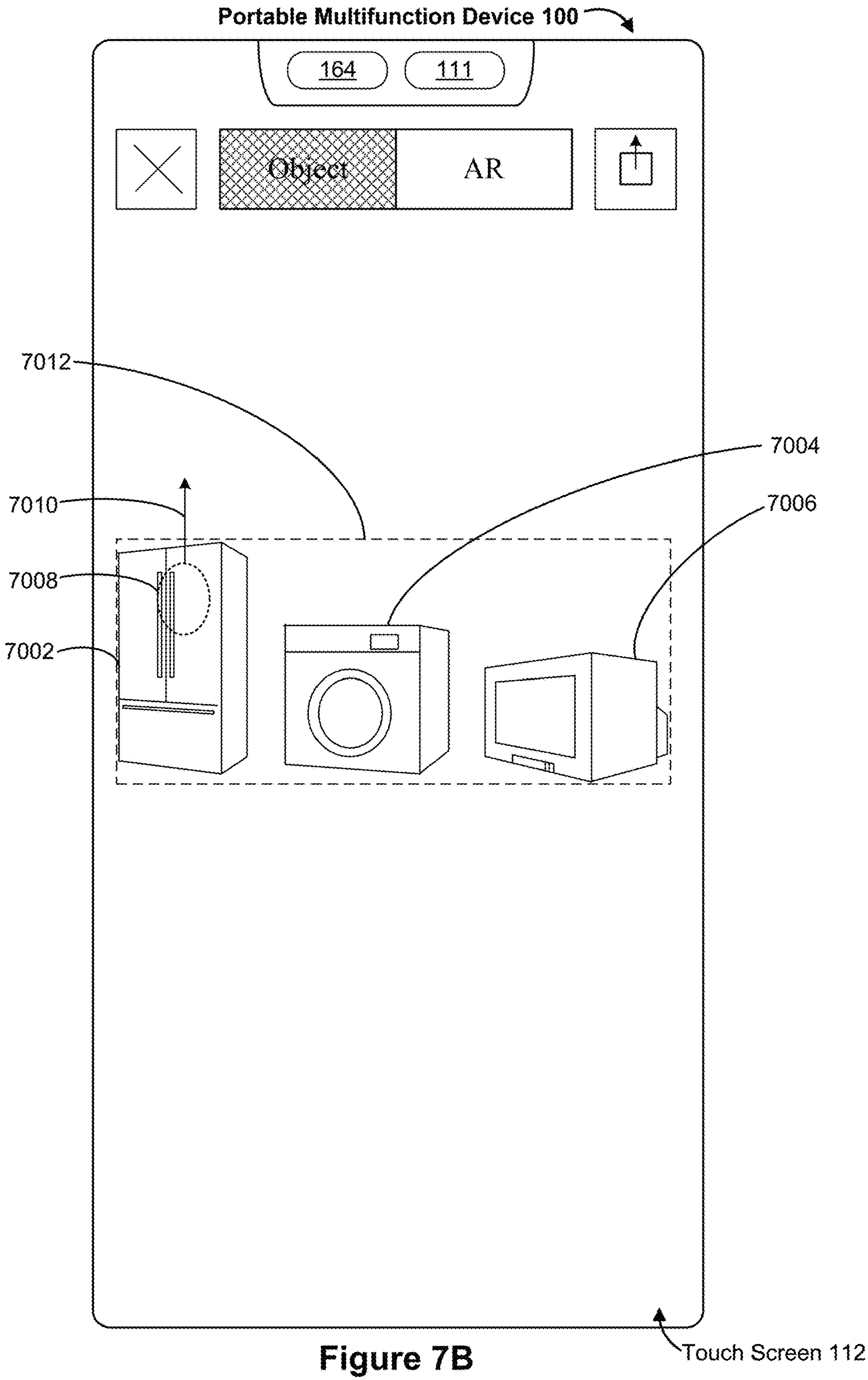
Figure 7C:
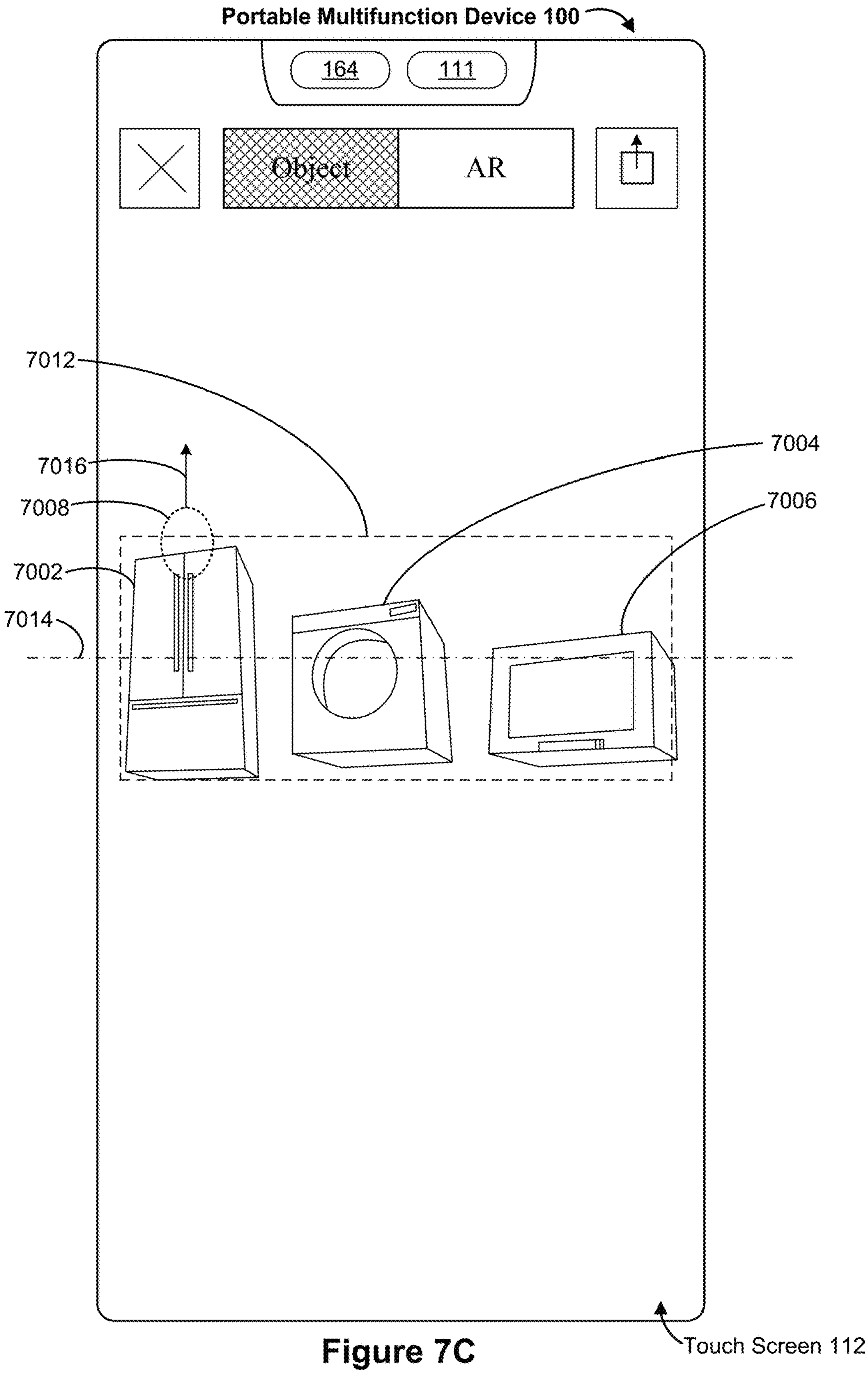

FIGS. 7B-7C illustrate rotation of virtual objects 7002, 7004 and 7006 in response to an input detected while object staging user interface 5004 is displayed.

Figure 7D:
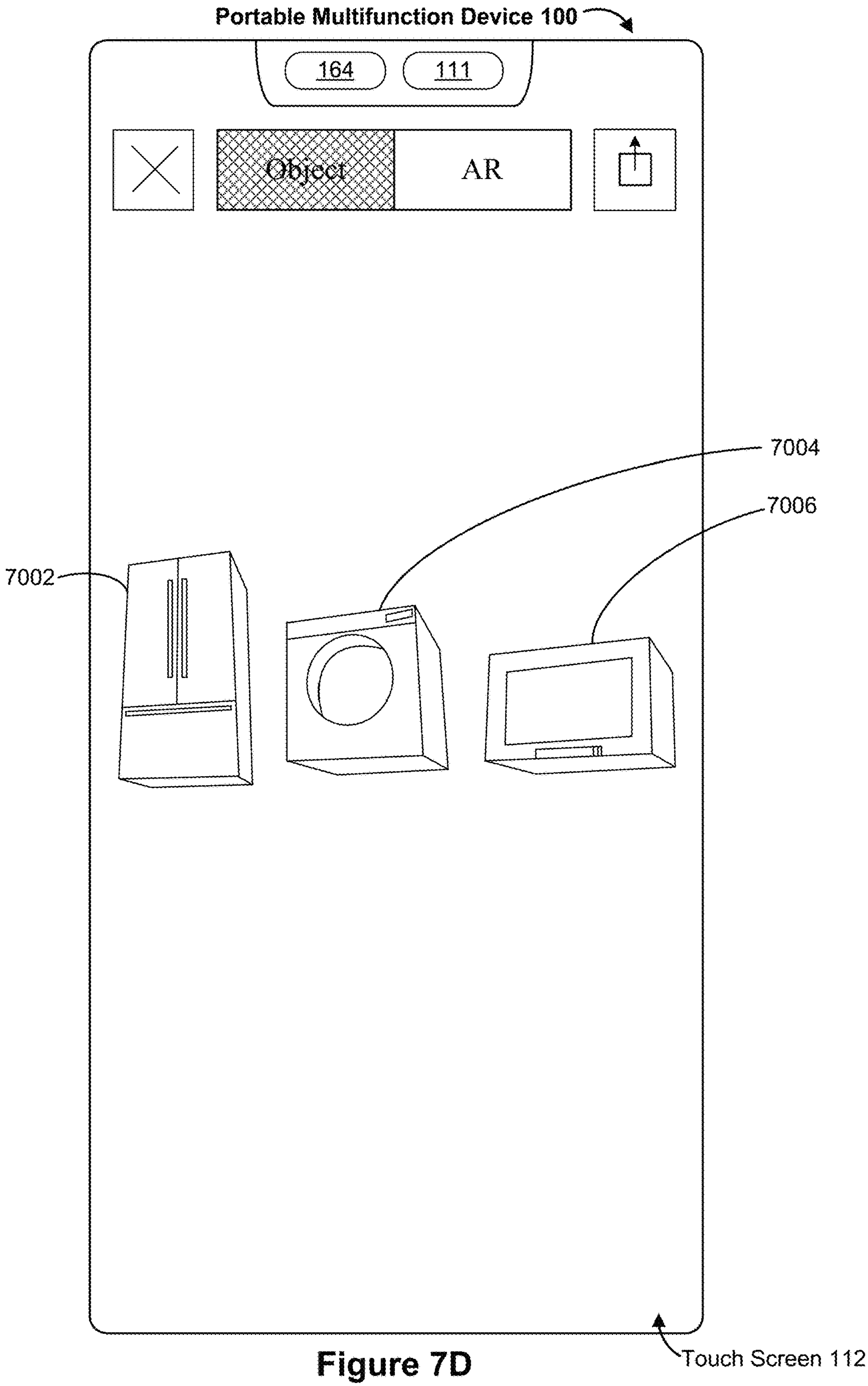

In FIG. 7B, an input (e.g., an upward vertical swipe input) by contact 7008 is detected at a location that corresponds to virtual object 7002. As contact 7008 moves along a path indicated by arrow 7010, virtual objects 7002, 7004 and 7006 rotate in the direction indicated by arrow 7010 (e.g., tilting upward). A virtual boundary 7012 (not displayed, as indicated by the dotted lines) surrounds virtual objects 7002, 7004 and 7006. As illustrated in FIG. 7C, in response to the vertical swipe input by contact 7008, virtual objects 7002, 7004 and 7006 rotate about a horizontal centerline 7014 of virtual boundary 7012. For example, horizontal centerline 7014 is a centerline that is perpendicular to the direction of arrow 7016 indicating the direction of the detected upward vertical swipe input. In some embodiments, in response to a leftward or rightward horizontal swipe input, virtual objects 7002, 7004 and 7006 rotate collectively in the direction of the horizontal swipe input about a vertical centerline (not shown) that bisects boundary 7012. In some embodiments, in response to a leftward or rightward horizontal swipe input, virtual objects 7002, 7004 and 7006 each rotate in the direction of the horizontal swipe input about vertical centerlines that bisect each virtual object. In FIG. 7D, contact 7008 has lifted off of touch-sensitive di splay system 112.

Figure 7E:
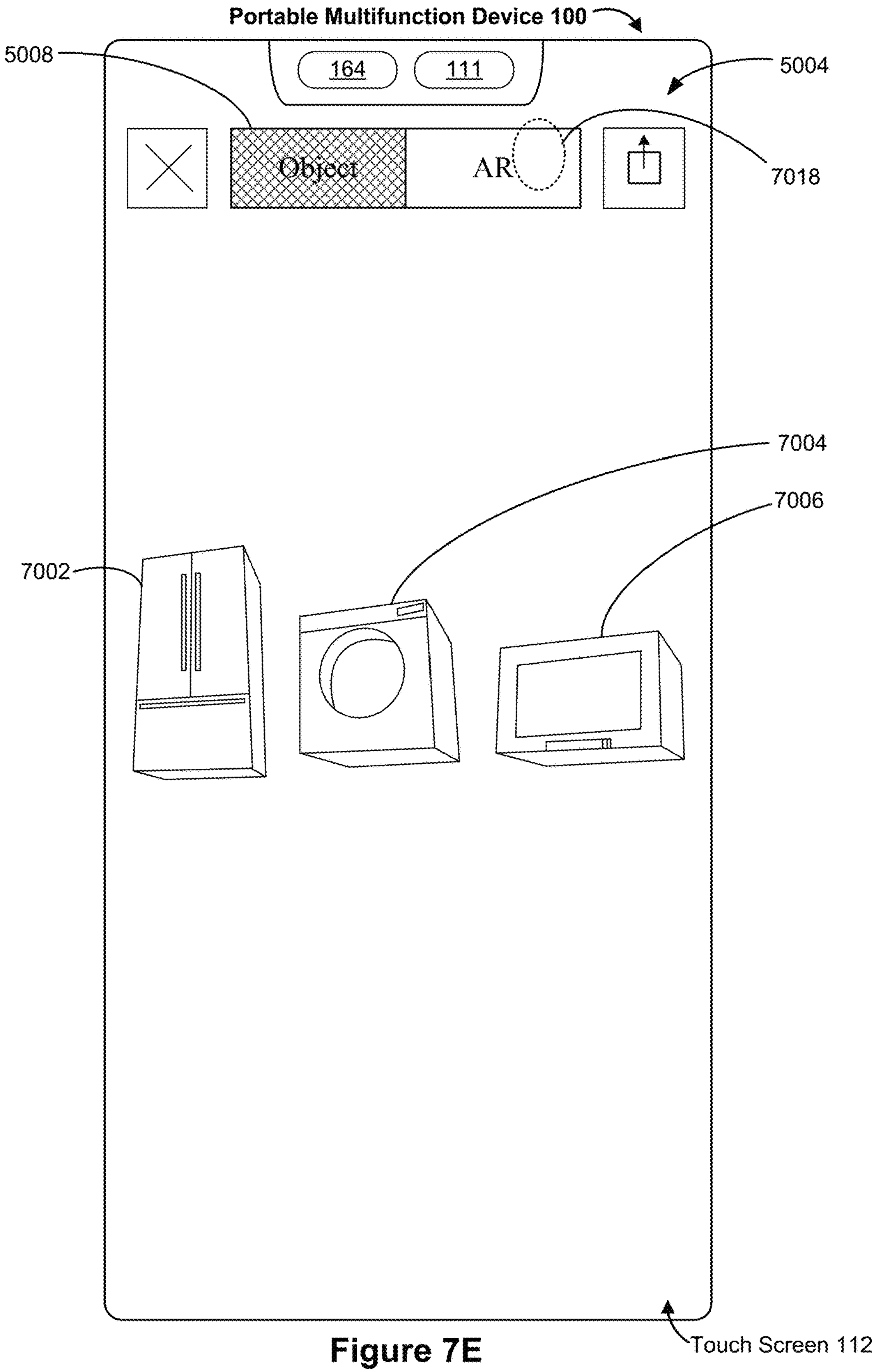
Figure 7F:
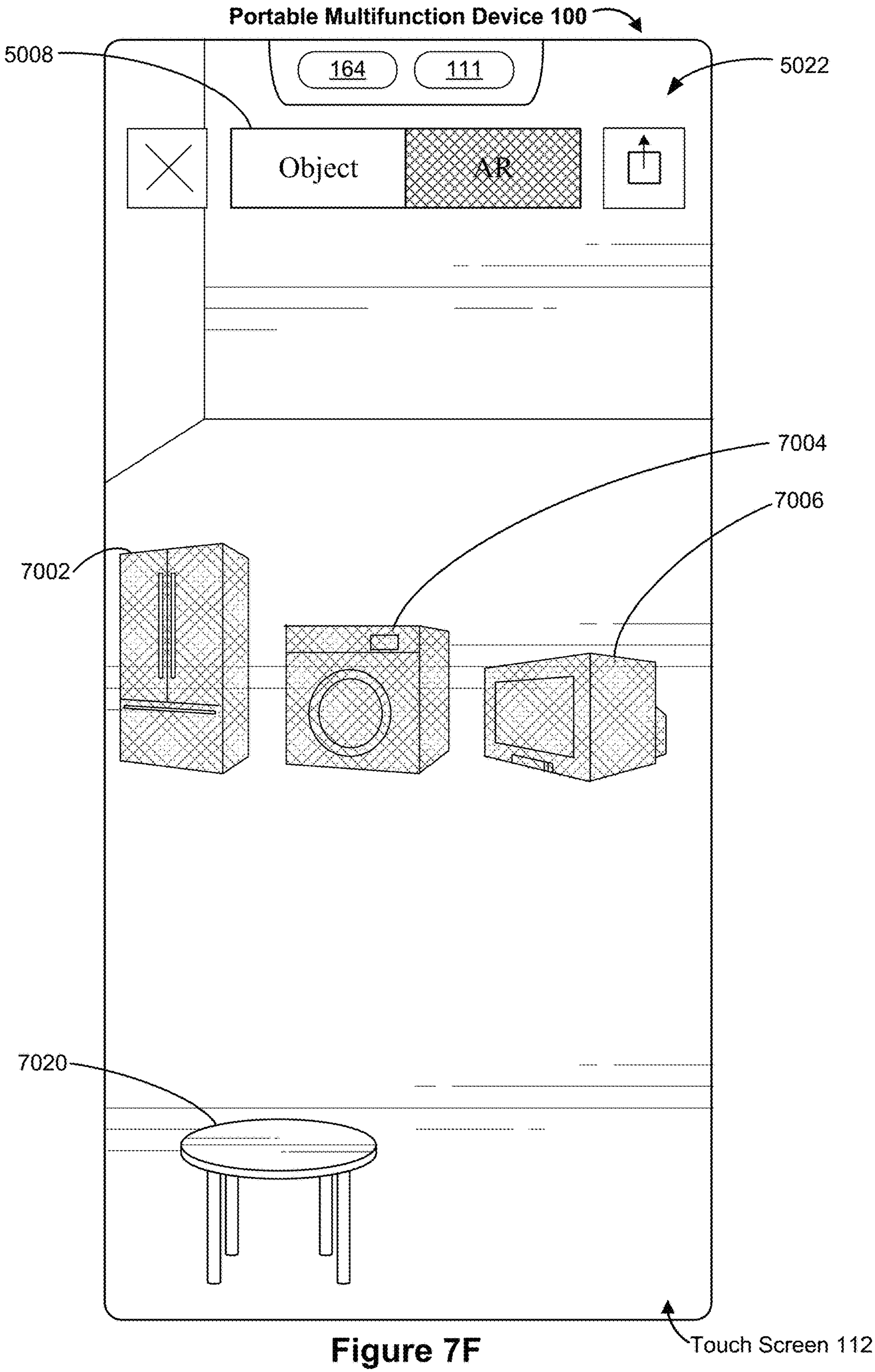
Figure 7G:
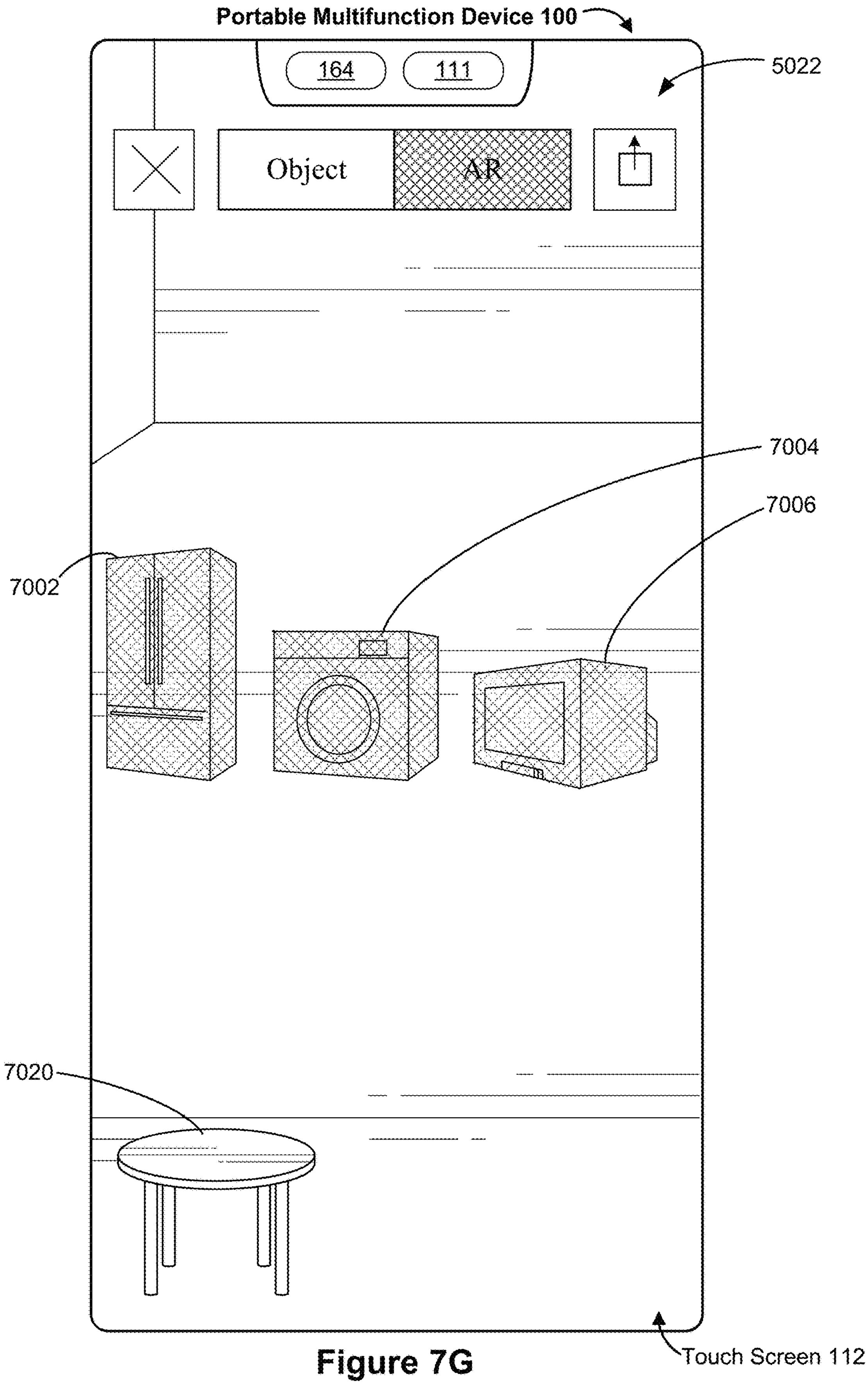

In FIG. 7E, an input (e.g., a tap input) by contact 7018 is detected at a location that corresponds to the "AR" region of toggle control 5008. In response to the input, display of object staging user interface 5004 is replaced by display of virtual objects 7002, 7004 and 7006 in an augmented reality view (e.g., virtual objects 7002, 7004 and 7006 are displayed in a physical environment captured by one or more cameras of device 100), as illustrated in FIGS. 7F-7G. In some embodiments, a rotation applied to virtual objects 7002, 7004 and 7006 (e.g., rotation about horizontal centerline 7014, as described with regard to FIGS. 7B-7C) in object staging user interface 5004 is not maintained when the virtual objects are displayed in augmented reality user interface 5022. For example, virtual objects 7002, 7004 and 7006 are configured to be placed at a fixed position relative to a horizontal plane, and are thus placed with a horizontal surface substantially parallel to a detected horizontal plane. In some embodiments, a rotation applied to virtual objects 7002, 7004 and 7006 (e.g., rotation about a vertical centerline) in object staging user interface 5004 is maintained when the virtual objects are displayed in augmented reality user interface 5022.

Figure 7H:
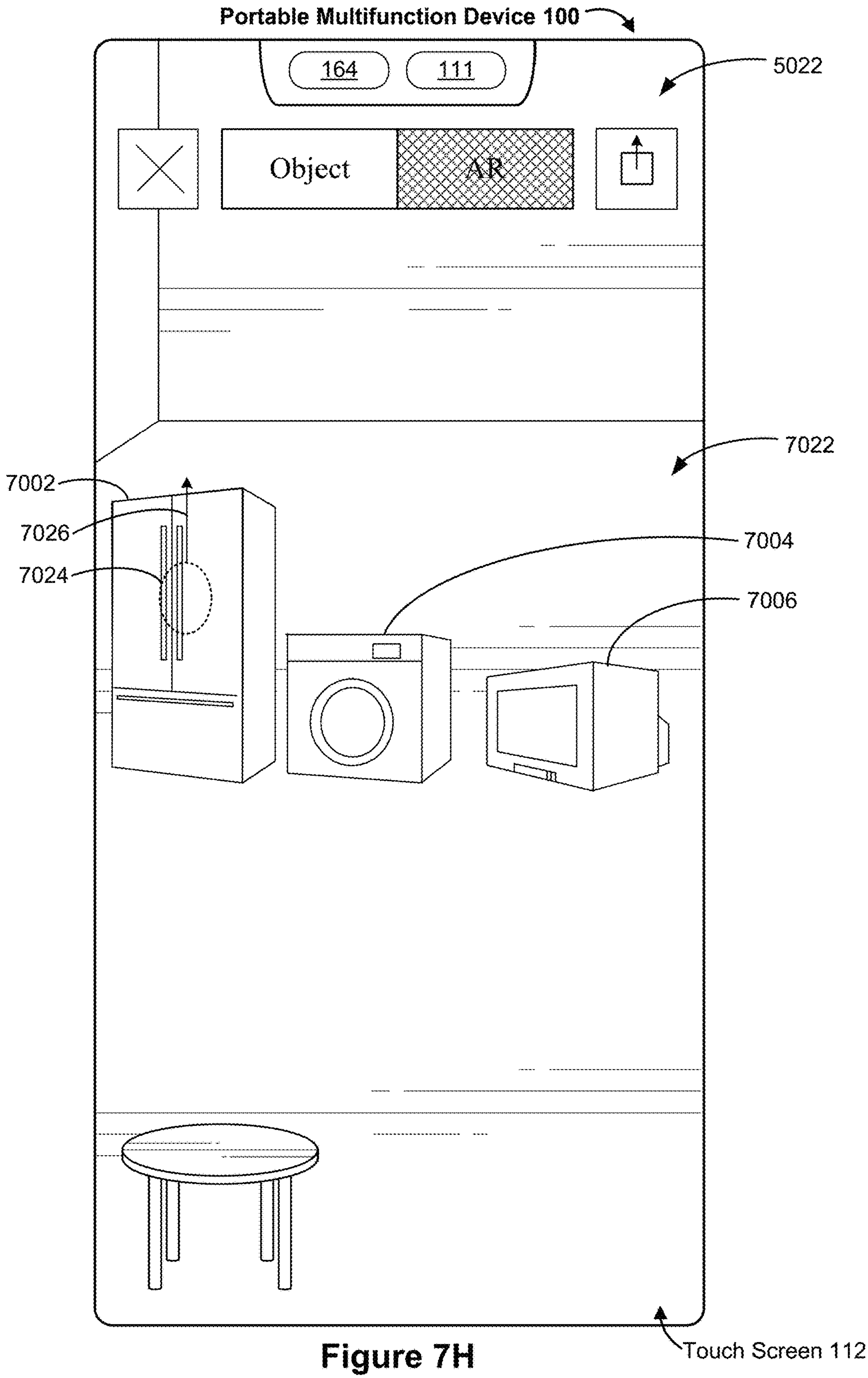

As illustrated in FIGS. 7F-7G, when a field of view of the cameras is initially displayed, translucent representations of the virtual objects may be displayed (e.g., while one or more planes that correspond to one or more of the virtual objects have not been detected in a field of view of the cameras of device 100). In some embodiments, in response to detecting that the object-placement criteria are met (e.g., one or more planes that correspond to the one or more virtual objects have been detected in the field of view of the cameras), the device displays an animated transition showing one or more of the virtual objects moving (e.g., rotating, scaling, translating, and/or a combination of the above) from a first orientation (e.g., as shown in FIG. 7G) to the second orientation (e.g., as shown in FIG. 7H) and changing from having a first set of visual properties (e.g., virtual objects 7002, 7004 and 7006 are shown in a translucent state in FIG. 7G) to having a second set of visual properties (e.g., virtual objects 7002, 7004 and 7006 are shown in a non-translucent state in FIG. 7H). For example, once one or more planes for placing virtual objects 7002, 7004 and 7006 are identified in the camera's field of view, the virtual objects 7002, 7004 and 7006 are placed onto that plane with the visible adjustment of its orientation, size, and translucency (and the like).

In FIGS. 7F-7G, translucent representations of virtual objects 7002, 7004 and 7006 are displayed in augmented reality user interface 5022 that includes a view of physical environment as captured by one or more cameras of device 100. The translucent representations of virtual objects 7002, 7004 and 7006 are displayed at fixed positions relative to touch-sensitive display system 112. For example, from FIG. 7F to FIG. 7G, as device 100 is moved relative to the physical environment (as indicated by, e.g., the changed position of physical table 7020 in the field of view of the cameras), virtual objects 7002, 7004 and 7006 remain at fixed positions relative to touch-sensitive display system 112.

In 7H, a plane 7022 that corresponds to virtual objects 7002, 7004 and 7006 (e.g., a horizontal plane that corresponds to a floor in the physical environment) has been detected in the field of view of the cameras and virtual objects 7002, 7004 and 7006 are placed on the detected plane in augmented reality user interface 5022. When virtual objects 7002, 7004 and 7006 have been placed on the detected plane, the virtual objects remain at a fixed position relative to the detected plane as device 100 moves in the physical environment and the field of view of the one or more cameras changes (as described below with regard to FIGS. 7R-7S).

Figure 7I:
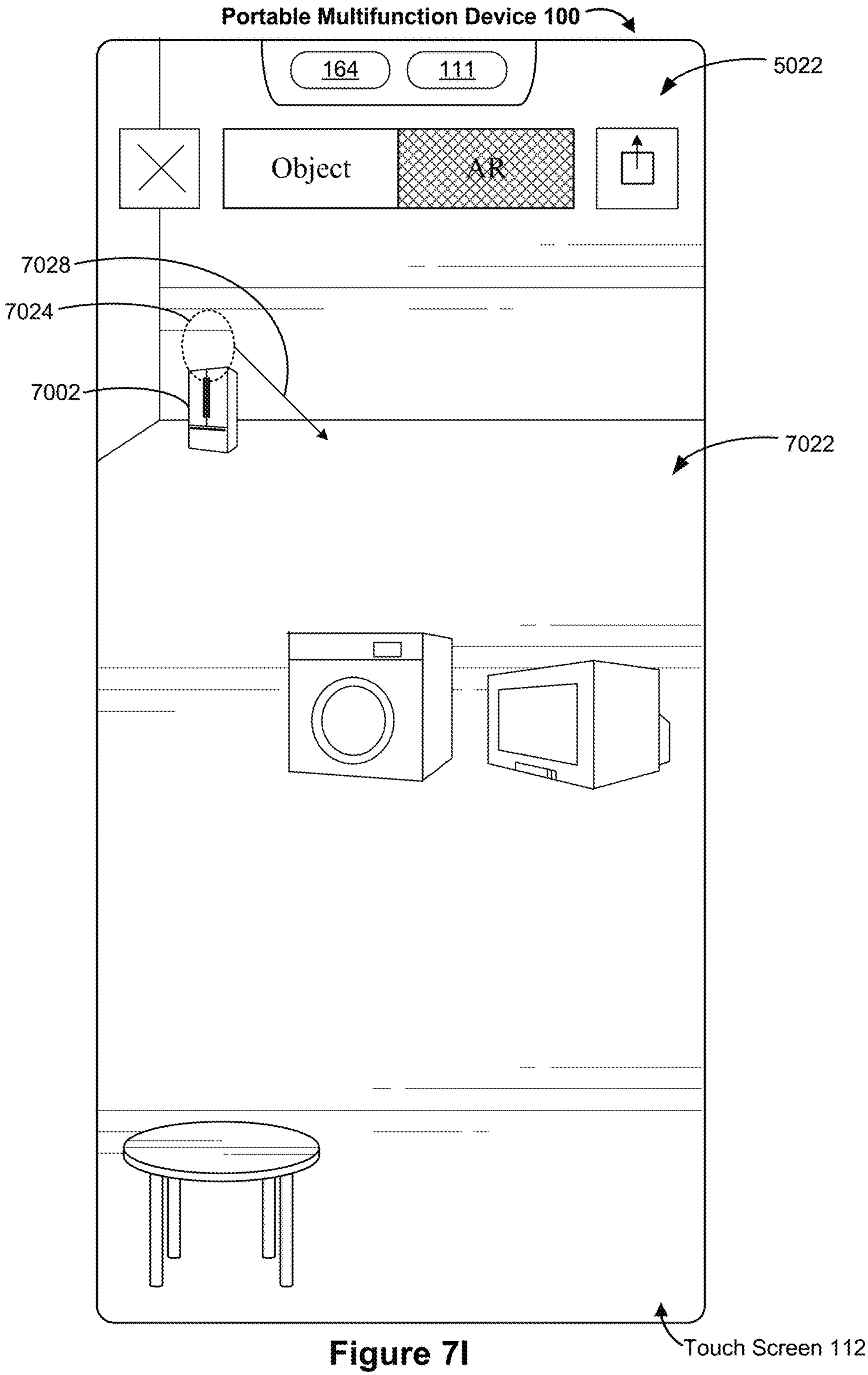

FIGS. 7H-7R illustrate inputs that alter positions and orientations of virtual objects 7002, 7004 and 7006 displayed in augmented reality user interface 5022. In FIG. 7H, an input (e.g., an upward vertical swipe input) by contact 7022 is detected at a location that corresponds to virtual object 7002. As contact 7024 moves along a path indicated by arrow 7026, virtual object 7002 moves along plane 7022 in the direction indicated by arrow 7026, as illustrated in FIGS. 7H-7I. As virtual object 7002 moves along plane 7022, a size of virtual object 7002 is adjusted (e.g., based on a virtual distance from the representation of the virtual object to the user, to maintain an accurate perspective of the virtual object in the field of view).

Figure 7J:
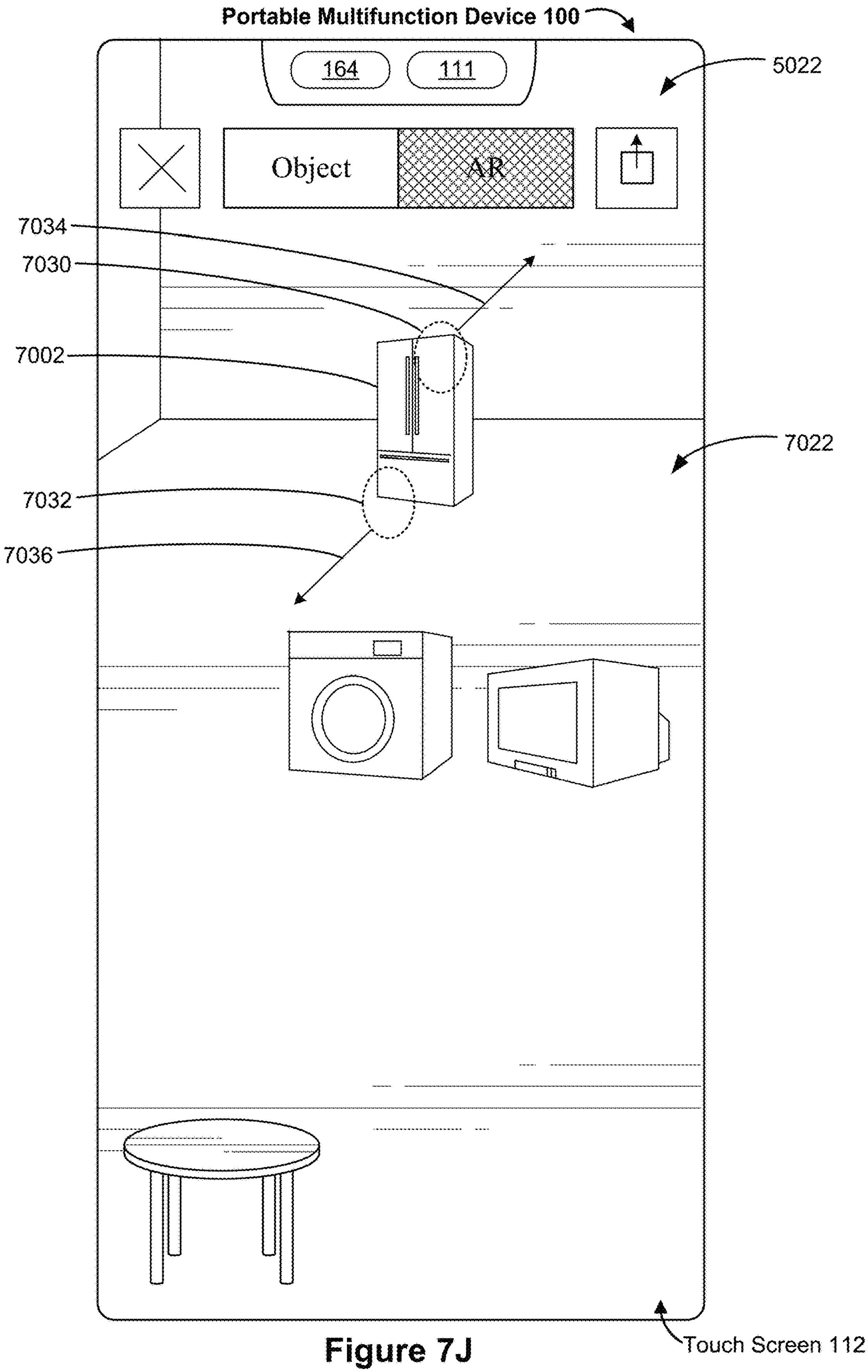

In FIG. 7I, as contact 7024 continues to move along a path indicated by arrow 7028, virtual object 7002 moves along plane 7022 in the direction indicated by arrow 7028, as illustrated in FIGS. 7I-7J As virtual object 7002 moves along plane 7022 toward the user, the size of virtual object 7002 increases.

In FIG. 7J, an input (e.g., a de-pinch gesture) by contacts 7030 and 7032 for changing the simulated physical size of virtual object 7002 is detected. As contact 7030 moves along a path indicated by arrow 7034 and contact 7032 moves along a path indicated by arrow 7036, the size of virtual object 7002 increases, as illustrated in FIGS. 7J-7K (e.g., based on a virtual distance from the representation of the virtual object to the user, to maintain an accurate perspective of the virtual object in the field of view).

Figure 7K:
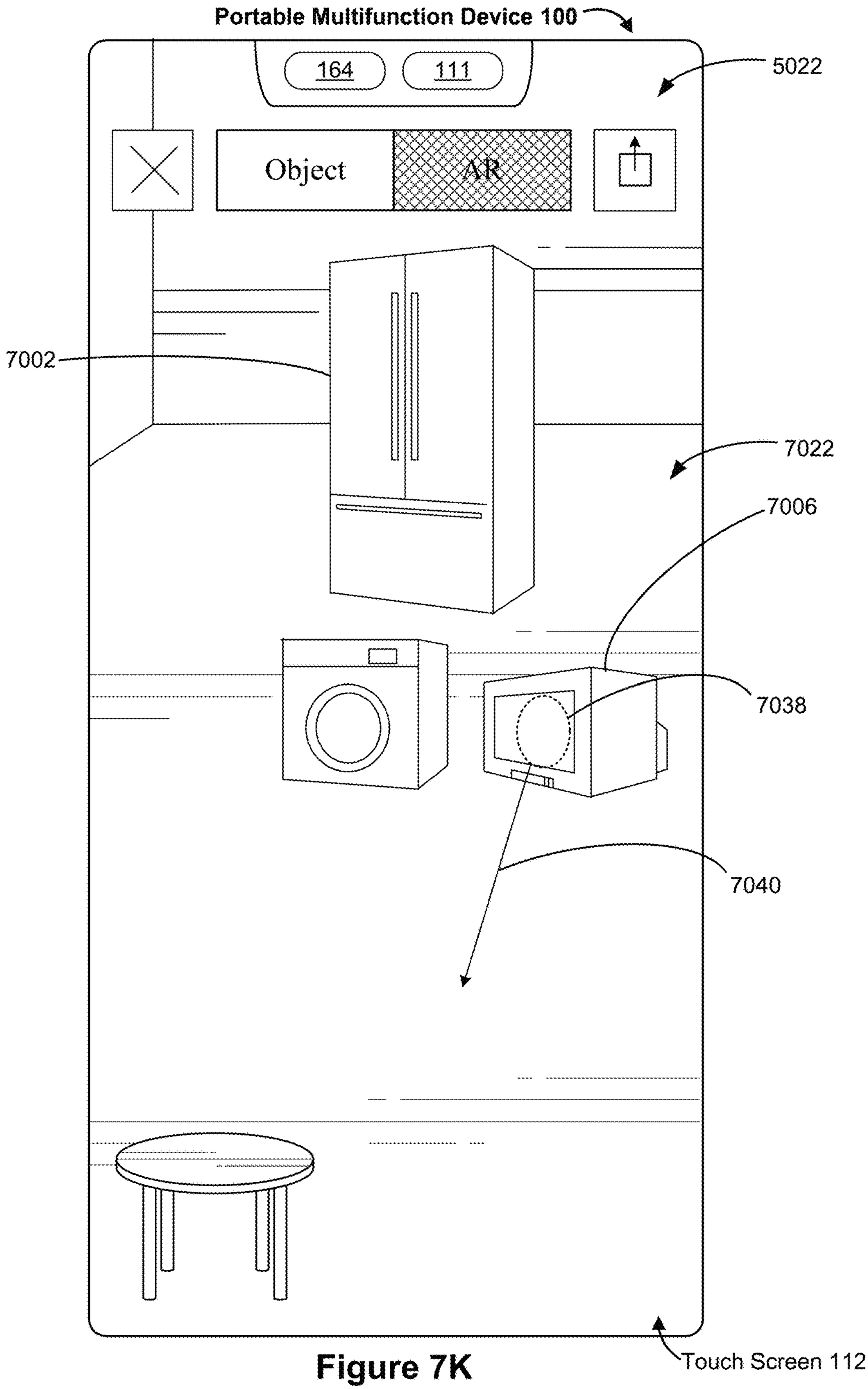
Figure 7L:
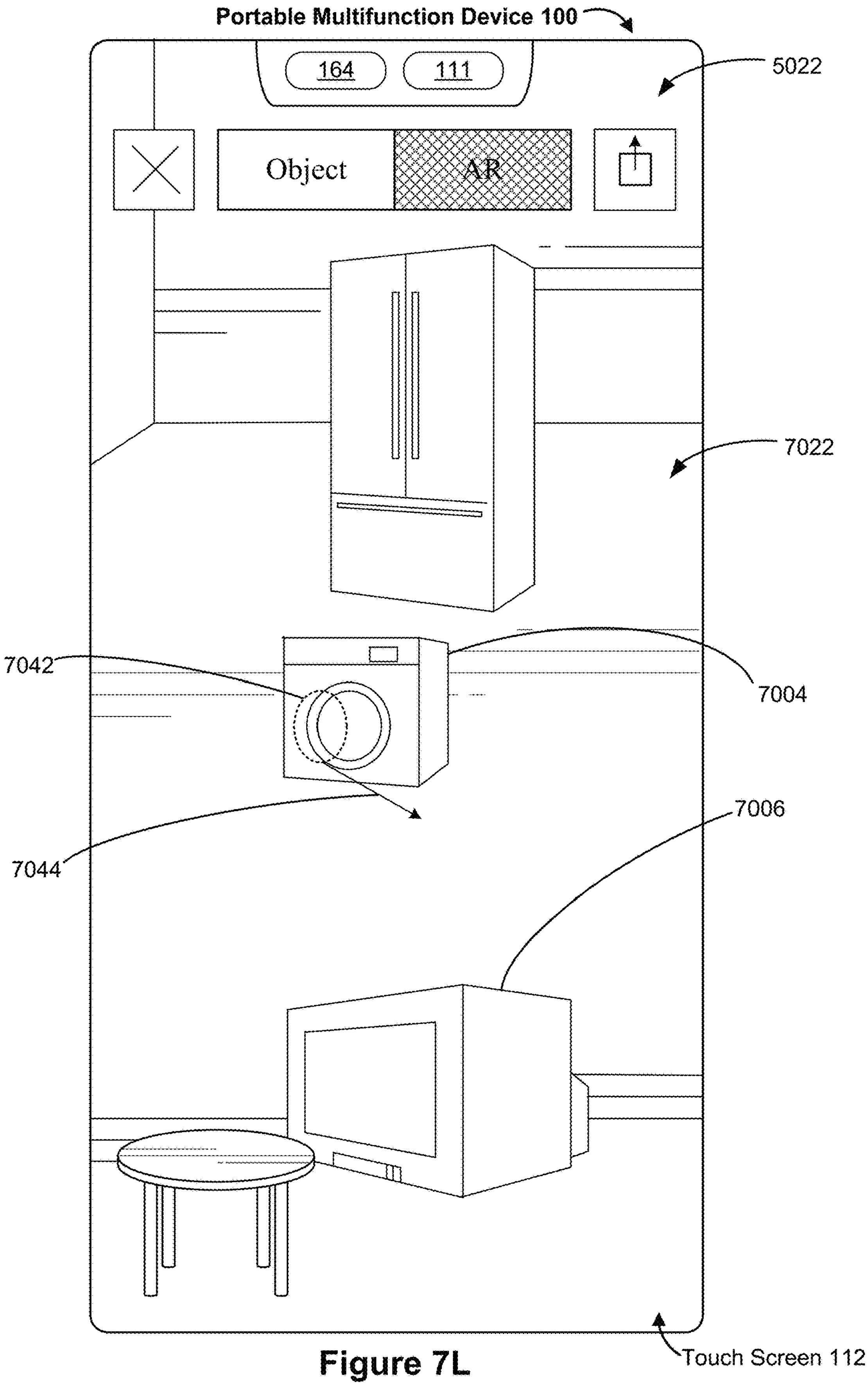

In FIG. 7K, an input (e.g., a downward and leftward swipe input) by contact 7038 is detected at a location that corresponds to virtual object 7006. As contact 7038 moves along a path indicated by arrow 7040, virtual object 7006 moves along plane 7022 in the direction indicated by arrow 7040, as illustrated in FIGS. 7K-7L. As virtual object 7006 moves along plane 7022 toward the user, the size of virtual object 7006 increases.

Figure 7M:
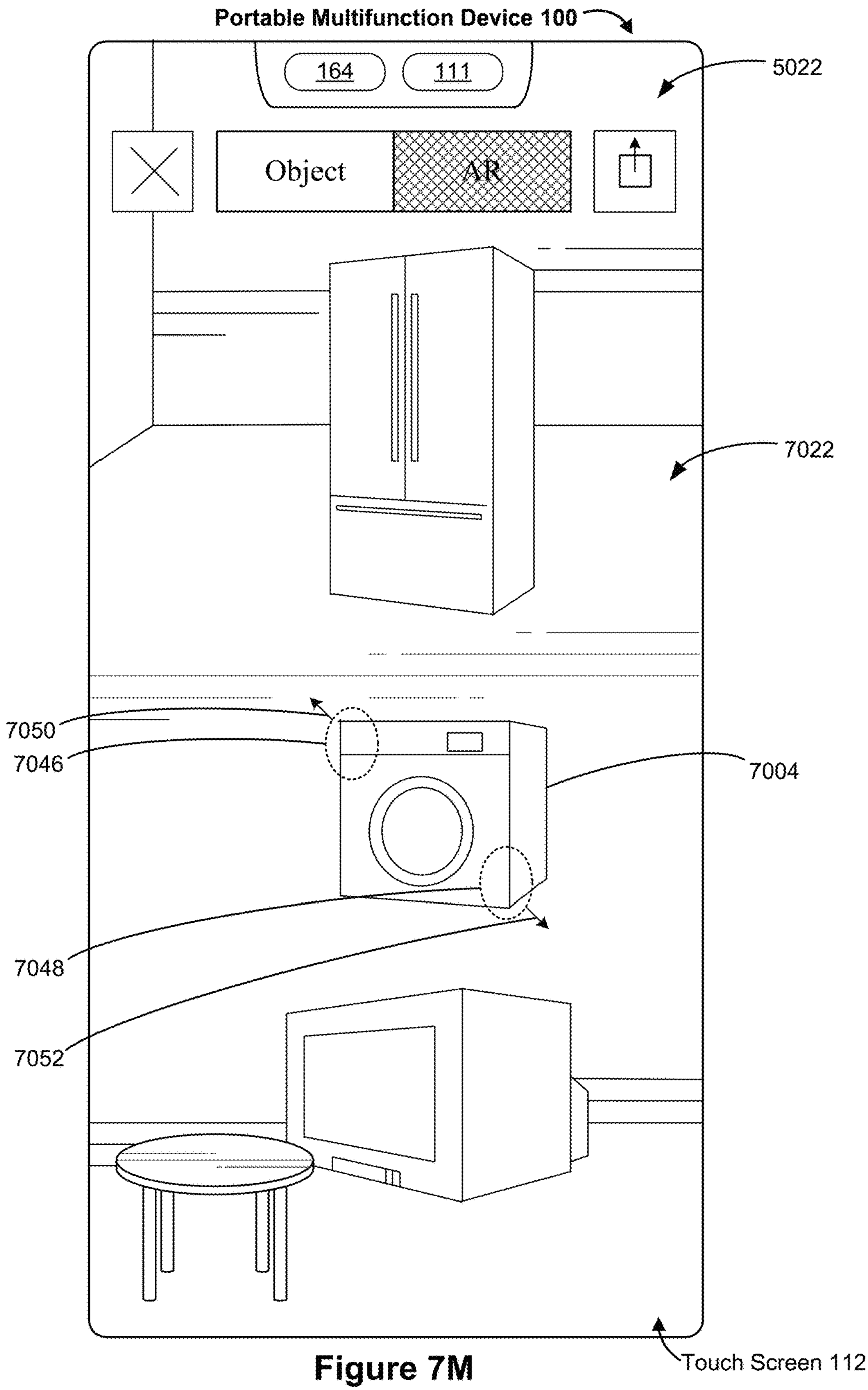

In FIG. 7L, an input (e.g., a downward and rightward swipe input) by contact 7042 is detected at a location that corresponds to virtual object 7004. As contact 7042 moves along a path indicated by arrow 7044, virtual object 7004 moves along plane 7022 in the direction indicated by arrow 7044, as illustrated in FIGS. 7L-7M. As virtual object 7004 moves along plane 7022 toward the user, the size of virtual object 7004 increases.

In FIG. 7M, an input (e.g., a de-pinch gesture) by contacts 7046 and 7048 for changing the simulated physical size of virtual object 7004 is detected. As contact 7046 moves along a path indicated by arrow 7050 and contact 7048 moves along a path indicated by arrow 7052, the size of virtual object 7004 increases, as illustrated in FIGS. 7M-7N.

Figure 7N:
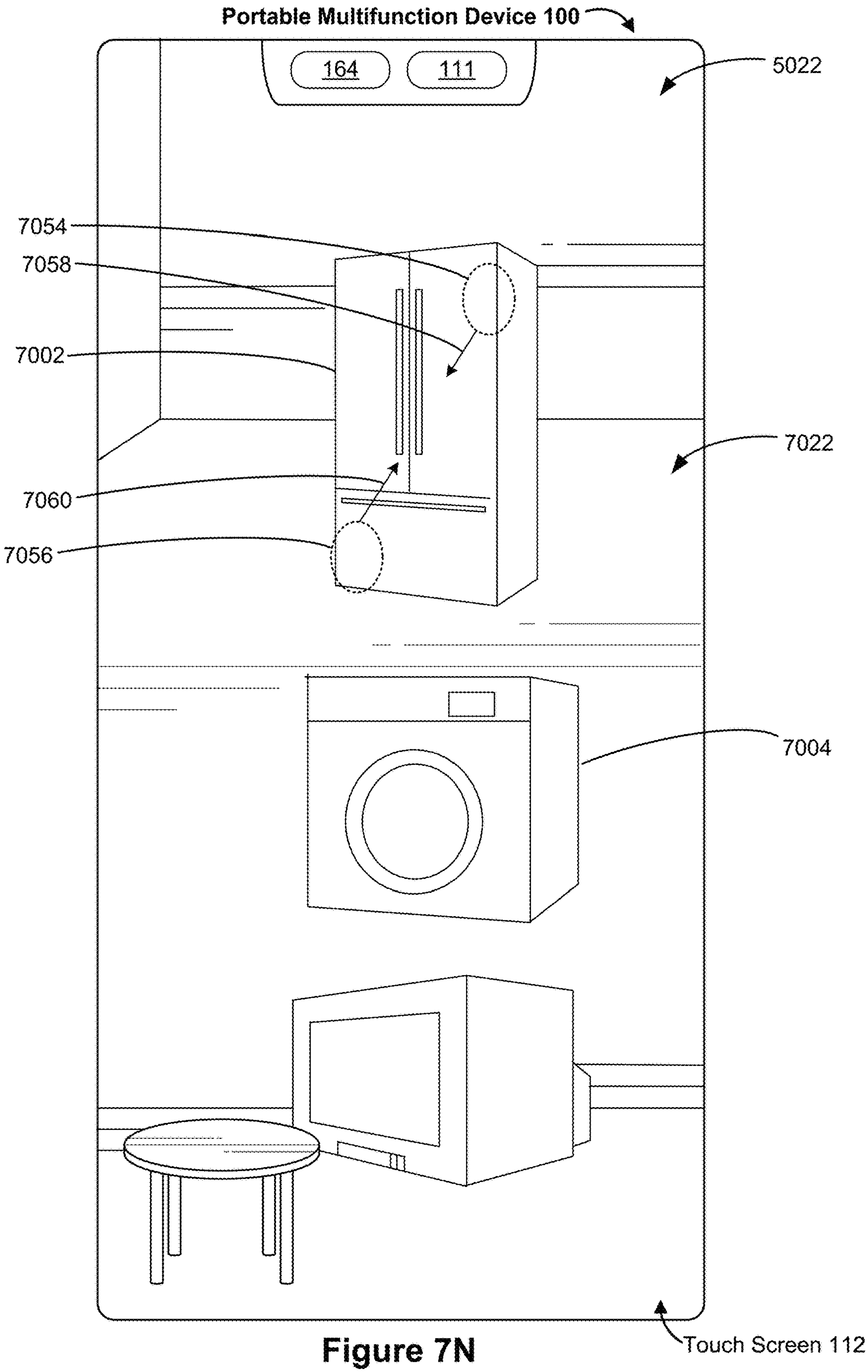

In FIG. 7N, an input (e.g., a pinch gesture) by contacts 7054 and 7056 for changing the simulated physical size of virtual object 7002 is detected. As contact 7054 moves along a path indicated by arrow 7058 and contact 7056 moves along a path indicated by arrow 7060, the size of virtual object 7002 decreases, as illustrated in FIGS. 7N-7O.

Figure 7O:
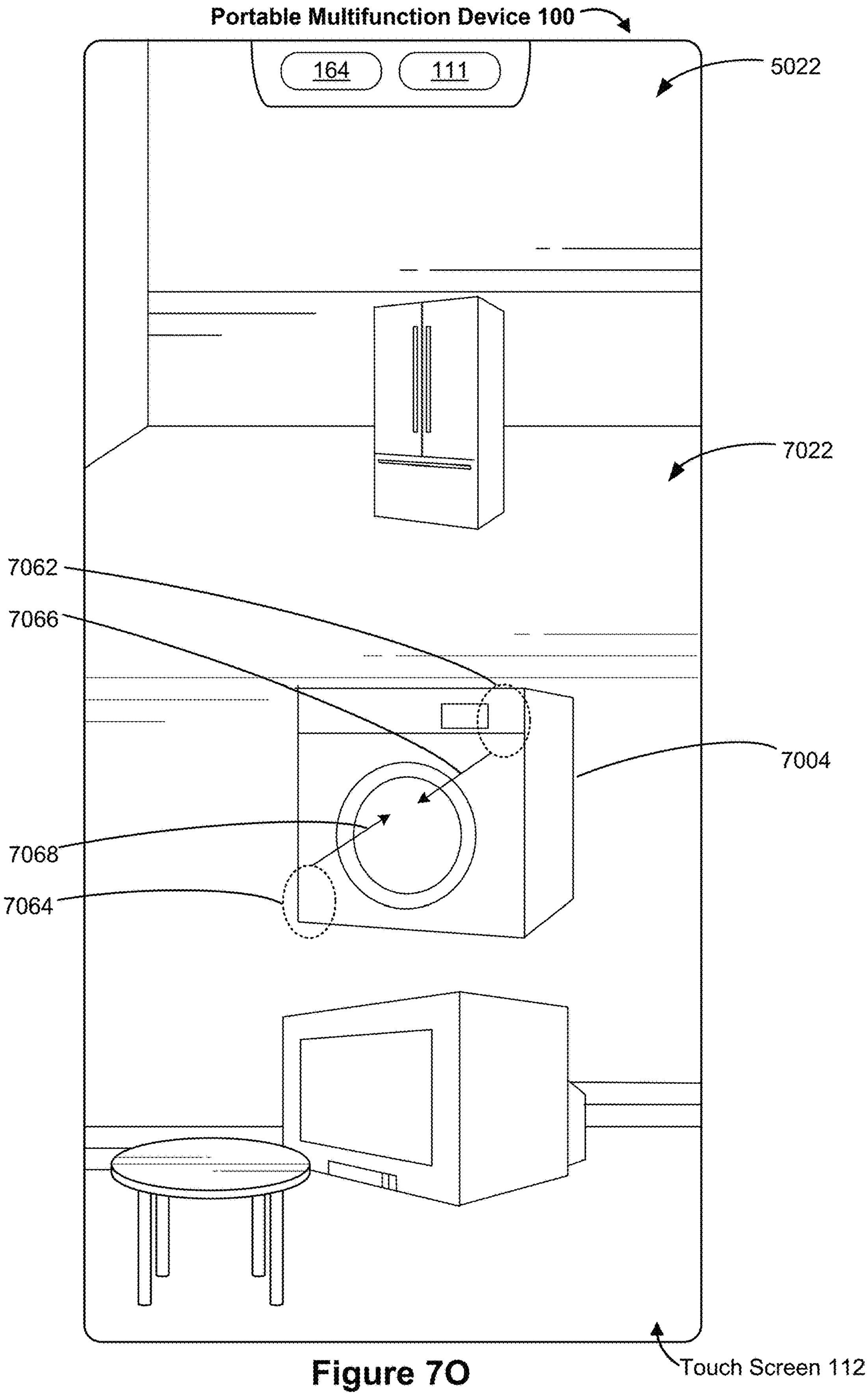

In FIG. 7O, an input (e.g., a pinch gesture) by contacts 7062 and 7064 for changing the simulated physical size of virtual object 7004 is detected. As contact 7062 moves along a path indicated by arrow 7066 and contact 7064 moves along a path indicated by arrow 7068, the size of virtual object 7002 decreases, as illustrated in FIGS. 7O-7P.

Figure 7P:
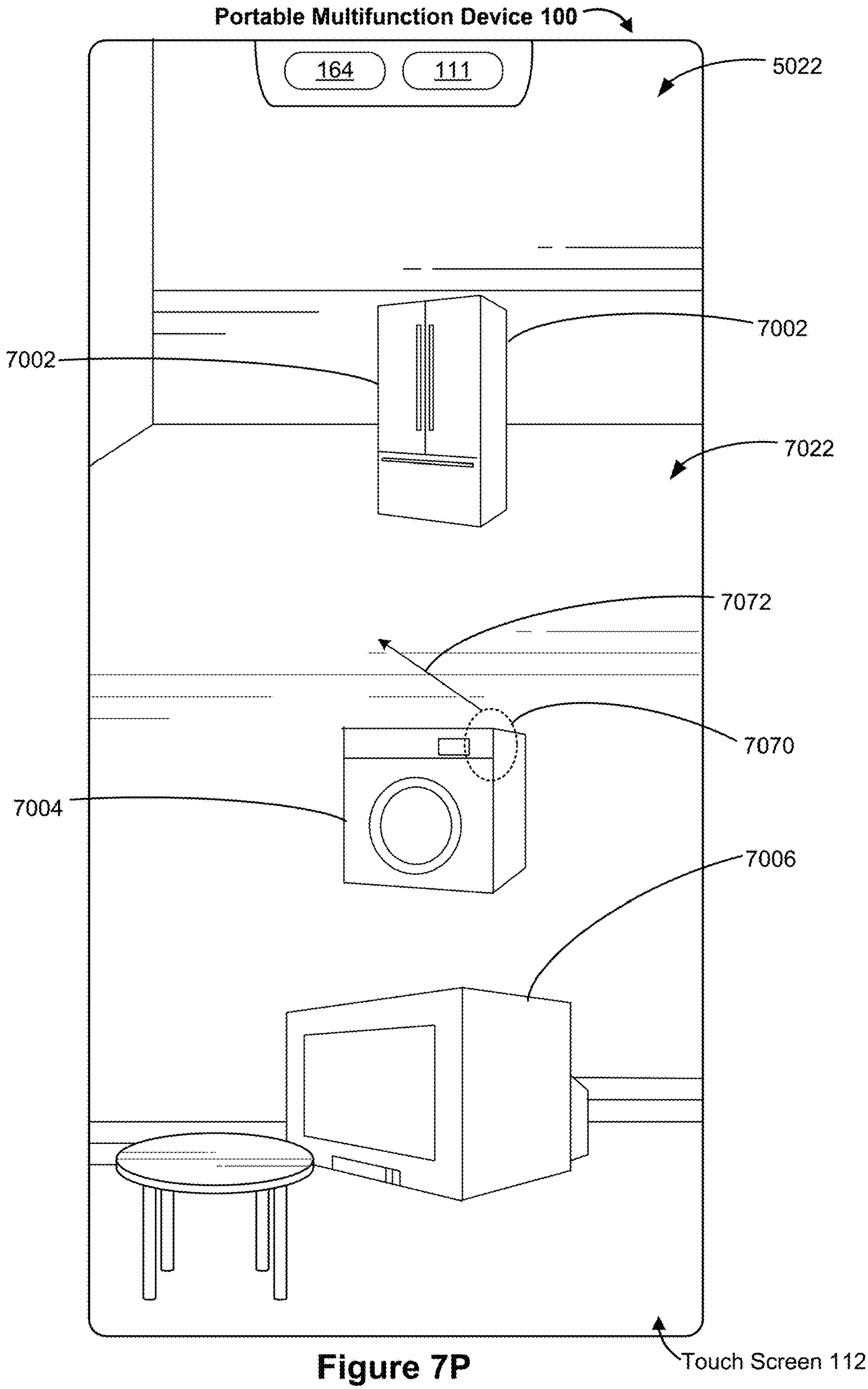
Figure 7Q:
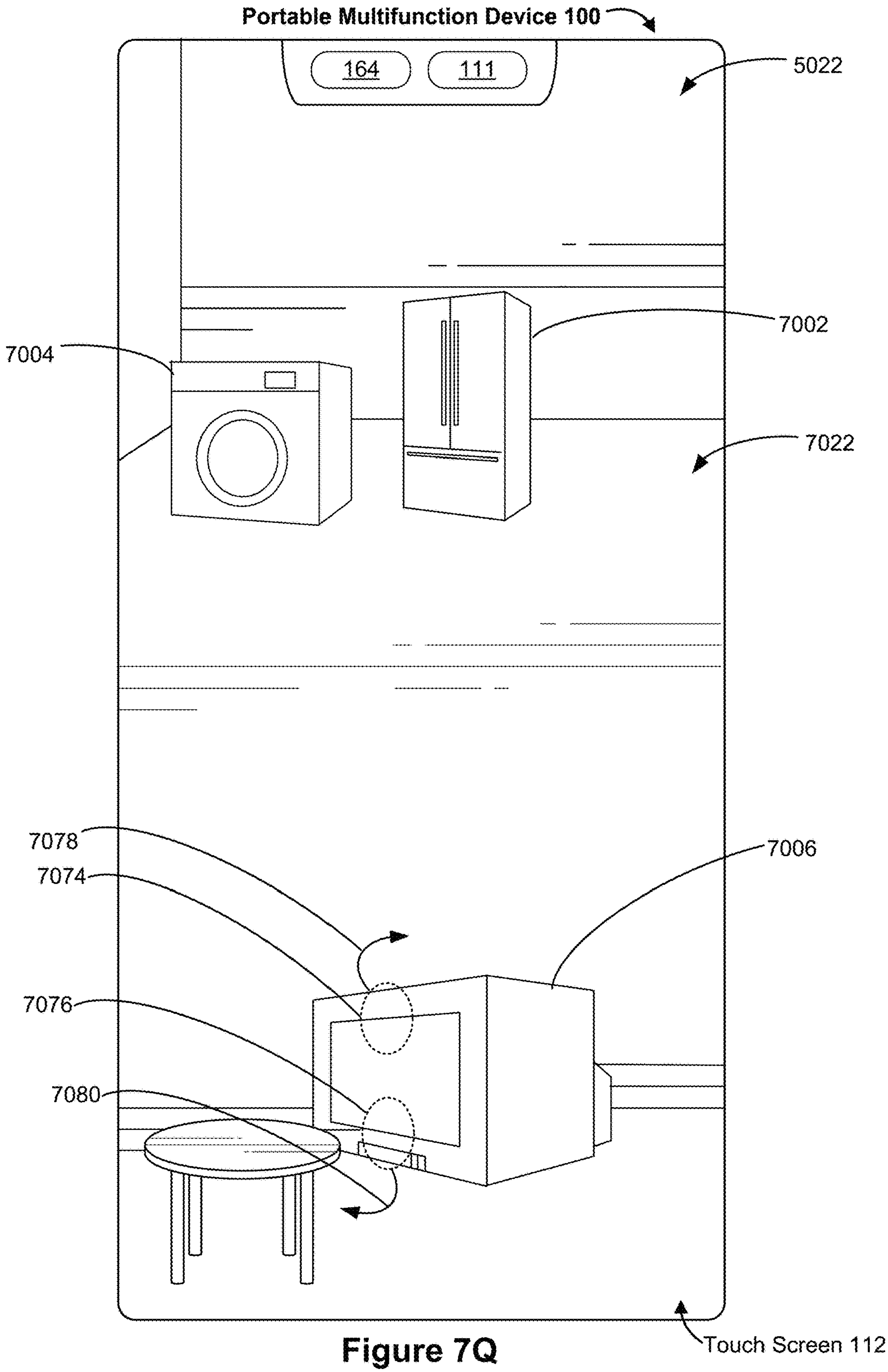

In FIG. 7P, an input (e.g., an upward and leftward swipe input) by contact 7070 is detected at a location that corresponds to virtual object 7004. As contact 7070 moves along a path indicated by arrow 7072, virtual object 7004 moves along plane 7022 in the direction indicated by arrow 7072, as illustrated in FIGS. 7P-7Q. As virtual object 7004 moves along plane 7022 away from the user, the size of virtual object 7004 decreases (e.g., based on a virtual distance from the representation of the virtual object to the user, to maintain an accurate perspective of the virtual object in the field of view).

Figure 7R:
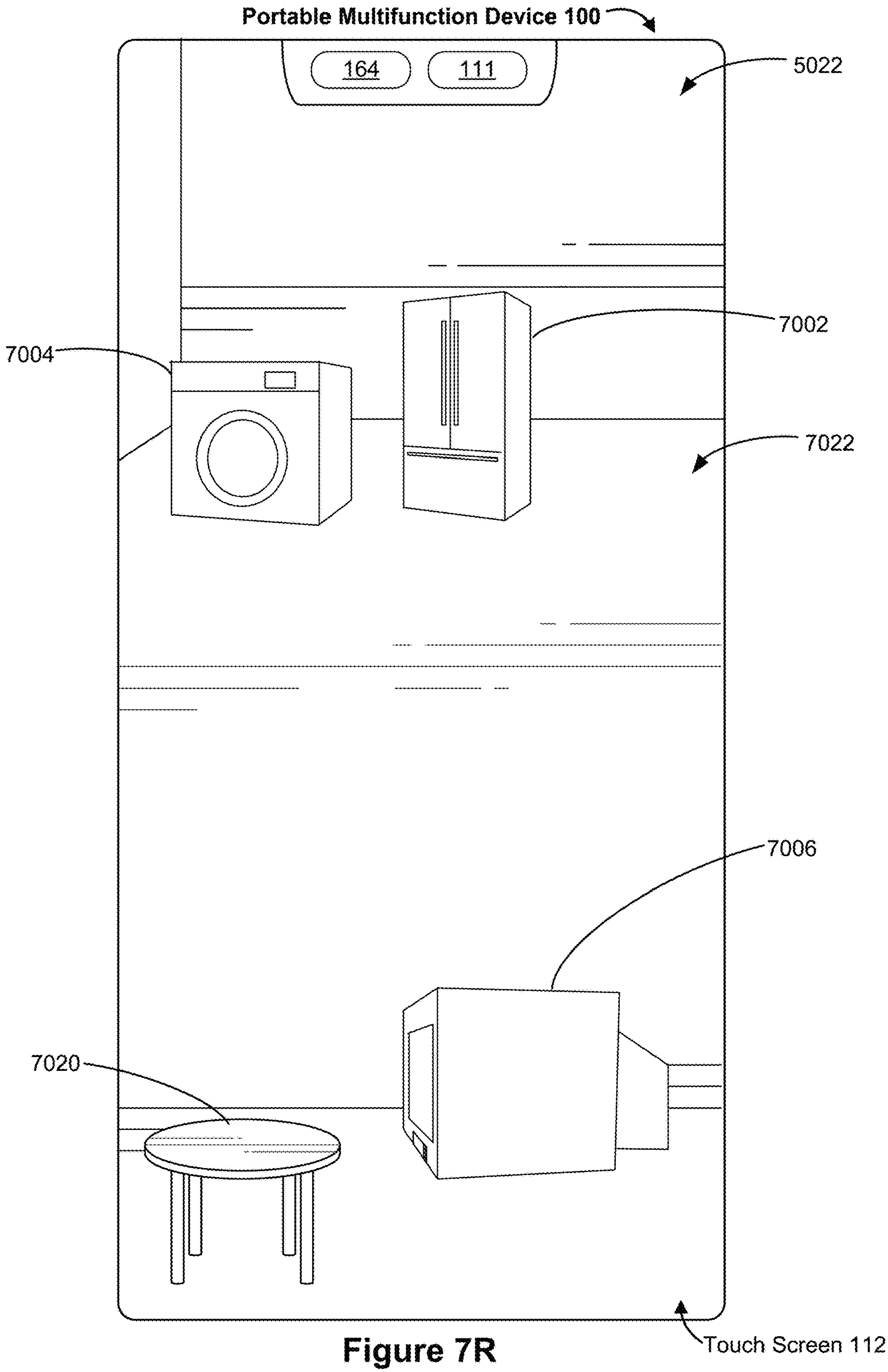
Figure 7S:
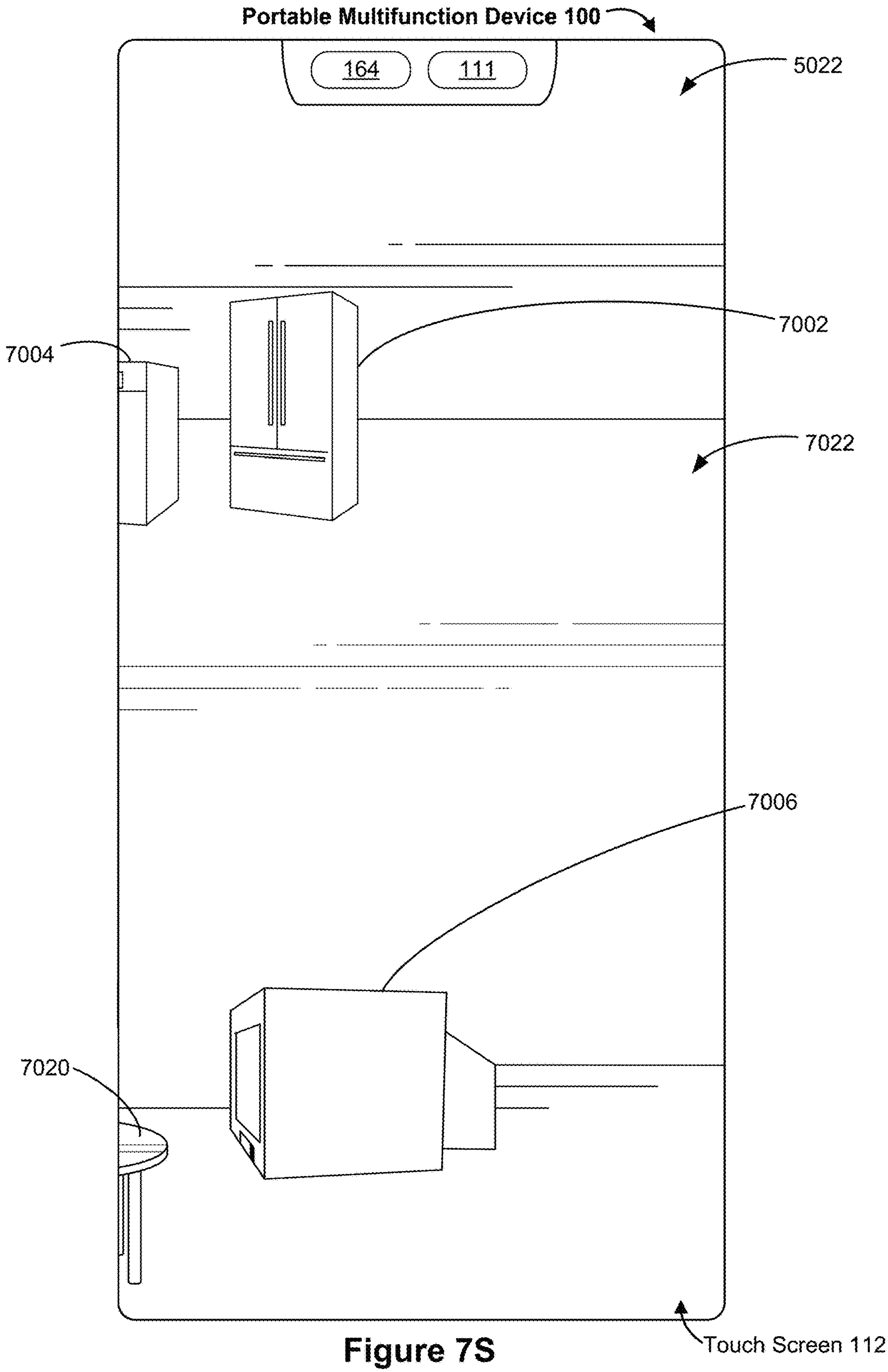

In FIG. 7Q, an input (e.g., a rotation gesture) by contacts 7074 and 7076 for changing the simulated orientation of virtual object 7006 is detected. As contact 7074 moves along a path indicated by arrow 7078 and contact 7076 moves along a path indicated by arrow 7080, virtual object 7006 rotates about an axis that is perpendicular to plane 7022 relative to which virtual object 7006 is positioned, as illustrated in FIGS. 7Q-R From FIG. 7R to FIG. 7S and from FIG. 7S to FIG. 7T, as device 100 is moved relative to the physical environment (as indicated by, e.g., the changed position of physical table 7020 in the field of view of the cameras), virtual objects 7002, 7004 and 7006 remain at fixed positions relative to plane 7022 in the physical environment (e.g., the positions of virtual objects 7002, 7004, and 7006 move with the physical environment as the view of the physical environment changes).

Figure 7T:
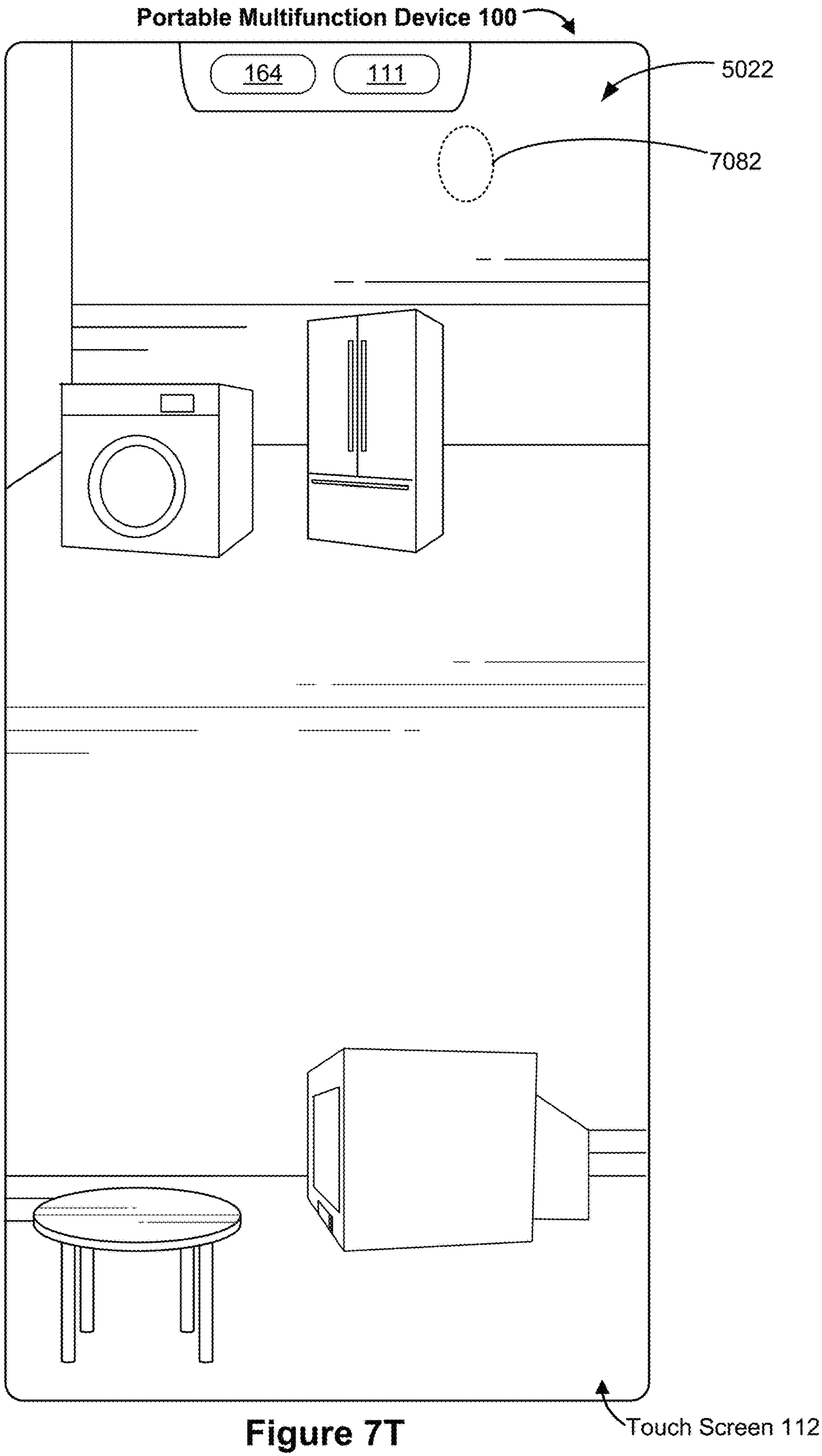

In FIG. 7T, an input (e.g., a tap input) by contact 7082 is detected in the augmented reality user interface 5022. In response to the input, toggle control 5008, cancel control 5006, and share control 5010 are displayed, as shown in FIG. 7U.

Figure 7U:
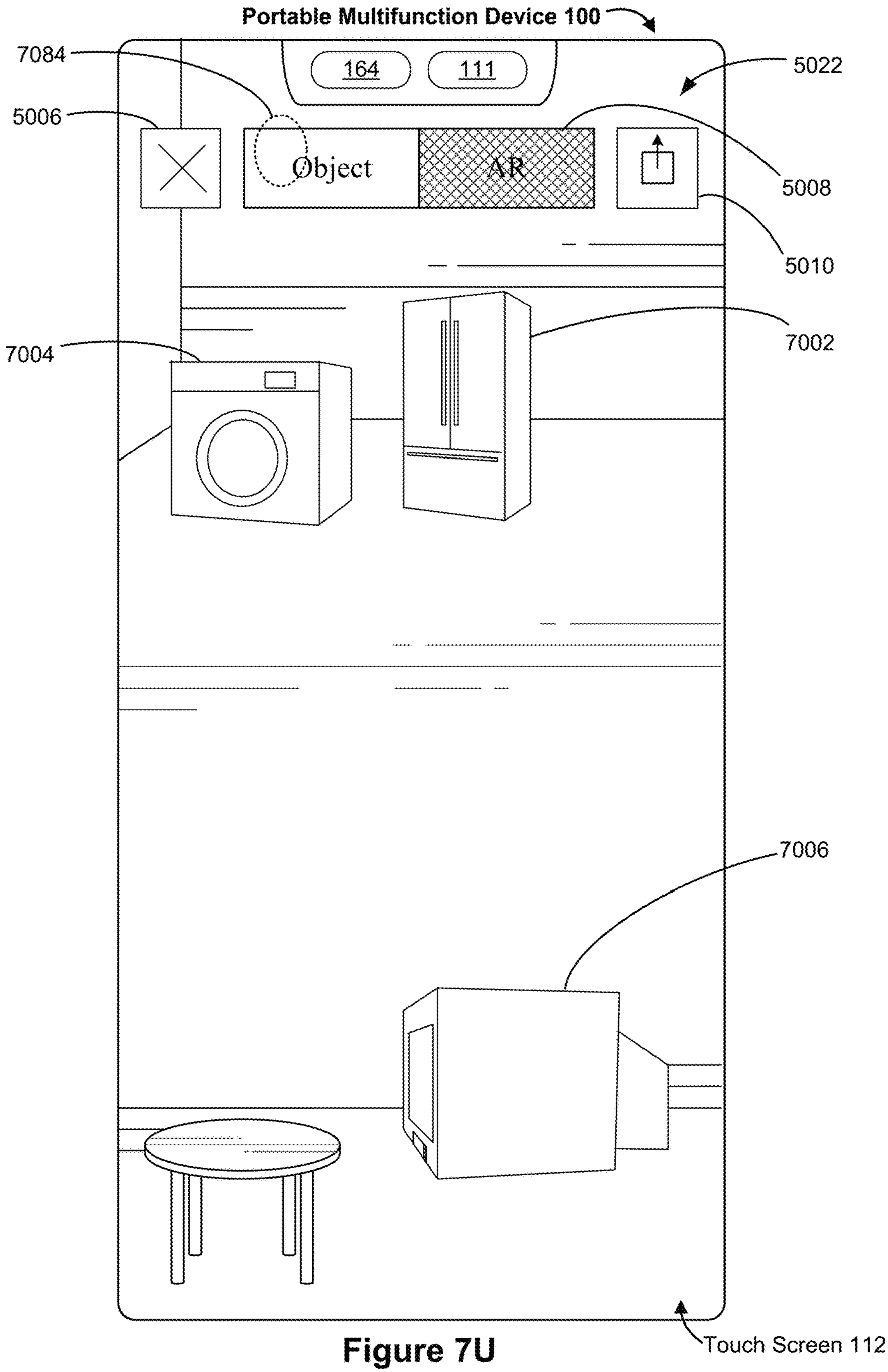
Figure 7V:
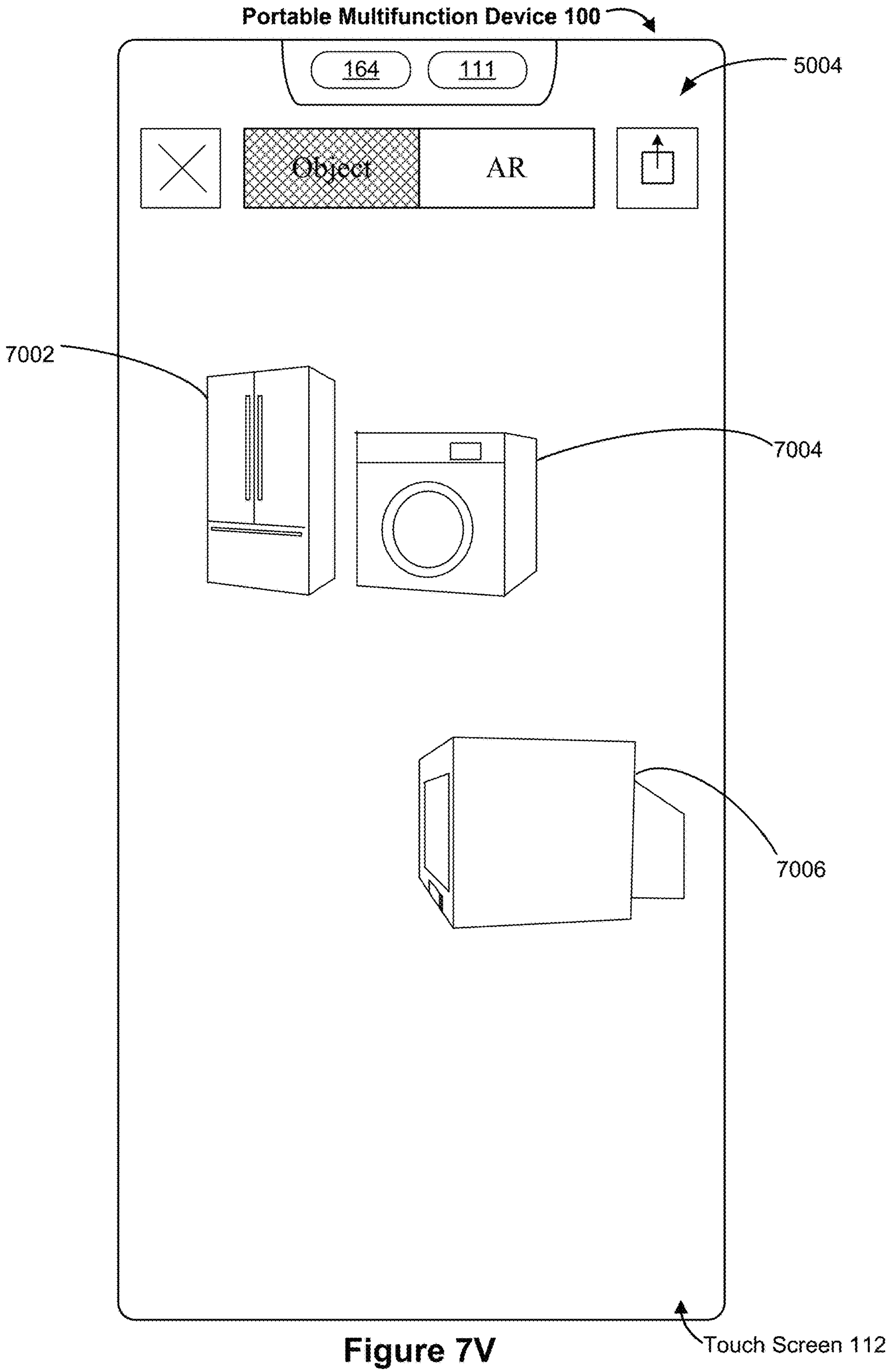
Figure 7W:
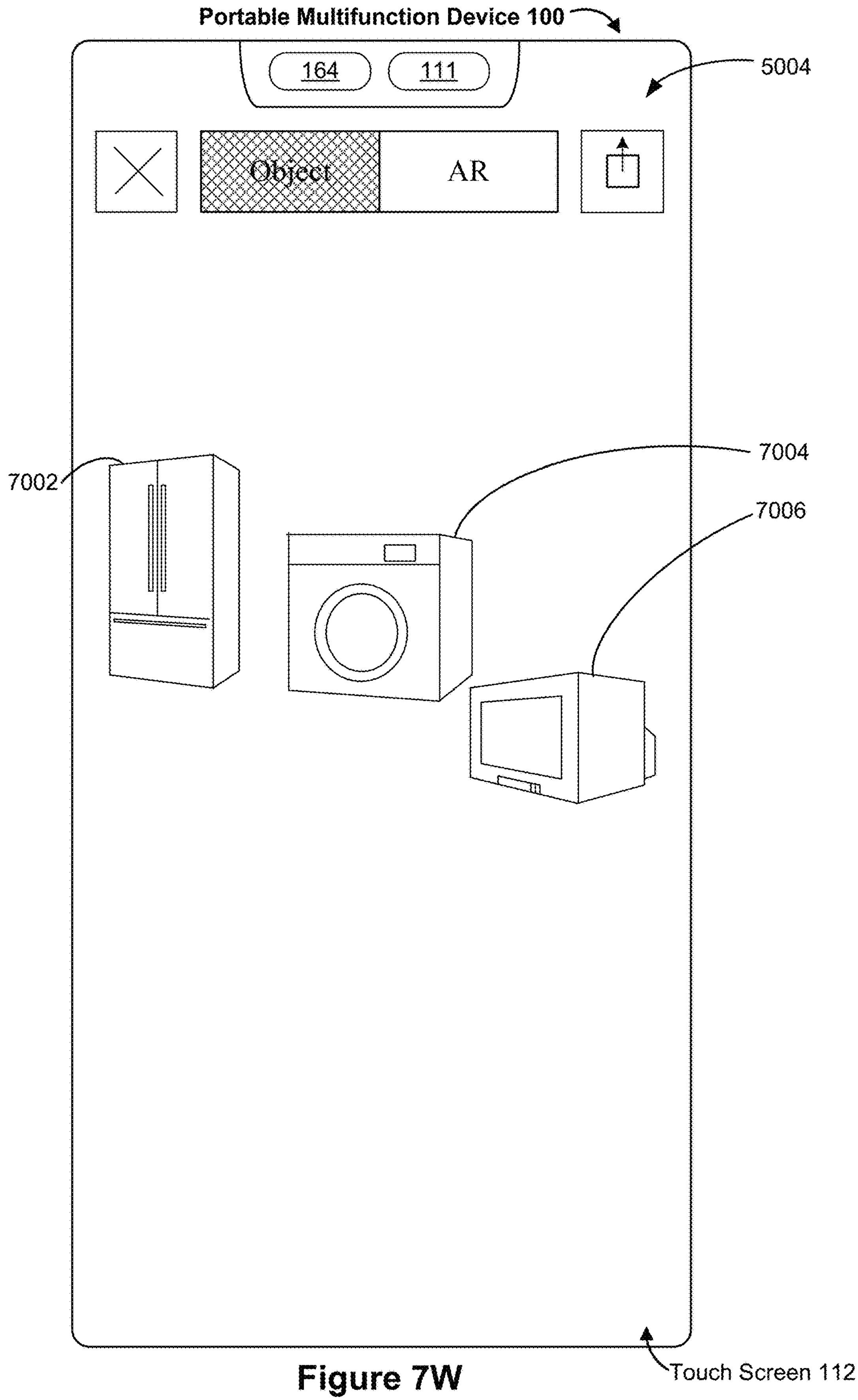

In FIG. 7U, an input (e.g., a tap input) by contact 7084 is detected at a location that corresponds to the "Object" region of toggle control 5008. In response to the input, display of virtual objects 7002, 7004 and 7006 in augmented reality user interface 5022 is replaced by display of virtual objects 7002, 7004 and 7006 in object staging view 5004, as illustrated in FIGS. 7U, 7V, 7W, and 7X. As the transition from displaying virtual objects 7002, 7004 and 7006 in augmented reality user interface 5022 to displaying virtual objects 7002, 7004 and 7006 in object staging view 5004 occurs, the device displays an animated transition showing virtual objects 7002, 7004 and 7006 moving (e.g., rotating, scaling, translating, and/or a combination of the above) back to a predefined configuration (e.g., predefined order, positions, orientations, and/or sizes) of the virtual objects 7002, 7004 and 7006 (as previously displayed in object user interface 5004 in FIG. 7A). For example, from FIG. 7U to FIG. 7X: virtual object 7002 moves downward and to the left to the position in which virtual object 7002 was previously displayed in FIG. 7A; virtual object 7004 moves downward and to the right to the position in which virtual object 7004 was previously displayed in FIG. 7A; and virtual object 7006 moves upward, to the right, and rotates counter-clockwise to the position and orientation in which virtual object 7006 was previously displayed in FIG. 7A. In some embodiments, while virtual objects 7002, 7004 and 7006 are displayed in object staging view 5004, the virtual object are displayed ordered by height (e.g., in decreasing height order) and/or with equal spacing between the displayed virtual objects.

Figure 7X:
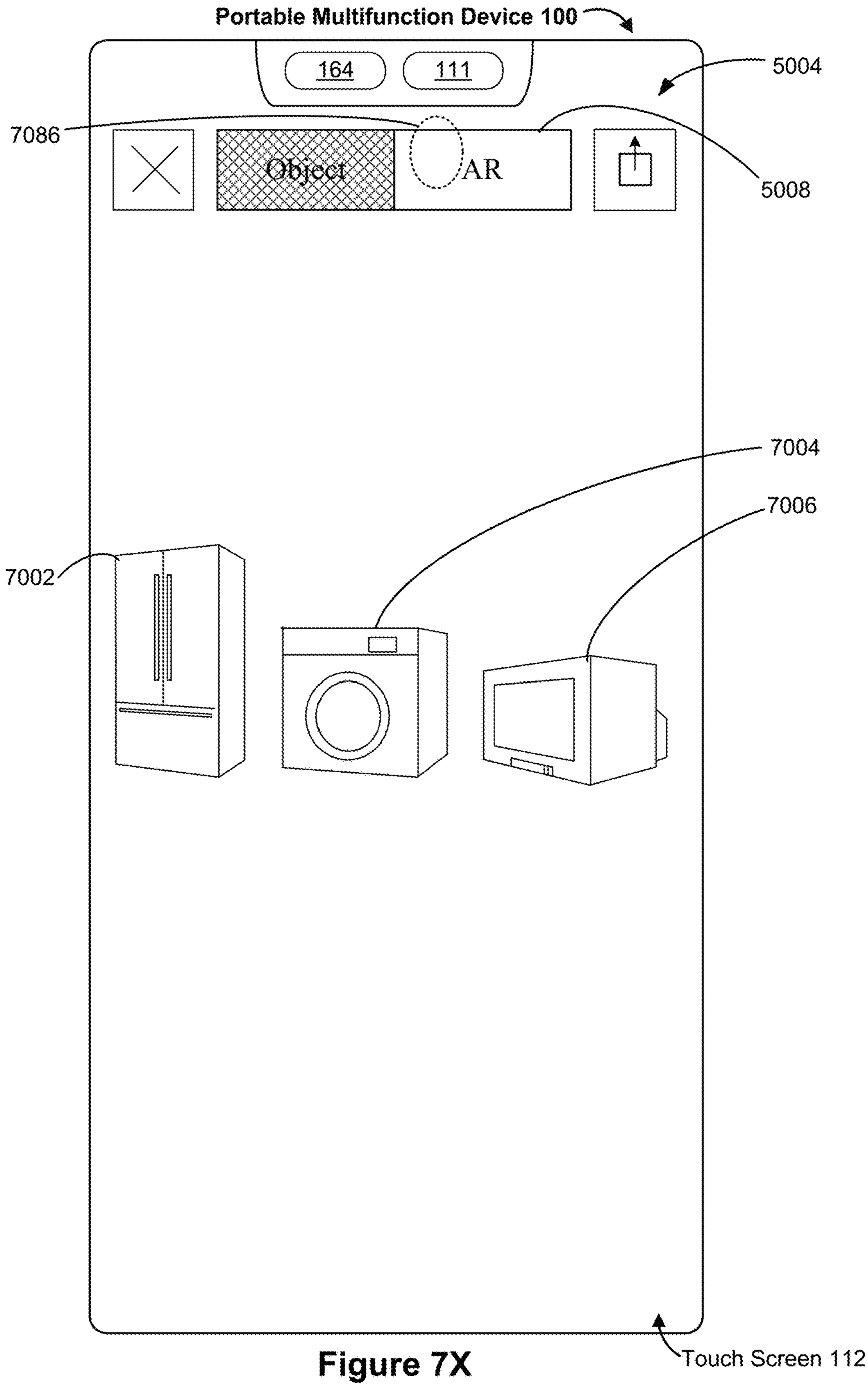
Figure 7Y:
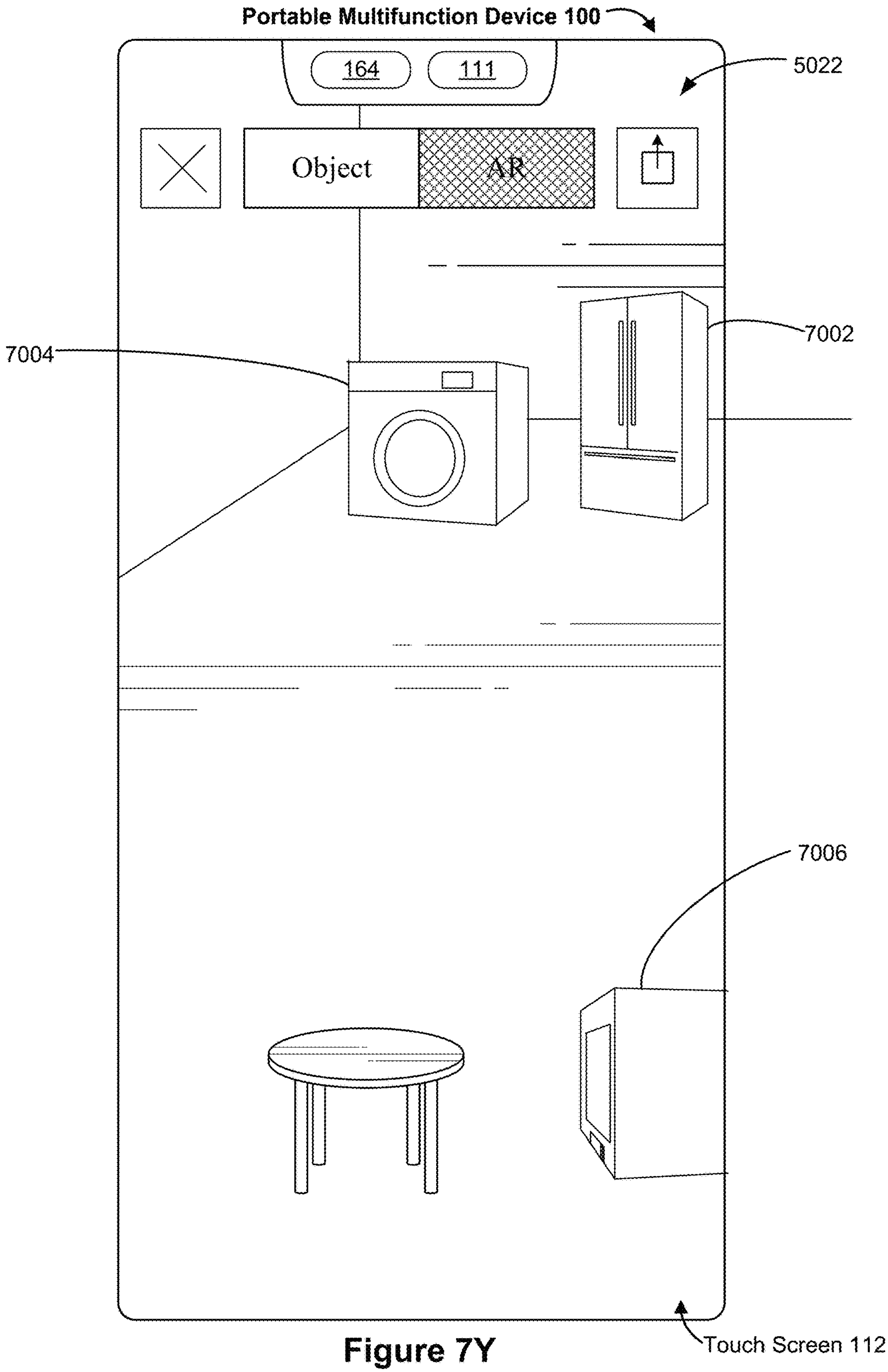

In FIG. 7X, an input (e.g., a tap input) by contact 7086 is detected at a location that corresponds to the "Object" region of toggle control 5008. In response to the input, display of virtual objects 7002, 7004 and 7006 in object staging view 5004 is replaced by display of virtual objects 7002, 7004 and 7006 in augmented reality user interface 5022, as illustrated in FIGS. 7X-7Y. In FIG. 7Y, virtual objects 7002, 7004 and 7006 are displayed in accordance with positions, orientations, and sizes that resulted from adjustments previously made to of virtual objects 7002, 7004 and 7006 as described with regard to FIGS. 7H-7R.

Figure 7Z:
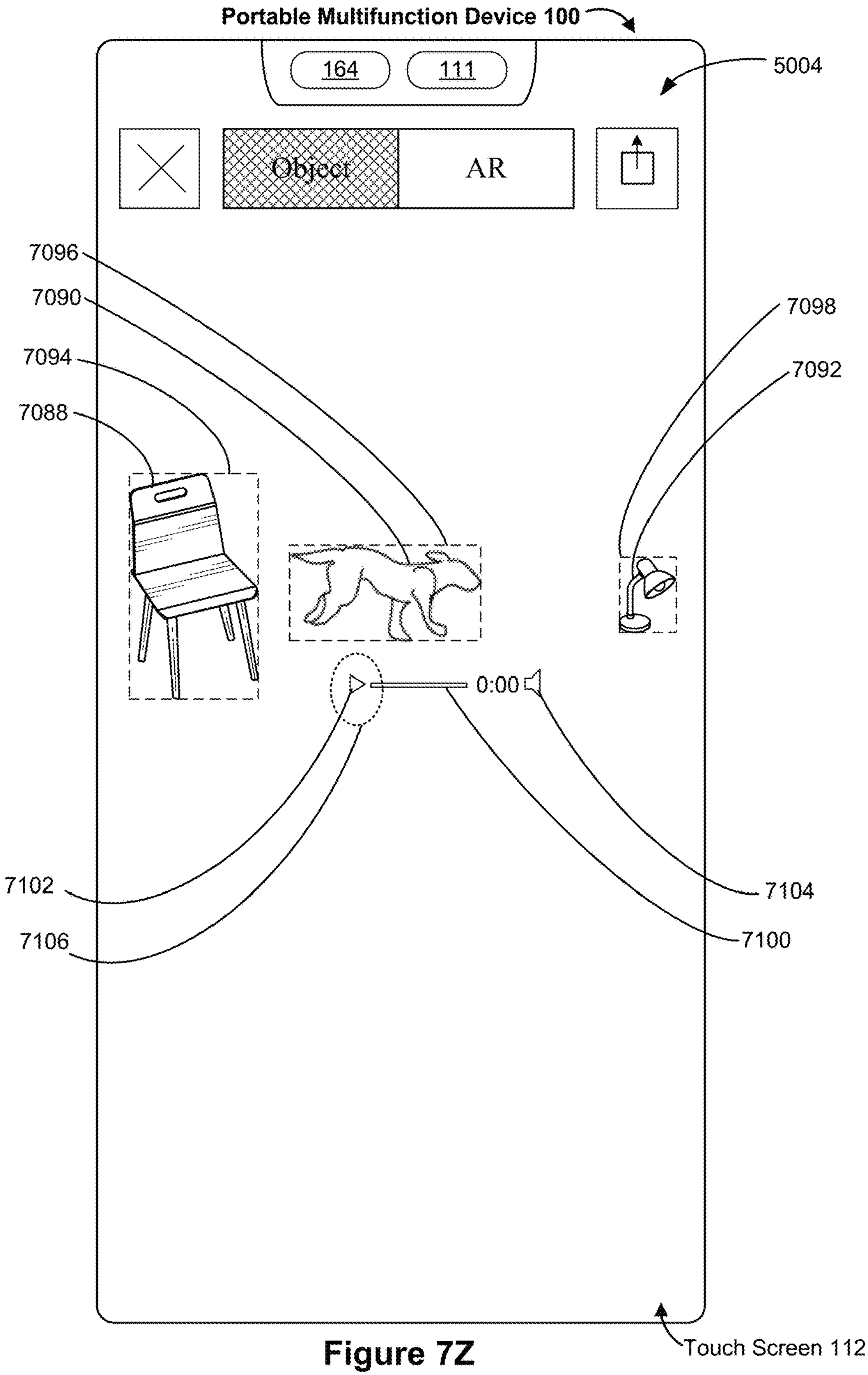
Figure 7A:
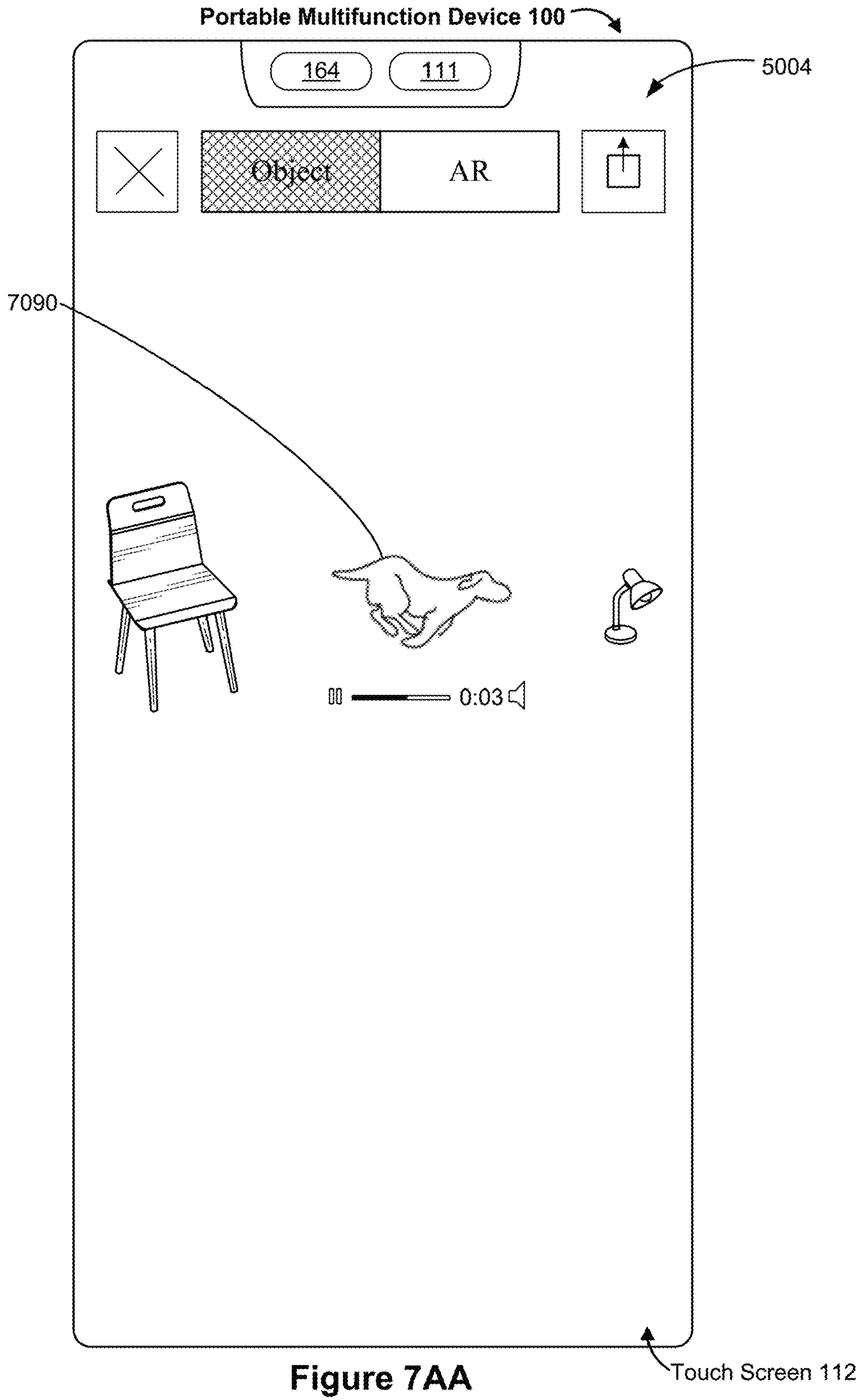
Figure 7A:
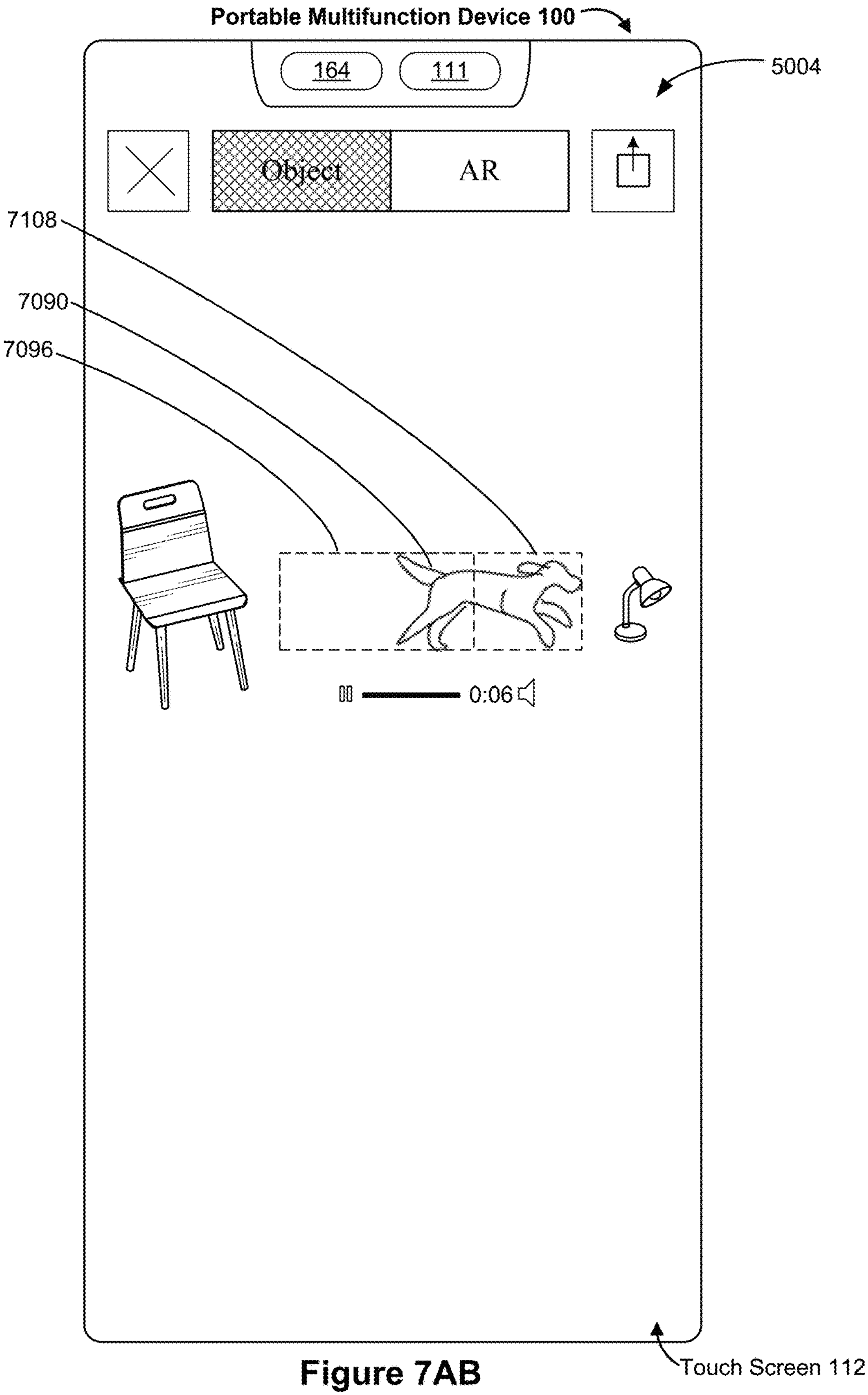
Figure 7A:
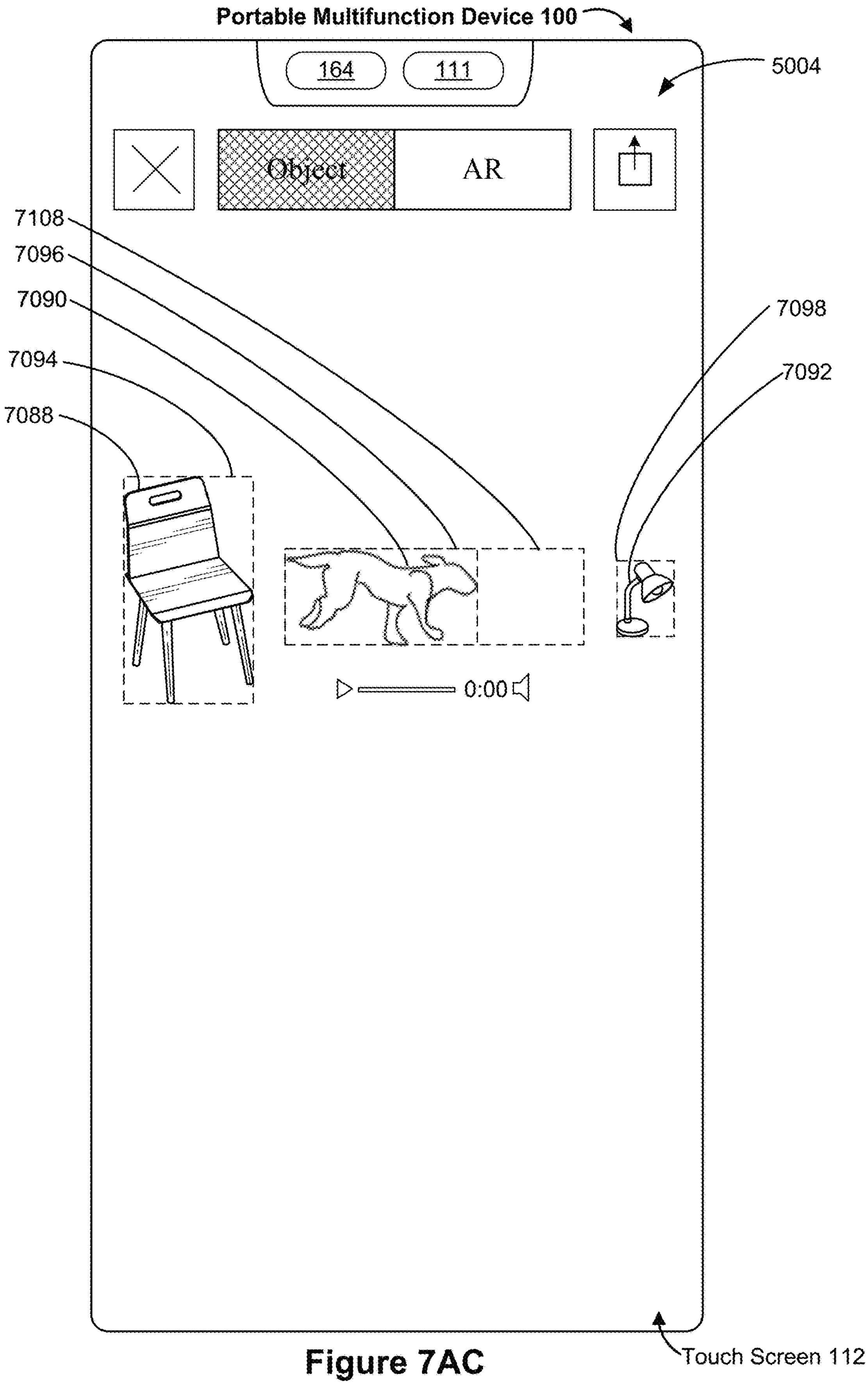
Figure 7A:
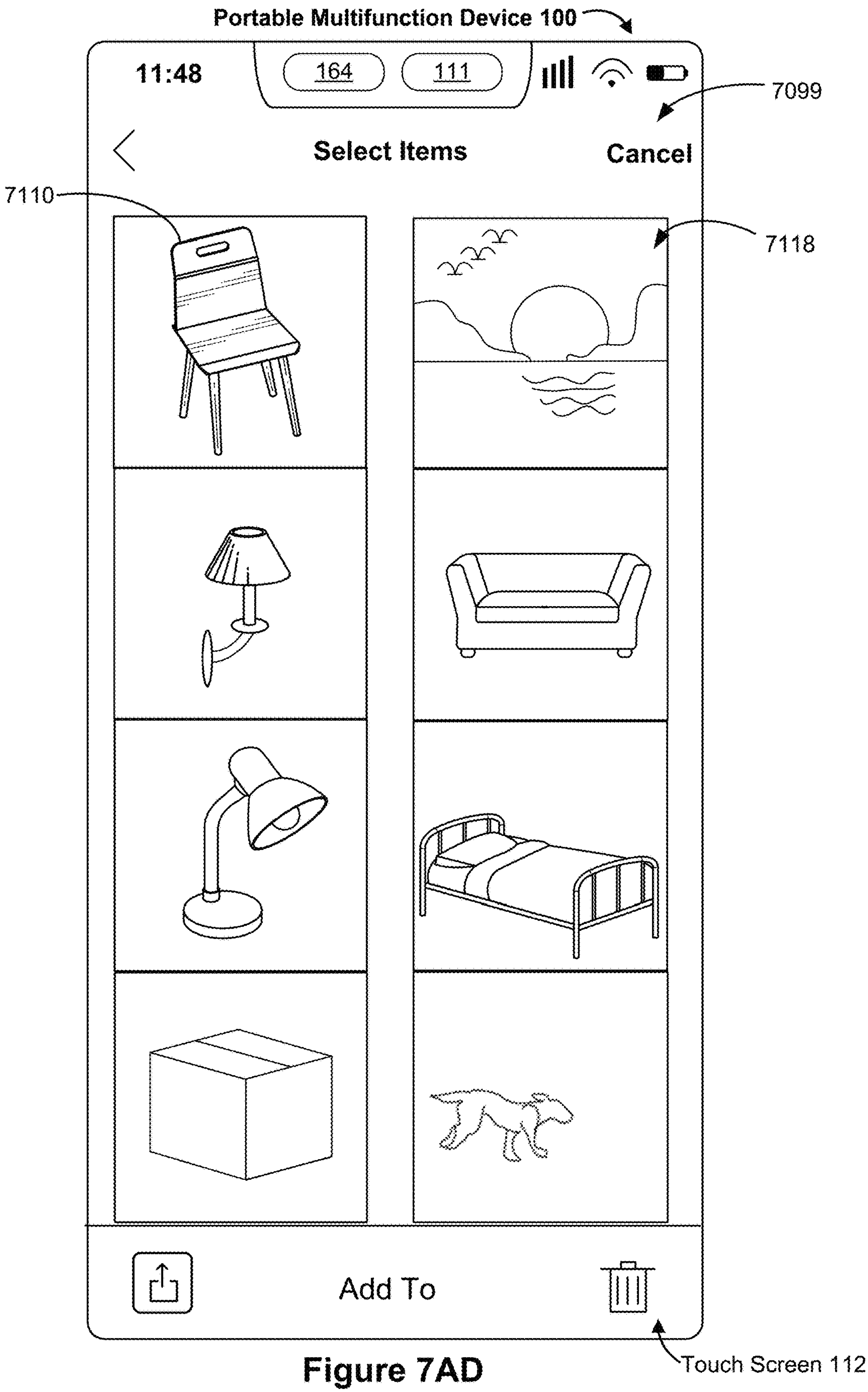
Figure 7A:
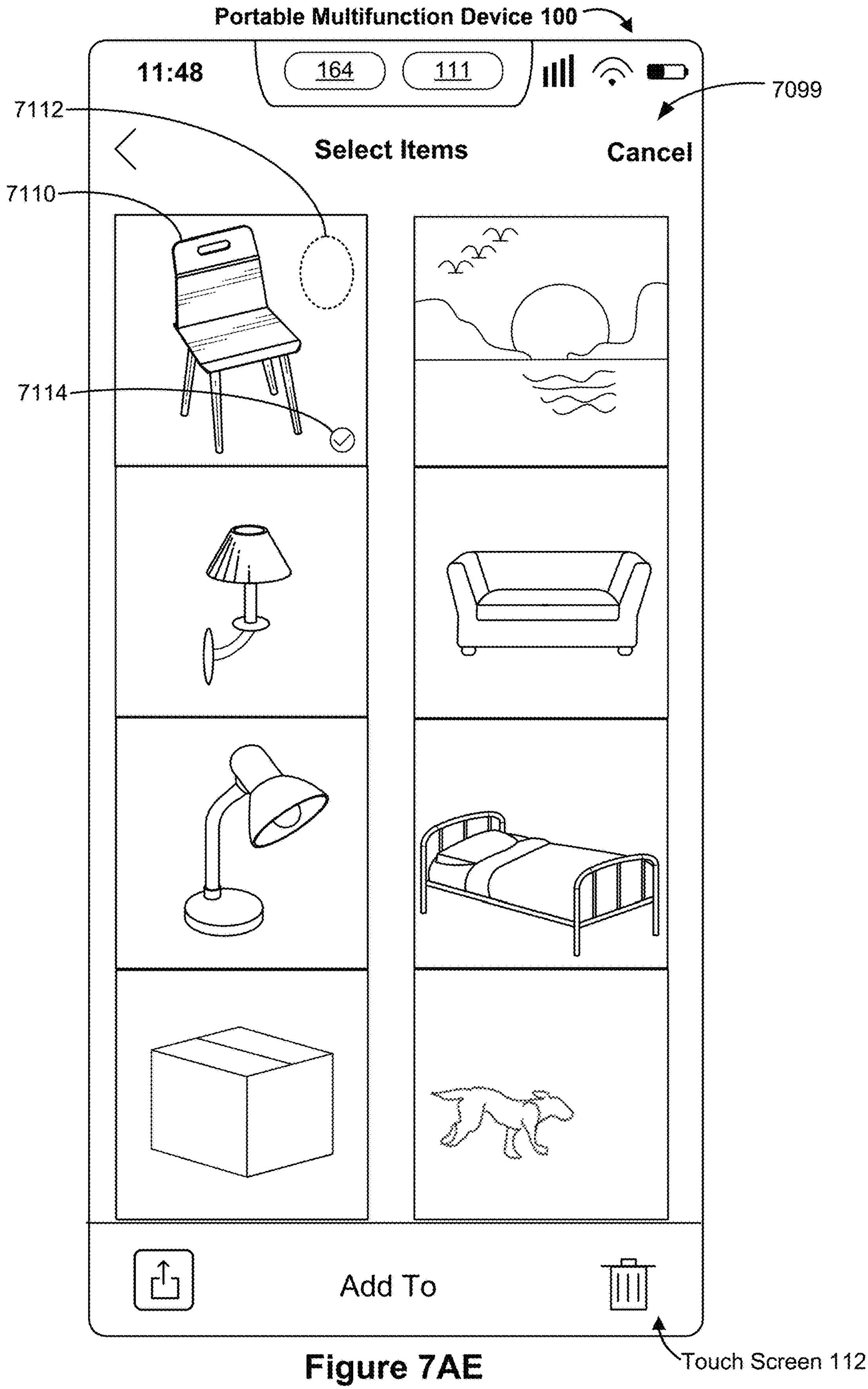
Figure 7A:
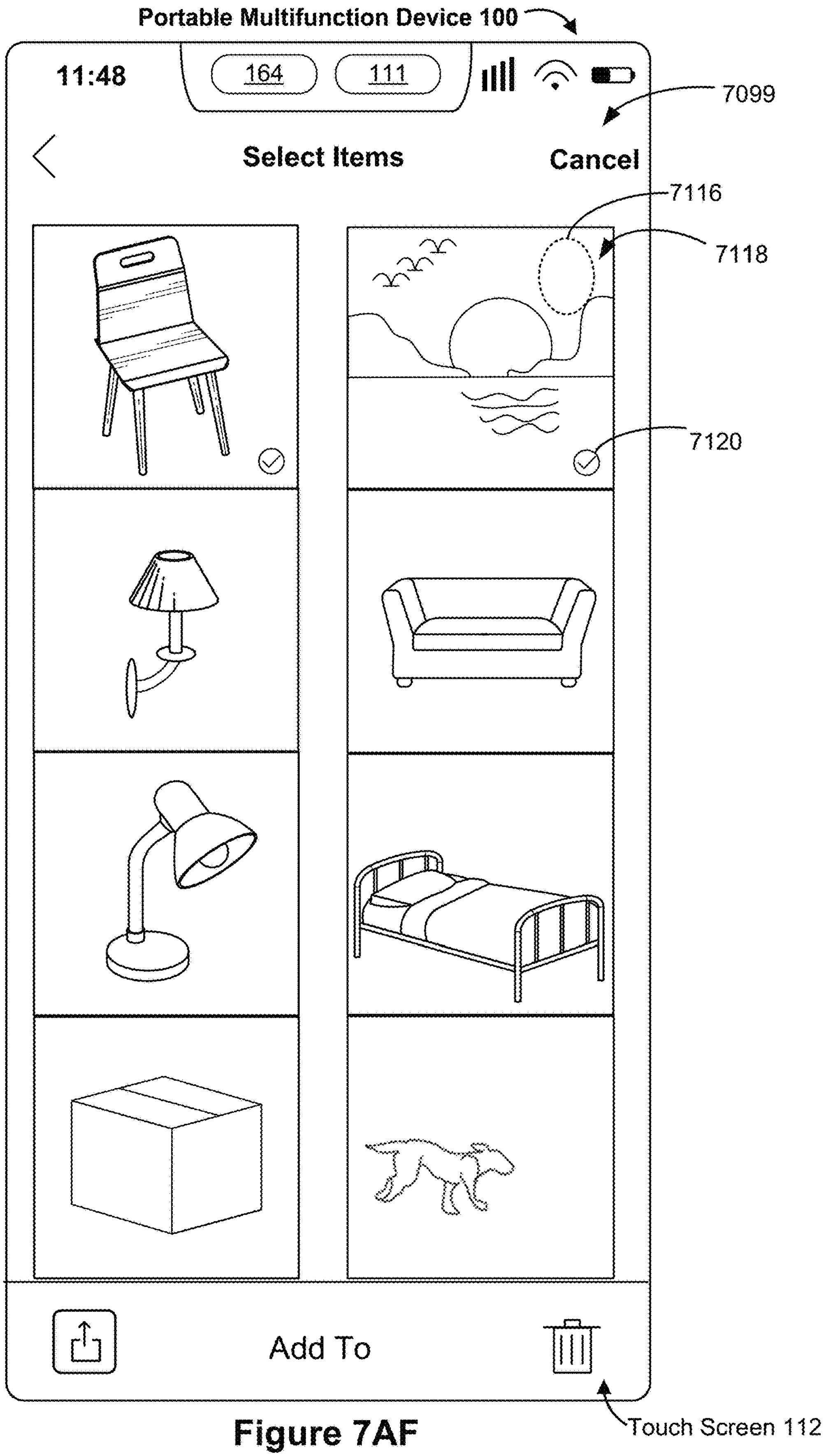
Figure 7A:
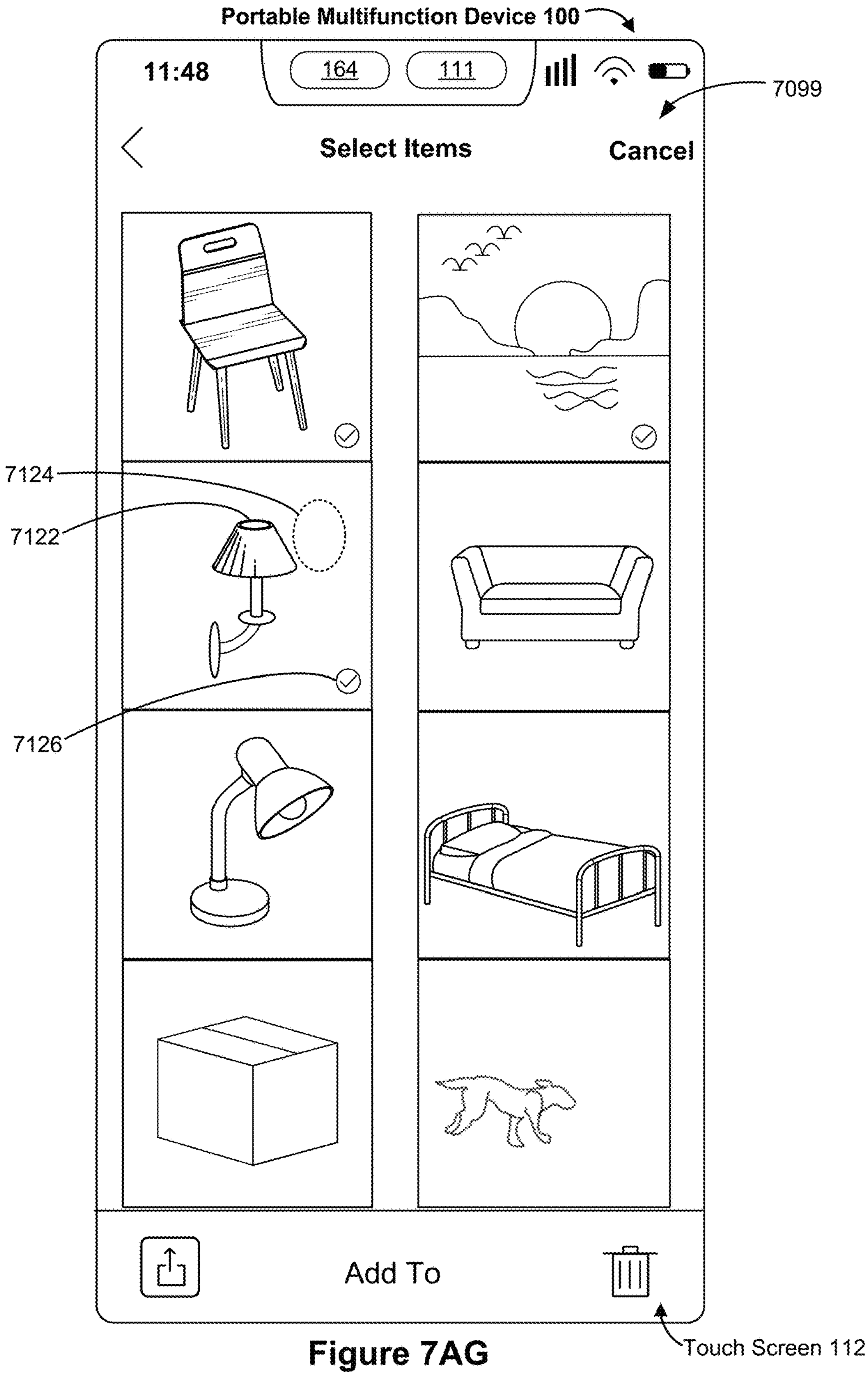
Figure 7A:
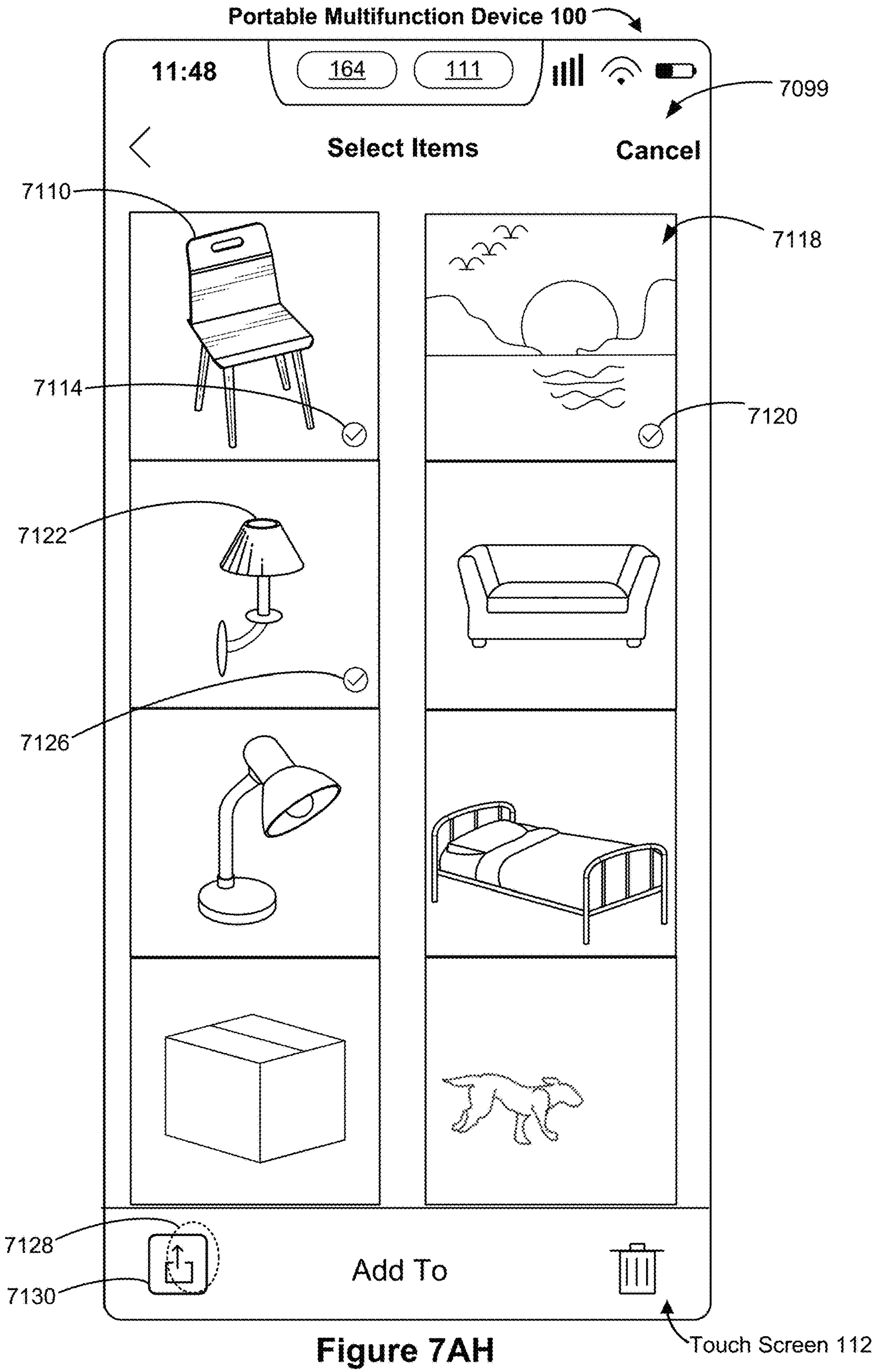
Figure 7A:
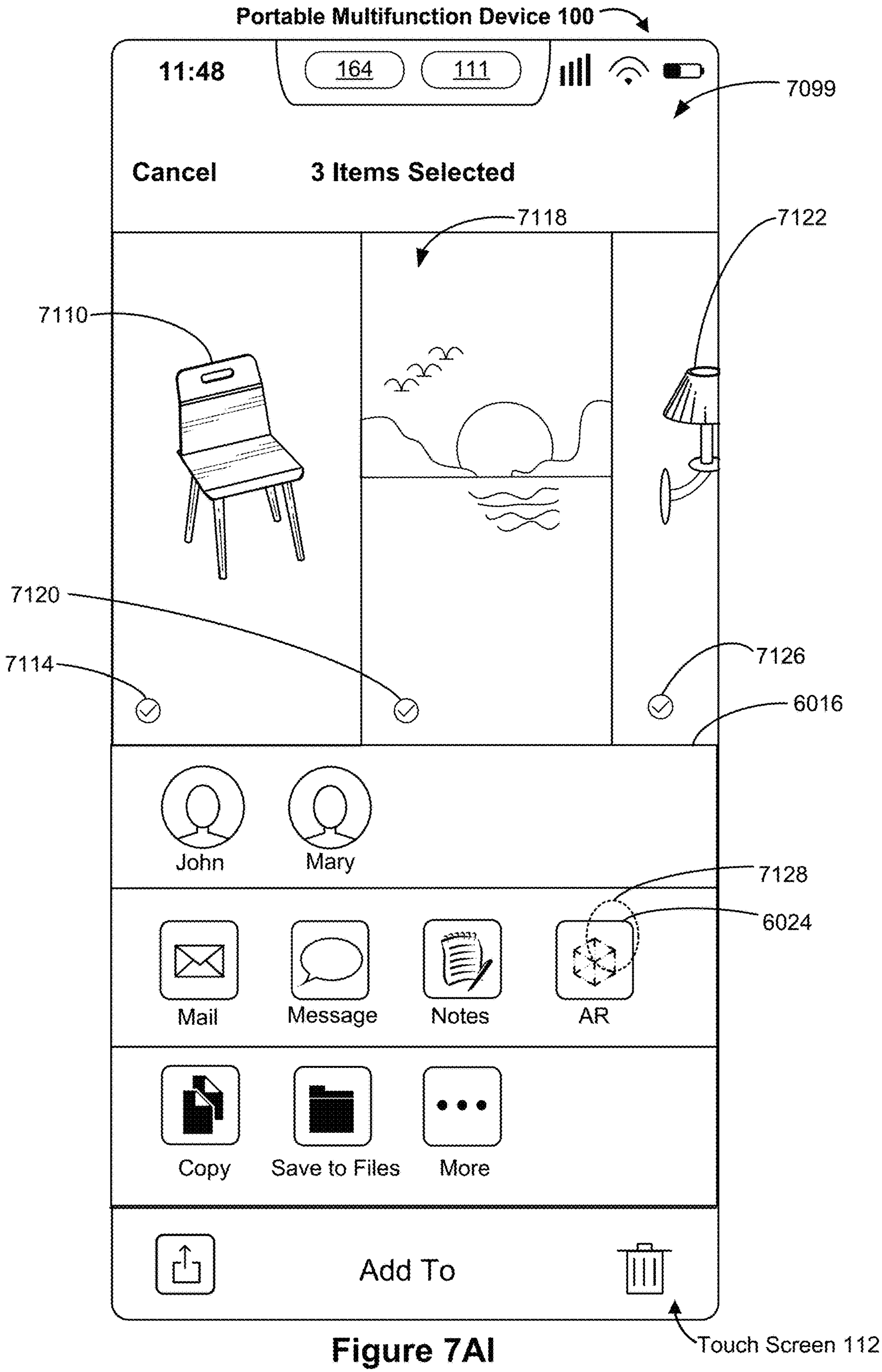
Figure 7A:
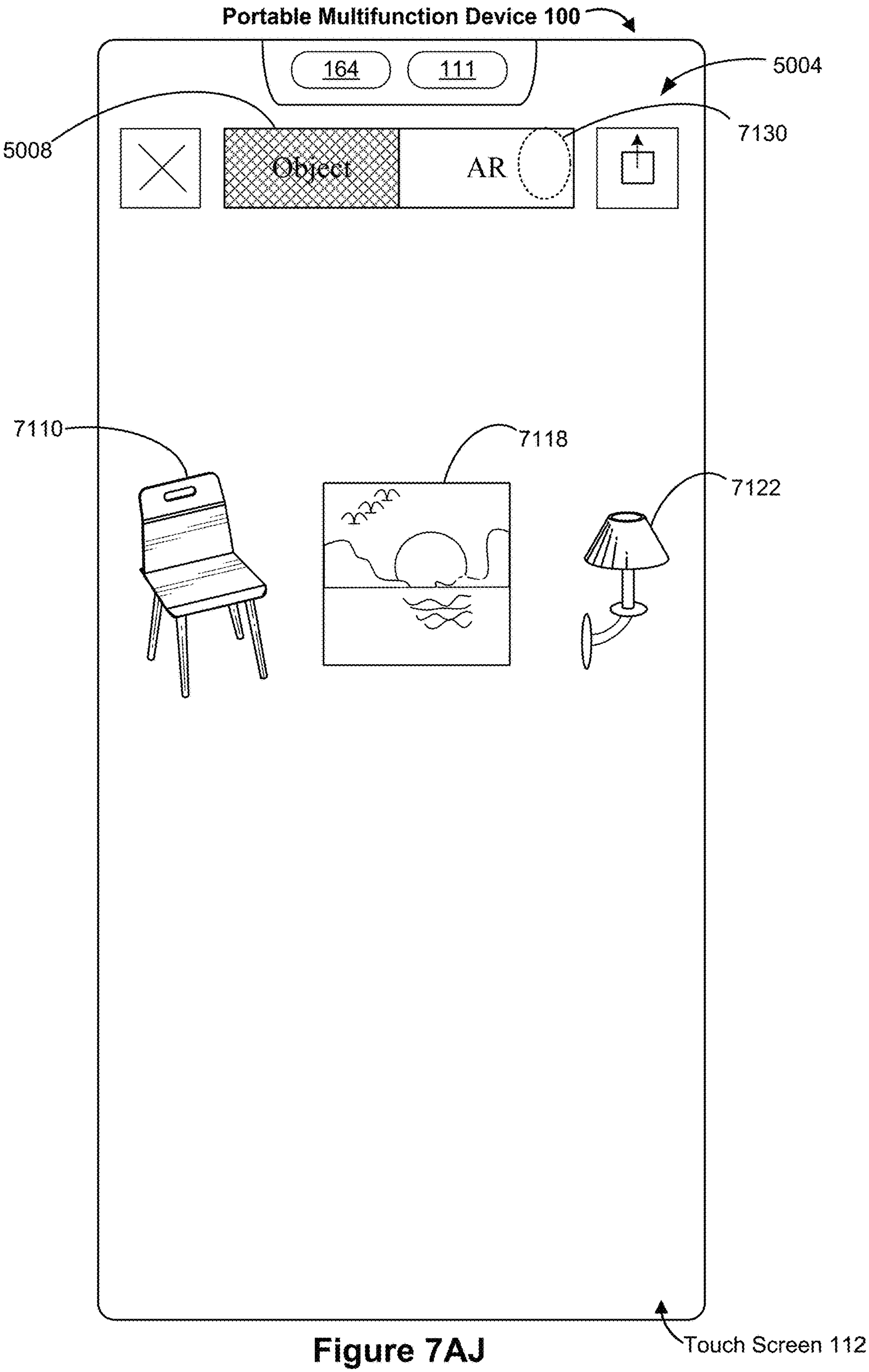
Figure 7A:
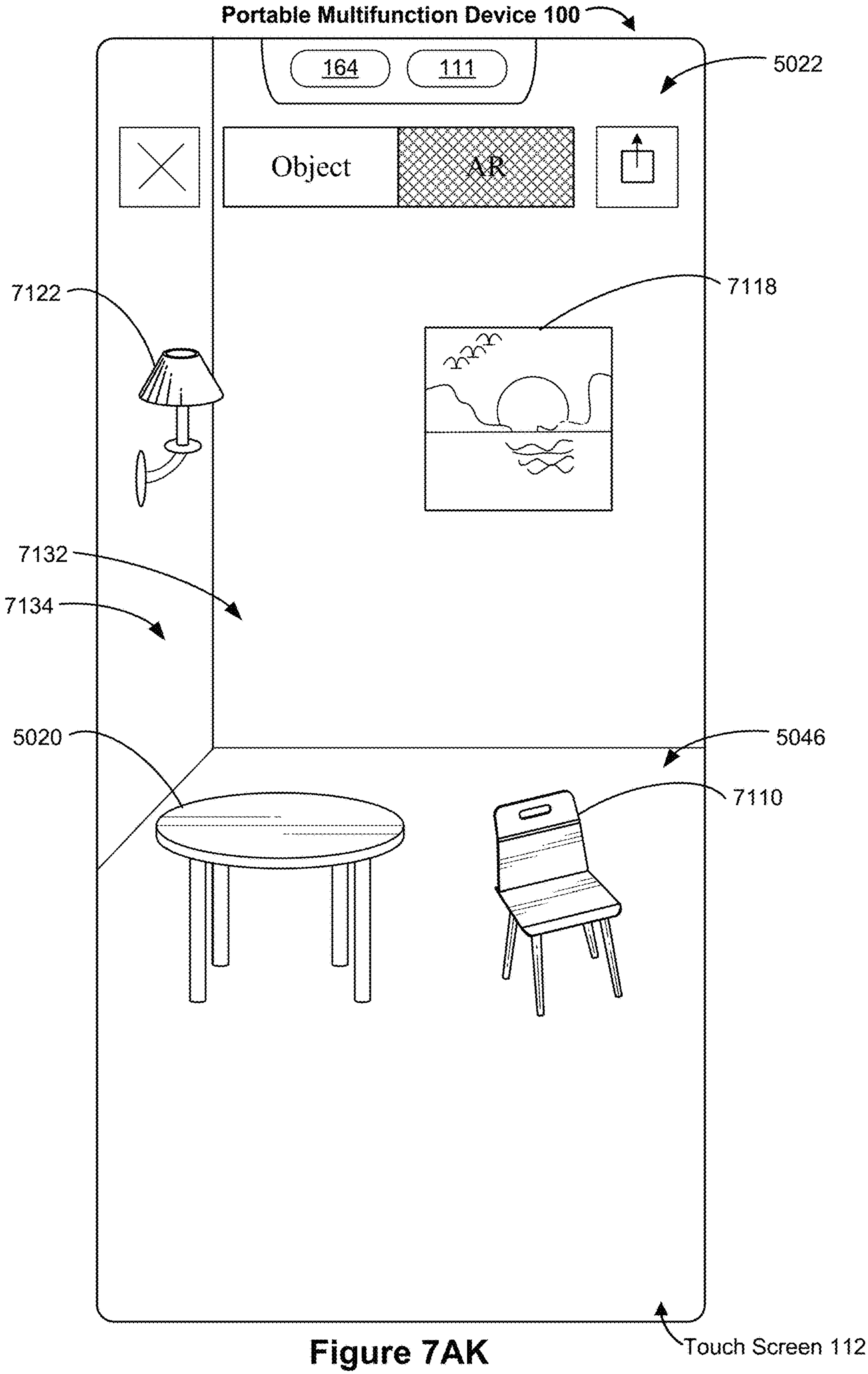
Figure 7A:
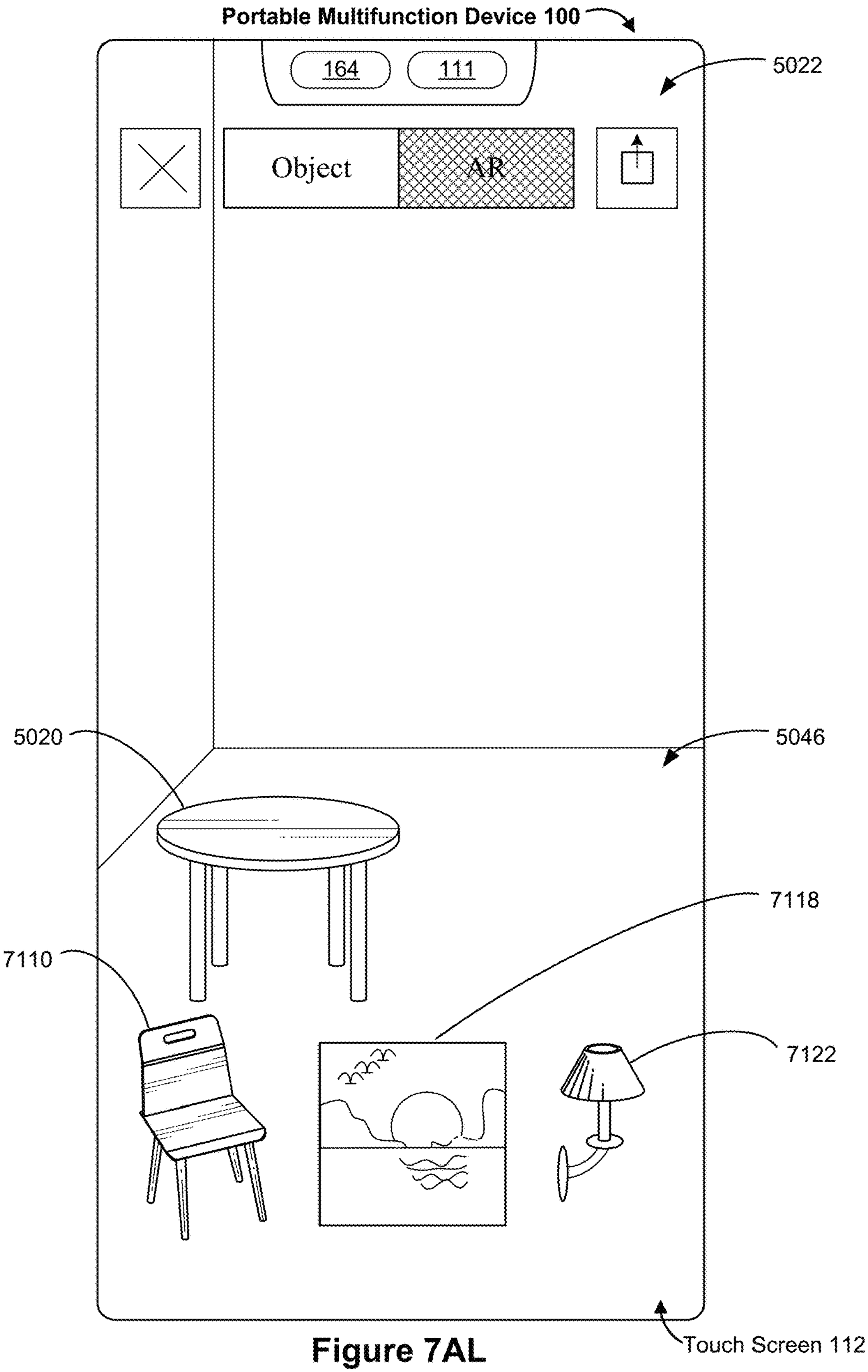
Figure 7A:
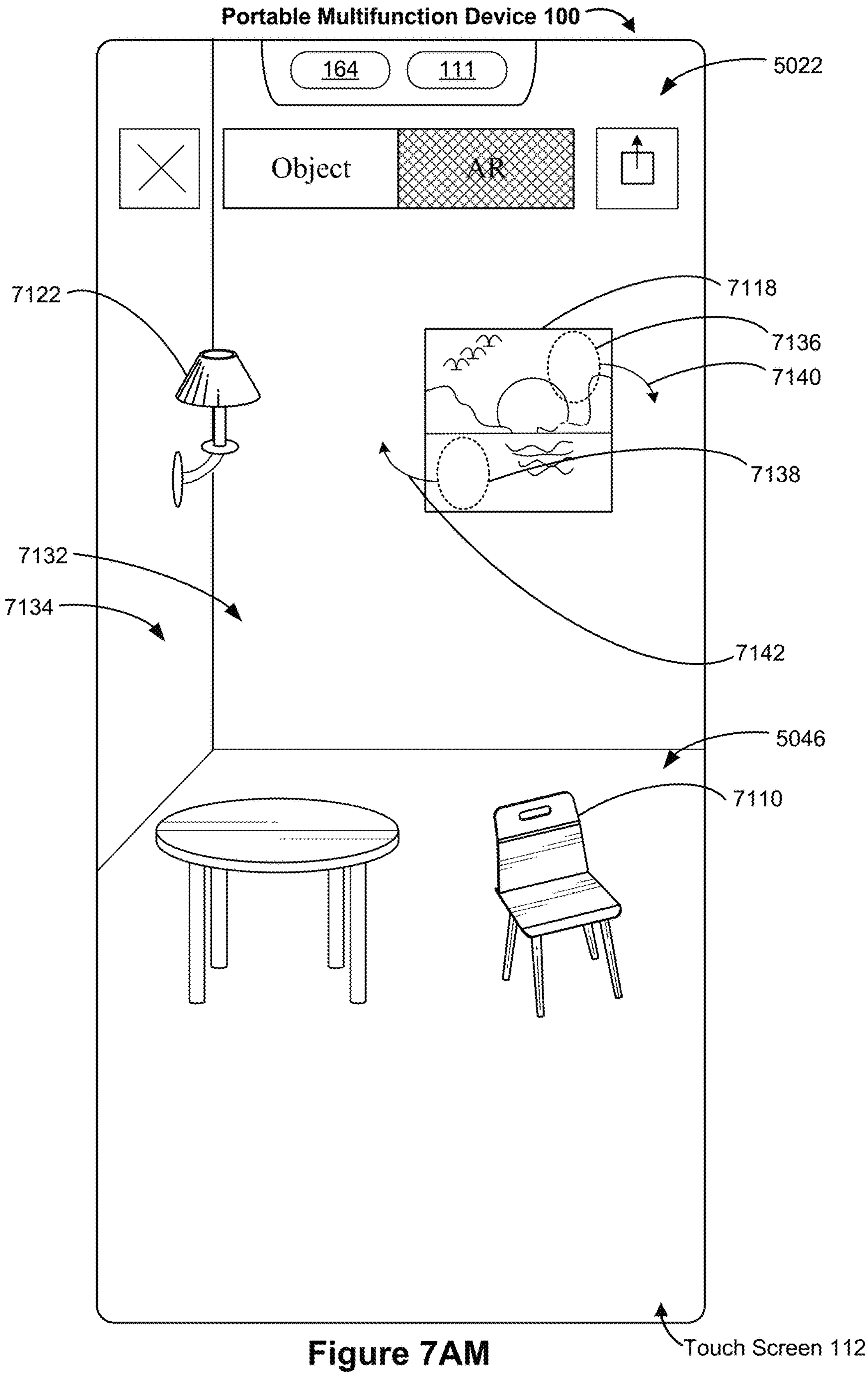
Figure 7A:
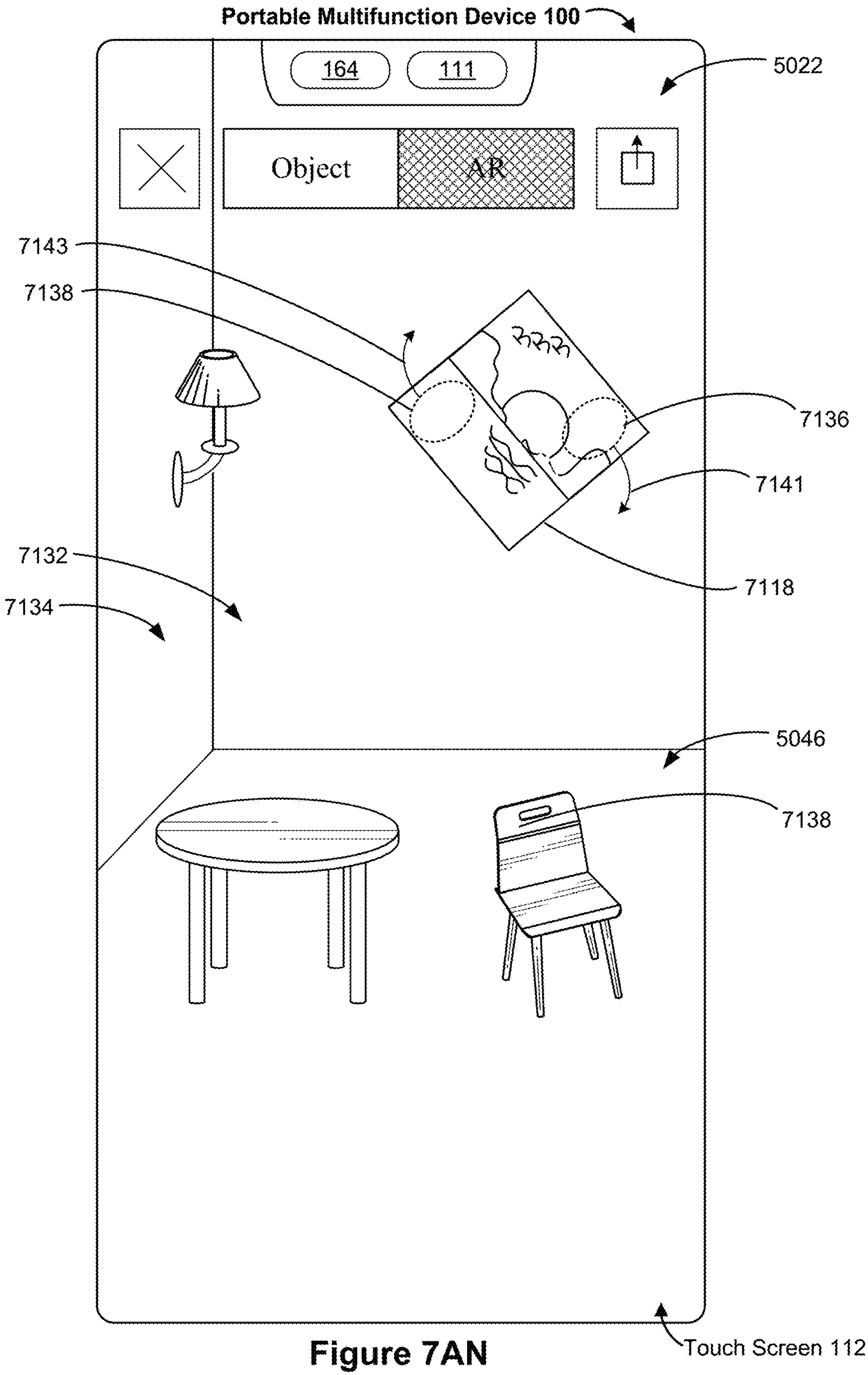
Figure 7A:
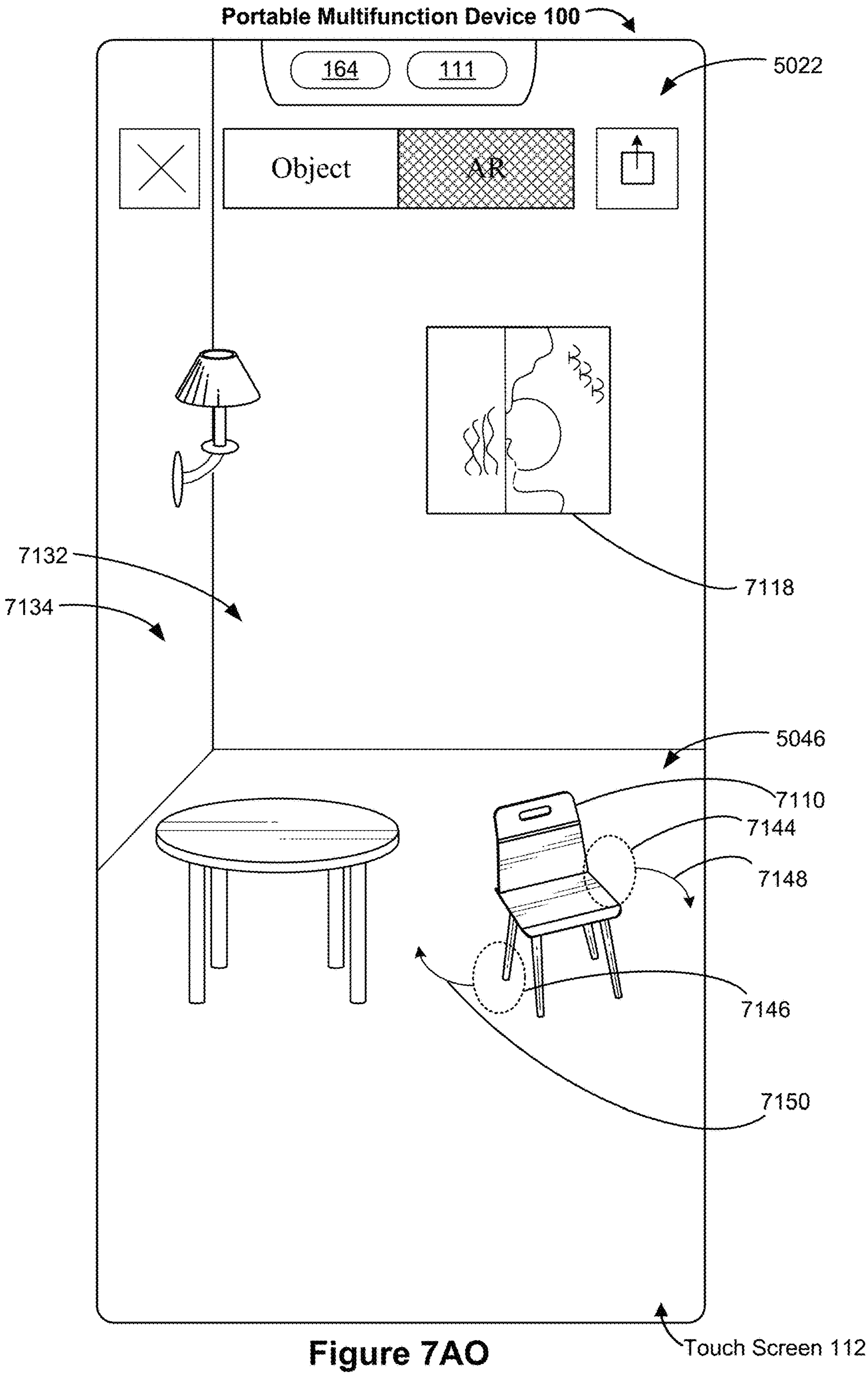
Figure 7A:
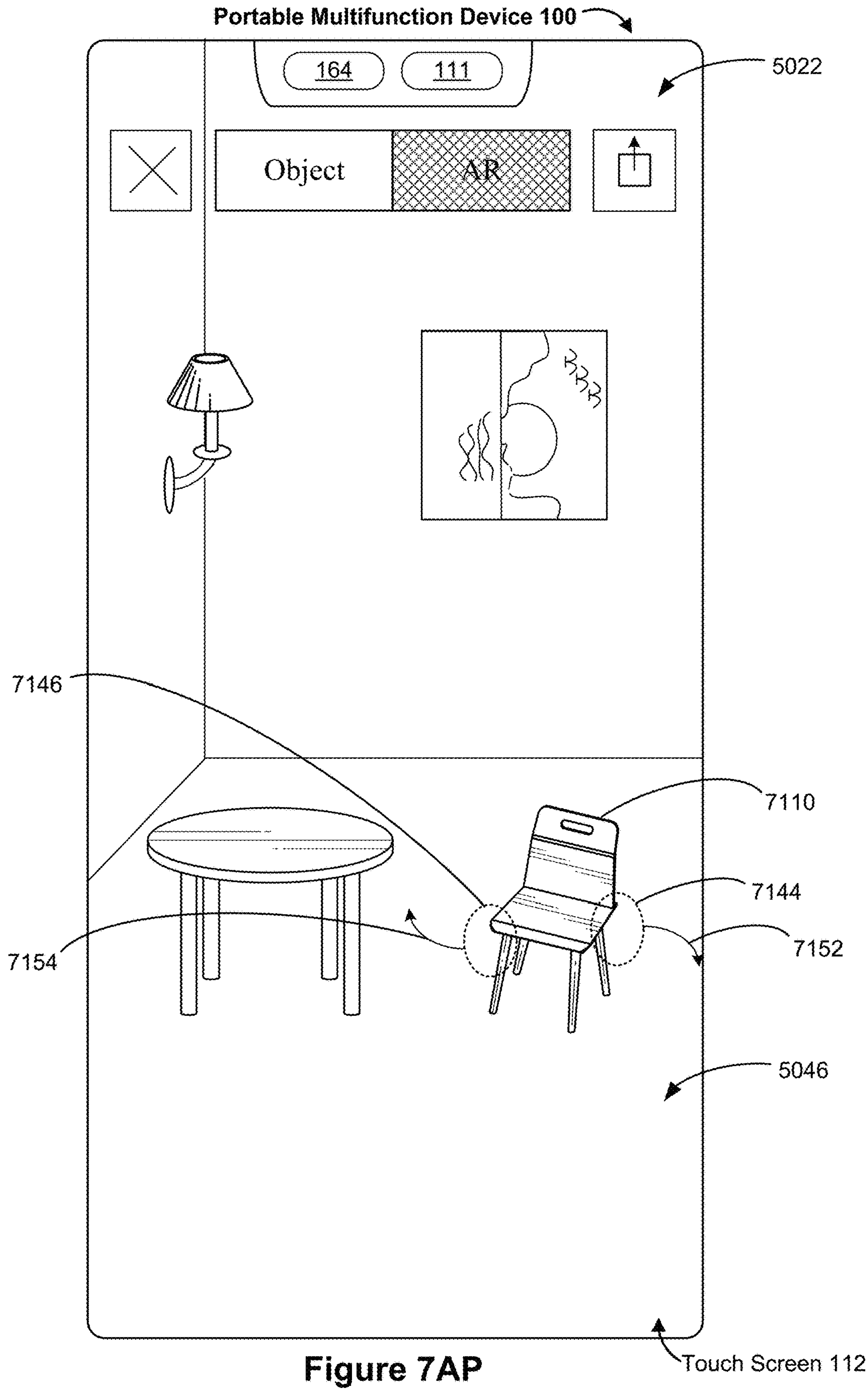
Figure 7A:
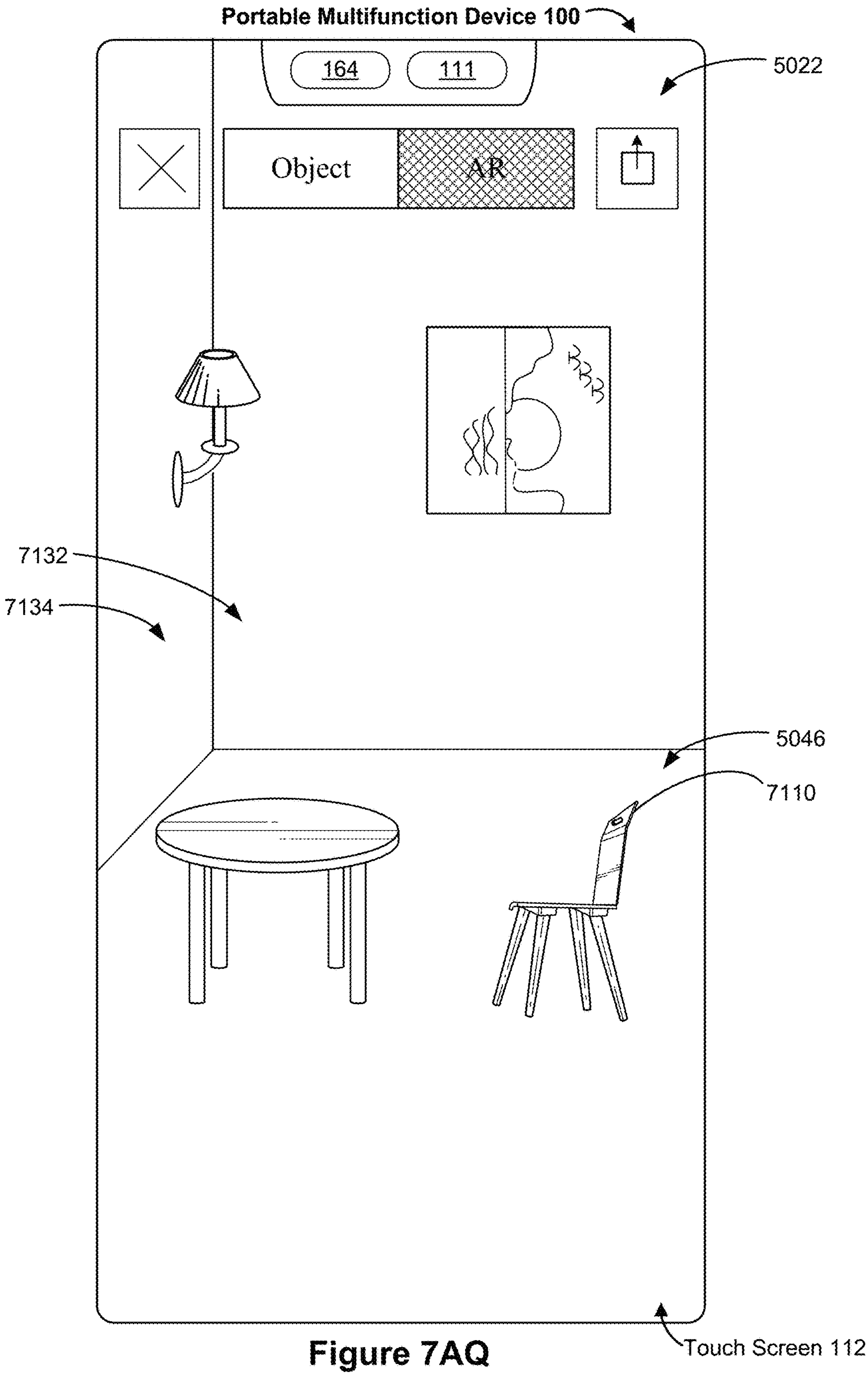

FIGS. 7Z-7AC illustrate boundaries of virtual objects used to set spacing between virtual objects in the object staging user interface 5004. In FIG. 7Z, boundary 7094 corresponds to virtual object 7088 and boundary 7098 corresponds to virtual object 7092. Boundary 7096 corresponds to a static state of virtual object 7090.

An animation sequence is associated with virtual object 7090. Timeline 7100 indicates a playback position within the animation sequence associated with virtual object 7090. A play control 7102 for initiating playback of the animation sequence associated with virtual object 7090 and a volume control 7104 for adjusting a volume of sound associated with the animation sequence are displayed. In FIG. 7Z, an input (e.g., a tap input) by contact 7106 is detected at a location that corresponds to play control 7102. In response to the input, the animation sequence associated with virtual object 7090 is activated, as illustrated by movement of the virtual object 7090 in FIGS. 7Z-7AC. The movement of virtual object 7090 extends beyond first boundary 7096. Boundary 7108 corresponds to the extended range of virtual object 7090 over the duration of the animation sequence. Equal spacing between virtual objects 7088, 7090, and 7092 in the object staging user interface 5004 is set based on boundary 7094, boundary 7108, and boundary 7098, as indicated in FIG. 7AC.

FIGS. 7AD-7AL illustrate selection of multiple virtual objects to place in an augmented reality user interface 5022.

FIG. 7AD illustrates an object management user interface 7099 (e.g., a website, a photo management application user interface, and/or a file management user interface) that displays two-dimensional images, such as image 7118, and/or two-dimensional representations of three-dimensional virtual objects, such as virtual object 7110.

In FIG. 7AE, an input (e.g., a tap input) by contact 7112 is detected at a location that corresponds to virtual object 7110. In response to the input, virtual object 7110 is selected (e.g., as marked by selection indicator 7114 displayed adjacent to virtual object 7112).

In FIG. 7AF, an input (e.g., a tap input) by contact 7116 is detected at a location that corresponds to image 7118. In response to the input, image 7118 is selected (e.g., as marked by selection indicator 7120 displayed overlaying image 7118).

In FIG. 7AG, an input (e.g., a tap input) by contact 7124 is detected at a location that corresponds to virtual object 7122. In response to the input, virtual object 7122 is selected (e.g., as marked by selection indicator 7126 displayed adjacent to virtual object 7122).

In FIG. 7AH, while virtual objects 7110, 7118 and 7122 are selected, an input (e.g., a tap input) by contact 7128 is detected at a location that corresponds to share control 7130. In response to the input, sharing user interface 6016 (described above with regard to FIG. 6C) is displayed, as illustrated in FIG. 7AI. While sharing user interface 6016 is displayed, currently selected virtual objects 7110, 7118 and 7122 are displayed (e.g., a collection of objects and/or images, including the objects and/or images displayed in object management user interface 7099, is filtered such that only currently selected virtual objects are displayed while sharing user interface 6016 is displayed).

In FIG. 7AI, an input (e.g., a tap input) by contact 7128 is detected at a location that corresponds to control 6024 for displaying one or more selected objects in an object three-dimensional viewing mode. In response to the input, sharing user interface 6016 and object management user interface 7099 cease to be displayed and currently selected virtual objects 7110, 7118 and 7122 are displayed in an object staging user interface 5004, as illustrated in FIG. 7AJ. (In some embodiments, in response to the input for displaying the one or more selected objects in the object three-dimensional viewing mode, the one or more selected objects are displayed in an augmented reality user interface 5022, as described with regard to FIG. 7AK.)

In FIG. 7AJ, an input (e.g., a tap input) by contact 7130 is detected at a location that corresponds to the "AR" region of toggle control 5008. In response to the input, display of virtual objects 7110, 7118 and 7122 in object staging view 5004 is replaced by display of virtual objects 7110, 7118 and 7122 in augmented reality user interface 5022.

In some embodiments, a plane type is defined for a virtual object and, when the virtual object is placed in an augmented reality user interface, the virtual object is displayed at a fixed position relative to a plane having the defined plane type. For example, a plane type that corresponds to virtual object 7110 (a virtual chair) is a horizontal physical surface that can serve as a support surface for a three-dimensional representation of the virtual object in the augmented reality view (e.g., a floor surface to support the chair). A plane type that corresponds to virtual object 7118 (a photographic image) is a vertical physical surface that can serve as a support surface for the three-dimensional representation of the virtual object in the augmented reality view (e.g., a vertical wall to hang the photographic image). A plane type that corresponds to virtual object 7122 (a wall sconce) is a vertical physical surface that can serve as a support surface for the three-dimensional representation of the virtual object in the augmented reality view (e.g., a vertical wall to hang the wall sconce). In FIG. 7AK, in response to an input detected as described with regard to FIG. 7AJ, virtual objects 7110, 7118 and 7122 are displayed in augmented reality user interface 5022 in accordance with defined plane types for the respective virtual objects. For example, virtual chair object 7110 is displayed such that it appears to be supported by floor plane 5046 detected in the physical environment, virtual photographic image object 7118 is displayed such that it appears to be hanging on rear wall plane 7132 detected in the physical environment, and virtual wall sconce object 7122 is displayed such that it appears to be hanging on side wall plane 7134 detected in the physical environment.

In some embodiments, no plane type is defined for the selected virtual objects and the virtual objects are displayed at a fixed position relative to a single plane (e.g., a default plane type, the first horizontal plane detected in the physical environment, and/or the first plane of any type detected in the physical environment). In FIG. 7AL, in response to an input detected as described with regard to FIG. 7AJ, virtual objects 7110, 7118 and 7122 are displayed at fixed positions relative to floor plane 5046 such that the virtual objects appear to be supported by floor plane 5046.

FIGS. 7AM-7AQ illustrate manipulation of virtual objects to place in an augmented reality user interface 5022.

In FIG. 7AM, an input (e.g., a rotation gesture) by contacts 7136 and 7138 for changing the simulated orientation of virtual object 7118 is detected. As contact 7136 moves along a path indicated by arrow 7140 and contact 7138 moves along a path indicated by arrow 7142, virtual object 7118 rotates about an axis that is perpendicular to vertical wall plane 7132 relative to which virtual object 7118 is positioned, as illustrated in FIGS. 7AM-7AN. In FIGS. 7AN-7AO, contact 7136 continues to move along a path indicated by arrow 7141, contact 7138 continues to move along a path indicated by arrow 7143, and virtual object 7110 continues to rotate.

In FIG. 7AO, an input (e.g., a rotation gesture) by contacts 7144 and 7146 for changing the simulated orientation of virtual object 7110 is detected. As contact 7144 moves along a path indicated by arrow 7148 and contact 7146 moves along a path indicated by arrow 7150, virtual object 7110 rotates about an axis that is perpendicular to horizontal floor plane 5046 relative to which virtual object 7110 is positioned, as illustrated in FIGS. 7AO-7AP. In FIGS. 7AP-7AQ, contact 7144 continues to move along a path indicated by arrow 7152, contact 7146 continues to move along a path indicated by arrow 7154, and virtual object 7110 continues to rotate.

FIGS. 8A-8K illustrate example user interfaces for displaying a prompt to change a property of a media item that does not meet compatibility criteria for display in an augmented reality environment, in accordance with some embodiments. The user interfaces in these figures are used to illustrate the processes described below, including the processes in FIGS. 9A-9C, 10A-10C, 11A-11D, 12A-12B, and 13A-13B. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 8A-8E illustrate handling of a media item that does not meet compatibility criteria for display in an augmented reality environment.

Figure 8A:
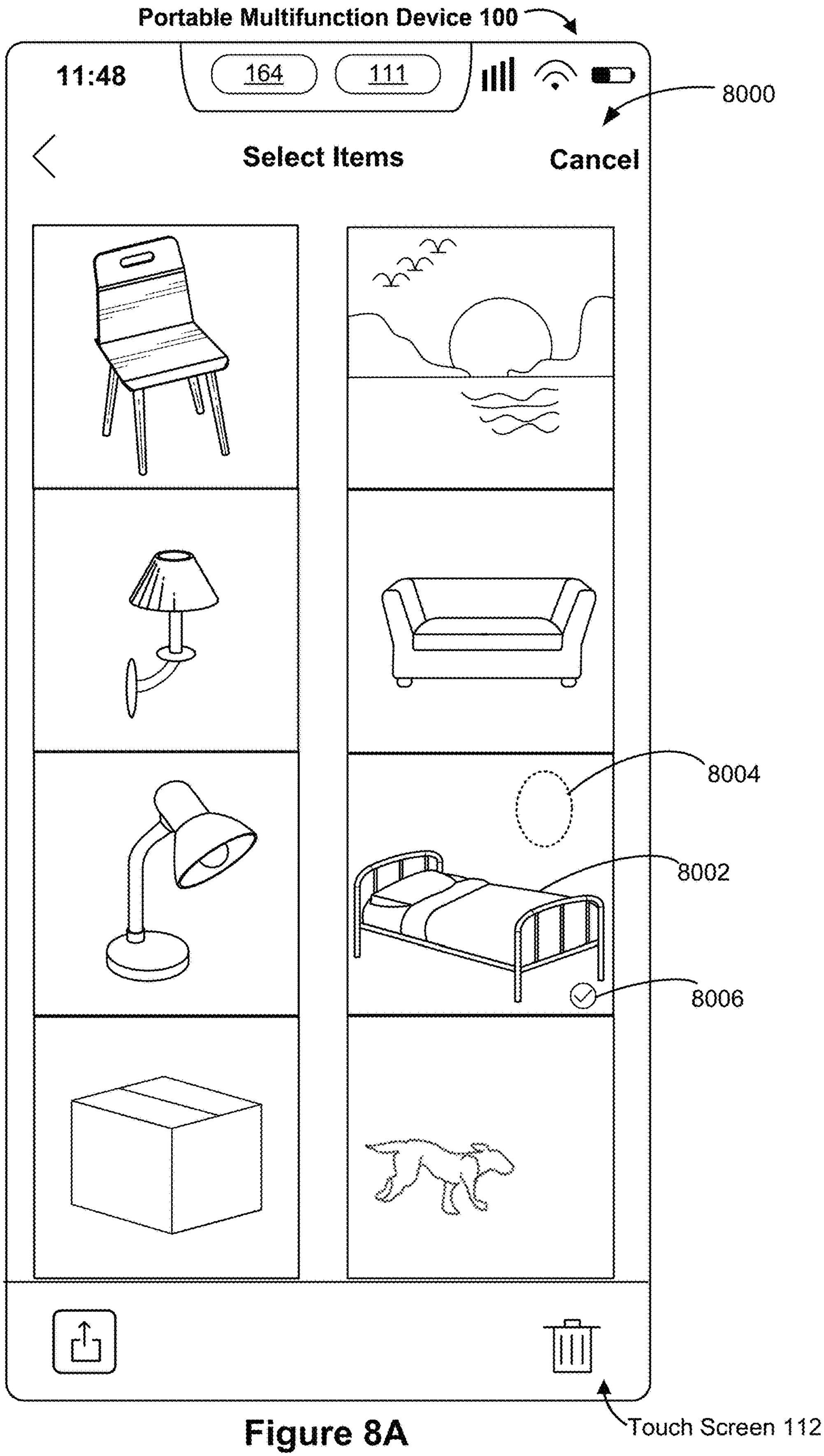
FIGS. 8A-8K illustrate example user interfaces for displaying a prompt to change a property of a media item that does not meet compatibility criteria for display in an augmented reality environment, in accordance with some embodiments.

In FIG. 8A, a file management user interface 8000 displays media items including AR-incompatible media item 8002. An input (e.g., a tap input) by contact 8004 is detected at a location that corresponds to AR-incompatible media item 8002. In response to the input, AR-incompatible media item 8002 is selected (e.g., as marked by selection indicator 8006).

Figure 8B:
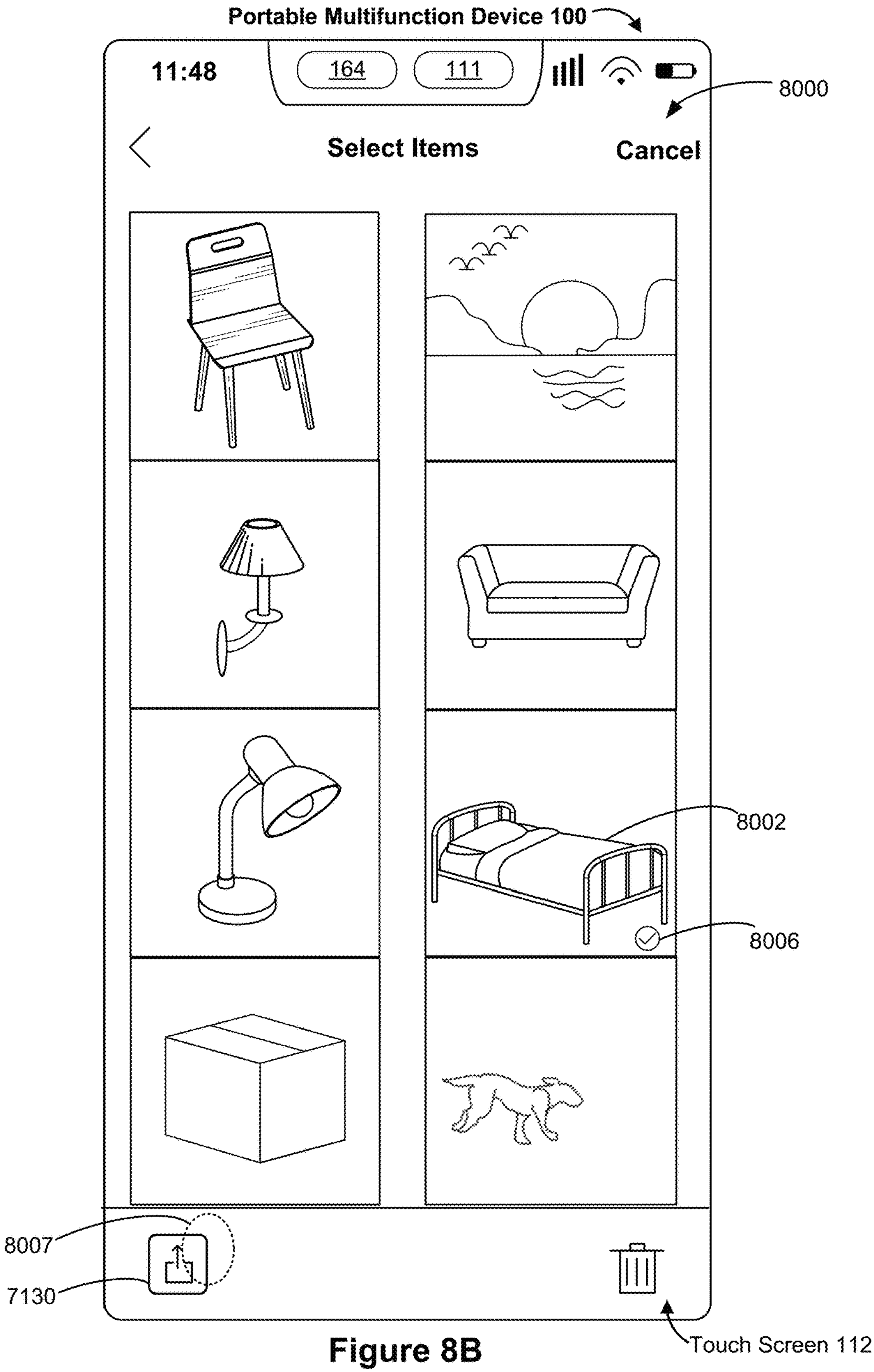

In FIG. 8B, while AR-incompatible media item 8002 is selected, an input (e.g., a tap input) by contact 8007 is detected at a location that corresponds to share control 7130. In response to the input, sharing user interface 6016 (described above with regard to FIG. 6C) is displayed with currently selected AR-incompatible media item 8002, as illustrated in FIG. 8C.

Figure 8C:
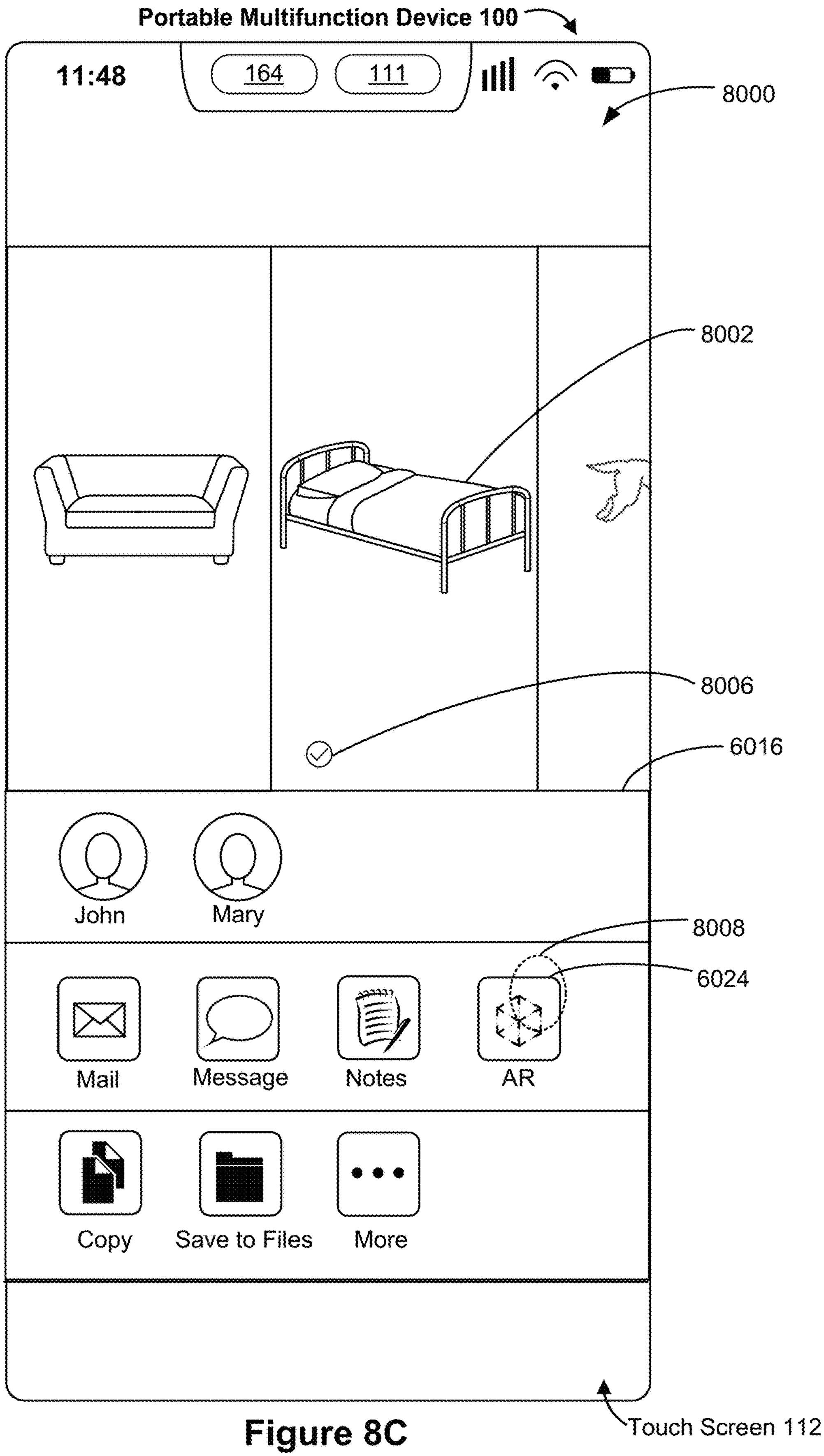
Figure 8D:
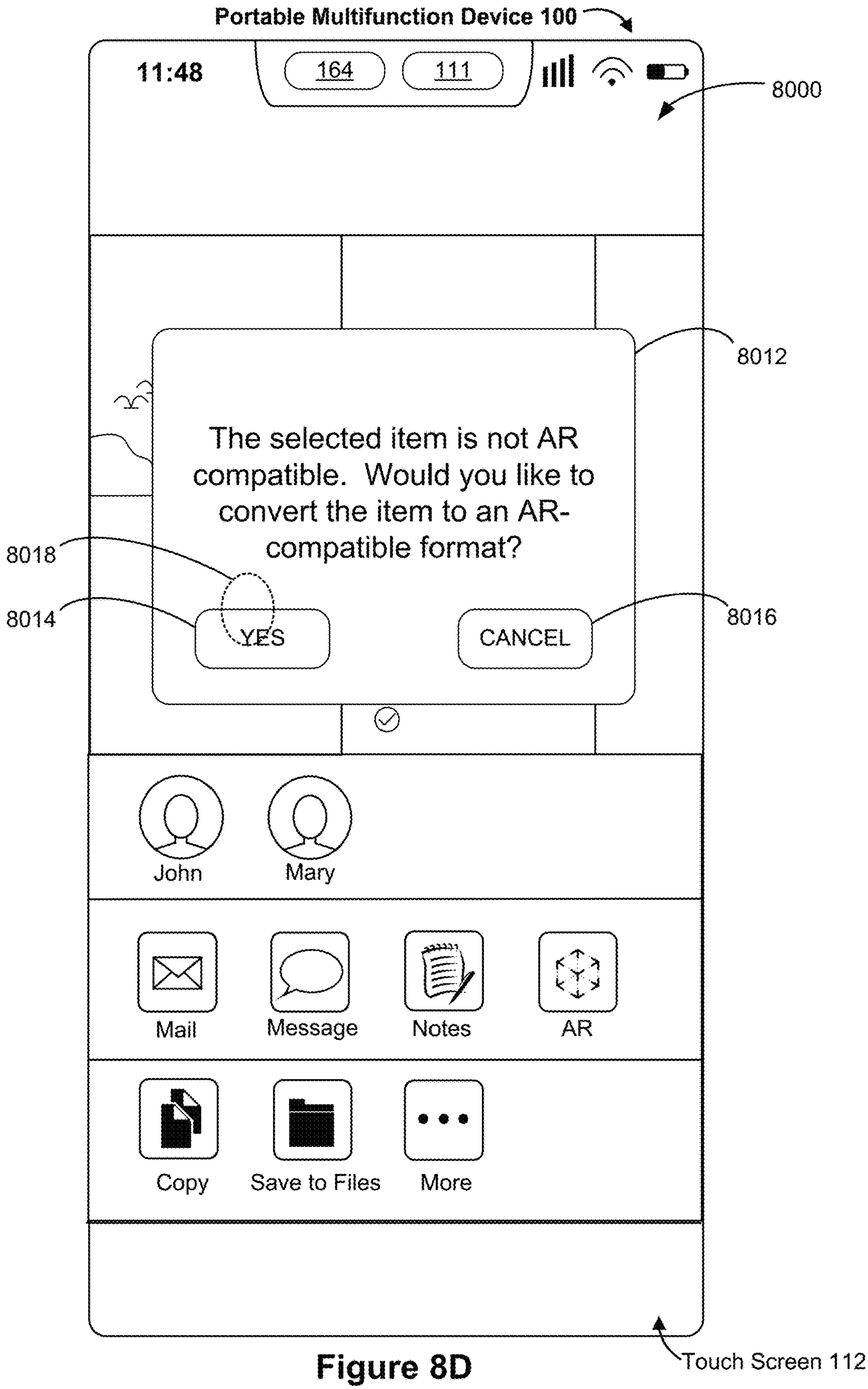

In FIG. 8C, an input (e.g., a tap input) by contact 8008 is detected at a location that corresponds to control 6024 for displaying one or more selected objects, such as selected AR-incompatible media item 8002, in a three-dimensional viewing mode. In response to detecting the input, the device determines whether selected AR-incompatible media item 8002 has a property that does not meet compatibility criteria for display in an augmented reality environment. Because selected AR-incompatible media item 8002 has a property that does not meet compatibility criteria for display in an augmented reality environment, the device displays a prompt panel 8012 including a prompt to change the property of the media item (e.g., "The selected item is not AR compatible. Would you like to convert the item to an AR-compatible format?"), as illustrated in FIG. 8D. Prompt panel 8012 includes a control 8014 for converting selected AR-incompatible media item 8002 to and a control 8016 for dismissing prompt panel 8012.

Figure 8E:
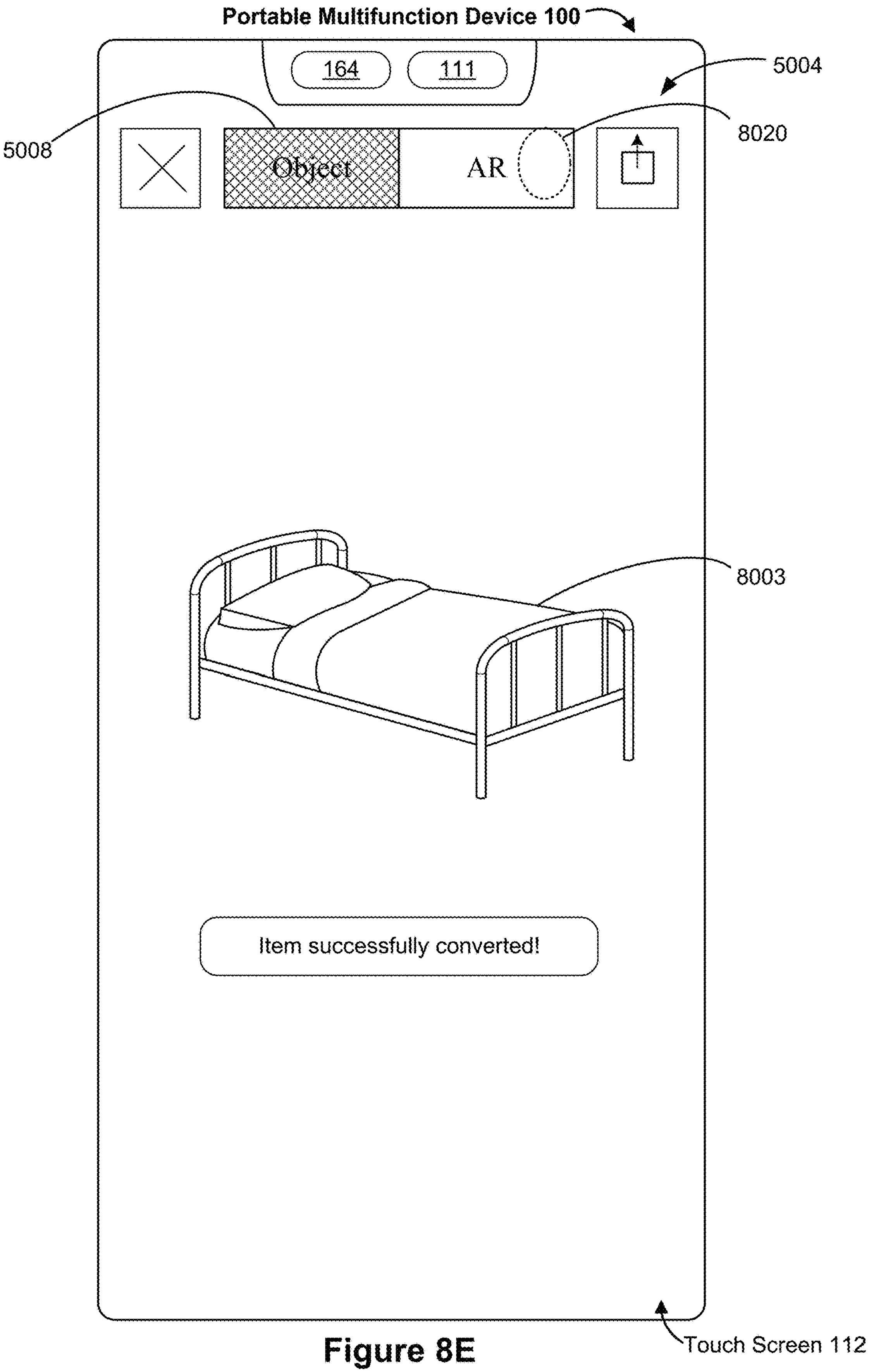
Figure 8F:
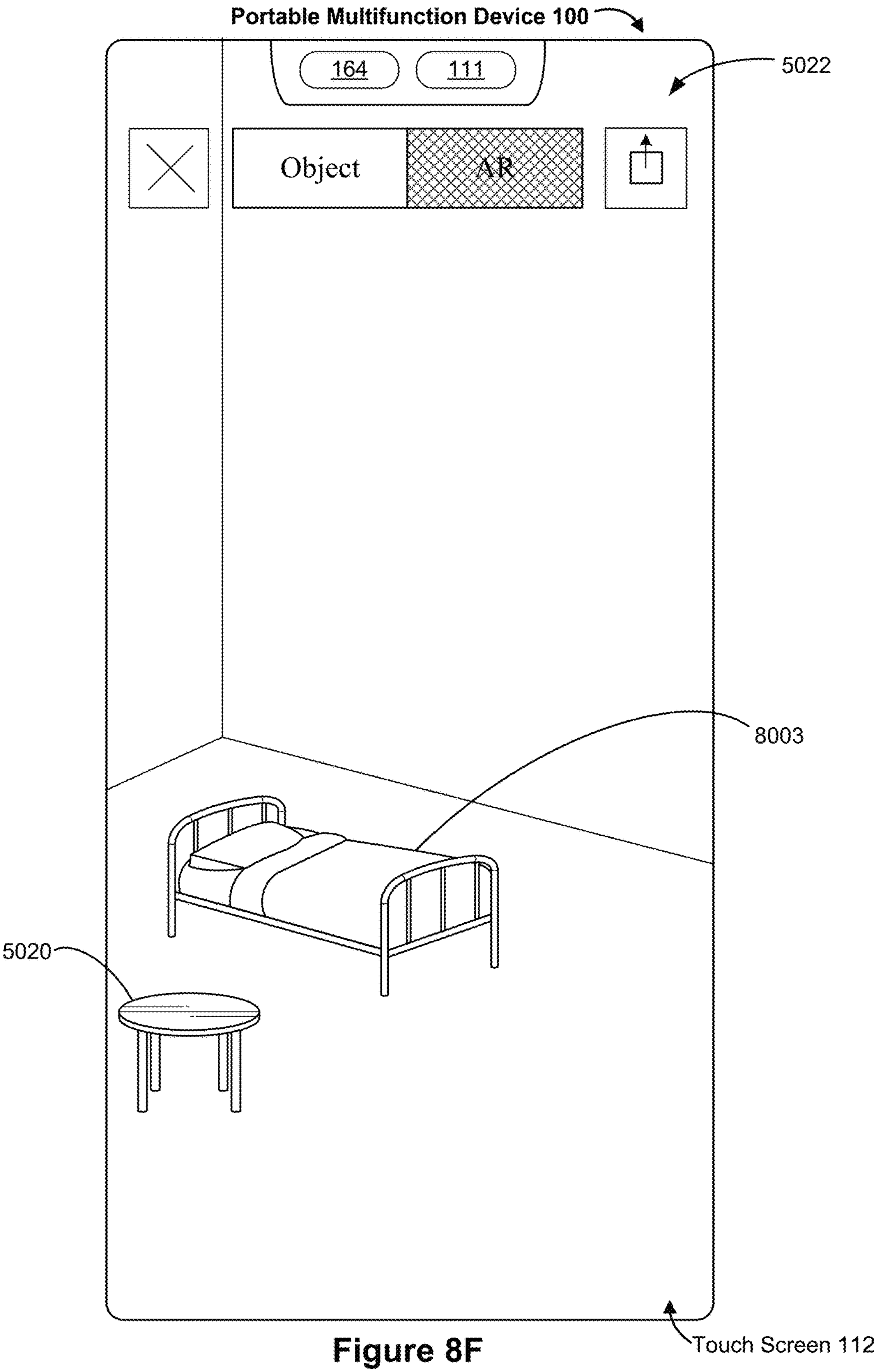

In FIG. 8D, an input (e.g., a tap input) by contact 8018 is detected at a location that corresponds to control 8014 for converting the selected media item to an AR-compatible format. In response to the input, AR-incompatible media item 8002 is converted to an AR-compatible format and the converted version of media item 8002 (e.g., virtual object 8003 corresponding to the converted version of media item 8002) is displayed in augmented reality user interface 5022, as illustrated in FIG. 8F (or in object staging user interface 5004, as illustrated in FIG. 8E). While virtual object 8003 corresponding to the converted version of media item 8002 is displayed in object staging user interface 5004, an input (e.g., a tap input) by contact 8020 is detected at a location that corresponds to the "AR" region of toggle control 5008. In response to the input, display of object staging user interface 5004 is replaced by display of the virtual object 8003 corresponding to the converted version of media item 8002 in augmented reality user interface 5022, as illustrated in FIGS. 8E-8F.

FIGS. 8G-8K illustrate handling of a media item that meets compatibility criteria for display in an augmented reality environment.

Figure 8G:
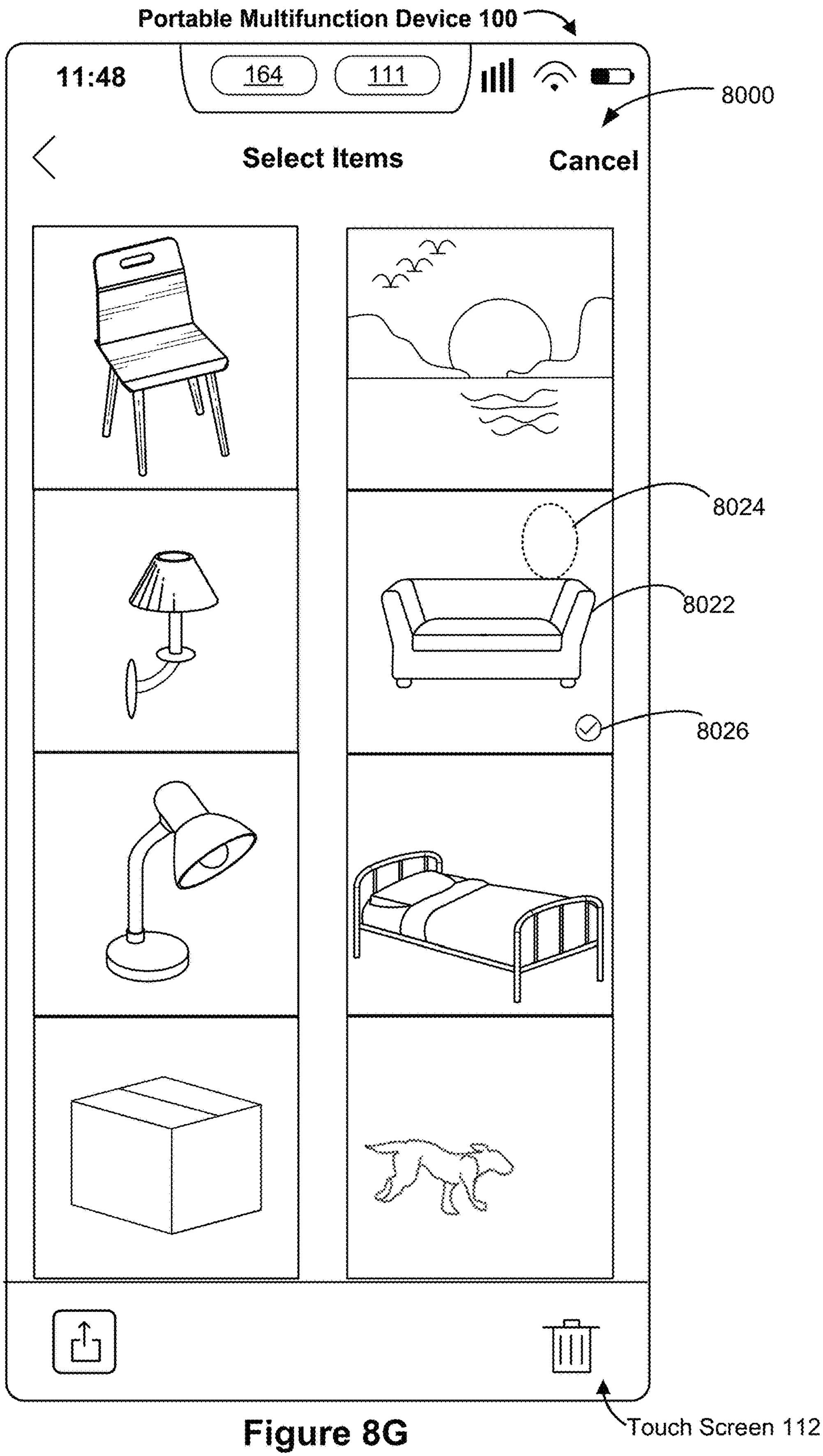

In FIG. 8G, a file management user interface 8000 displays media items including AR-compatible media item 8022. An input (e.g., a tap input) by contact 8028 is detected at a location that corresponds to AR-compatible media item 8022. In response to the input, AR-compatible media item 8022 is selected (e.g., as marked by selection indicator 8026).

Figure 8H:
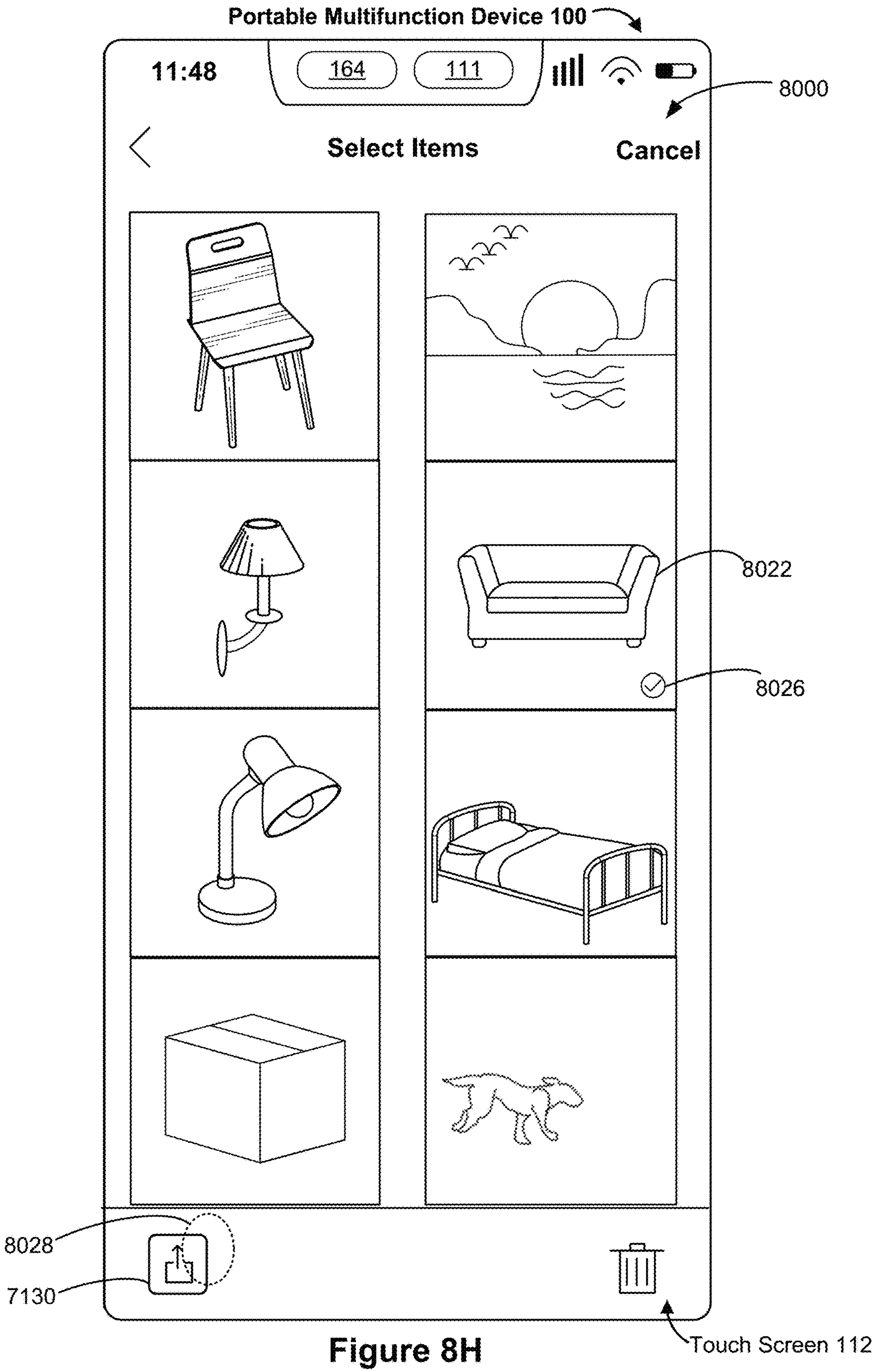

In FIG. 8H, while AR-compatible media item 8022 is selected, an input (e.g., a tap input) by contact 8028 is detected at a location that corresponds to share control 7130. In response to the input, sharing user interface 6016 (described above with regard to FIG. 6C) is displayed with currently selected AR-compatible media item 8022, as illustrated in FIG. 8I.

Figure 8I:
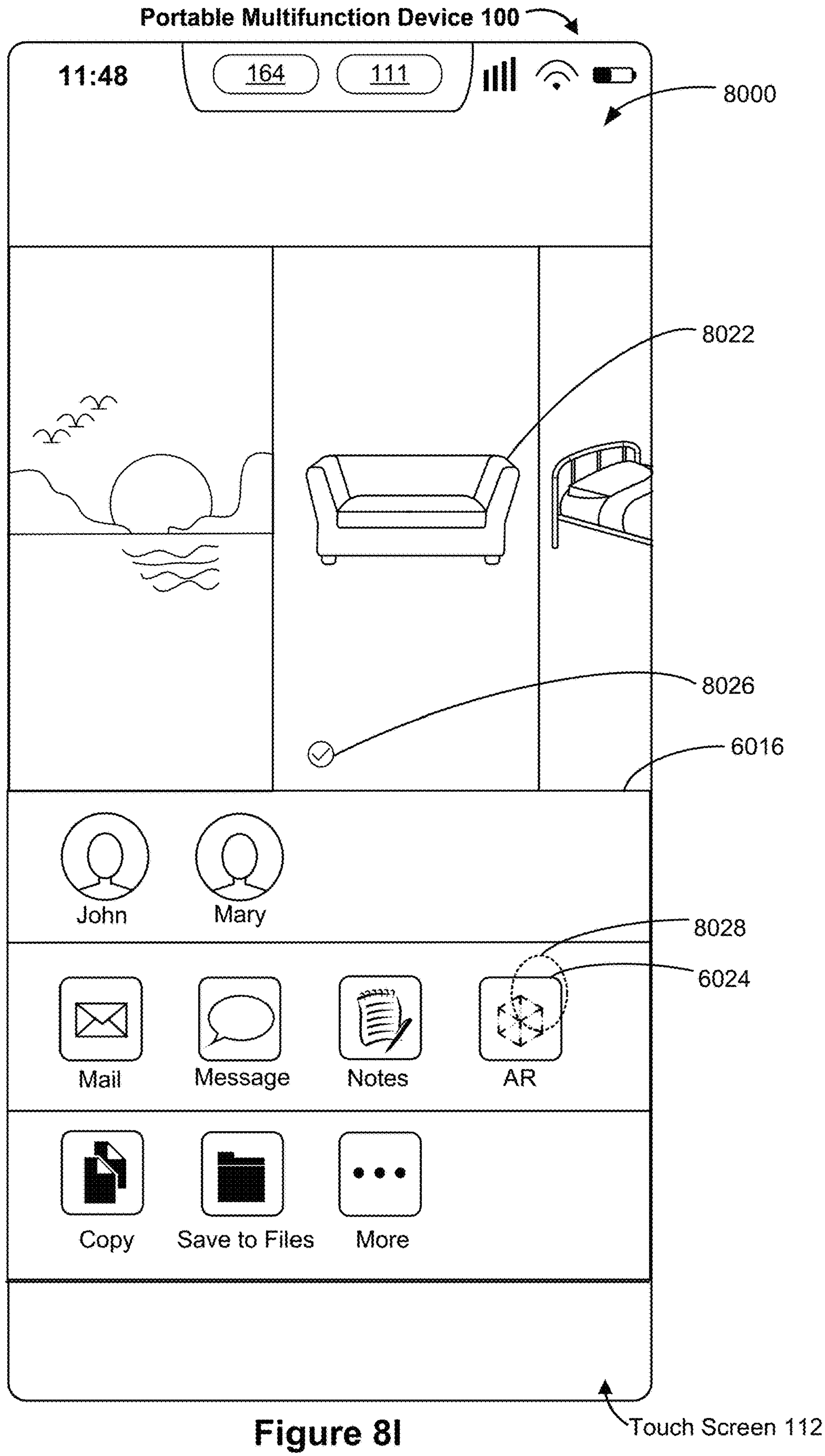
Figure 8J:
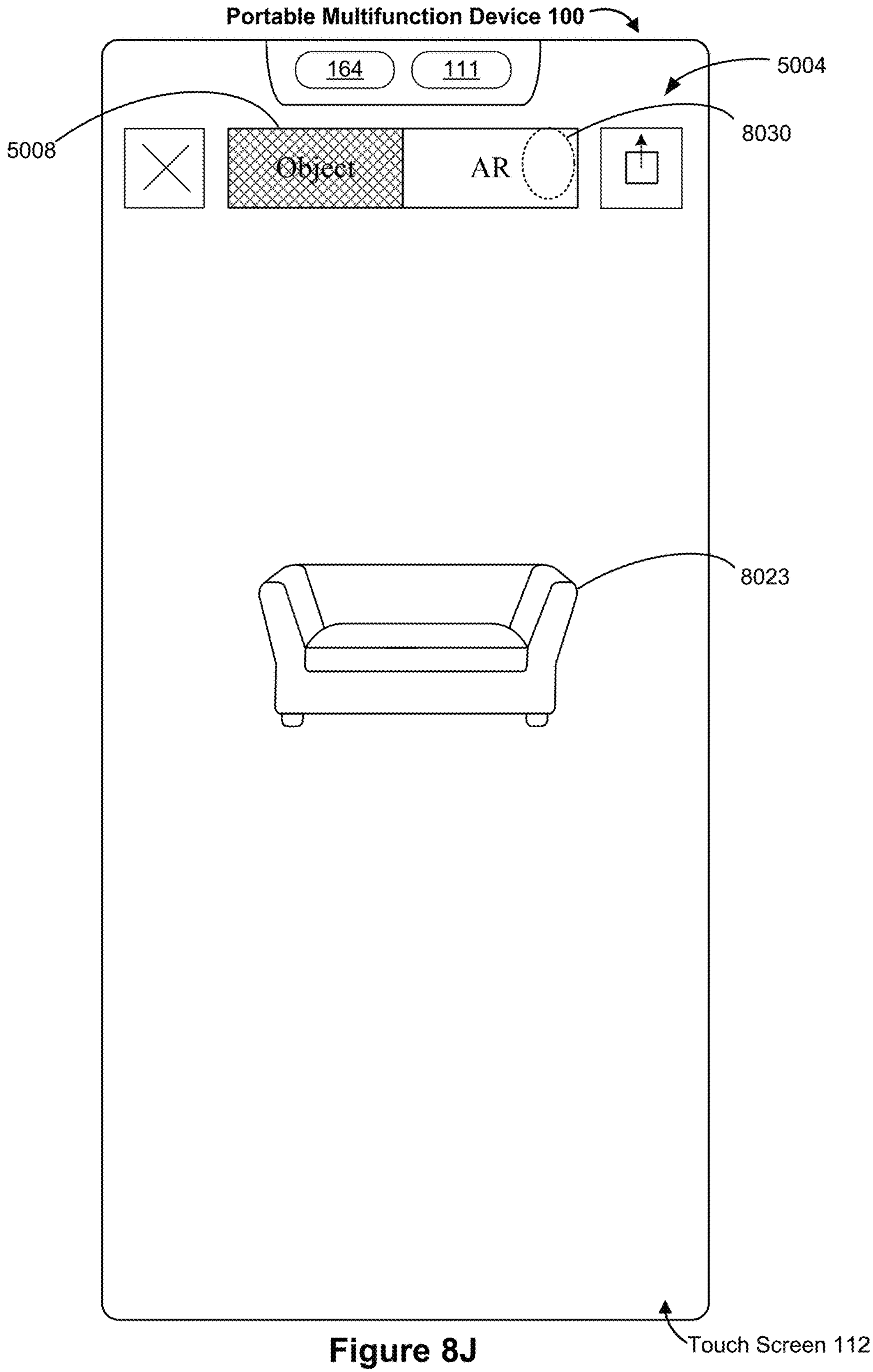
Figure 8K:
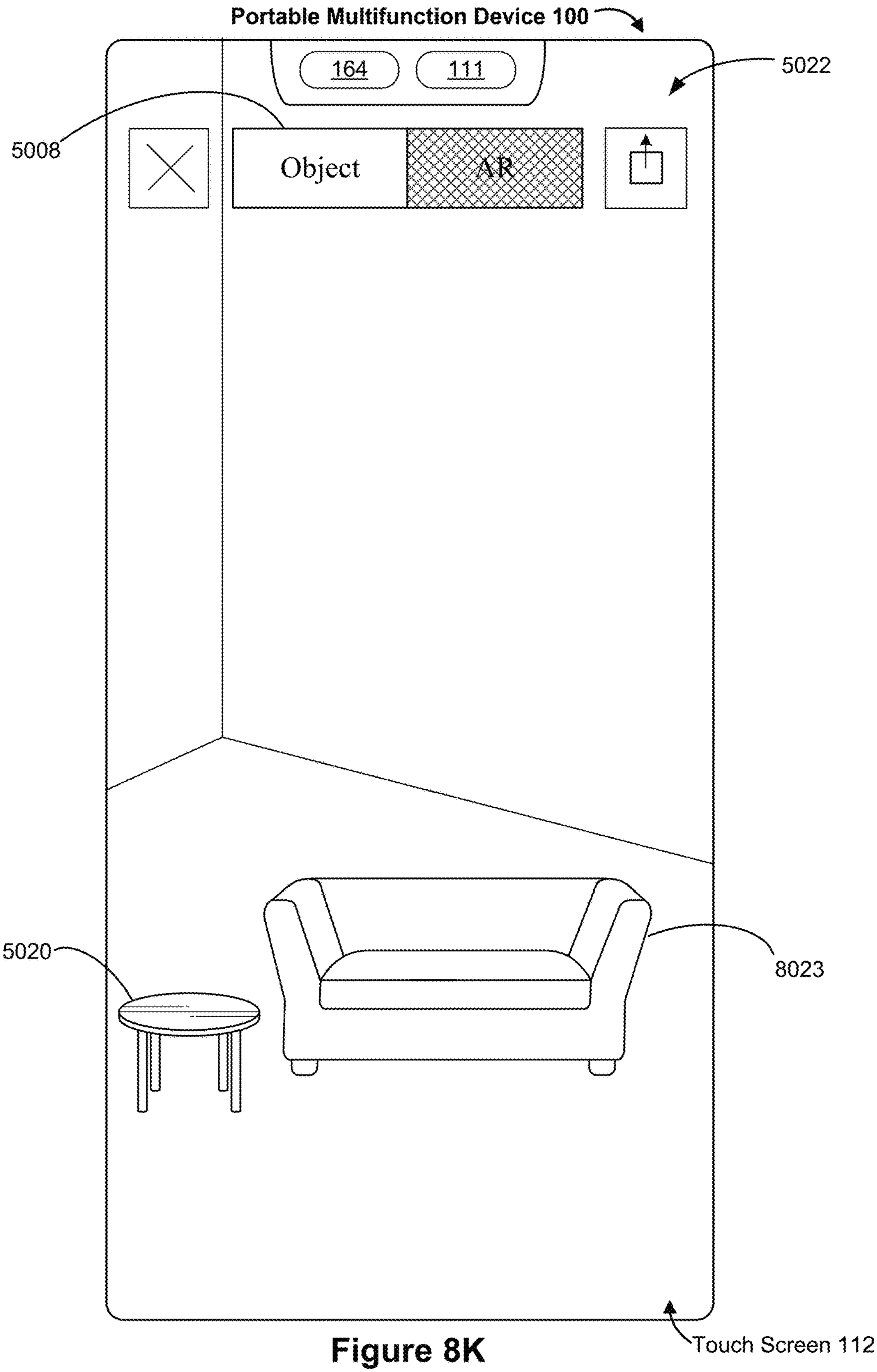

In FIG. 8I, an input (e.g., a tap input) by contact 8028 is detected at a location that corresponds to control 6024 for displaying one or more selected objects, such as selected AR-compatible media item 8022, in a three-dimensional viewing mode. In response to detecting the input, the device determines whether selected AR-compatible media item 8022 has a property that does not meet compatibility criteria for display in an augmented reality environment. Because selected AR-compatible media item 8022 meets the compatibility criteria for display in an augmented reality environment, the device displays a virtual object 8023 that corresponds to AR-compatible media item 8022 in augmented reality user interface 5022, as illustrated in FIG. 8K (or in object staging user interface 5004, as illustrated in FIG. 8J). While virtual object 8023 that corresponds to AR-compatible media item 8022 is displayed in object staging user interface 5004, an input (e.g., a tap input) by contact 8030 is detected at a location that corresponds to the "AR" region of toggle control 5008. In response to the input, display of object staging user interface 5004 is replaced by display of virtual object 8023 that corresponds to AR-compatible media item 8022 in augmented reality user interface 5022, as illustrated in FIGS. 8J-8K.

FIGS. 9A-9C are flow diagrams illustrating method 900 of displaying a visual indication of one or more inputs that if performed would cause criteria to be satisfied for performing an action, in accordance with some embodiments. Method 900 is performed at an electronic device (e.g., device 300, FIG. 3, or portable multifunction device 100, FIG. 1A) with a display generation component (e.g., a display, a projector, a heads-up display, etc.) and one or more input devices (e.g., a touch-screen display that serves both as the display and the touch-sensitive surface, cameras, controllers, joysticks, buttons, etc.). In some embodiments, the display generation component is a touch-screen display and the touch-sensitive surface is an input device that is on or integrated with the display generation component. In some embodiments, the display generation component is separate from one or more input devices. Some operations in method 900 are, optionally, combined and/or the order of some operations is, optionally, changed.

This method relates to detecting an input while an environment that includes a virtual object is displayed. The virtual object is associated with an action (e.g., an animation). In response to the input, the device determines whether to perform the action or to display an indication of input that will cause the action to be performed. Displaying an indication of input that will cause the action associated with the virtual object to be performed provides improved visual feedback to the user (e.g., by determining when the user is not providing input that satisfies criteria for causing animation of the virtual object and providing information about the required input to the user). Providing improved visual feedback to the user increases the efficiency with which the user is able to cause the action associated with a virtual object to be performed, thereby enhancing the operability of the device, which, additionally, reduces power usage and improves battery life of the device by enabling the user to use the device more quickly and efficiently.

The device displays (902), via the display generation component (e.g., touch-sensitive display system 112), at least a portion of an environment (e.g., a virtual reality environment, an augmented reality environment, or an object view environment that allows manipulation of an object for placement in an augmented reality environment) that includes a virtual object that is associated with a first action (e.g., an animation sequence that animates at least a portion of the virtual object) that is triggered based on satisfaction of a first set of criteria. For example, FIG. 5F illustrates a virtual object 5002 displayed in augmented reality user interface 5022. As shown in FIGS. 5E-5F, augmented reality user interface 5022 displays an augmented reality environment that includes virtual object 5002 and a physical environment as captured by one or more cameras (e.g., one or more cameras of camera module 143) of device 100. Virtual object 5002 is associated with an animation sequence, as illustrated in FIGS. 5H-5I.

While displaying, by the display generation component, the portion of the environment, the device detects (904) a first input. For example, in FIG. 5G, a tap input is detected at a location that corresponds to virtual object 5002. In FIGS. 5J-5K, a swipe input is detected at a location that corresponds to virtual object 5002.

In response to detecting the first input (906): in accordance with a determination that the first input satisfies the first set of criteria (e.g., the first set of criteria are satisfied by a tap input, a press input, detection of a gaze of a user of the electronic device directed to a location that corresponds to the virtual object, an input that causes the virtual object to be displayed at a designated portion of a field of view of one or more cameras, and/or movement of at least a portion of the electronic device to within a defined distance of a position of the displayed of the virtual object), the device performs the first action (e.g., animating at least a portion of the virtual object in accordance with the animation sequence associated with the virtual object) and, in accordance with a determination that the first input does not satisfy the first set of criteria but instead satisfies a second set of criteria (e.g., the second set of criteria are satisfied by a swipe input for moving the virtual object, a swipe input for rotating the virtual object, a pinch input for reducing the displayed size of the virtual object, a de-pinch input for increasing the displayed size of the virtual object, detection of a gaze of a user of the electronic device directed to a location that does not correspond to the virtual object, an input that causes the virtual object to be displayed at a location that is not within the designated portion of a field of view of one or more cameras, and/or determination that the electronic device is not within a defined distance of a position of the displayed of the virtual object), the device forgoes performing the first action and instead display a first visual indication of one or more inputs (e.g., a text prompt indicating the one or more inputs and/or an animation illustrating the one or more inputs) that if performed would cause the first set of criteria to be satisfied.

For example, in response to an input that satisfies a first set of criteria (e.g., the tap input described with regard to FIG. 5G), a first action is performed (e.g., playback of an animation sequence occurs, as described with regard to FIGS. 5H-5I). In response to an input that does not satisfy the first set of criteria but instead satisfies a second set of criteria (e.g., the swipe input described with regard to FIGS. 5J-5K), the device forgoes performing the first action and instead displays a first visual indication of one or more inputs that if performed would cause the first set of criteria to be satisfied (e.g., the device displays visual indication 5028 indicating, "Tap on the box to view animation!" as described with regard to FIG. 5K). In some embodiments, an audio indication of one or more inputs that if performed would cause the first set of criteria to be satisfied is provided in addition to or in lieu of the visual indication.

In some embodiments, the first set of criteria include (908) criteria that are satisfied in accordance with a determination that at least a portion of the electronic device (e.g., a respective input device of the one or more input devices, the display generation component, and/or one or more cameras) moves to a position that is within a defined distance of a displayed position of the virtual object. In some embodiments, the first visual indication of one or more inputs that if performed would cause the first set of criteria to be satisfied includes a direction to move the electronic device to a position that is within the defined distance of the displayed position of the virtual object (e.g., "Move the device closer to the box."). For example, as described with regard to FIGS. 5AD-5AH, a first set of criteria for performing an action are satisfied in accordance with a determination that device 100 has moved to a position that is within a defined distance of a displayed position of virtual object 5002. In FIGS. 5AD-5AE, the device is not within the defined distance of the displayed position of virtual object 5002, and a visual indication 5060 of one or more inputs that if performed would cause the first set of criteria to be satisfied is displayed. In FIG. 5AF, the device has moved to within the defined distance of the displayed position of virtual object 5002 and an animation sequence is performed, as described with regard to FIGS. 5AF-5AH. Determining whether to perform an action associated with the virtual object or display an indication of input that will cause the action to be performed, depending on whether the device moves to a position that is within a defined distance of a displayed position of the virtual object, provides improved visual feedback to the user (e.g., by determining when the device is not sufficiently near to the virtual object and providing information indicating that the user must move closer to the displayed position of the virtual object to activate the animation of the virtual object). Providing improved visual feedback to the user increases the efficiency with which the user is able to cause the action associated with a virtual object to be performed, thereby enhancing the operability of the device, which, additionally, reduces power usage and improves battery life of the device by enabling the user to use the device more quickly and efficiently.

In some embodiments, the one or more input devices include (910) a touch-screen display (e.g., touch-sensitive display system 112) and the first set of criteria include criteria that are satisfied in accordance with a determination that the first input is a tap input by a contact on the touch-screen display at a location that corresponds to the virtual object (e.g., as described with regard to FIGS. 5G-5I). In some embodiments, the first visual indication includes a direction to tap a location that corresponds to the virtual object (e.g., "Tap on the box."). Determining whether to perform an action associated with the virtual object or display an indication of input that will cause the action to be performed, depending on whether the input is a tap input by a contact on a touch-screen display at a location that corresponds to the virtual object, provides improved visual feedback to the user (e.g., by determining whether the input is a tap input and providing information indicating that the user must tap the virtual object to activate the animation of the virtual object). Providing improved visual feedback increases the efficiency with the user is able to cause the action associated with a virtual object to be performed, thereby enhancing the operability of the device, which, additionally, reduces power usage and improves battery life of the device by enabling the user to use the device more quickly and efficiently.

In some embodiments, the one or more input devices include (912) a sensor (e.g., one or more cameras of camera module 143) for detecting a direction of a gaze of a user of the electronic device and the first set of criteria include criteria that are satisfied in accordance with a determination that the gaze of the user is directed toward a location that corresponds to the virtual object (e.g., a location within a designated portion of the virtual object, a location at any position on the virtual object, and/or a location at a position within a defined distance of the virtual object). For example, as described with regard to FIGS. 5L-1 and 5L-2, 5M-1 and 5M-2, 5N-1 and 5N-2, and 5O-1 and 5O-2, a first set of criteria for performing an action are satisfied in accordance with a determination that a gaze of a user is directed toward a location that corresponds to virtual object 5002. In FIGS. 5L-1 and 5L-2, gaze 5034 of user 5030 is not directed toward a displayed location of virtual object 5002, and a visual indication 5036 of one or more inputs that if performed would cause the first set of criteria to be satisfied is displayed. In FIGS. 5M-1 and 5M-2, gaze 5038 of user 5030 is directed toward a displayed location of virtual object 5002 and an animation sequence is performed, as described with regard to FIGS. 5M-1 and 5M-2, FIGS. 5N-1 and 5N-2 and 5O-1 and 5O-2. In some embodiments, the first visual indication includes a direction to direct the user's gaze toward a location that corresponds to the virtual object (e.g., "Look at the box."). Determining whether to perform an action associated with the virtual object or display an indication of input that will cause the action to be performed, depending on whether the gaze of the user is directed toward a location that corresponds to the virtual object, enables the performance of multiple different types of operations in response to an input. Enabling the performance of multiple different types operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, the electronic device includes one or more cameras (e.g., one or more rear facing cameras on a side of the device opposite from the display generation component), the displayed environment includes at least a portion of the field of view of the one or more cameras, the device detects (914) movement of the electronic device (e.g., lateral movement and/or rotation of the electronic device) that adjusts the field of view of the one or more cameras and, in response to detecting the movement of the electronic device, the device adjusts the virtual object in accordance with a fixed spatial relationship (e.g., orientation and/or position) between the virtual object and a respective plane in the field of view of the one or more cameras (e.g., the virtual object is displayed with an orientation and a position on the display such that a fixed angle between the virtual object and the plane is maintained (e.g., the virtual object appears to stay at a fixed location on the plane) as the field of view of the one or more cameras is adjusted in response to detected movement of the electronic device). For example, as described with regard to FIG. 5E, augmented reality user interface 5022 displays a physical environment 5018 as captured in the field of view of one or more cameras. As described with regard to FIGS. 5S-5U, as the device moves such that the field of view of the one or more cameras is adjusted, virtual object 5002 moves in accordance with a fixed spatial relationship between virtual object 5002 and a plane that corresponds to upper surface of physical table 5020. Adjusting the virtual object in accordance with a fixed spatial relationship between the virtual object and a plane in the field of view of the one or more cameras in response to movement of the electronic device provides improved visual feedback to the user (e.g., by providing an indication that the virtual object has been placed at a fixed position relative to the plane). Providing improved visual feedback to the user enhances the operability of the device and makes the user-device interface more efficient, which, additionally, reduces power usage and improves battery life of the device by enabling the user to use the device more quickly and efficiently.

In some embodiments, the first set of criteria include (916) criteria that are satisfied in accordance with a determination that the virtual object is displayed within a designated portion of the field of view of the one or more cameras (e.g., the virtual object is fully visible in the displayed portion of the field of view of the one or more cameras, the virtual object is substantially centered in the displayed portion of the field of view of the one or more cameras, the virtual object is displayed within a designated portion of the field of view of the one or more cameras, and/or at least a predetermined portion of the virtual object displayed in the field of view of the cameras). For example, In FIGS. 5S-5T, virtual object 5002 is not fully displayed within a designated portion (e.g., circle 5052) of the field of view of the one or more cameras displayed in augmented reality user interface 5022, and a visual indication 5054 of one or more inputs that if performed would cause the first set of criteria to be satisfied is displayed. In FIG. 5U, virtual object 5002 is fully displayed within circle 5052 and an animation sequence is performed, as described with regard to FIGS. 5U-5W. In some embodiments, the first visual indication includes a direction to move the device such that the virtual object is displayed within the designated portion of the field of view of the one or more cameras (e.g., "Move the device to view the box."). In some embodiments, the first set of criteria require that multiple criteria (e.g., gaze at virtual object, tap input on virtual object, proximity to virtual object, and/or virtual object in field of view) are satisfied (e.g., as described with regard to FIGS. 5X-5AC). In some embodiments, in accordance with a determination that virtual object display criteria are met (e.g., the virtual object is fully visible in the displayed portion of the field of view of the one or more cameras, the virtual object is substantially centered in the displayed portion of the field of view of the one or more cameras, the virtual object is displayed within a designated portion of the field of view of the one or more cameras, and/or at least a predetermined portion of the virtual object displayed in the field of view of the cameras), the first visual indication is not displayed. In some embodiments, the virtual object has a boundary (e.g., an outline of virtual object 5002 or an oval or box that circumscribes virtual object 5002), performing the action (e.g., animation of the virtual object) causes at least a portion of the virtual object to extend beyond the first boundary, a second boundary corresponds to the extended range of the first respective virtual object during the animation, and the first set of criteria include criteria that are satisfied in accordance with a determination that the second boundary is fully displayed in the displayed portion of the field of view of the cameras of the device. Determining whether to perform an action associated with the virtual object or display an indication of input that will cause the action to be performed, depending on whether the virtual object is displayed within a designated portion of the field of view of the one or more cameras, enables the performance of multiple different types of operations in response to an input. Enabling the performance of multiple different types operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, the second set of criteria include (918) criteria that are met in accordance with a determination that the first input is an input for moving the virtual object (e.g., a swipe input that includes movement of a contact along a path on a touch-screen display). For example, an input for moving virtual object 5002 is described with regard to FIGS. 5J-5K. Displaying an indication of input that will cause the action to be performed in response to an input for moving the virtual object provides improved visual feedback to the user (e.g., by providing information to the user about a different input that is required for animating the virtual object). Providing visual feedback to the user enhances the operability of the device (e.g., by helping the user to provide proper inputs and reducing unnecessary additional inputs for interacting with the virtual object), which, additionally, reduces power usage and improves battery life of the device by enabling the user to use the device more quickly and efficiently.

In some embodiments, the device receives (920) a request to display the virtual object at a first location in the environment, and, in response to the request to display the virtual object at the first location in the environment: in accordance with a determination that a surface size that corresponds to the first location does not meet size compatibility criteria for the virtual object, the device displays a visual indication that provides information indicating that the first location does not meet the size compatibility criteria (and forgoes displaying the virtual object at the first location in the environment) and in accordance with a determination that the surface size that corresponds to the first location meets the size compatibility criteria for the virtual object (e.g., the surface size that corresponds to the first location is smaller (e.g., by a predefined amount) than a size of the virtual object), the device displays the virtual object at the first location in the environment. For example, as described with regard to FIGS. 5Q-5R, in response to a request to display virtual object 5002 at an upper surface of physical lamp 5004 (e.g., input that moves virtual object 5002 along a path indicated by arrow 5048 in FIG. 5Q), a visual indication 5050 provides information indicating that the first location does not meet the size compatibility criteria (e.g., information including text that indicates "The object cannot be placed on this surface!") because a size of the upper surface of physical lamp 5044 does not meet size compatibility criteria for virtual object 5002. In some embodiments, the virtual object has a size property (e.g., that corresponds to a real world size of the object) that indicates a size (e.g., length, width, radius, and/or area) of at least a portion of the virtual object. For example, the size property indicates a size of a portion of the virtual object (e.g., a size of a surface of the virtual object that will be placed at a fixed position relative to (e.g., facing) a surface in the physical environment). The first location is, for example, an upper surface of a table, a wall, a floor, or a ceiling. Displaying a visual indication in response to determining that a location where the user requested to display the virtual object does not meet size compatibility criteria provides the user with improved visual feedback (e.g., by providing an indication of why the virtual object is not being placed at the location and/or how to place the virtual object at a location that meets size compatibility criteria). Providing improved visual feedback enhances the operability of the device (e.g., by helping the user to provide proper inputs and reducing unnecessary additional inputs for placing the virtual object) and makes the user-device more efficient, which, additionally, reduces power usage and improves battery life of the device by enabling the user to use the device more quickly and efficiently.

In some embodiments, the movement of the electronic device is detected (922) while (and/or after) performing the first action, adjusting the virtual object in response to detecting the movement of the electronic device in accordance with the fixed spatial relationship between the virtual object and the respective plane causes the virtual object to move at least partially beyond the displayed portion of the field of view of the one or more cameras, and, while the virtual object is at least partially beyond the displayed portion of the field of view of the one or more cameras, the device displays a second visual indication (e.g., the same as or different from the first visual indication) of one or more inputs that if performed would cause the first set of criteria to be satisfied. Displaying an indication of inputs that would cause the first set of criteria to be satisfied while the virtual object is beyond the displayed field of view of the one or more cameras provides the user with improved visual feedback (e.g., to indicate that the user must move the device such that the virtual object is visible (e.g., fully visible) within the field of view of the one or more cameras). Providing improved visual feedback enhances the operability of the device and makes the user-device interface more efficient (e.g., by helping the user to provide proper inputs, reducing unnecessary additional inputs for causing the first set of criteria to be satisfied), which, additionally, reduces power usage and improves battery life of the device by enabling the user to use the device more quickly and efficiently.

In some embodiments, the electronic device includes one or more cameras and, in accordance with a determination that the first input corresponds to a request to display the virtual object in an augmented reality environment (e.g., an input at a location that corresponds to the "AR" region of toggle control 5008, as described with regard to FIG. 5D) the device replaces (924) display of the environment that includes the virtual object with display of at least a portion of the field of view of the one or more cameras (e.g., as described with regard to FIGS. 5E-5F). In some embodiments, the environment displayed by the display generation component includes a background other than an image of a physical environment surrounding the device (e.g., the background of the first user interface region is a preselected background color/pattern, or a background image that is distinct from an output image concurrently captured by the one or more cameras and distinct from live content in a field of view of the one or more cameras) and, in response to a request to display the virtual object in an augmented reality environment, the display of the environment is replaced with display of the physical environment surrounding the device (e.g., as captured in the field of view of the one or more cameras). Either performing an action associated with a virtual object, displaying an indication of input that will cause the action to be performed, or replacing display of an environment that includes a virtual object with a display of the virtual object with a field of view of one or more cameras in response to an input enables the performance of multiple different types of operations in response to the input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, the second set of criteria include (926) criteria that are met in accordance with a determination that the first input is an input for altering a characteristic (e.g., an orientation and/or size) the virtual object. In some embodiments, an input for altering a characteristic includes a swipe input (e.g., movement of a contact along a path on the touch-screen display). For example, the input for altering a characteristic of the virtual object is an input detected while virtual object 5002 is displayed in object staging user interface 5004 for rotating virtual object 5002, as described with regard to FIGS. 5B-5C. In some embodiments, the swipe input changes the orientation of the virtual object (e.g., by rotating the virtual object about one or more axes). In some embodiments, an input for altering a characteristic includes a pinch and/or de-pinch input (e.g., movement of two contacts along respective paths on the touch-screen display that bring the contacts closer together (pinch) or further apart (de-pinch)). In some embodiments, the pinch and/or de-pinch input changes the displayed size of the virtual object. In some embodiments, the first input that satisfies the first set of criteria is an input (e.g., a tap input at a location that corresponds to virtual object 5002) detected while virtual object 5002 is displayed in object staging user interface 5004 (e.g., causing an animation sequence associated with virtual object 5002 to occur while virtual object 5002 is displayed in object staging user interface 5004). Either performing an action associated with a virtual object, displaying an indication of input that will cause the action to be performed, or replacing display of an environment that includes a virtual object with a display of the virtual object with a field of view of one or more cameras in response to an input enables the performance of multiple different types of operations in response to the input. Enabling the performance of multiple different types of operations in response to an input increases the efficiency with which the user is able to perform these operations, which, additionally, reduces power usage and improves battery life of the device by enabling the user to use the device more quickly and efficiently.

In some embodiments, the first visual indication of the one or more inputs that if performed would cause the first set of criteria to be satisfied includes (928) a text prompt (e.g., a text prompt indicating "Tap on the box to view animation!" as described with regard to visual indication 5028 in FIG. 5K). Displaying a text prompt indicating input that will cause the action associated with the virtual object to be performed provides improved visual feedback to the user (e.g., by providing a text that indicates the required input to the user). Providing improved visual feedback to the user increases the efficiency with which the user is able to cause the action associated with a virtual object to be performed, thereby enhancing the operability of the device, which, additionally, reduces power usage and improves battery life of the device by enabling the user to use the device more quickly and efficiently In some embodiments, the device detects (930) a second input that satisfies the first set of criteria while displaying the first visual indication of the one or more inputs that if performed would cause the first set of criteria to be satisfied and, in response to detecting the second input that satisfies the first set of criteria, the device ceases to display the first visual indication. For example, as described with regard to FIGS. 5AD-5AF, an input that satisfies a first set of criteria for performing an action is detected while visual indication 5060 is displayed, and, in accordance with a determination that device 100 has moved to a position that is within a defined distance of a displayed position of virtual object 5002 (as described with regard to FIG. 5AF), the device ceases to display visual indication 5060. Ceasing to display the visual indication of input that will cause the action to be performed, in response to detecting input that satisfies the first set of criteria (e.g., without requiring further user input to dismiss the first visual indication) reduces the number of inputs needed to perform an operation. Reducing the number of inputs needed to perform an operation enhances the operability of the device and makes the user-device interface more efficient, which, additionally, reduces power usage and improves battery life of the device by enabling the user to use the device more quickly and efficiently.

In some embodiments, performing the first action includes (932) animating at least a portion of the virtual object (e.g., animating the virtual object 5002 such that the lid of the box opens, as described with regard to FIGS. 5G-5I). Animating at least a portion of the virtual object provides the user with improved visual feedback (e.g., to indicate that the provided input satisfies the criteria for animating the object). Providing improved visual feedback enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the device displays (934) (e.g., during and/or after performing the first action) a video play head control for adjusting playback of an animated sequence that animates the portion of the virtual object. For example, as described with regard to FIGS. 5AI-5AK, input that moves video play head control 5066 adjusts playback of an animated sequence that animates the lid of virtual object 5002. Displaying a video play head control for adjusting playback of an animated sequence that animates the portion of the virtual object provides the user with improved visual feedback (e.g., to indicate that playback of the virtual object is adjustable). Providing improved visual feedback enhances the operability of the device and makes the user-device interface more efficient, which, additionally, reduces power usage and improves battery life of the device by enabling the user to use the device more quickly and efficiently.

In some embodiments, the electronic device includes (936) an audio generation component, performing the first action includes generating, by the audio generation component, a first audio channel and a second audio channel, and the device adjusts an amplitude of the first audio channel and an amplitude of the second audio channel in accordance with a displayed position of the virtual object in the environment. In some embodiments, spatial audio is used to provide the user of an indication of a distance and/or position of the virtual object in the environment relative to a (real or virtual) position of the user in the environment. For example, as the distance between the virtual object and the user decreases, the amplitude of the first audio channel and the amplitude of the second audio channel increase, and as the virtual object moves from left of the user to right of the user, an amplitude of the left audio channel is decreased and an amplitude of the right audio channel is increased. Adjusting an amplitude of a first audio channel and an amplitude of a second audio channel based on a displayed position of the virtual object in the environment provides the user with aural feedback (e.g., to indicate the distance and the location of the virtual object in the environment relative to the position of the user in the environment). Providing aural feedback enhances the operability of the device and makes the user-device interface more efficient (e.g., by helping the user to locate a virtual object that is not currently within the displayed field of view of the one or more cameras), which, additionally, reduces power usage and improves battery life of the device by enabling the user to use the device more quickly and efficiently.

It should be understood that the particular order in which the operations in FIGS. 9A-9C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1200, and 1400) are also applicable in an analogous manner to method 900 described above with respect to FIGS. 9A-9C. For example, the contacts, inputs, gestures, virtual objects, environments, user interface regions, user interface objects, fields of view, movements, and/or animations described above with reference to method 900 optionally have one or more of the characteristics of the contacts, inputs, gestures, media items, virtual objects, environments, user interface regions, user interface objects, fields of view, movements, and/or animations described herein with reference to other methods described herein (e.g., methods 1000, 1100, 1200, and 1400). For brevity, these details are not repeated here.

FIGS. 10A-10C are flow diagrams illustrating method 1000 of displaying a media item in a user interface that includes content of at least a portion of a field of view of one or more cameras, in accordance with some embodiments. Method 1000 is performed at an electronic device (e.g., device 300, FIG. 3, or portable multifunction device 100, FIG. 1A) with a display generation component (e.g., a display, a projector, a heads-up display, etc.), one or more input devices (e.g., a touch-screen display that serves both as the display and the touch-sensitive surface, cameras, controllers, joysticks, buttons, etc.), and one or cameras (e.g., one or more rear-facing cameras on a side of the device opposite from the display and the touch-sensitive surface). In some embodiments, the display generation component is a touch-screen display and the touch-sensitive surface is an input device that is on or integrated with the display generation component. In some embodiments, the display generation component is separate from one or more input devices. Some operations in method 1000 are, optionally, combined and/or the order of some operations is, optionally, changed.

This method relates to displaying a representation of a media item in a user interface that includes content of at least a portion of a field of view of one or more cameras. Displaying the media item in a user interface that includes content of at least a portion of a field of view of one or more cameras reduces the number of inputs needed to perform an operation (e.g., by providing a control in an existing sharing user interface for displaying the representation of the media item in an interface that includes content of at least a portion of a field of view of one or more cameras). Reducing the number of inputs needed to perform an operation enhances the operability of the device and makes the user-device interface more efficient (e.g., by allowing the user to display a representation of the media item in interface that includes content of at least a portion of a field of view of one or more cameras without needing to provide inputs and/or access external applications to convert the media item for display in an interface that includes content of at least a portion of a field of view of one or more cameras), which, additionally, reduces power usage and improves battery life of the device by enabling the user to use the device more quickly and efficiently.

The device displays (1002), by the display generation component (e.g., touch-sensitive display system 112): a first user interface region (e.g., photo viewing interface 6004 of a photo management application, as described with regard to FIG. 6A), a first representation of a first media item (e.g., a photograph (such as photo 6002), an image, a still image that corresponds to a video, album art that corresponds to music content, or a thumbnail representation thereof) in the first user interface region, and a first user interface object (e.g., control 6008) for displaying a sharing user interface (e.g., an interface that provides a plurality of affordances corresponding to various sharing methods for the first media item and/or other media items).

While displaying the first user interface region, the device detects (1004) a first input corresponding to the sharing user interface object. For example, the device detects an input at a location that corresponds to control 600) for displaying a sharing user interface as described with regard to FIG. 6B.

In response to detecting the first input corresponding to the first user interface object, the device displays (1006) the sharing user interface (e.g., overlaid over the first user interface or replacing display of the first user interface) that includes a second user interface object for initiating a process for displaying a second representation of the first media item in an augmented reality environment (e.g., control 6024 for displaying one or more selected objects in an object three-dimensional viewing mode). For example, in response to the input described with regard to FIG. 6B, the device displays sharing user interface 6016 that includes control 6024, as described with regard to FIG. 6C.

While the sharing user interface is displayed, the device detects (1008) a sequence of one or more inputs including selection of the second user interface object. For example, as described with regard to FIG. 6C, while sharing user interface 6016 is displayed, an input is detected at a location that corresponds to control 6024.

In response to detecting the sequence of one or more inputs including selection of the second user interface object, the device (ceases to display the sharing user interface and/or the first user interface region, and) displays (1010) the second representation of the first media item in a second user interface (e.g., augmented reality user interface 5022) that includes content of at least a portion of the field of view of the one or more cameras (e.g., one or more cameras of camera module 143). For example, in response to the input described with regard to FIG. 6C, the device displays photo 6002 in augmented reality user interface 5022 that includes at least a portion of the field of view of one or more cameras of device 100, as described with regard to FIGS. 6D-6E. In some embodiments, the second representation of the first media item is displayed with a simulated depth (e.g., to give a flat image an appearance of depth in the environment). For example, as described with regard to FIG. 6E, image 6002 is displayed with a simulated backing 6034 that adds an appearance of depth in the environment to image 6002. In some embodiments, the second representation of the first media item is modified to include a simulated reflectivity (e.g., so that the image appears to be glossy) and/or increased luminance (e.g., so that the image appears to be shiny).

In some embodiments, the displayed second representation of the first media item overlays (1012) a respective plane (e.g., a wall, a floor, or a ceiling) in the field of view of the one or more cameras. For example, in FIG. 6E, photo 6002 overlays wall 6032 of physical environment 5018 as detected in the field of view of the one or more cameras of device 100. Displaying a media item representation overlaying a plane in an environment provides improved visual feedback to the user (e.g., allowing the user to see the distance and location of the media item in an environment). Providing improved visual feedback enhances the operability of the device and makes the user-device interface more efficient (e.g., providing easy access and manipulation of the media item to the user), which, additionally, reduces power usage and improves battery life of the device by enabling the user to use the device more quickly and efficiently.

In some embodiments, while displaying the second representation of the first media item in the second user interface, the device detects (1014) an input for rotating the second representation of the first media item (e.g., an input by two contacts that move (e.g., clockwise or counterclockwise) along a rotational path). In response to the input, the device rotates the second representation of the first media item about an axis that is normal to the respective plane in the field of view of the one or more cameras over which the first media item is displayed. For example, as described with regard to FIGS. 6W-6Y, in response to an input for rotating photo 6046 about an axis that is normal to wall 6032 over which photo 6046 is displayed, the device rotates photo 6046 about the axis that is normal to wall 6032. In some embodiments, in accordance with a determination that the input for rotating the second representation of the first media item is a request to rotate the second representation of the first media item about an unavailable axis (e.g., an axis that is not normal to the respective plane in the field of view of the one or more cameras over which the first media item is displayed), a visual indication is displayed (e.g., to indicate that rotation is not permitted about the unavailable axis.) For example, as described with regard to FIG. 6Z, in response to an input for rotating photo 6046 about axis 6106 that is parallel to wall 6032 over which photo 6046 is displayed, the device displays visual indication 6098 indicating that rotation is not permitted about axis 6106. Rotating the media item representation about an axis that is normal to the plane in the field of view of the one or more cameras in response to an input reduces the number of inputs needed to perform an operation (e.g., by allowing the user to directly interact with the displayed representation of the media item as displayed in the augmented reality user interface, rather than requiring the user to indicate a preferred rotation in a different context before the media item is displayed in the augmented reality user interface). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, the device detects (1016) first movement of the electronic device (e.g., lateral movement and/or rotation of the electronic device) that adjusts the field of view of the one or more cameras (e.g., as illustrated in FIGS. 6E-6F) and, in response to detecting the movement of the electronic device, the device adjusts the second representation of the first media item (e.g., photo 6002) in accordance with a fixed spatial relationship (e.g., orientation and/or position) between the second representation of the first media item and the respective plane (e.g., wall 6032) in the field of view of the one or more cameras. Adjusting the media item representation in accordance with a fixed spatial relationship with respect to the field of view of the cameras provides improved visual feedback to the user (e.g., to indicate the fixed spatial relationship of the media item representation relative to the detected plane in the physical environment). Providing improved visual feedback enhances the operability of the device and makes the user-device interface more efficient (e.g., by helping the user to provide proper inputs and reducing use mistakes when interacting with the device), which, additionally, reduces power usage and improves battery life of the device by enabling the user to use the device more quickly and efficiently.

In some embodiments, the device detects (1018) selection of a first representation of a second media item (e.g., while the first user interface region is displayed or while the sharing user interface is displayed) and, in response to detecting the sequence of one or more inputs including selection of the second user interface object, the device displays a second representation of the second media item in the second user interface that includes the content of at least a portion of the field of view of one or more cameras (e.g., the second representation of the first media item and the second representation of the second media item are concurrently displayed in a portion of the field of view of one or more cameras). For example, as described with regard to FIGS. 6I-6J, inputs for selecting a first media item (photo 6002) and a second media item (photo 6046) is detected. In response to detecting a sequence of inputs that includes the inputs for selecting photos 6002 and 6046 (and inputs for displaying photos 6002 and 6046 in augmented reality user interface 5022, as described with regard to FIGS. 6L-6M), photos 6002 and 6046 are displayed in augmented reality user interface 5022 that includes content of at least a portion of the field of view of one or more cameras, as described with regard to FIGS. 6N-6O. In some embodiments, the second representation of the first media item and the second representation of the second media item are displayed with fixed spatial relationships to plane (e.g., overlaying the same plane) in the field of view of the one or more cameras. Displaying multiple media items in a user interface that includes the field of view of one or more cameras in response to detecting the sequence of one or more inputs reduces the number of inputs needed to perform an operation (e.g., by allowing the user to select multiple media items using a single selection user interface and simultaneously place the multiple selected items). Reducing the number of inputs needed to perform an operation enhances the operability of the device, which additionally, reduces power usage and improves battery life of the device by enabling the user to use the device more quickly and efficiently.

In some embodiments, the selection of the second media item is detected (1020) while the sharing user interface is displayed. For example, the first media item is selected by the first input corresponding to the sharing user interface object (e.g., when the first input is received while the first media item is displayed in the first user interface region) and the second media item is selected by an additional input received (e.g., among the sequence of one or more inputs including selection of the second user interface object) at a location corresponding to the second media item while the sharing user interface is displayed. Displaying multiple media items in a user interface that includes the field of view of one or more cameras in response to detecting the sequence of one or more inputs reduces the number of inputs needed to perform an operation (e.g., by allowing the user to provide a single input at a sharing user interface object to simultaneously place multiple selected items). Reducing the number of inputs needed to perform an operation enhances the operability of the device, which additionally, reduces power usage and improves battery life of the device by enabling the user to use the device more quickly and efficiently.

In some embodiments, while displaying the first user interface region, the device displays (1022) the first representation of the second media item and the selection of the second media item is detected while the first user interface region is displayed. For example, the first media item (e.g., photo 6002) is selected by a first input (e.g., a tap input) detected at a location corresponding to the first media item (e.g., as described with regard to FIG. 6I) while the first user interface region (e.g., a photo selection interface 6036) is displayed and the second media item (e.g., photo 6046) is selected by a second input (e.g., a tap input) detected at a location corresponding to the second media item (e.g., as described with regard to FIG. 6J) while the first user interface region is displayed (e.g., prior to detection of the first input corresponding to the sharing user interface object). Displaying multiple media items in a user interface that includes the field of view of one or more cameras in response to detecting the sequence of one or more inputs reduces the number of inputs needed to perform an operation (e.g., by allowing the user to select multiple media items using a single selection user interface and simultaneously place the multiple selected items). Reducing the number of inputs needed to perform an operation enhances the operability of the device, which additionally, reduces power usage and improves battery life of the device by enabling the user to use the device more quickly and efficiently.

In some embodiments, selection of the first media item is detected (1024) at a first time (e.g., by the first input corresponding to the sharing user interface object (e.g., when the first input is received while the first media item is displayed in the first user interface region) or by a first selection input (e.g., a tap input at a location that corresponds to the first media item) detected prior to the first the first input corresponding to the sharing user interface object). For example, selection of the first representation of photo 6002 is detected (e.g., as described with regard to FIG. 6I) at a first time. Selection of the second media item is detected at a second time (e.g., by a selection input detected while the sharing user interface is displayed or by a second selection input (e.g., a tap input at a location that corresponds to the second media item) detected prior to detection of the first input corresponding to the sharing user interface object). For example, selection of the first representation of photo 6046 is detected (e.g., as described with regard to FIG. 6J) at a second time. Displaying the second representation of the first media item in the second user interface and displaying the second representation of the second media item in the second user interface includes: in accordance with a determination that the first time is prior to the second time, displaying the second representation of the first media item and the second representation of the second media item with a first order (e.g., the first media item is displayed to the left of (or above, or in front of) the second media item (e.g. overlaying a plane in the field of view of the one or more cameras)) and in accordance with a determination that the second time is prior to the first time, displaying the second representation of the first media item and the second representation of the second media item with a second order (e.g., the first media item is displayed to the right of (or below, or behind) the second media item) that is distinct from the first order. For example, because the first time at which the first representation of photo 6002 was selected is prior to the second time at which the first representation of photo 6046 was selected, the second representation of photo 6002 is displayed to the left of the second representation of photo 6046 in FIG. 6O. If the first representation of photo 6046 was selected prior to the first representation of photo 6046, the second representation of photo 6002 would instead be displayed to the right of the second representation of photo 6046. Ordering the multiple media item representations in an environment in accordance with the time of selection of the respective media items performs an operation (e.g., the operation of determining the order of the media item representations in the environment) based on a selection order without requiring further user input to order the multiple media items in the environment. Performing an operation automatically without requiring further user input enhances the operability of the device, which, reduces power usage and improves battery life of the device by enabling the user to use the device more quickly and efficiently.

In some embodiments, while displaying the first representation of the first media item in the second user interface and displaying the second representation of the second media item in the second user interface, the device detects (1026) an input for manipulating a second representation of a respective media item (e.g. an input that includes a swipe gesture (for altering a position of the second representation of the respective media item on a respective plane in the field of view of the one or more cameras or for moving the second representation of the respective media item from a first respective plane in the field of view of the one or more cameras to a second respective plane in the field of view of the one or more cameras), an input that includes a de-pinch gesture (for increasing a size of the second representation of the respective media item), an input that includes a pinch gesture (for decreasing the size of the second representation of the respective media item), and/or an input that includes a rotation gesture (for rotating the second representation of the respective media item). In response to detecting the input for manipulating the second representation of the respective media item: in accordance with a determination that the first input is directed to the second representation of the first media item (e.g., a swipe input directed to photo 6002 as described with regard to FIGS. 6O-6P), the device manipulates the second representation of the first media item based on the first input (e.g., photo 6002 moves in accordance with the swipe input); and in accordance with a determination that the first input is directed to the second representation of the second media item (e.g., a swipe input directed to photo 6046 as described with regard to FIGS. 6Q-6R), the device manipulates the second representation of the second media item based on the first input (e.g., as photo 6046 moves in accordance with the swipe input). FIGS. 6P-6Y illustrate examples of inputs for manipulating media items 6002, 6046 and 6052 in augmented reality user interface 5022. In some embodiments, the input for manipulating a second representation of a respective media item is detected while only a single media item (e.g., the second representation of the first media item) is displayed and the displayed representation of the media item is manipulated in response to the input. Manipulating the respective media item representation in the environment in response to detecting the input reduced the number of inputs needed to perform an operation (e.g., by allowing the user to directly manipulate the displayed objects without requiring additional inputs to designate an item to be manipulated). Reducing the number of inputs needed to manipulate the media item representations enhances the operability of the device, which, additionally, reduces power usage and improves battery life of the device by enabling the user to use the device more quickly and efficiently.

In some embodiments, the sharing user interface includes (1028) a third user interface object for transmitting the first media item to a remote device (e.g., via an e-mail, a message (e.g., SMS or MMS) or a device-to-device file transferring service (e.g., AirDrop). For example, as described with regard to FIG. 6C, sharing user interface 6016 includes user interface objects (labelled with contact names "John" and "Mary," as indicated in region 6018) for transmitting photo 6002 to a contact via a device-to-device file transferring service and user interface objects (labelled "Mail" and "Message" in region 6020) for transmitting photo 6002 to a remote device via e-mail or via message, respectively. In some embodiments, the sharing user interface includes a fourth user interface object for viewing and/or storing the first media item in an application (e.g., an application (such as a notes management application), that is distinct from the application (such as a photo management application) that displays the first user interface object). For example, as described with regard to FIG. 6C, sharing user interface 6016 includes a user interface object (labelled "Notes" in region 6018) for storing photo 6002 to a notes application that is distinct from the photo management application. In some embodiments, the sharing user interface includes a fifth user interface object for copying the first media item. For example, as described with regard to FIG. 6C, sharing user interface 6016 includes a user interface object (labelled "Copy" in region 6022) for copying photo 6002. In some embodiments, the sharing user interface includes sixth user interface object for ceasing to display the sharing user interface. For example, as described with regard to FIG. 6C, a user interface object (control 6028 for ceasing to display the sharing user interface 6016) is displayed for ceasing to display sharing user interface 6016. Including a user interface object for transmitting a media item to a remote device on the same sharing user interface that includes the option for displaying the media item in a field of view of one or more cameras provides additional control options without cluttering the user interface (e.g., with controls for displaying additional user interfaces). Providing additional control options without cluttering the user interface with additional displayed controls enhances the operability of the device, which, additionally, reduces power usage and improves battery life of the device by enabling the user to use the device more quickly and efficiently.

In some embodiments, the second representation of the first media item (e.g., the cutout version of photo 6110) is displayed (1030) with an orientation that is perpendicular to a plane (e.g., a floor or a ceiling) in the field of view of the one or more cameras. For example, as described with regard to FIGS. 6AE-6AH, the cutout version of photo 6110 is displayed with an orientation that is perpendicular to floor plane 5046 (e.g., such that floor plane 5046 appears to support the cutout version of photo 6110). In some embodiments, a background of the first media item is transparent (e.g., an outline of a subject of the first media item is detected and a background that includes one or more portions of the first media item that are beyond the outline (e.g., portions of photo 6110 that are beyond the cutout version of photo 6110) are removed from the second representation of the first media item such that a physical environment as captured in the field of view of the one or more cameras is visible around the outline and "through" the transparent portion of the second representation of the first media item. For example, physical table 5020 is visible around the outline of the cutout version of the photo 6110. Displaying the media item representation with an orientation that is perpendicular to a plane in the field of view of the one or more cameras provides additional control options to the user without cluttering the user interface with additional displayed control (e.g., the user is enabled to display a media item at a fixed position that is parallel to a vertical surface or perpendicular to a horizontal surface using controls accessed via the same sharing user interface). Providing additional control options to the user enhances the operability of the device, which, additionally, reduces power usage and improves battery life of the device by enabling the user to use the device more quickly and efficiently.

In some embodiments, while a first face of the second representation of the first media item is displayed, the device detects (1032) a second movement of the electronic device that adjusts the field of view of the one or more cameras (e.g., a movement of device 100 as described with regard to FIGS. 6AE-6AI). In response to detecting the second movement of the electronic device, the device adjusts the second representation of the first media item (e.g., the cutout version of photo 6110) in accordance with a fixed spatial relationship (e.g., orientation and/or position) between the second representation of the first media item and the plane in the field of view of the one or more cameras. After the second movement, a second face, opposite the first face, of the second representation of the first media item is displayed and the second face of the second representation of the first media item is a reversed version of the first face of the second representation of the first media item. For example, the face of the cutout version of photo 6110 displayed in FIG. 6AI is opposite the face of the cutout version of photo 6110 displayed in FIG. 6AE. Displaying a second face, opposite the first face, of the second representation of the first media item in response to movement of the electronic device provides improved visual feedback to the user (e.g., indicating a position of the user relative to the photo), which enhances the operability of the device, which, additionally, reduces power usage and improves battery life of the device by enabling the user to use the device more quickly and efficiently.

It should be understood that the particular order in which the operations in FIGS. 10A-10C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1200, and 1400) are also applicable in an analogous manner to method 1000 described above with respect to FIGS. 10A-10C. For example, the contacts, inputs, gestures, media items, environments, user interface regions, user interface objects, fields of view, and/or movements described above with reference to method 1000 optionally have one or more of the characteristics of the contacts, inputs, gestures, media items, virtual objects environments, virtual objects, user interface regions, user interface objects, fields of view, and/or movements described herein with reference to other methods described herein (e.g., methods 900, 1100, 1200, and 1400). For brevity, these details are not repeated here.

FIGS. 11A-11D are flow diagrams illustrating method 1100 for responding to an input directed to a respective virtual object of a plurality of displayed virtual objects, in accordance with some embodiments. Method 1100 is performed at an electronic device (e.g., device 300, FIG. 3, or portable multifunction device 100, FIG. 1A) with a display generation component (e.g., a display, a projector, a heads-up display, etc.), one or more input devices (e.g., a touch-screen display that serves both as the display and the touch-sensitive surface, cameras, controllers, joysticks, buttons, etc.), and one or cameras (e.g., one or more rear-facing cameras on a side of the device opposite from the display and the touch-sensitive surface). In some embodiments, the display generation component is a touch-screen display and the touch-sensitive surface is an input device that is on or integrated with the display generation component. In some embodiments, the display generation component is separate from one or more input devices. Some operations in method 1100 are, optionally, combined and/or the order of some operations is, optionally, changed.

This method relates to changing the display property of a single virtual object or multiple virtual objects based on a manipulation input, depending on whether the multiple virtual objects are displayed with a portion of a field of view of one or more cameras. Either changing the display property of a single virtual object or changing the display property of multiple virtual objects, depending on whether the multiple virtual objects are being displayed with a portion of a field of view of cameras provides additional control options without cluttering the user interface with additional displayed controls (e.g., the same input is used to perform different operations rather than requiring separate controls for the different operations). Providing additional control options without cluttering the user interface with additional displayed controls enhances the operability of the device and makes user-device interface more efficient, which, additionally, reduces power usage and improves battery life of the device by enabling the user to use the device more quickly and efficiently.

The device displays (1102), by the display generation component (e.g., touch-sensitive display system 112), a plurality of virtual objects (e.g., graphical representations of three-dimensional objects). For example, as described with regard to FIG. 7A, virtual objects 7002, 7004, and 7006 are displayed in object staging user interface 5004; and as described with regard to FIG. 7H, virtual objects 7002, 7004, and 7006 are displayed in augmented reality user interface 5022 that includes at least a portion of a field of view of the one or more cameras (e.g., one or more cameras of camera module 143).

While displaying the plurality of virtual objects, the device detects (1104) a first manipulation input directed to a respective virtual object of the plurality of virtual objects (e.g., a pinch or swipe at a location on the touch-sensitive surface that corresponds to: the first virtual object, the second virtual object, another virtual object in the plurality of virtual objects, or a space adjacent to the respective virtual object of the plurality of virtual objects). For example, as described with regard to FIG. 7B, an upward swipe input is detected at a location that corresponds to virtual object 7002 displayed in object staging user interface 5004. In FIG. 7H, an upward swipe input is detected at a location that corresponds to virtual object 7002 displayed in augmented reality user interface 5022.

In response to detecting the first manipulation input directed to the respective virtual object of the plurality of virtual objects (1106): in accordance with a determination that the plurality of virtual objects are displayed with at least a portion of a field of view of the one or more cameras, the device changes a display property of the respective virtual object based on the first manipulation input (e.g., individually rotating, resizing, and/or moving the respective virtual object), and, in accordance with a determination that the plurality of virtual objects are displayed in a user interface that does not include the field of view of the one or more cameras (e.g., a staging user interface that includes a simulated three-dimensional space in which a three-dimensional representation of the virtual object may be manipulated (e.g., rotated around an x-axis, a y-axis, and/or a Z-axis, and/or resized) in response to user input), the device changes a display property of the plurality of virtual objects (e.g., collectively rotating and/or resizing the plurality of virtual objects) based on the first manipulation input. For example, in response to the input described with regard to FIG. 7B, while virtual object 7002 is displayed in object staging user interface 5004 that does not include the field of view of the one or more cameras, a display property of virtual objects 7002, 7004, and 7006 is changed (e.g., virtual objects 7002, 7004, and 7006 are all simultaneously rotated, as illustrated in FIGS. 7B-7C). In response to the input described with regard to FIG. 7H, while virtual object 7002 is displayed in object augmented reality user interface 5022 that does include the field of view of the one or more cameras, a display property of virtual object 7002 is changed (e.g., virtual objects 7002 is moved, as illustrated in FIGS. 7H-7I, and no other virtual objects are moved (virtual object 7004 and 7006 remain at the same position from FIG. 7H to FIG. 7I)).

In some embodiments, while the plurality of virtual objects are displayed in the user interface that does not include the field of view of the one or more cameras, the plurality of virtual objects are displayed (1108) with a first set of display characteristics. Displaying the virtual objects with a first set of display characteristics when the virtual objects are displayed in a user interface including the field of view of cameras provides improved visual feedback to the user (e.g., by allowing the user to determine how the virtual objects are displayed). Providing improved visual feedback to the user increases the efficiency with which the user is able to play with the virtual objects, thereby enhancing the operability of the device, which additionally, reduces power usage and improves battery life of the device by enabling the user to use the device more quickly and efficiently.

In some embodiments, the first set of display characteristics includes (1110) a height ordering characteristic and displaying the plurality of objects in accordance with the height ordering characteristic includes ordering the respective virtual objects of the plurality of virtual objects in accordance with respective heights of the respective virtual objects (e.g., a first virtual object that has a first height is displayed to the left of, above, and/or in front of a second virtual object that has a second height). For example, as illustrated in FIG. 7X, virtual objects 7002, 7004, and 7006 are displayed in descending height order. In some embodiments, the plurality of objects are displayed in ascending height order. Displaying the virtual objects in accordance with the height ordering characteristic provides improved visual feedback to the user (e.g., by allowing the user to readily understand the quantity and distribution of virtual objects). Providing improved visual feedback to the user enhances the operability of the device, which additionally, reduces power usage and improves battery life of the device by enabling the user to use the device more quickly and efficiently.

In some embodiments, the first set of display characteristics includes (1112) a spacing characteristic and displaying the plurality of objects in accordance with the spacing characteristic includes positioning the respective virtual objects of the plurality of virtual objects with a uniform distance between respective boundaries of adjacent respective virtual objects. For example, as illustrated in FIG. 7X, virtual objects 7002, 7004, and 7006 are displayed with a uniform distance between the boundaries (e.g., outlines) of the respective virtual objects. Displaying the virtual objects in accordance with the spacing characteristics including positioning of the respective virtual objects when the virtual objects are displayed in a user interface including the field of view of cameras provides improved visual feedback to the user (e.g., by allowing the user to readily understand the quantity and distribution of virtual objects). Providing improved visual feedback to the user increases the efficiency with which the user is able to play with the virtual objects, thereby enhancing the operability of the device, which additionally, reduces power usage and improves battery life of the device by enabling the user to use the device more quickly and efficiently.

In some embodiments, a first respective virtual object of the plurality of virtual objects has (1114) a first boundary (e.g., an outline of the first respective virtual object or an oval or box that circumscribes the first respective virtual object) that corresponds to a static state of the first respective virtual object. For example, as described with regard to FIG. 7Z, virtual object 7090 has a first boundary 7096 that is a box that surrounds (e.g., the outer edges of) virtual object 7090. The first respective virtual object is associated with a first action (e.g., an animation sequence that animates at least a portion of the virtual object) that causes at least a portion of the first virtual object to extend beyond the first boundary (e.g., the virtual object grows in size during the animation). For example, as described with regard to FIGS. 7Z-7AB, virtual object 7090 has an animated sequence that causes virtual object 7090 to move beyond first boundary 7096. The first respective virtual object has a second boundary that corresponds to the extended range of the first respective virtual object during the first action (e.g., an outline of the first respective virtual object that incorporates the extension caused by the first action or an oval or box that circumscribes the first respective virtual object including the extension caused by the first action). For example, as described with regard to FIGS. 7AB-7AC, second boundary 7108 of virtual object 7090 to an extended range of virtual object 7090 including the movement of virtual object 7090 beyond boundary 7096 during the animated sequence. The respective boundaries of the adjacent respective virtual objects include the second boundary of the first respective virtual object. For example, virtual object 7088 has boundary 7094 that is a box that surrounds (e.g., the outer edges of) virtual object 7088, virtual object 7090 has second boundary 7108 of virtual object 7090 to an extended range of virtual object 7090, and virtual object 7092 has boundary 7098 that is a box that surrounds (e.g., the outer edges of) virtual object 7092. Virtual objects 7088, 7090, and 7092 are displayed with a uniform distance between the boundaries (e.g., outlines) of the respective virtual objects. The virtual object having a first boundary that corresponds to the static state of the virtual object and a second boundary that corresponds to the extended range of the virtual object during the associated action provides improved visual feedback to the user (e.g., by allowing the user to determine the extent of animation of the virtual object and manipulate the virtual object in accordance with the information about the extent of the animation). Providing improved visual feedback to the user increases the efficiency with which the user is able to interact with the virtual object (e.g. by helping the user to provide proper inputs and reducing user mistakes when operating/interacting with the device), thereby enhancing the operability of the device, which, additionally, reduces power usage and improves battery life of the device by enabling the user to use the device more quickly and efficiently.

In some embodiments, while displaying the plurality of virtual objects with at least a portion of a field of view of the one or more cameras (e.g., in augmented reality user interface 5022), after changing the display property of the respective virtual object based on the first manipulation input, the device detects (1116) a request to display the plurality of virtual objects in the user interface that does not include the field of view of the one or more cameras (e.g., object staging user interface 5004). For example, after display properties of virtual objects 7002, 7004, and 7006 have been changed in response to inputs provided while augmented reality user interface 5022 is displayed, as described with regard to FIGS. 7H-7R, an input at a location that corresponds to the "Object" region of toggle control 5008 is provided as a request to display virtual objects 7002, 7004 and 7006 in object staging interface 5004, as described with regard to FIG. 7U. In response to detecting the request to display the plurality of virtual objects in the user interface that does not include the field of view of the one or more cameras, the device displays the user interface that does not include the field of view of the one or more cameras, including displaying the plurality of virtual objects with the first set of display characteristics. For example, as described with regard to FIGS. 7U-7X, virtual objects 7002, 7004, and 7006 are displayed in object staging interface 5004 with the same positions, orientations, and order that virtual objects 7002, 7004, and 7006 had in object staging interface 5004 prior to the changes to the display properties that occurred in response to inputs provided while augmented reality user interface 5022 was displayed. For example, the positions, orientations, sizes, and order of virtual objects 7002, 7004, and 7006 in FIG. 7X are the same as the positions, orientations, sizes, and order of virtual objects 7002, 7004, and 7006 in FIG. 7A. Displaying the virtual objects with the first set of display characteristics when displaying the user interface that does not include the field of view of the one or more cameras reduces the number of inputs needed to perform an operation (e.g., by displaying all of the virtual objects in readily accessible positions, such that the user does not need to reposition a virtual objects in order to view and manipulate it). Reducing the number of inputs needed to perform an operation increases the efficiency with which the user is able to switch between different display, thereby enhancing the operability of the device, which, additionally, reduces power usage and improves battery life of the device by enabling the user to use the device more quickly and efficiently.

In some embodiments, while displaying the plurality of virtual objects in the user interface that does not include the field of view of the one or more cameras (e.g., object staging user interface 5004), the device detects (1118) a request to re-display the plurality of virtual objects with at least a portion of a field of view of the one or more cameras (e.g., in augmented reality user interface 5022). For example, after display properties of virtual objects 7002, 7004, and 7006 have been changed in response to inputs provided while augmented reality user interface 5022 is displayed, as described with regard to FIGS. 7H-7R, and after virtual objects 7002, 7004 and 7006 are displayed in object staging interface 5004, as described with regard to FIG. 7X, an input at a location that corresponds to the "AR" region of toggle control 5008 is provided as a request to re-display virtual objects 7002, 7004 and 7006 in augmented reality user interface 5022, as described with regard to FIG. 7X. In response to detecting the request to re-display the plurality of virtual objects with at least a portion of a field of view of the one or more cameras, the device re-displays the plurality of virtual objects with at least a portion of a field of view of the one or more cameras, wherein the display property of the respective virtual object is changed based on the first manipulation input. For example, as described with regard to FIGS. 7X-7Y, virtual objects 7002, 7004 and 7006 are re-displayed in augmented reality user interface 5022. In FIG. 7Y, virtual objects 7002, 7004, and 7006 are displayed in accordance with the changes to the positions, orientations, sizes, and order that were made in response to inputs provided, as described with regard to FIGS. 7H-7R. Re-displaying the respective virtual object with a display property based on the first manipulation input reduces the number of inputs needed (e.g., by re-applying the display property to the respective virtual object without requiring the user to provide the input to manipulate the respective virtual object a second time). Reducing the number of inputs needed to perform an operation increases the efficiency with which the user is able to interact with virtual objects, thereby enhancing the operability of the device, which, additionally, reduces power usage and improves battery life of the device by enabling the user to use the device more quickly and efficiently.

In some embodiments, the first manipulation input is a rotation input and changing the display property of the plurality of virtual objects (in the user interface that does not include the field of view of the one or more cameras) includes (1120) rotating the plurality of virtual objects around a central region (e.g., centroid) of a boundary that corresponds to (e.g., surrounds) the plurality of virtual objects. For example, as described with regard to FIGS. 7B-7C, virtual objects 7002, 7004, and 7006 rotate around a centerline 7014 that is a central region of boundary 7012. In some embodiments, the boundary that corresponds to the plurality of virtual objects is an oval or box that circumscribes the plurality of virtual objects. In some embodiments, at least one virtual object of the plurality of virtual objects is associated with a first action (e.g., an animation sequence that animates at least a portion of the virtual object) that causes at least a portion of the first virtual object to extend beyond a first boundary that corresponds to the static state of the virtual object (e.g., the virtual object grows in size during the animation) and the boundary that corresponds to the plurality of virtual objects encompasses a second boundary that corresponds to the extended range of the at least one virtual object. For example, as described with regard to FIG. 7AC, first boundary 7096 corresponds to a static state of virtual object 7090 and second boundary 7108 corresponds to an extended range of virtual object 7090. Rotating the plurality of virtual objects around a central region of a boundary that corresponds to the plurality of virtual objects reduces the number of inputs needed to perform an operation (e.g., by rotating the virtual objects collectively in response to a single input rather than requiring several individual inputs). Reducing the number of inputs needed to perform an operation increases the efficiency with which the user is able to perform these operations, thereby enhancing the operability of the device, which, additionally, reduces power usage and improves battery life of the device by enabling the user to use the device more quickly and efficiently.

In some embodiments, prior to displaying the plurality of virtual objects, the device displays (1122) a selection user interface (e.g., a photo user interface that displays a plurality of selectable images, a file user interface that displays a plurality of selectable files, or a website that includes a plurality of selectable objects). While the selection user interface is displayed, the device detects selection of the plurality of virtual objects. For example, as described with regard to FIGS. 7AD-7AH, while object management user interface 7099 is displayed, selection of virtual objects 7110, 7118, and 7122 is detected. While the plurality of virtual objects are selected, the device receives a request to display the plurality of virtual objects. For example, the request to display the plurality of virtual objects includes an input at a location that corresponds to share control 7130, as described with regard to FIG. 7AH, and an input at a location that corresponds to control 6024 for displaying one or more selected objects in an object three-dimensional viewing mode, as described with regard to FIG. 7AI. In response to receiving the request to display the plurality of virtual objects, the device displays the plurality of virtual objects in the user interface that does not include the field of view of the one or more cameras. For example in response to the inputs described with regard to FIGS. 7AH-7AI, virtual objects 7110, 7118, and 7122 are displayed in object staging view 5004, as described with regard to FIG. 7AJ. In some embodiments, the selection user interface enables selection of a plurality of virtual objects using a single selection input (e.g., the selection user interface includes a link for accessing a predefined group of virtual objects). In some embodiments, an anchor plane that corresponds to the respective plane is a property in a set of properties of a respective virtual object of the plurality of virtual objects, and is specified in accordance with the nature of a physical object that the respective virtual object is supposed to represent. In some embodiments, the virtual object is placed at a predefined orientation and/or position relative to multiple planes detected in the field of view of the one or more cameras (e.g., multiple respective sides of the virtual object are associated with respective planes detected in the field of view of the camera(s). In some embodiments, if the orientation and/or position predefined for the virtual object is defined relative to a horizontal bottom plane of the virtual object, the bottom plane of the virtual object is displayed on a floor plane detected in the field of view of the camera(s) (e.g., the horizontal bottom plane of the virtual object is parallel to the floor plane with zero distance from the floor plane). In some embodiments, if the orientation and/or position predefined for the virtual object is defined relative to a vertical back plane of the virtual object, the back surface of the virtual object is placed against a wall plane detected in the field of view of the one or more cameras (e.g., the vertical back plane of the virtual object is parallel to the wall plane with zero distance from the wall plane). In some embodiments, the virtual object is placed at a fixed distance relative a respective plane and/or at an angle other than zero or right angles relative to the respective plane. Enabling selection of a plurality of virtual objects from the selection user interface reduces the number of inputs required to select multiple objects (e.g., by allowing a user to select multiple objects from a single user interface rather than requiring the user to separately select objects from multiple user interfaces). Reducing the number of inputs required to perform an operation enhances the operability of the device, which, additionally, reduces power usage and improves battery life of the device by enabling the user to use the device more quickly and efficiently.

In some embodiments, a first virtual object of the plurality of virtual objects has a first defined plane type (e.g., the first virtual object is configured to be displayed at a fixed position relative to a first type of plane, such as a vertical (e.g., wall) plane) and a second virtual object of the plurality of virtual objects has a second defined plane type (e.g., the second virtual object is configured to be displayed at a fixed position relative to a second type of plane, such as a horizontal (e.g., floor, ceiling, or table surface) plane). For example, the defined plane type of virtual object 7118 is a vertical plane and the defined plane type of virtual object 7110 is a horizontal plane. In response to receiving the request to display the plurality of virtual objects (1124): the first virtual object of the plurality of virtual objects is displayed at a fixed position relative to a first plane that corresponds to the first defined plane type (e.g., the first virtual object is displayed at a fixed position relative to a vertical plane) and the second virtual object of the plurality of virtual objects is displayed at a fixed position relative to a second plane that corresponds to the second defined plane type that is distinct from the first defined plane type (e.g., the second virtual object is displayed at a fixed position relative to a horizontal plane). For example, as described with regard to FIG. 7AK, virtual object 7118 is displayed at a fixed position relative to vertical plane 7132 and virtual object 7110 is displayed at a fixed position relative to horizontal plane 5046. Displaying the first virtual object at a fixed position relative to a first plane and displaying the second virtual object at a fixed position relative to a second plane reduces the number of inputs required to place multiple virtual objects (e.g., by reducing the number of inputs required to individually place multiple virtual objects at positions relative to different planes). Reducing the number of inputs required to place multiple virtual objects enhances the operability of the device, which, additionally, reduces power usage and improves battery life of the device by enabling the user to use the device more quickly and efficiently.

In some embodiments, while the first virtual object is displayed at the fixed position relative to the first plane and the second virtual object is displayed at the fixed position relative to the second plane, the device detects (1126) a rotation input. In response to detecting the rotation input: in accordance with a determination that the rotation input is directed to the first virtual object, the device rotates the first virtual object about a first axis (e.g., rotating the first virtual object about an axis that is normal to a vertical plane relative to which the first virtual object is displayed) and in accordance with a determination that the rotation input is directed to the second virtual object, the device rotates the second virtual object about a second axis that is distinct from the first axis (e.g., rotating the second virtual object about an axis that is normal to a horizontal plane relative to which the second virtual object is displayed). For example, as described with regard to FIGS. 7AM-7AO, in response to a rotation input directed to virtual object 7118, virtual object 7118 rotates about an axis that is normal to vertical plane 7132 and, as described with regard to FIGS. 7AO-7AQ, in response to a rotation input directed to virtual object 7110, virtual object 7110 rotates about an axis that is normal to horizontal plane 5046. Rotating the first virtual object and the second virtual object about different axes in response to detecting a rotation input provides reduces the number of inputs needed to perform an operation (e.g., by automatically determining the appropriate axis of rotation based on the surface to which the virtual object is affixed without requiring the user to provide input to specify an axis of rotation). Reducing the number of inputs needed to perform rotation of virtual objects about different axes in a user interface increases the efficiency with which the user is able to perform these operations, thereby enhancing the operability of the device, which, additionally, reduces power usage and improves battery life of the device by enabling the user to use the device more quickly and efficiently.

It should be understood that the particular order in which the operations in FIGS. 11A-11D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1200, and 1400) are also applicable in an analogous manner to method 1100 described above with respect to FIGS. 11A-11D. For example, the contacts, inputs, gestures, virtual objects, environments, user interface regions, user interface objects, fields of view, movements, and/or animations described above with reference to method 1100 optionally have one or more of the characteristics of the contacts, inputs, gestures, media items, virtual objects, environments, user interface regions, user interface objects, fields of view, movements, and/or animations described herein with reference to other methods described herein (e.g., methods 900, 1000, 1200, and 1400). For brevity, these details are not repeated here.

FIGS. 12A-12B are flow diagrams illustrating method 1200 for displaying a prompt to change a property of a media item that does not meet compatibility criteria for display in an augmented reality environment, in accordance with some embodiments. Method 1200 is performed at an electronic device (e.g., device 300, FIG. 3, or portable multifunction device 100, FIG. 1A) with a display generation component (e.g., a display, a projector, a heads-up display, etc.), one or more input devices (e.g., a touch-screen display that serves both as the display and the touch-sensitive surface, cameras, controllers, joysticks, buttons, etc.), and one or cameras (e.g., one or more rear-facing cameras on a side of the device opposite from the display and the touch-sensitive surface). In some embodiments, the display generation component is a touch-screen display and the touch-sensitive surface is an input device that is on or integrated with the display generation component. In some embodiments, the display generation component is separate from one or more input devices. Some operations in method 1200 are, optionally, combined and/or the order of some operations is, optionally, changed.

The device displays (1202), by the display generation component (e.g., touch-sensitive display system 112), a representation of a media item (e.g., a three-dimensional model, a photograph, an image, a still image that corresponds to a video, album art that corresponds to music content, or a thumbnail representation thereof). For example, in FIG. 8A, AR-incompatible media item 8002 is displayed in file management user interface 8000. In FIG. 8G, AR-compatible media item 8022 is displayed in file management user interface 8000.

The device detects (1204) an input corresponding to a request to display the media item in an augmented reality environment. For example, the input includes input detected at a location that corresponds to share control 7130 as described with regard to FIG. 8B and/or FIG. 8H and/or input detected at a location that corresponds to control 6024, as described with regard to FIG. 8C and/or FIG. 8I.

In response to detecting the input corresponding to a request to display the media item in an augmented reality environment (1206): in accordance with a determination that the media item has a property (e.g., media format, data size, or corresponding physical size) that does not meet compatibility criteria for display in the augmented reality environment (e.g., the incompatible media format is wavefront, collada, PLY, Alembic, gITF, or dae), the device displays a prompt (e.g., replacing display of the representation of the media item and/or overlaid over display of the media item) to change the property of the media item (e.g., convert the media item from a first format to a compatible format, apply compression, or adjust a size property of the object) and, in accordance with a determination that the media item meets the compatibility criteria (e.g., the compatible media format is a format of a three-dimensional virtual object or the media format is compatible with an augmented reality platform, such as the AR Kit platform), the device displays a virtual object that corresponds to the media item with content of at least a portion of the field of view of the one or more cameras. For example, media item 8002 has a property that does not meet compatibility criteria for display in an augmented reality environment, so in response to the request to display media item 8002 in an augmented reality environment, prompt 8012 to change the property of the media item is displayed. Media item 8022 meets compatibility criteria for display in an augmented reality environment, so in response to the request to display media item 8022 in an augmented reality environment, virtual object 8023 that corresponds to media item 8022 is displayed in augmented reality environment 5022, as illustrated in FIG. 8K. Displaying a virtual object corresponding to the media item that meets the compatibility criteria or displaying a prompt to change the property of the media item that does not meet the compatibility criteria, in response to detecting the input corresponding to a request to display the media item in an augmented reality environment, provides improved visual feedback to the user (e.g., by notifying the user whether the media item meets compatibility criteria). Providing improved visual feedback to the user increases the efficiency with which the user is able to display the media item as the virtual object, thereby enhancing the operability of the device, which, additionally, reduces power usage and improves battery life of the device by enabling the user to use the device more quickly and efficiently.

In some embodiments, while displaying the representation of the media item, the device displays (1208) a control (e.g., a button that indicates an option for viewing the media item in AR) that corresponds to the media item and the input corresponding to the request to display the media item in the augmented reality environment is an input detected at a location that corresponds to the control that corresponds to the media item. Displaying a control that corresponds to the media item and detecting an input at the location that corresponds to the control provides additional control options without cluttering the UI with additional displayed controls. Providing additional control options without cluttering the UI with additional displayed controls enhances the operability of the device, which, additionally, reduces power usage and improves battery life of the device by enabling the user to use the device more quickly and efficiently.

In some embodiments, the one or more input devices include a touch-screen display and the device detects (1210) an input by a contact with the touch-screen at a location that corresponds to the representation of the media item. In response to detecting the input by the contact with the touch-screen at the location that corresponds to the representation of the media item, in accordance with a determination that the input meets option display criteria, the device displays an option for displaying the media item in the augmented reality environment. The input corresponding to the request to display the media item in the augmented reality environment is an input detected at a location that corresponds to the option for displaying the media item in the augmented reality environment. Displaying an option for displaying the media item in the augmented reality environment in accordance with a determination that the input meets option display criteria provides additional control options without cluttering the UI with additional displayed controls. Providing additional control options without cluttering the UI with additional displayed controls enhances the operability of the device, which, additionally, reduces power usage and improves battery life of the device by enabling the user to use the device more quickly and efficiently.

In some embodiments, the option display criteria include (1212) criteria that are satisfied in accordance with a determination that the contact is maintained at the location on the touch-sensitive surface that corresponds to the representation of the media item with less than a threshold amount of movement for at least a predefined threshold amount of time (e.g., a long press time threshold). For example, the first criteria are met by a touch-hold input.

In some embodiments, the compatibility criteria include criteria that are satisfied in accordance with a determination that (1214) a file format of the media item is a file format (e.g., the compatible media format is a format of a three-dimensional virtual object or the media format is compatible with an augmented reality platform, such as the AR Kit platform) that is compatible with display in the augmented reality environment. For example, the file format is USDZ.

In some embodiments, the compatibility criteria include criteria that are satisfied in accordance with a determination that (1216) a data size of the media item meets size criteria (e.g., the data size is below a defined threshold).

In some embodiments, the media item includes (1218) metadata that indicates a physical size of that corresponds to the media item (and, in some embodiments, a plane type that corresponds to the media item (e.g., wall, floor, ceiling)), the device detects, in the field of view of the one or more cameras, at least one plane; and the compatibility criteria include criteria that are satisfied in accordance with a determination that a physical size of the media item meets placement criteria for the at least one plane (e.g., the physical size of the media item is not larger than a determined size of the plane). In some embodiments, the placement criteria require that a plane type that corresponds to a specified plane type of the media item is detected in the field of view of the one or more cameras and/or that the physical size of the media item is not larger than a detected plane of the plane type. Satisfying the compatibility criteria in accordance with a determination that the physical size of the media item meets placement criteria for the plane reduces the number of inputs needed to perform an operation (e.g., allowing the user to determine whether the media item meets the compatibility criteria for displaying a virtual object in the augmented reality environment). Reducing the number of inputs needed to perform an operation enhances the operability of the device, which, additionally, reduces power usage and improves battery life of the device by enabling the user to use the device more quickly and efficiently.

In some embodiments, while displaying the prompt to change the property of the media item, the device detects (1220) an input for accepting the suggestion to change the property of the media item (e.g., an input at a location that corresponds to control 8014 for converting the selected media item to an AR-compatible format, as described with regard to FIG. 8D) and, in response to detecting the input for accepting the suggestion to change the property of the media item, the device changes the property of the media item (e.g., the device converts the media item from a first format to a compatible format, apply compression, or adjust a size property of the object). For example, in response to detecting the input for accepting the suggestion to change the property of the media item, media item 8002 is converted to virtual object 8003. Changing the property of the media item in response to detecting the input for accepting the suggestion to change the property of the media item reduces the number of inputs required to change the property of the media item (e.g., by changing the property without requiring the user to provide input to exit the application and use an external application to change the property of the media item). Reducing the number of inputs required to change the property of the media item enhances the operability of the device, which, additionally, reduces power usage and improves battery life of the device by enabling the user to use the device more quickly and efficiently.

In some embodiments, in response to detecting the input for accepting the suggestion to change the property of the media item, the device displays (1222) the virtual object that corresponds to the media item with content of at least a portion of the field of view of the one or more cameras (e.g., virtual object 8003 corresponding to the converted version of media item 8002 is displayed in augmented reality user interface 5022, as described with regard to FIG. 8F). Displaying the virtual object that corresponds to the media item in a user interface that includes content of at least a portion of the field of view of cameras in response to detecting the input for accepting the suggestion to change the property of the media item reduces the number of inputs required to change the property of the media item (e.g., by changing the property without requiring the user to provide input to exit the application and use an external application to change the property of the media item). Reducing the number of inputs required to change the property of the media item enhances the operability of the device, which, additionally, reduces power usage and improves battery life of the device by enabling the user to use the device more quickly and efficiently.

In some embodiments, in response to detecting the input for accepting the suggestion to change the property of the media item, the device displays (1224) the virtual object that corresponds to the media item in a user interface that does not include the field of view of the one or more cameras (e.g., a staging user interface that includes a simulated three-dimensional space in which a three-dimensional representation of the virtual object may be manipulated (e.g., rotated around an x-axis, a y-axis, and/or a Z-axis, and/or resized) in response to user input). For example, virtual object 8003 corresponding to the converted version of media item 8002 is displayed in object staging user interface 5004, as described with regard to FIG. 8E. Displaying the virtual object that corresponds to the media item in a user interface that does not includes content of at least a portion of the field of view of cameras in response to detecting the input for accepting the suggestion to change the property of the media item reduces the number of inputs required to change the property of the media item (e.g., by changing the property without requiring the user to provide input to exit the application and use an external application to change the property of the media item). Reducing the number of inputs required to change the property of the media item enhances the operability of the device, which, additionally, reduces power usage and improves battery life of the device by enabling the user to use the device more quickly and efficiently.

In some embodiments, while displaying the prompt to change the property of the media item, the device detects (1226) an input for rejecting the suggestion to change the property of the media item and, in response to detecting the input for rejecting the suggestion to change the property of the media item, the device displays an error message instead of displaying the virtual object in a user interface that includes the field of view of the one or more cameras. Displaying an error message in response to detecting the input for rejecting the suggestion to change the property of the media item provides improved visual feedback to the user (e.g., indicating to the user that the suggestion to change the property of the media item has been rejected). Providing improved visual feedback enhances the operability of the device, which, additionally, reduces power usage and improves battery life of the device by enabling the user to use the device more quickly and efficiently.

It should be understood that the particular order in which the operations in FIGS. 12A-12B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, and 1400) are also applicable in an analogous manner to method 1200 described above with respect to FIGS. 12A-12B. For example, the contacts, inputs, gestures, media items, virtual objects, environments, user interface regions, user interface objects, and/or fields of view described above with reference to method 1200 optionally have one or more of the characteristics of the contacts, inputs, gestures, media items, virtual objects, environments, user interface regions, user interface objects, fields of view, movements, and/or animations described herein with reference to other methods described herein (e.g., methods 900, 1000, 1100, and 1400). For brevity, these details are not repeated here.

FIGS. 13A-13J illustrate example user interfaces for displaying a virtual model of content concurrently with a selectable user interface object for performing an operation associated with the content, in accordance with some embodiments. The user interfaces in these figures are used to illustrate the processes described below, including the processes in FIGS. 9A-9C, 10A-10C, 11A-11D, 12A-12B, and 13A-13B. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 13A-13G are related to a shopping user interface 1300 that is configured to perform an operation (e.g., a purchase operation) associated with content.

Figure 13A:
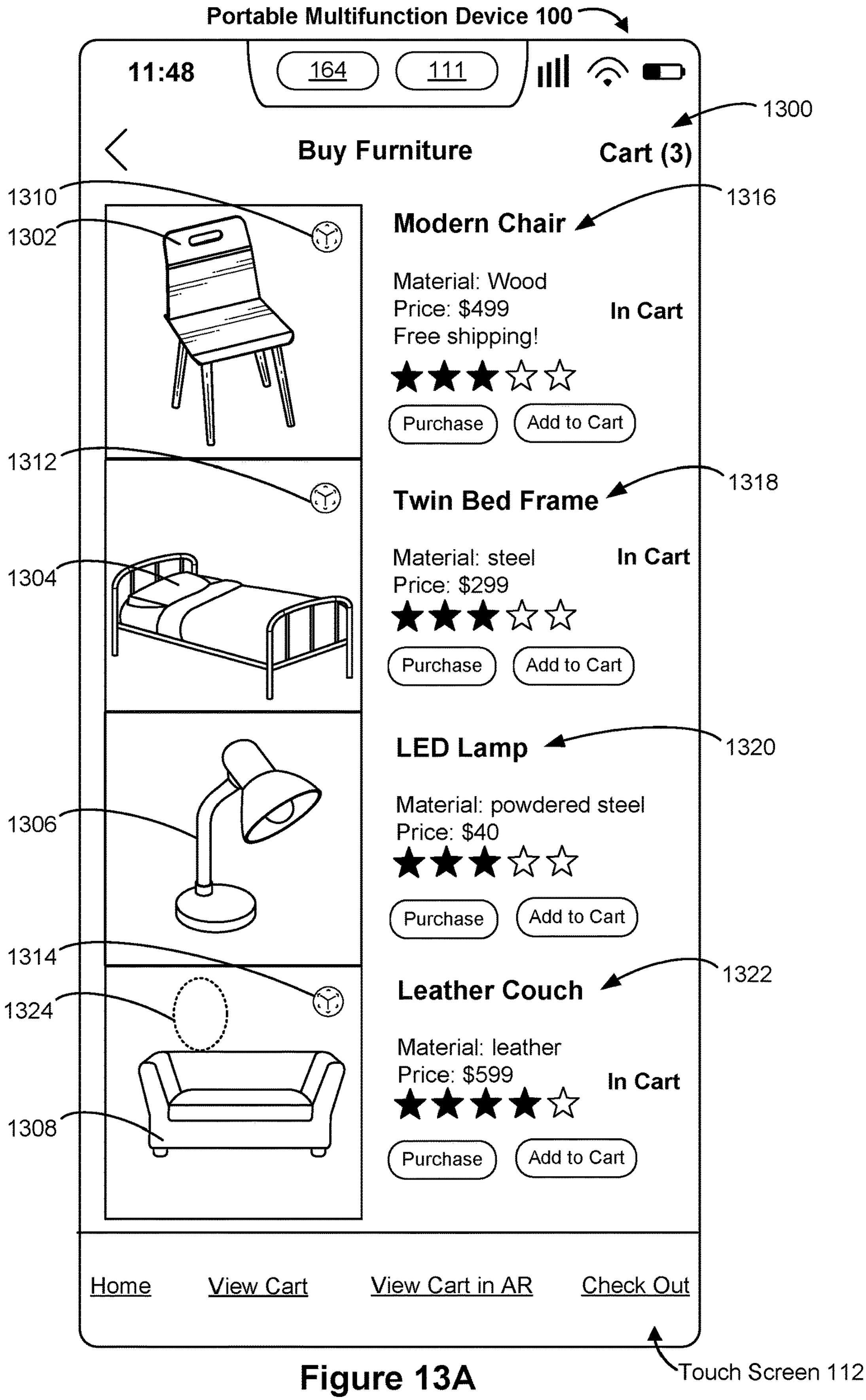
FIGS. 13A-13J illustrate example user interfaces for displaying a virtual model of content concurrently with a selectable user interface object for performing an operation associated with the content, in accordance with some embodiments.

FIG. 13A illustrates shopping user interface 1300 that displays content that includes content item 1302 (a chair), content item 1304 (a bed frame), content item 1306 (a lamp), and content item 1308 (a couch). Virtual models of content items 1302, 1304, and 1308 are available (e.g., for display in an object view and/or an augmented reality view as described further below with regard to FIGS. 13B-13C), as indicated by virtual model indicators 1310, 1312, and 1314, respectively. For example, virtual model indicator 1310 displayed adjacent to content item 1302 indicates that a virtual model of content item 1302 is available to view. Because no virtual model indicator is displayed for content item 1306, the user is made aware that no virtual model is available for content item 1306. The shopping user interface 1300 includes metadata 1316, 1318, 1320, and 1322 that corresponds to content items 1302, 1304, 1306, and 1308, respectively. For example, metadata 1316 includes a name ("Modern Chair") of content item 1302, a material ("Material: Wood") of content item 1302, a price ("Price: $499") of content item 1302, additional information ("Free Shipping!") for content item 1302, and/or a rating (three out of five stars) for content item 1302.

Figure 13B:
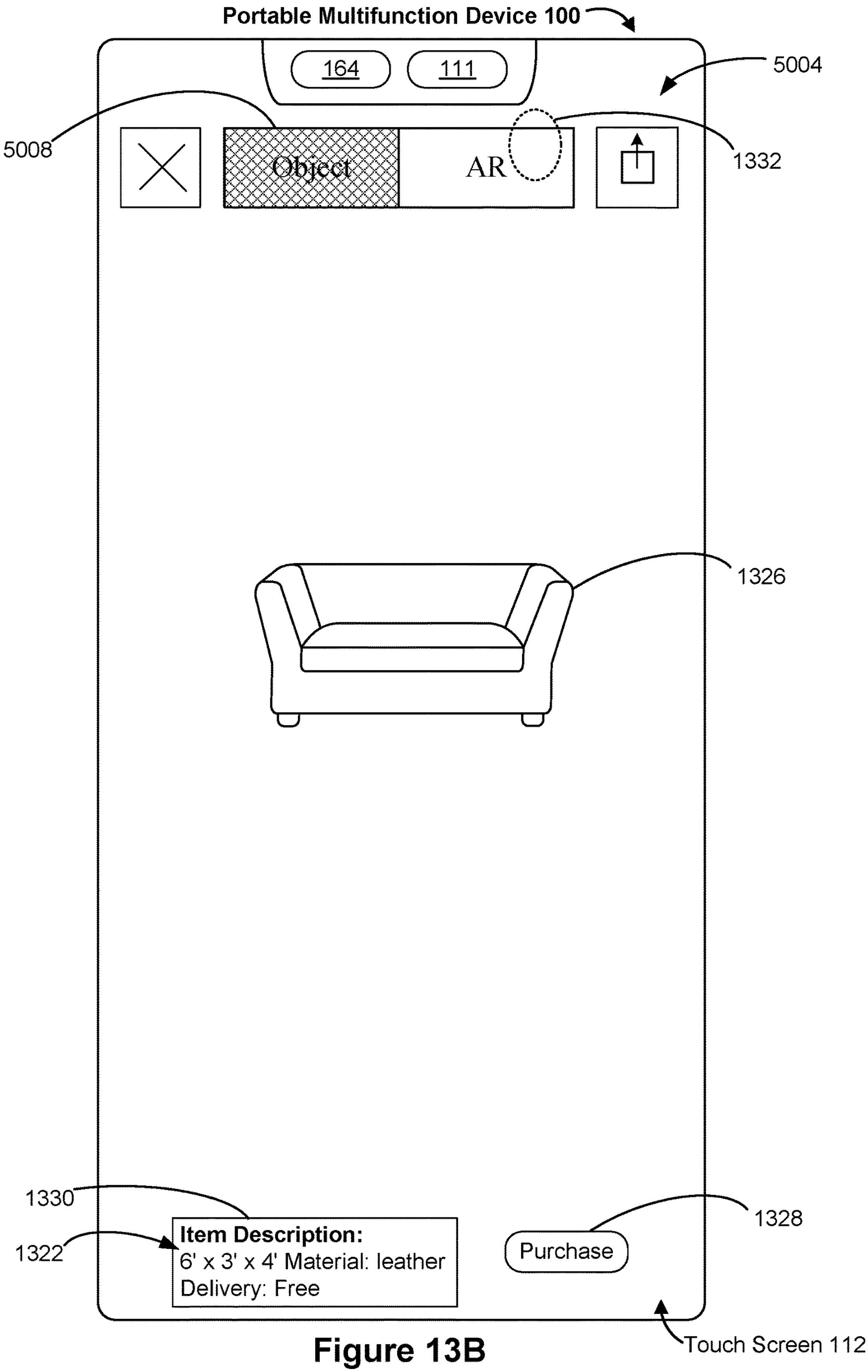

While shopping user interface 1300 is displayed, a request to display a virtual model that corresponds to content item 1308 is received. For example, an input (e.g., a tap input) by a contact 1324 is detected at a location that corresponds to content item 1308 (e.g., at a location that corresponds to the displayed representation of the content item and/or at a location that corresponds to metadata associated with the content item), as illustrated in FIG. 13A. In some embodiments, in response to the request to display the virtual model that corresponds to a content item, the virtual model is displayed in an object staging user interface (e.g., object staging user interface 5004, as illustrated in FIG. 13B). In some embodiments, in response to the request to display the virtual model that corresponds to a content item, the virtual model is displayed in an augmented reality user interface (e.g., augmented reality user interface 5022, as illustrated in FIG. 13C).

As illustrated in FIG. 13B, in response to the input by contact 1324, a virtual model 1326 of content item 1308 is displayed concurrently with selectable user interface object 1328 (e.g., a purchase button) in object staging user interface 5004. While virtual model 1326 is displayed in object staging user interface 5004, user input for manipulation of virtual model 1326 causes a characteristic of virtual model 1326 to change (e.g. rotation of the virtual object about one or more axes). For example, manipulation of virtual model 1326 in object staging user interface 5004 occurs as described with regard to FIGS. 5B-5C above. In some embodiments, at least a portion of the metadata 1322 for content item 1308 is displayed in object staging user interface 5004, as indicated at 1330.

While virtual model 1326 is displayed in object staging user interface 5004, as shown in FIG. 13B, an input (e.g., a tap input) by contact 1332 is detected on touch-sensitive display system 112 at a location that corresponds to the "AR" region of toggle control 5008. In response to the input, display of object staging user interface 5004 is replaced by display of virtual model 1326 in an augmented reality user interface 5022 (e.g., virtual model 1326 is displayed in a physical environment captured by one or more cameras of device 100), as illustrated in FIG. 13C.

Figure 13C:
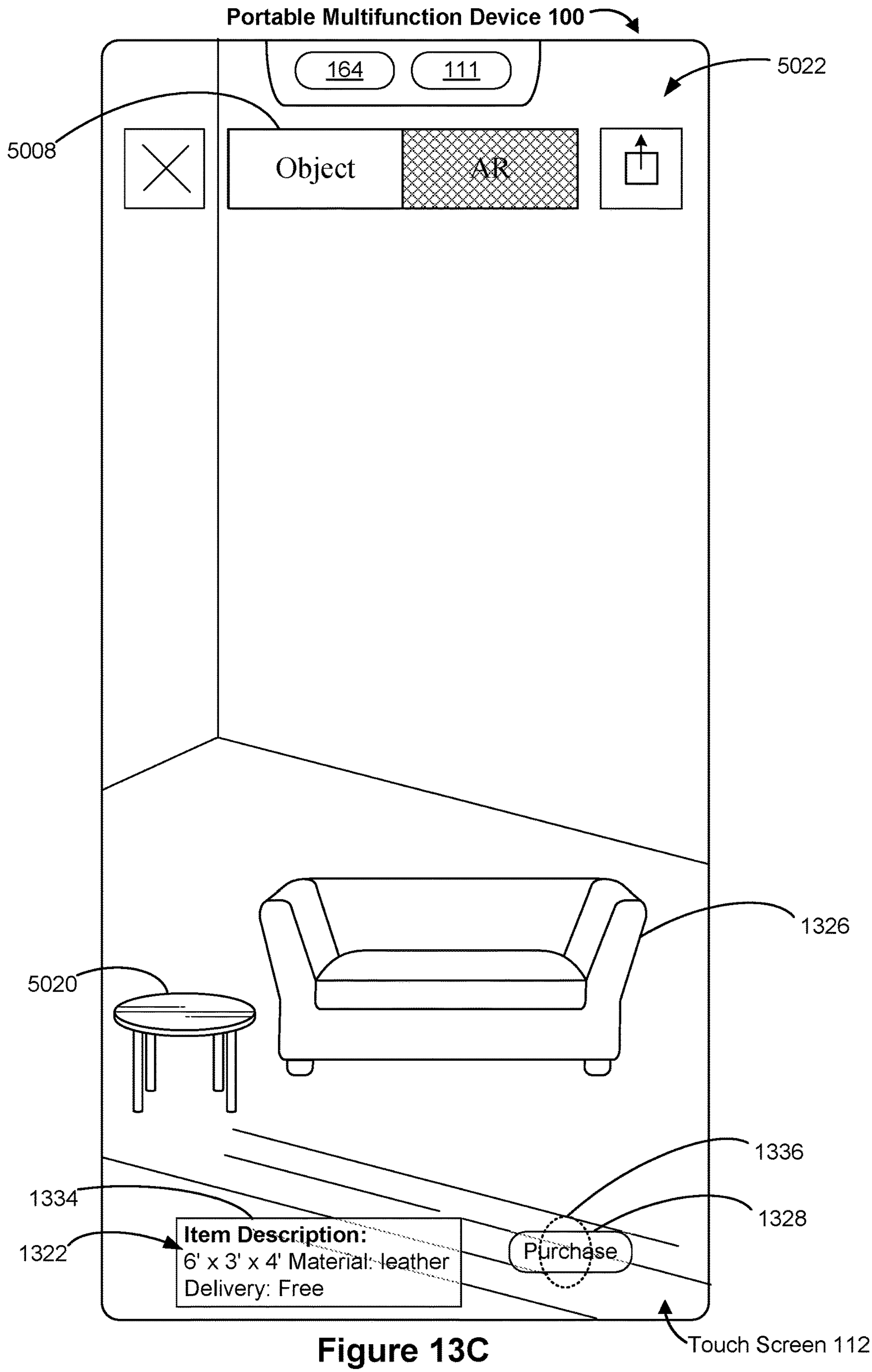

In FIG. 13C, virtual model 1326 of content item 1308 is displayed concurrently with selectable user interface object 1328 in augmented reality user interface 5022. In some embodiments, virtual model 1326 is displayed at a location that corresponds to a surface (e.g., a floor surface) detected in the physical environment captured by one or more cameras of device 100. Physical table 5020 is visible in the physical environment captured by the one or more cameras. Selectable user interface object 1328 is translucent (e.g., such that the floor in the physical environment is partially visible through the "Purchase" button.) In some embodiments, at least a portion of the metadata 1322 for content item 1308 is also displayed in augmented reality user interface 5022, as indicated at 1334.

Figure 13D:
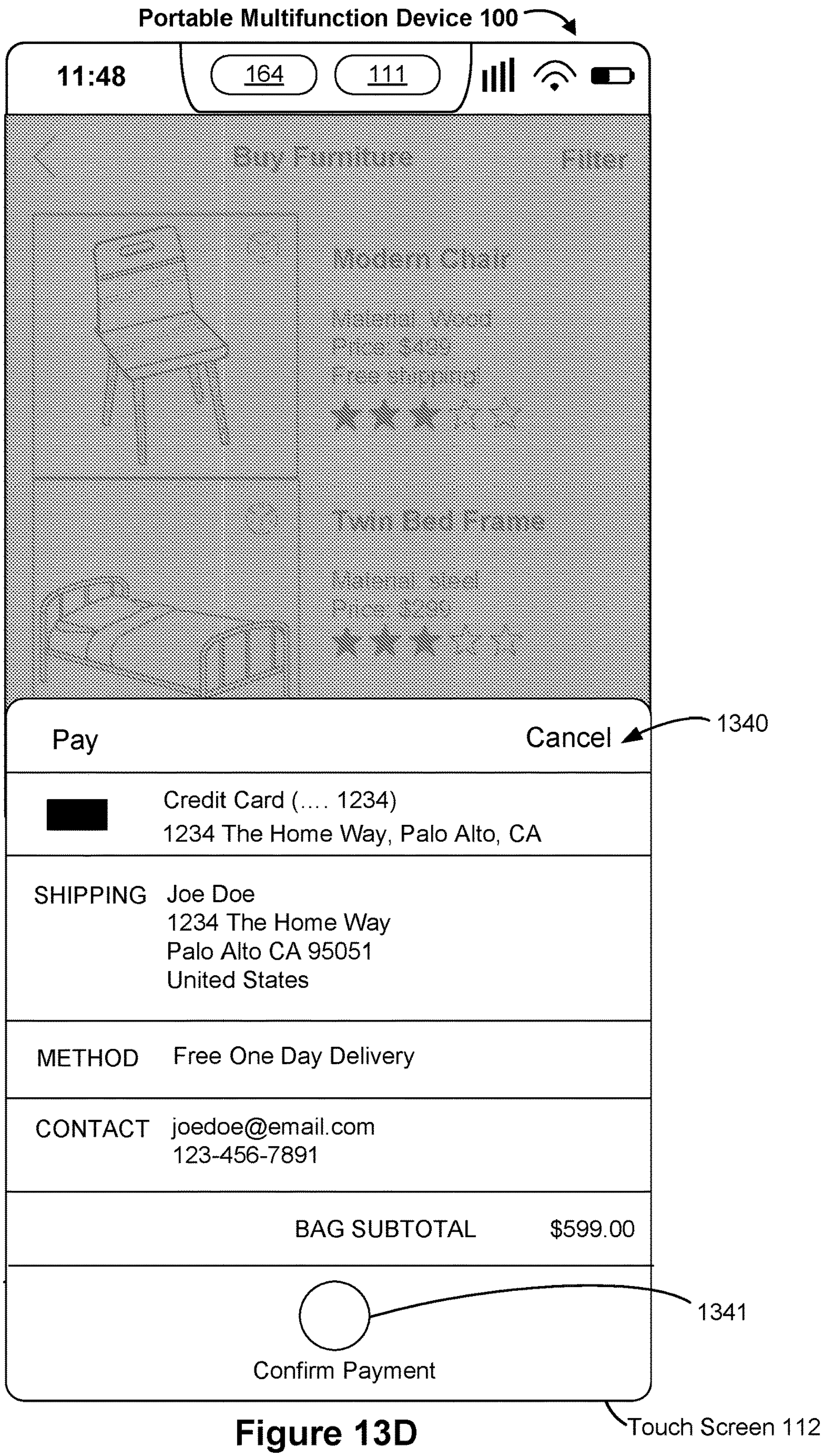

While virtual model 1326 is displayed concurrently with selectable user interface object 1328 (e.g., in object staging user interface 5004, as illustrated in FIG. 13B or in augmented reality user interface 5022, as illustrated in FIG. 13C) an input (e.g., a tap input by contact 1336, illustrated in FIG. 13C) is detected at a location that corresponds to selectable user interface object 1328. In some embodiments, in response to detecting the input at a location that corresponds to selectable user interface object 1328, a native payment interface 1340 (e.g., a payment interface associated with the operating system of device 100, such as an Apple Pay interface) is displayed, as shown in FIG. 13D. In some embodiments, in response to detecting the input at a location that corresponds to selectable user interface object 1328, a store payment interface 1342 (e.g., a payment interface associated with the store that provides shopping user interface 1300) is displayed, as shown in FIG. 13E.

As illustrated in FIG. 13D, native payment interface 1340 includes payment information (e.g., previously provided credit card information), shipping information (e.g., a previously provided shipping address and/or shipping method), and contact information for the purchaser (e.g., previously provided contact information). While the native payment interface 1340 is displayed, an input to authorize acquisition of content item 1308 is provided (e.g., the user provides input (e.g., a tap input) at a user interface object for authorizing acquisition of the content item, the user provides a numeric input at a displayed number pad, or the user provides biometric information such as a fingerprint or thumbprint at a location that corresponds to a fingerprint sensor and/or a facial recognition input). For example, the input to authorize acquisition of content item 1308 is a thumbprint input detected by a thumbprint sensor at a location indicated by region 1341.

Figure 13E:

FIG. 13E illustrates store payment interface 1342. In some embodiments, store payment interface includes input fields that prompt the user to provide input indicating payment information, shipping information, and/or contact information. While the store payment interface 1342 is displayed, an input to authorize acquisition of content item 1308 is provided (e.g., the user provides input (e.g., a tap input) at a location that corresponds to "Place Order" button 1344).

Figure 13F:
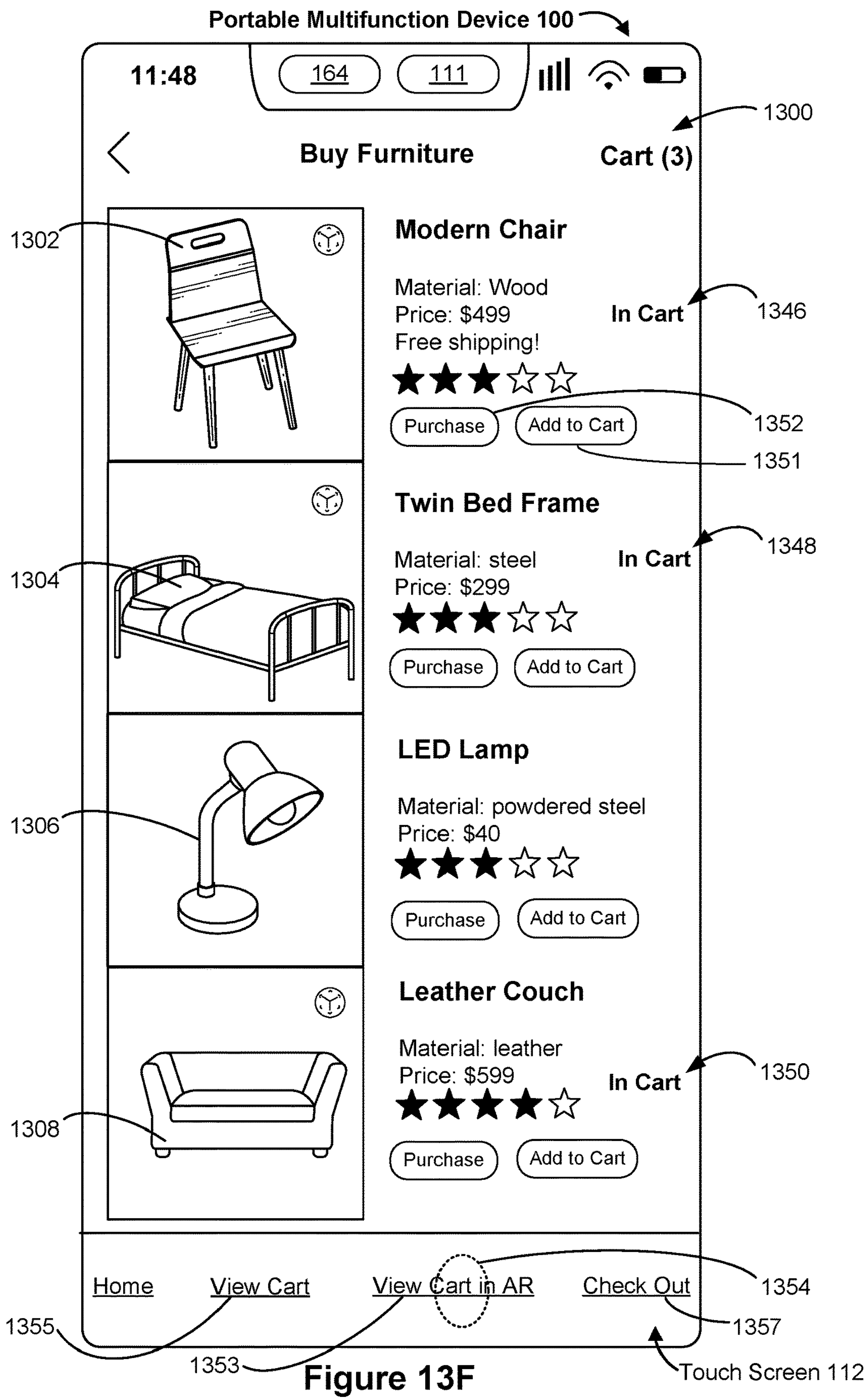

FIG. 13F illustrates input that corresponds to a request to display a virtual model that includes multiple virtual objects that correspond to multiple content items. As shown in FIG. 13F, content items 1302, 1304 and 1308 have been added to a shopping cart (as indicated by in-cart indicators 1346, 1348, and 1350). For example, content item 1302 has been added to the shopping cart by input at a location that corresponds to a respective add to cart button 1351 that corresponds to content item 1302. An input (e.g., a tap input) by a contact 1354 is detected at a location that corresponds to a user interface object for viewing a virtual model of the selected content items (e.g., "View Cart in AR" link 1353). In some embodiments, the user interface object for viewing the virtual model of the selected content items is distinct from a user interface object (e.g., "View Cart" link 1355) for viewing the selected content items (e.g., without displaying virtual objects that correspond to the respective selected content items). For example, from shopping user interface 1300, a user is enabled to add individual items to a cart (e.g., using add to cart button 1351), purchase individual items using a selectable user interface object (e.g., purchase button 1352), view a virtual model that corresponds to a content item (e.g., by providing input at a location that corresponds to the content item), view a virtual model that corresponds to content in the cart (e.g., multiple content items in the cart) in an augmented reality user interface 5022 (e.g., using "View Cart in AR" link 1353), view the content in the cart without displaying a virtual model of the content (e.g., using "View Cart" link 1355), and/or provide input to proceed directly to a payment interface, such as native payment user interface 1340 or store payment interface 1342 (e.g., using the "Check Out" link 1357). In response to the input detected at the location that corresponds to the user interface object for viewing the virtual model of the selected content items, the virtual model is displayed (e.g., in an object staging user interface 5004 or an augmented reality user interface 5022).

Figure 13G:
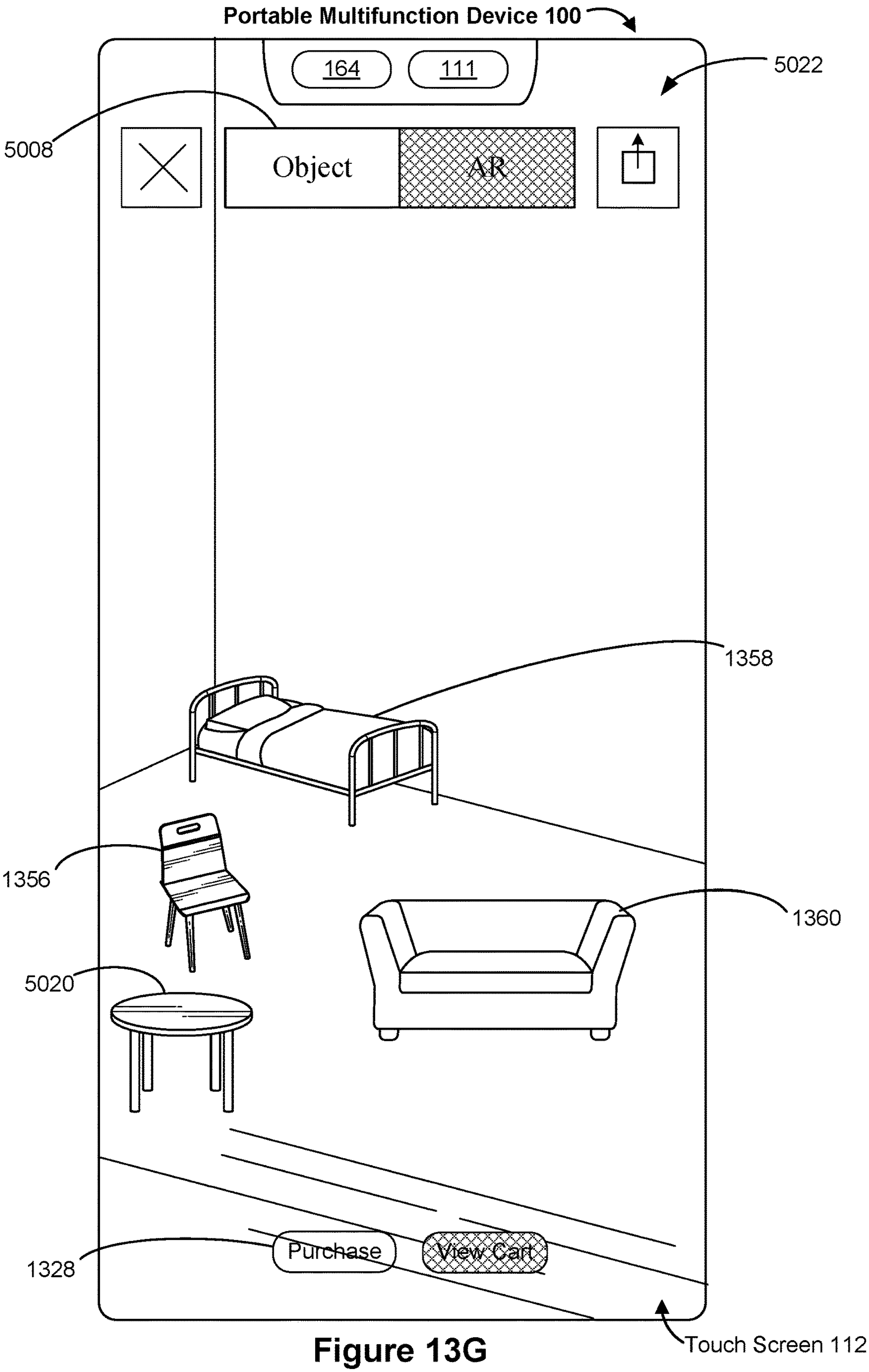

In FIG. 13G, in response to the input detected at the "View Cart in AR" link 1353, display of shopping user interface 1300 has been replaced by display of augmented reality user interface 5022. A virtual model that includes virtual object 1356 associated with content item 1302 (the chair), virtual object 1358 associated with content item 1304 (the bed), and virtual object 1360 associated with content item 1308 (the couch) is displayed concurrently with selectable user interface object 1328 in augmented reality user interface 5022. In some embodiments, in response to the input detected at the "View Cart in AR" link 1353, display of shopping user interface 1300 is replaced by display of the virtual model that includes virtual object 1356, 1358, and 1360 concurrently with selectable user interface object 1328 in object staging user interface 5004. In some embodiments, responses to input directed to a respective virtual object of a plurality of displayed virtual objects in the virtual model occur as described with regard to FIGS. 7A-7AQ and 11A-11D. For example, in response to a manipulation input directed to a respective virtual object displayed in augmented reality user interface 5022, the device changes a display property of the respective virtual object based on the manipulation input, and in response to a manipulation input directed to a respective virtual object displayed in object staging user interface 5004, the device changes a display property of the plurality of virtual objects based on the manipulation input.

Figure 13H:
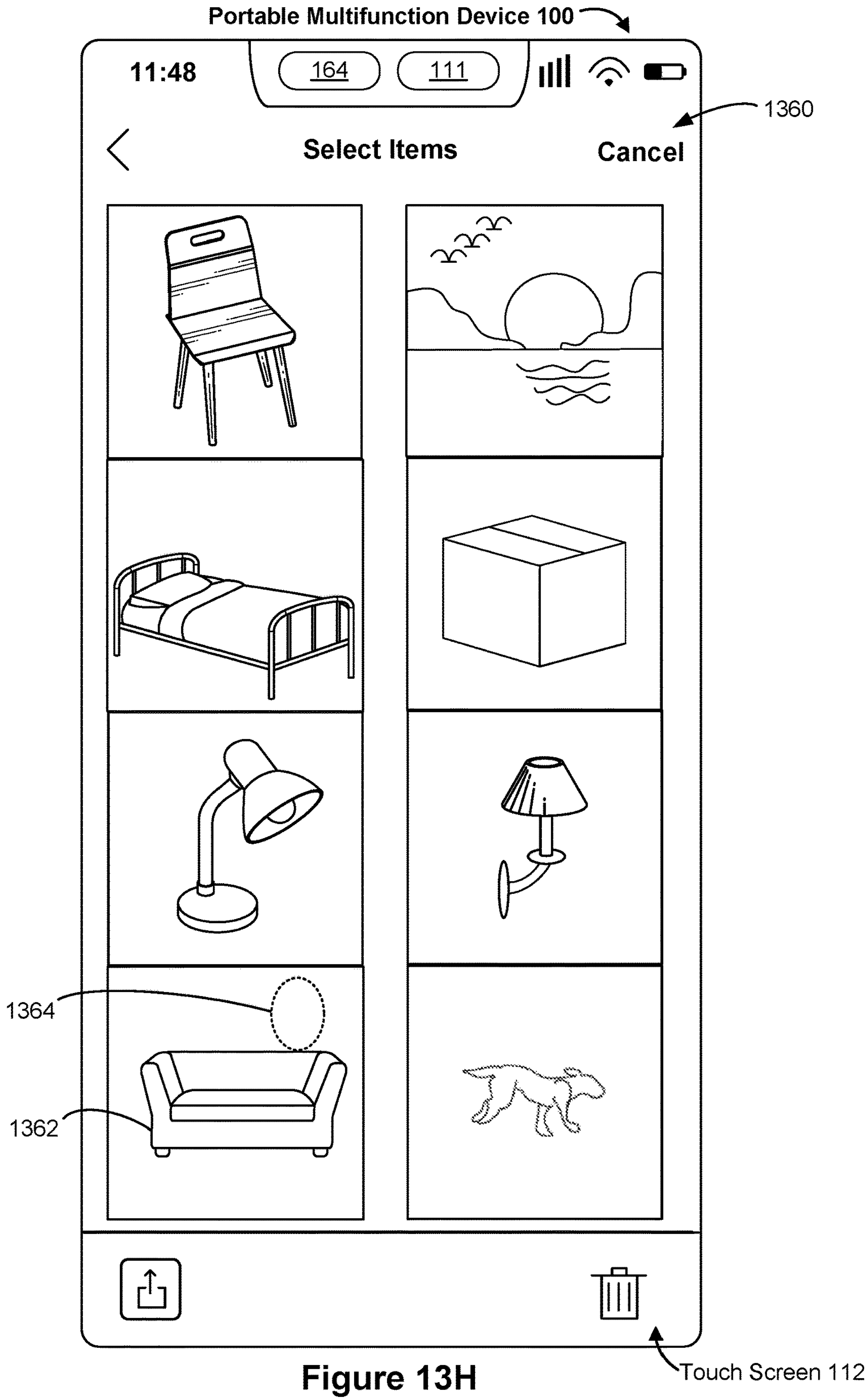
Figure 13I:
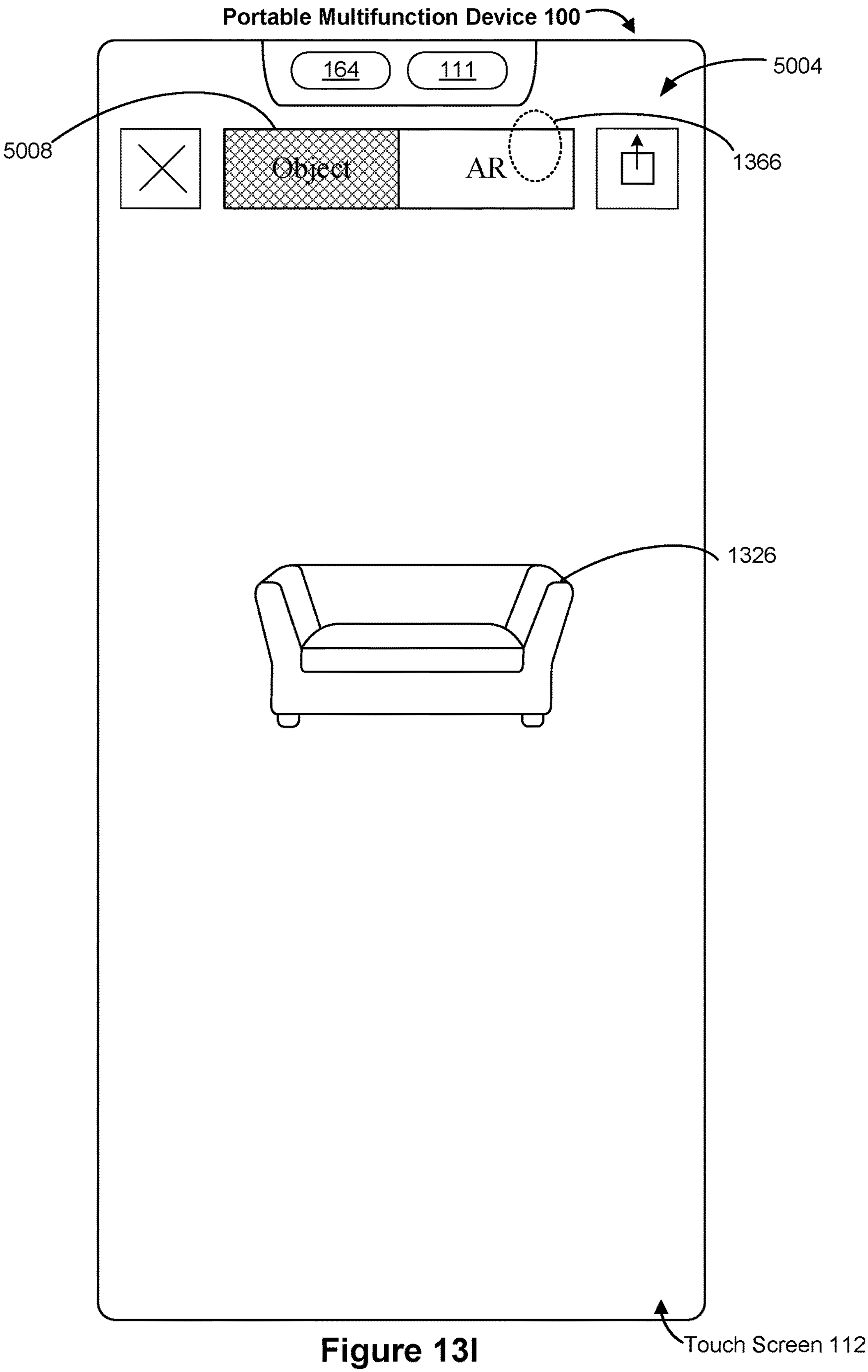
Figure 13J:
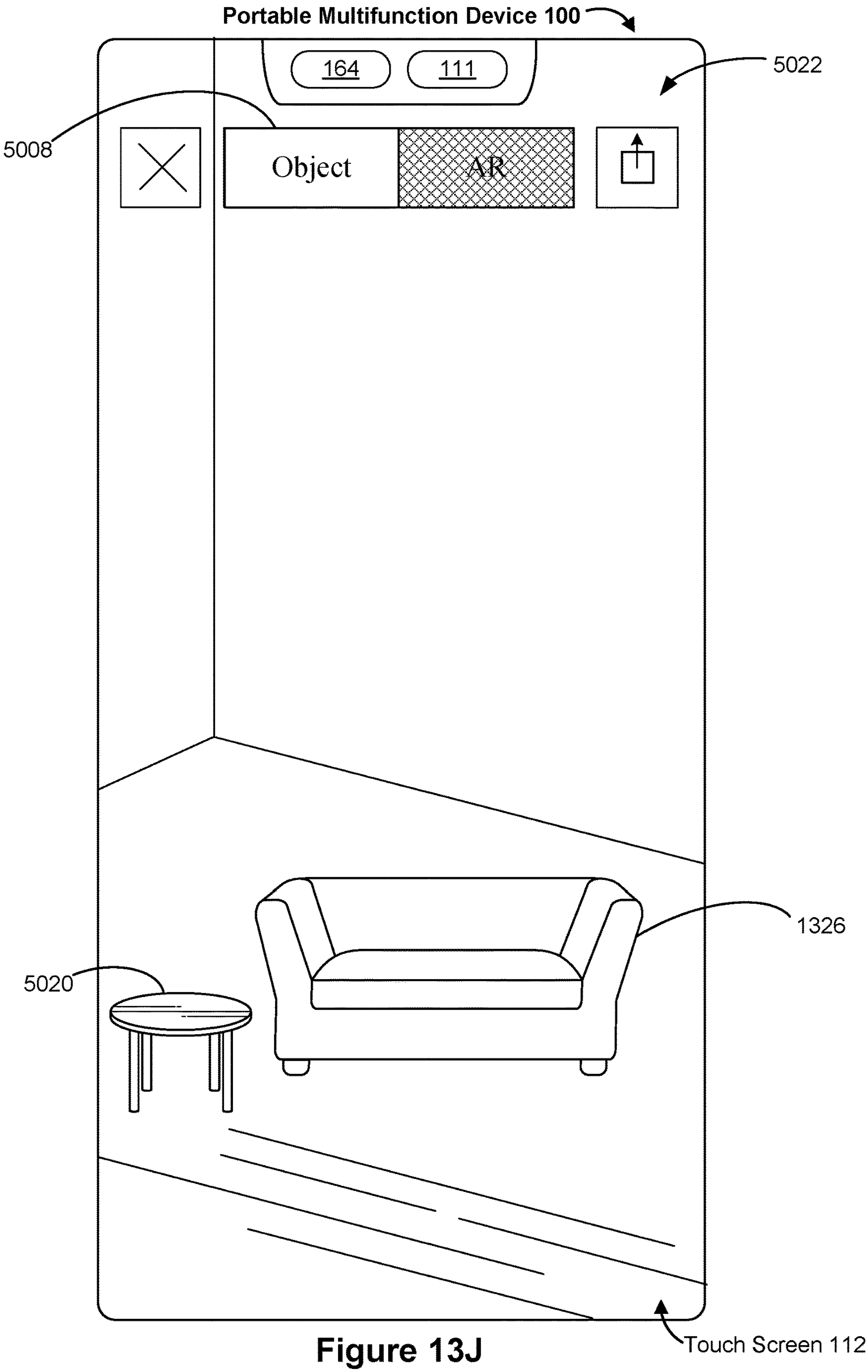

FIGS. 13H-13J are related to an object selection user interface 1360 that is not configured to perform the purchase operation (e.g., for purchasing the content items as described with regard to FIGS. 13A-13G).

As illustrated in FIG. 13H, object selection user interface 1360 is a file user interface that displays two-dimensional images that correspond to virtual objects available for viewing. For example, in the object selection user interface illustrated in FIG. 13H, image 1362 is a two-dimensional representation of a virtual model 1326. For example, before purchasing content item 1308 using shopping user interface 1300, a user stored virtual model 1362 corresponding to content item 1308 in a personal collection of virtual models illustrated in object selection user interface 1360. While the object selection user interface 1360 is displayed, a request to display the virtual model that corresponds to the content represented by image 1362. For example, an input (e.g., a tap input) by contact 1364 is detected at a location that corresponds to image 1362. In some embodiments, in response to the request to display the virtual model that corresponds to the content item, the virtual model is displayed in an object staging user interface (e.g., object staging user interface 5004, as illustrated in FIG. 13I). In some embodiments, in response to the request to display the virtual model that corresponds to the content item, the virtual model is displayed in an augmented reality user interface (e.g., augmented reality user interface 5022, as illustrated in FIG. 13J).

As illustrated in FIG. 13I, in response to the input by contact 1364, virtual model 1326 of content item 1308 is displayed in object staging user interface 5004. Because the input to display virtual model 1326 was received in object selection user interface 1360, which is not a shopping user interface for acquiring content, no purchase button (selectable user interface object 1328) is displayed.

As illustrated in FIG. 13I, in response to the input by contact 1364, virtual model 1326 of content item 1308 is displayed in object staging user interface 5004. Because the input to display virtual model 1326 was received in object selection user interface 1360, which is not a shopping user interface for acquiring content, no purchase button (selectable user interface object 1328) is displayed.

While virtual model 1326 is displayed in object staging user interface 5004, as shown in FIG. 13I, an input (e.g., a tap input) by contact 1366 is detected on touch-sensitive display system 112 at a location that corresponds to the "AR" region of toggle control 5008. In response to the input, display of object staging user interface 5004 is replaced by display of virtual model 1326 in an augmented reality user interface 5022 (e.g., virtual model 1326 is displayed in a physical environment captured by one or more cameras of device 100), as illustrated in FIG. 13J. Because the input to display virtual model 1326 was received in object selection user interface 1360, which is not a shopping user interface for acquiring content, no purchase button (selectable user interface object 1328) is displayed in augmented reality user interface 5022.

FIGS. 14A-14B are flow diagrams illustrating method 1400 process for displaying a virtual model of content concurrently with a selectable user interface object for performing an operation associated with the content, in accordance with some embodiments. Method 1400 is performed at an electronic device (e.g., device 300, FIG. 3, or portable multifunction device 100, FIG. 1A) with a display generation component (e.g., a display, a projector, a heads-up display, etc.) and one or more input devices (e.g., a touch-screen display that serves both as the display and the touch-sensitive surface, cameras, controllers, joysticks, buttons, etc.). In some embodiments, the display generation component is a touch-screen display and the touch-sensitive surface is an input device that is on or integrated with the display generation component. In some embodiments, the display generation component is separate from one or more input devices. Some operations in method 1400 are, optionally, combined and/or the order of some operations is, optionally, changed.

The device displays (1402), by the display generation component (e.g., touch-sensitive display system 112), a first user interface with a first representation (e.g., a two-dimensional representation) of content (e.g., one or more content items displayed in a website or application). For example, the first user interface is shopping user interface 1300 that displays content items 1302, 1304, 1306, and 1308, as described with regard to FIG. 13A, or an object selection user interface 1360 that displays content item 1362, as described with regard to FIG. 13H. In some embodiments, the content includes representations of one or more physical objects (e.g., to be delivered to the user when acquired). In some embodiments, the content includes media items, such as virtual objects, video, images, and/or audio (e.g., to be provided to the device of the user when acquired). For example, content includes media item (e.g., a photograph) that is displayable in an augmented reality view as described with regard to FIGS. 6A-6AI and 10A-10C. In some embodiments, the one or more content items are currently selected content items.

While displaying the first user interface with the first representation of the content, the device receives (1404), via the one or more input devices, a request to display a virtual model (e.g., a three-dimensional representation) that corresponds to the content (e.g., the virtual model includes one or more virtual objects that correspond respectively to the one or more content items). For example, the request to display a virtual model is an input at a location that corresponds to a content item (e.g., a tap input by contact 1324 at a location that corresponds to content item 1308, as described with regard to FIG. 13A, or a tap input by contact 1364 at a location that corresponds to content item 1362, as described with regard to FIG. 13H).

In response to receiving the request to display the virtual model that corresponds to the content (1406): in accordance with a determination that the first user interface is configured to perform an operation associated with the content (e.g., an operation for acquiring (e.g., downloading and/or purchasing) the content), the device displays the virtual model of the content concurrently with a selectable user interface object (e.g., a control for activating the operation for acquiring the content) for performing the operation associated with the content. For example, shopping user interface 1300, as described with regard to FIG. 13A, is configured to perform an acquisition operation for acquiring selected content. In response to a request to display a virtual model while shopping user interface 1300 is displayed, virtual model 1326 is displayed concurrently with selectable user interface object 1328, as described with regard to FIGS. 13B and 13C. In accordance with a determination that the first user interface is not configured to perform the operation associated with the content (e.g., the user interface is an application or website that does not include a feature for acquiring content) the device displays the virtual model of the content without displaying a selectable user interface object for performing the operation associated with the content. For example, object selection user interface 1360, as described with regard to FIG. 13H, is not configured to perform the acquisition operation for acquiring selected content. In response to a request to display a virtual model while object selection user interface 1360 is displayed, virtual model 1326 is displayed without displaying selectable user interface object 1328, as described with regard to FIGS. 13I and 13J. In some embodiments, the user interface that is configured to perform the operation associated with the content is a user interface of a website or application for acquiring content. In some embodiments, the user interface that is not configured to perform the operation associated with the content is a file management interface for viewing, selecting, and/or otherwise interacting with files. In some embodiments, the operation associated with the content is an operation for paying for the content and/or displaying a payment user interface (e.g., to authorize payment and/or provide payment details) for the content. In some embodiments, the operation associated with the content is an operation for performing an animation sequence associated with the content (e.g., as described with regard to FIGS. 5A-5AK and 9A-9C). In some embodiments, the operation associated with the content is an operation for sharing the content. Displaying a virtual model of content concurrently with a selectable user interface object in accordance with a determination that a user interface is configured to perform an operation associated with the content (e.g., a button for acquiring the content) reduces the number of inputs needed to perform an operation (e.g., by allowing a user to select the button for acquiring the content while viewing the virtual model rather than requiring the user to provide additional input to access a separate interface in order to acquire the content). Reducing the number of inputs needed to perform an operation enhances operability of the device and makes the user-device interface more efficient which, additionally, reduces power usage and improves battery life of the device by enabling the user to use the device more quickly and efficiently.

In some embodiments, the device detects (1408) an input directed to the selectable user interface object for performing the operation associated with the content; and in response to detecting the input directed to the selectable user interface object for performing the operation associated with the content, the device performs the operation (e.g., acquire the content and/or display a user interface that facilitates (e.g., displays prompts to provide input related to) acquisition of the content). For example, as described with regard to FIGS. 13C-13D, an input is detected at a location that corresponds to with selectable user interface object 1328, and, in response to the input, a payment interface (e.g., native payment interface 1340, as described with regard to FIG. 13D, or store payment interface 1342, as described with regard to FIG. 13E) is displayed. Performing an operation associated with content in response to input directed to a selectable user interface object (e.g., a button for acquiring the content) that is displayed concurrently with a virtual model of the content reduces the number of inputs needed to perform an operation (e.g., by allowing a user to acquire the content while viewing of the virtual model rather than requiring the user to provide additional input to access a separate interface in order to acquire the content). Reducing the number of inputs needed to perform an operation enhances operability of the device and makes the user-device interface more efficient which, additionally, reduces power usage and improves battery life of the device by enabling the user to use the device more quickly and efficiently.

In some embodiments, while displaying the virtual model of the content concurrently with the selectable user interface object for performing the operation associated with the content, the device displays (1410) data that corresponds to the content (e.g., metadata for the content, such as price, length, width, height, circumference, area, volume, weight, size, available sizes, color, and/or available colors). For example, as described with regard to FIGS. 13C and 13D, metadata 1322 is displayed while virtual model 1326 is displayed concurrently with selectable user interface object 1336. In some embodiments, metadata is stored in association with the one or more content items (e.g., by an application that displays the first representation of the content or by a server that provides content displayed by a website or application). Displaying data that corresponds to content while displaying a virtual model of the content reduces the number of inputs needed to view data that corresponds to the content (e.g., by allowing a user to view content metadata while viewing the virtual model rather than requiring the user to provide additional input to view the content metadata in a separate interface). Reducing the number of inputs needed to perform an operation enhances operability of the device and makes the user-device interface more efficient which, additionally, reduces power usage and improves battery life of the device by enabling the user to use the device more quickly and efficiently.

In some embodiments, the content includes (1412) a plurality of content items (e.g., content items that have been selected for acquisition) and the virtual model of the content includes a plurality of virtual objects, wherein a respective virtual object of the plurality of virtual objects corresponds to a respective content item of the plurality of content items. (For example, as described with regard to FIGS. 13F-13G, content that includes selected content items 1302, 1304, and 1308. In response to a request to display the virtual model that corresponds to the content, a virtual model is displayed in FIG. 13G that includes virtual object 1356 associated with content item 1302, virtual object 1358 associated with content item 1304, and virtual object 1360 associated with content item 1308. Displaying a virtual model that includes a plurality of virtual objects, wherein a respective virtual object of the plurality of virtual objects corresponds to a respective content item of the plurality of content items, reduces the number of inputs needed to view multiple virtual objects (e.g., by allowing a user to view multiple virtual objects concurrently without having to provide multiple inputs in order to display each virtual object individually). Reducing the number of inputs needed to perform an operation enhances operability of the device and makes the user-device interface more efficient which, additionally, reduces power usage and improves battery life of the device by enabling the user to use the device more quickly and efficiently.

In some embodiments, the virtual model of the content and the selectable user interface object for performing the operation associated with the content are displayed (1414) in the first user interface (e.g., in shopping user interface 1300). Displaying the virtual model of the content and the selectable user interface object for performing the operation associated with the content (e.g., a button for acquiring the content) in the first user interface displayed while the request to display the virtual model is received reduces the number of inputs required to perform an operation (e.g., by allowing a user to select the button for acquiring the content from while viewing the virtual model in the first user interface, rather than requiring the user to provide additional input to access a separate interface in order to acquire the content). Reducing the number of inputs needed to perform an operation enhances operability of the device and makes the user-device interface more efficient which, additionally, reduces power usage and improves battery life of the device by enabling the user to use the device more quickly and efficiently.

In some embodiments, displaying the virtual model of the content concurrently with the selectable user interface object includes (1416): displaying a second user interface (e.g., replacing display of the first user interface and/or at least partially overlaying the first user interface) and displaying the virtual model of the content concurrently with the selectable user interface object in the second user interface (e.g., an interstitial user interface, an augmented reality user interface, a virtual environment, and/or a user interface for providing acquisition authorization input). For example, the virtual model (e.g., virtual model 1326) is displayed concurrently with the selectable user interface object (e.g., selectable user interface object 1328) in an object staging user interface 5004, as described with regard to FIG. 13B, or in an augmented reality user interface 5022, as described with regard to FIG. 13C. Displaying the virtual model of the content and the selectable user interface object for performing the operation associated with the content (e.g., a button for acquiring the content) in a second user interface without requiring further user input enhances the operability of the device (e.g., by displaying a second user interface and displaying the button in response to a single input instead of requiring separate inputs to display the second user interface and to display the button) and makes the user-device interface more efficient which, additionally, reduces power usage and improves battery life of the device by enabling the user to use the device more quickly and efficiently.

In some embodiments, while displaying the second user interface (e.g., a staging user interface that includes a simulated three-dimensional space in which a three-dimensional representation of the virtual object may be manipulated (e.g., rotated around an x-axis, a y-axis, and/or a z-axis, and/or resized) in response to user input), the device detects (1418) a manipulation input directed to the virtual model (e.g., a pinch or swipe at a location on a touch-sensitive surface that corresponds to the virtual model or that corresponds to a respective virtual object of a plurality of virtual objects of the model) and, in response to detecting the manipulation input directed to the virtual model, the device changes a display property of the virtual model based on the manipulation input (e.g., rotating and/or resizing the virtual model (e.g., collectively or individually rotating and/or resizing one or more virtual objects)). For example, while the virtual model (e.g., virtual model 1326) is displayed concurrently with the selectable user interface object (e.g., selectable user interface object 1328) in an object staging user interface 5004, as described with regard to FIG. 13B, a manipulation input is received for manipulating virtual model 1326. Manipulation of virtual objects in an object staging user interface 5004 is described further with regard to FIGS. 5B-5C. In some embodiments, while the second user interface is displayed, an input for displaying the virtual model in an augmented reality view is detected (e.g., at a location of a displayed control for displaying an augmented reality view). In response to detecting the input for displaying the virtual model in the augmented reality view, the virtual model is displayed with at least a portion of a field of view of the one or more cameras. For example, in response to an input detected at a location that corresponds to the "AR" region of toggle control 5008, display of virtual model 1326 in object staging user interface 5004 is replaced with display of virtual model 1326 with at least a portion of a field of view of one or more cameras in an augmented reality user interface 5022, as described with regard to FIGS. 13B-13C. Changing a display property of a virtual model based on a manipulation input directed to the virtual model provides improved visual feedback to the user (e.g., indicating that the virtual model is changeable in response to user input). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device includes (1420) one or more cameras (e.g., one or more rear-facing cameras on a side of the device opposite from the display and the touch-sensitive surface) and displaying the second user interface includes displaying the virtual model and the selectable user interface object with at least a portion of the field of view of the one or more cameras. For example, the virtual model (e.g., virtual model 1326) is displayed concurrently with the selectable user interface object (e.g., selectable user interface object 1328) in an augmented reality user interface 5022, as described with regard to FIG. 13C. Displaying the virtual model of the content and the selectable user interface object for performing the operation associated with the content (e.g., a button for acquiring the content) with at least a portion of the field of view of the one or more cameras (e.g., displaying the virtual model in an augmented reality view of a physical environment) without requiring further user input enhances the operability of the device (e.g., by displaying the virtual model in the augmented reality view and displaying the button for acquiring the content in response to a single input rather than requiring separate inputs to display the virtual model in the augmented reality view and to display the button for acquiring the content) and makes the user-device interface more efficient which, additionally, reduces power usage and improves battery life of the device by enabling the user to use the device more quickly and efficiently.

In some embodiments, the selectable user interface object for performing the operation associated with the content is displayed (1422) at a location that corresponds to the displayed portion of the field of view of the one or more cameras. For example, as described with regard to FIG. 13C, the selectable user interface object (e.g., selectable user interface object 1328) is displayed overlaying the displayed portion of the field of view of the one or more cameras (e.g., as shown in augmented reality user interface 5022). Displaying the selectable user interface object for performing the operation associated with the content (e.g., a button for acquiring the content) at a location that corresponds to the displayed portion of the field of view of the one or more cameras reduces the number of inputs required to perform an operation (e.g., by displaying the virtual model in the augmented reality view and displaying the button for acquiring the content in response to a single input rather than requiring separate inputs to display the virtual model in the augmented reality view and to display the button for acquiring the content). Reducing the number of inputs required to perform an operation enhances the operability of the device and makes the user-device interface more efficient which, additionally, reduces power usage and improves battery life of the device by enabling the user to use the device more quickly and efficiently.

In some embodiments, the selectable user interface object for performing the operation associated with the content has (1424) a display property (e.g., at least a portion of the selectable user interface object is translucent) that renders the displayed portion of the field of view of the one or more cameras partially visible through the selectable user interface object. For example, in FIG. 13C, the floor of the physical environment visible in augmented reality user interface 5022 is partial visible through selectable user interface object 1328. Displaying the selectable user interface object for performing the operation associated with the content (e.g., a button for acquiring the content) with a display property that allows the displayed portion of the field of view of the one or more cameras partially visible through the selectable user interface object (e.g., displaying a translucent button through which the augmented reality view of the physical environment and/or the virtual model is visible) reduces the number of inputs required to perform the operation (e.g., by allowing the user to simultaneously view the button and the augmented reality view rather than requiring the user to provide additional input to access a separate interface in order to display the button for acquiring the content). Reducing the number of inputs needed to perform an operation enhances the operability of the device and makes the user-device interface more efficient which, additionally, reduces power usage and improves battery life of the device by enabling the user to use the device more quickly and efficiently.

In some embodiments, while displaying the virtual model of the content concurrently with the selectable user interface object for performing the operation associated with the content, the device detects (1424) an input directed to the selectable user interface object, and in response to detecting the input directed to the selectable user interface object, the device displays a third user interface (e.g., replacing display of the first user interface or the second user interface with the third user interface, or displaying the third user interface at least partially overlaying the first user interface or the second user interface). (For example, as described with regard FIG. 13C, an input (e.g., a tap input by contact 1336) is detected at a location that corresponds to selectable user interface object 1328. In response to receiving the input, native payment interface 1340 e.g., an Apple Pay transaction processing interface) is displayed, as described with regard to FIG. 13D, or a store payment interface 1342 (e.g., a checkout page associated with a store that provides an application or website) is displayed, as described with regard to FIG. 13E. While displaying the third user interface, the device detects an input to authorize acquisition of the content (e.g., an input at a sensor for fingerprint, thumbprint, or facial recognition, input at a displayed number pad entry prompt, input at a physical button of the device, and/or an input at a location on a touchscreen that corresponds to a displayed authorization user interface object). For example, the input to authorize acquisition of the content is a thumbprint input detected by a thumbprint sensor at a location indicated by region 1341, as described with regard to FIG. 13D, or the input to authorize acquisition of the content is an input (e.g., a tap input) at a location that corresponds to "Place Order" button 1344), as described with regard to FIG. 13E. In response to detecting the request to authorize the acquisition of the content, the device acquires the content (e.g., downloading the content and/or transmitting authorization information to the application, the website, and/or a transaction processing service for acquiring the content). Displaying a third user interface for authorizing acquisition of content in response to detecting an input detected while displaying the virtual model is displayed reduces a number of inputs required (e.g., by displaying the interface for authorizing acquisition of content directly from the interface that displays the virtual model, rather than requiring the user to provide additional input to navigate away from the interface that displays the virtual model to a separate interface that displays a control for displaying the interface for authorizing acquisition of content) and makes the user-device interface more efficient which, additionally, reduces power usage and improves battery life of the device by enabling the user to use the device more quickly and efficiently.

It should be understood that the particular order in which the operations in FIGS. 14A-14B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, and 1200) are also applicable in an analogous manner to method 1400 described above with respect to FIGS. 14A-14B. For example, the contacts, inputs, gestures, virtual model, virtual objects, environments, user interface regions, user interface objects, and/or fields of view described above with reference to method 1400 optionally have one or more of the characteristics of the contacts, inputs, gestures, media items, virtual objects, environments, user interface regions, user interface objects, and/or fields of view described herein with reference to other methods described herein (e.g. methods 900, 1000, 1100, and 1200). For brevity, these details are not repeated here.

The operations described above with reference to 9A-9C, 10A-10C, 11A-11D, 12A-12B, and 14A-14B are, optionally, implemented by components depicted in FIGS. 1A-1B. For example, display operations 902, 1002, 1006, 1010, 1102, 1202, 1206, 1402, and 1406; detection operations 904, 1004, 1008, 1104, 1204; performance operation 906; change operation 1106, and receiving operation 1404 are, optionally, implemented by event sorter 170, event recognizer 180, and event handler 190. Event monitor 171 in event sorter 170 detects a contact on touch-sensitive display system 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at an electronic device including a display generation component, one or more input devices, and one or more cameras:

displaying, by the display generation component:

a first user interface region;

a first representation of a first media item in the first user interface region; and a first user interface object for displaying a sharing user interface;

while displaying the first user interface region, detecting a first input corresponding to the first user interface object;

in response to detecting the first input corresponding to the first user interface object, displaying the sharing user interface that includes a second user interface object for initiating a process for displaying a second representation of the first media item in an augmented reality environment;

while the sharing user interface is displayed, detecting a sequence of one or more inputs including selection of the second user interface object; and in response to detecting the sequence of one or more inputs including selection of the second user interface object, displaying the second representation of the first media item in a second user interface that includes content of at least a portion of a field of view of the one or more cameras.

2. The method of claim 1, wherein the displayed second representation of the first media item overlays a respective plane in the field of view of the one or more cameras.

3. The method of claim 2, including:

while displaying the second representation of the first media item in the second user interface, detecting an input for rotating the second representation of the first media item; and in response to the input for rotating the second representation of the first media item, rotating the second representation of the first media item about an axis that is normal to the respective plane in the field of view of the one or more cameras over which the first media item is displayed.

4. The method of claim 1, including:

detecting first movement of the electronic device that adjusts the field of view of the one or more cameras; and in response to detecting the first movement of the electronic device, adjusting the second representation of the first media item in accordance with a fixed spatial relationship between the second representation of the first media item and a respective plane in the field of view of the one or more cameras.

5. The method of claim 1, including:

detecting selection of a first representation of a second media item; and in response to detecting the sequence of one or more inputs including selection of the second user interface object, displaying a second representation of the second media item in the second user interface that includes the content of at least a portion of the field of view of the one or more cameras.

6. The method of claim 5, wherein the selection of the second media item is detected while the sharing user interface is displayed.

7. The method of claim 5, including:

while displaying the first user interface region, displaying the first representation of the second media item; and wherein the selection of the second media item is detected while the first user interface region is displayed.

8. The method of claim 5, wherein:

selection of the first media item is detected at a first time;

selection of the second media item is detected at a second time; and wherein displaying the second representation of the first media item in the second user interface and displaying the second representation of the second media item in the second user interface includes:

in accordance with a determination that the first time is prior to the second time, displaying the second representation of the first media item and the second representation of the second media item with a first order; and in accordance with a determination that the second time is prior to the first time, displaying the second representation of the first media item and the second representation of the second media item with a second order that is distinct from the first order.

9. The method of claim 5, including:

while displaying the second representation of the first media item in the second user interface and displaying the second representation of the second media item in the second user interface, detecting an input for manipulating a second representation of a respective media item; and in response to detecting the input for manipulating the second representation of the respective media item:

in accordance with a determination that the input for manipulating the second representation of the respective media item is directed to the second representation of the first media item, manipulating the second representation of the first media item based on the first input; and in accordance with a determination that the input for manipulating the second representation of the respective media item is directed to the second representation of the second media item, manipulating the second representation of the second media item based on the first input.

10. The method of claim 1, wherein the sharing user interface includes a third user interface object for transmitting the first media item to a remote device.

11. The method of claim 1, wherein the second representation of the first media item is displayed with an orientation that is perpendicular to a plane in the field of view of the one or more cameras.

12. The method of claim 11, including:

while a first face of the second representation of the first media item is displayed, detecting a second movement of the electronic device that adjusts the field of view of the one or more cameras, in response to detecting the second movement of the electronic device, adjusting the second representation of the first media item in accordance with a fixed spatial relationship between the second representation of the first media item and the plane in the field of view of the one or more cameras, wherein:

after the second movement, a second face, opposite the first face, of the second representation of the first media item is displayed; and the second face of the second representation of the first media item is a reversed version of the first face of the second representation of the first media item.

13. A computer system, comprising:

a display generation component;

one or more input devices;

one or more cameras;

one or more processors; and memory storing one or more programs, wherein the one or more programs are configured to be executed by the one or more processors, the one or more programs including instructions for:

displaying, by the display generation component:

a first user interface region;

a first representation of a first media item in the first user interface region; and a first user interface object for displaying a sharing user interface;

while displaying the first user interface region, detecting a first input corresponding to the first user interface object;

in response to detecting the first input corresponding to the first user interface object, displaying the sharing user interface that includes a second user interface object for initiating a process for displaying a second representation of the first media item in an augmented reality environment;

while the sharing user interface is displayed, detecting a sequence of one or more inputs including selection of the second user interface object; and in response to detecting the sequence of one or more inputs including selection of the second user interface object, displaying the second representation of the first media item in a second user interface that includes content of at least a portion of a field of view of the one or more cameras.

14. The computer system of claim 13, wherein the displayed second representation of the first media item overlays a respective plane in the field of view of the one or more cameras.

15. The computer system of claim 14, wherein the one or more programs include instructions for:

while displaying the second representation of the first media item in the second user interface, detecting an input for rotating the second representation of the first media item; and in response to the input for rotating the second representation of the first media item, rotating the second representation of the first media item about an axis that is normal to the respective plane in the field of view of the one or more cameras over which the first media item is displayed.

16. The computer system of claim 13, wherein the one or more programs include instructions for:

detecting first movement of the computer system that adjusts the field of view of the one or more cameras; and in response to detecting the first movement of the computer system, adjusting the second representation of the first media item in accordance with a fixed spatial relationship between the second representation of the first media item and a respective plane in the field of view of the one or more cameras.

17. The computer system of claim 13, wherein the one or more programs include instructions for:

detecting selection of a first representation of a second media item; and in response to detecting the sequence of one or more inputs including selection of the second user interface object, displaying a second representation of the second media item in the second user interface that includes the content of at least a portion of the field of view of the one or more cameras.

18. The computer system of claim 17, wherein the selection of the second media item is detected while the sharing user interface is displayed.

19. The computer system of claim 17, wherein the one or more programs include instructions for:

while displaying the first user interface region, displaying the first representation of the second media item; and wherein the selection of the second media item is detected while the first user interface region is displayed.

20. The computer system of claim 17, wherein:

selection of the first media item is detected at a first time;

selection of the second media item is detected at a second time; and wherein displaying the second representation of the first media item in the second user interface and displaying the second representation of the second media item in the second user interface includes:

in accordance with a determination that the first time is prior to the second time, displaying the second representation of the first media item and the second representation of the second media item with a first order; and in accordance with a determination that the second time is prior to the first time, displaying the second representation of the first media item and the second representation of the second media item with a second order that is distinct from the first order.

21. The computer system of claim 17, wherein the one or more programs include instructions for:

while displaying the second representation of the first media item in the second user interface and displaying the second representation of the second media item in the second user interface, detecting an input for manipulating a second representation of a respective media item; and in response to detecting the input for manipulating the second representation of the respective media item:

in accordance with a determination that the input for manipulating the second representation of the respective media item is directed to the second representation of the first media item, manipulating the second representation of the first media item based on the first input; and in accordance with a determination that the input for manipulating the second representation of the respective media item is directed to the second representation of the second media item, manipulating the second representation of the second media item based on the first input.

22. The computer system of claim 13, wherein the sharing user interface includes a third user interface object for transmitting the first media item to a remote device.

23. The computer system of claim 13, wherein the second representation of the first media item is displayed with an orientation that is perpendicular to a plane in the field of view of the one or more cameras.

24. The computer system of claim 23, wherein the one or more programs include instructions for:

while a first face of the second representation of the first media item is displayed, detecting a second movement of the computer system that adjusts the field of view of the one or more cameras, in response to detecting the second movement of the computer system, adjusting the second representation of the first media item in accordance with a fixed spatial relationship between the second representation of the first media item and the plane in the field of view of the one or more cameras, wherein:

after the second movement, a second face, opposite the first face, of the second representation of the first media item is displayed; and the second face of the second representation of the first media item is a reversed version of the first face of the second representation of the first media item.

25. A non-transitory computer readable storage medium storing one or more programs, the one or more programs comprising instructions, which, when executed by a computer system with a display generation component, one or more input devices, and one or more cameras, cause the computer system to:

display, by the display generation component:

a first user interface region;

a first representation of a first media item in the first user interface region; and a first user interface object for displaying a sharing user interface;

while displaying the first user interface region, detect a first input corresponding to the first user interface object;

in response to detecting the first input corresponding to the first user interface object, display the sharing user interface that includes a second user interface object for initiating a process for displaying a second representation of the first media item in an augmented reality environment;

while the sharing user interface is displayed, detect a sequence of one or more inputs including selection of the second user interface object; and in response to detecting the sequence of one or more inputs including selection of the second user interface object, display the second representation of the first media item in a second user interface that includes content of at least a portion of a field of view of the one or more cameras.

26. The non-transitory computer readable storage medium of claim 25, wherein the displayed second representation of the first media item overlays a respective plane in the field of view of the one or more cameras.

27. The non-transitory computer readable storage medium of claim 26, wherein the one or more programs include instructions, which, when executed by the computer system, cause the computer system to:

while displaying the second representation of the first media item in the second user interface, detect an input for rotating the second representation of the first media item; and in response to the input for rotating the second representation of the first media item, rotate the second representation of the first media item about an axis that is normal to the respective plane in the field of view of the one or more cameras over which the first media item is displayed.

28. The non-transitory computer readable storage medium of claim 25, wherein the one or more programs include instructions, which, when executed by the computer system, cause the computer system to:

detect first movement of the computer system that adjusts the field of view of the one or more cameras; and in response to detecting the first movement of the computer system, adjust the second representation of the first media item in accordance with a fixed spatial relationship between the second representation of the first media item and a respective plane in the field of view of the one or more cameras.

29. The non-transitory computer readable storage medium of claim 25, wherein the one or more programs include instructions, which, when executed by the computer system, cause the computer system to:

detect selection of a first representation of a second media item; and in response to detecting the sequence of one or more inputs including selection of the second user interface object, display a second representation of the second media item in the second user interface that includes the content of at least a portion of the field of view of the one or more cameras.

30. The non-transitory computer readable storage medium of claim 29, wherein the selection of the second media item is detected while the sharing user interface is displayed.

31. The non-transitory computer readable storage medium of claim 29, wherein the one or more programs include instructions, which, when executed by the computer system, cause the computer system to:

while displaying the first user interface region, display the first representation of the second media item; and wherein the selection of the second media item is detected while the first user interface region is displayed.

32. The non-transitory computer readable storage medium of claim 29, wherein:

selection of the first media item is detected at a first time;

selection of the second media item is detected at a second time; and wherein displaying the second representation of the first media item in the second user interface and displaying the second representation of the second media item in the second user interface includes:

in accordance with a determination that the first time is prior to the second time, displaying the second representation of the first media item and the second representation of the second media item with a first order; and in accordance with a determination that the second time is prior to the first time, displaying the second representation of the first media item and the second representation of the second media item with a second order that is distinct from the first order.

33. The non-transitory computer readable storage medium of claim 29, wherein the one or more programs include instructions, which, when executed by the computer system, cause the computer system to:

while displaying the second representation of the first media item in the second user interface and displaying the second representation of the second media item in the second user interface, detect an input for manipulating a second representation of a respective media item; and in response to detecting the input for manipulating the second representation of the respective media item:

in accordance with a determination that the input for manipulating the second representation of the respective media item is directed to the second representation of the first media item, manipulate the second representation of the first media item based on the first input; and in accordance with a determination that the input for manipulating the second representation of the respective media item is directed to the second representation of the second media item, manipulate the second representation of the second media item based on the first input.

34. The non-transitory computer readable storage medium of claim 25, wherein the sharing user interface includes a third user interface object for transmitting the first media item to a remote device.

35. The non-transitory computer readable storage medium of claim 25, wherein the second representation of the first media item is displayed with an orientation that is perpendicular to a plane in the field of view of the one or more cameras.

36. The non-transitory computer readable storage medium of claim 35, wherein the one or more programs include instructions, which, when executed by the computer system, cause the computer system to:

while a first face of the second representation of the first media item is displayed, detect a second movement of the computer system that adjusts the field of view of the one or more cameras, in response to detecting the second movement of the computer system, adjust the second representation of the first media item in accordance with a fixed spatial relationship between the second representation of the first media item and the plane in the field of view of the one or more cameras, wherein:

after the second movement, a second face, opposite the first face, of the second representation of the first media item is displayed; and the second face of the second representation of the first media item is a reversed version of the first face of the second representation of the first media item.

* * * * *